US012648047B2

(12) United States Patent
Pelletier et al.

(10) Patent No.: US 12,648,047 B2
(45) Date of Patent: *Jun. 2, 2026

(54) OPERATING WITH MULTIPLE SCHEDULERS IN A WIRELESS SYSTEM

(71) Applicant: InterDigital Patent Holdings, Inc., Wilmington, DE (US)

(72) Inventors: Ghyslain Pelletier, Montreal (CA); Paul Marinier, Brossard (CA); Diana Pani, Montreal (CA); Stephen E. Terry, Northport, NY (US); Pascal M. Adjakple, Great Neck, NY (US); Samian Kaur, Plymouth Meeting, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 335 days.

This patent is subject to a terminal disclaimer.

(21) Appl. No.: 18/218,510

(22) Filed: Jul. 5, 2023

(65) Prior Publication Data

US 2023/0354464 A1 Nov. 2, 2023

Related U.S. Application Data

(63) Continuation of application No. 17/530,717, filed on Nov. 19, 2021, now Pat. No. 11,716,781, which is a (Continued)

(51) Int. Cl.
*H04W 36/00* (2009.01)
*H04L 5/00* (2006.01)
(Continued)

(52) U.S. Cl.
CPC ........... *H04W 76/27* (2018.02); *H04L 5/0032* (2013.01); *H04W 16/32* (2013.01); (Continued)

(58) Field of Classification Search
CPC . H04W 74/04; H04W 36/00; H04W 36/0072; H04W 72/04; H04W 72/042;
(Continued)

(56) References Cited

U.S. PATENT DOCUMENTS

| | | | |
|---|---|---|---|
| 7,826,411 B2 | 11/2010 | Gonikberg et al. | |
| 7,978,677 B2 | 7/2011 | Prakash et al. | |

(Continued)

FOREIGN PATENT DOCUMENTS

| | | |
|---|---|---|
| CN | 1863344 | 11/2006 |
| CN | 1878392 | 12/2006 |

(Continued)

OTHER PUBLICATIONS

Ericsson, "RNL-based energy saving solution—Change Request", 3GPP Tdoc R3-093104, 3GPP TSG-RAN Meeting #66, Jeju, Korea, Nov. 13, 2009, 27 pages.

(Continued)

*Primary Examiner* — Robert C Scheibel
(74) *Attorney, Agent, or Firm* — Volpe Koenig

(57) ABSTRACT

Systems and methods are disclosed for a WTRU to operate using multiple schedulers. The WTRU may exchange data with the network over more than one data path, such that each data path may use a radio interface connected to a different network node and each node may be associated with an independent scheduler. For example, a WTRU may establish a RRC connection between the WTRU and a network. The RRC connection may establish a first radio interface between the WTRU and a first serving site of the network and a second radio interface between the WTRU and a second serving site of the network. The RRC connection may be established between the WTRU and the MeNB and a control function may be established between the WTRU and the SCeNB. The WTRU may receive data from (Continued)

X2bis the network over the first radio interface or the second radio interface.

18 Claims, 32 Drawing Sheets

Related U.S. Application Data continuation of application No. 16/418,832, filed on May 21, 2019, now Pat. No. 11,184,942, which is a continuation of application No. 15/695,850, filed on Sep. 5, 2017, now Pat. No. 10,349,463, which is a continuation of application No. 14/794,493, filed on Jul. 8, 2015, now Pat. No. 9,788,358, which is a continuation of application No. 13/974,946, filed on Aug. 23, 2013, now Pat. No. 9,113,450.

(60) Provisional application No. 61/863,311, filed on Aug. 7, 2013, provisional application No. 61/821,186, filed on May 8, 2013, provisional application No. 61/821,071, filed on May 8, 2013, provisional application No. 61/753,334, filed on Jan. 16, 2013, provisional application No. 61/753,323, filed on Jan. 16, 2013, provisional application No. 61/726,448, filed on Nov. 14, 2012, provisional application No. 61/692,548, filed on Aug. 23, 2012.

(51) Int. Cl.

| | |
|---|---|
| *H04W 16/32* | (2009.01) |
| *H04W 52/36* | (2009.01) |
| *H04W 72/1263* | (2023.01) |
| *H04W 72/1268* | (2023.01) |
| *H04W 72/23* | (2023.01) |
| *H04W 74/04* | (2009.01) |
| *H04W 76/15* | (2018.01) |
| *H04W 76/27* | (2018.01) |
| *H04W 88/06* | (2009.01) |
| H04W 24/00 | (2009.01) |
| H04W 48/16 | (2009.01) |
| H04W 84/04 | (2009.01) |

(52) U.S. Cl.
CPC ..... *H04W 36/0072* (2013.01); *H04W 52/365* (2013.01); *H04W 72/1263* (2013.01); *H04W 72/1268* (2013.01); *H04W 72/23* (2023.01); *H04W 74/04* (2013.01); *H04W 76/15* (2018.02); *H04W 24/00* (2013.01); *H04W 48/16* (2013.01); *H04W 84/042* (2013.01); *H04W 88/06* (2013.01)

(58) Field of Classification Search
CPC ......... H04W 72/1263; H04W 72/1268; H04W 88/06; H04W 76/15; H04W 76/27; H04W 16/32; H04W 52/365; H04W 48/16; H04L 5/0032
See application file for complete search history.

(56) References Cited

U.S. PATENT DOCUMENTS

| | | | |
|---|---|---|---|
| 8,184,658 B1 | 5/2012 | Chowdhuri et al. | |
| 8,195,991 B2 | 6/2012 | Kitazoe | |
| 8,248,996 B2 | 8/2012 | Li et al. | |
| 8,364,199 B2 | 1/2013 | Xue et al. | |
| 8,369,290 B2 | 2/2013 | Xing et al. | |
| 8,391,906 B2 | 3/2013 | Flore et al. | |
| 8,416,678 B2 * | 4/2013 | Yi | H04L 63/12 |
| | | | 370/216 |
| 8,498,284 B2 | 7/2013 | Pani et al. | |
| 8,553,580 B2 | 10/2013 | Yin | |
| 8,644,286 B2 | 2/2014 | Sollenberger et al. | |
| 9,008,671 B2 | 4/2015 | Fodor et al. | |
| 9,112,552 B2 | 8/2015 | Ko et al. | |
| 9,113,450 B2 | 8/2015 | Pelletier et al. | |
| 9,185,580 B2 | 11/2015 | Jung et al. | |
| 9,220,028 B2 | 12/2015 | Suzuki et al. | |
| 9,220,124 B2 | 12/2015 | Wegmann et al. | |
| 9,392,515 B2 | 7/2016 | Wang et al. | |
| 9,788,358 B2 | 10/2017 | Pelletier et al. | |
| 9,882,821 B2 | 1/2018 | Bi et al. | |
| 9,923,659 B2 | 3/2018 | Kang et al. | |
| 10,034,205 B2 | 7/2018 | Kazmi et al. | |
| 10,341,910 B2 | 7/2019 | Burbidge et al. | |
| 10,349,463 B2 | 7/2019 | Pelletier et al. | |
| 2004/0152458 A1 | 8/2004 | Hottinen | |
| 2005/0202823 A1 | 9/2005 | Shaheen et al. | |
| 2006/0050705 A1 | 3/2006 | Kim | |
| 2006/0056448 A1 * | 3/2006 | Zaki | H04W 36/0066 |
| | | | 370/466 |
| 2006/0121921 A1 | 6/2006 | Tajima et al. | |
| 2006/0268821 A1 | 11/2006 | Terry | |
| 2007/0116012 A1 | 5/2007 | Chang et al. | |
| 2007/0155390 A1 | 7/2007 | Kodikara et al. | |
| 2007/0201397 A1 | 8/2007 | Zhang | |
| 2007/0232358 A1 | 10/2007 | Sherman | |
| 2007/0263574 A1 | 11/2007 | Lu et al. | |
| 2007/0286126 A1 | 12/2007 | Prakash et al. | |
| 2008/0171561 A1 | 7/2008 | Irony et al. | |
| 2008/0220787 A1 | 9/2008 | Stanwood et al. | |
| 2009/0103478 A1 | 4/2009 | Sammour et al. | |
| 2009/0103496 A1 | 4/2009 | Purkayastha et al. | |
| 2009/0122730 A1 | 5/2009 | Yang et al. | |
| 2009/0175214 A1 | 7/2009 | Sfar et al. | |
| 2009/0180451 A1 | 7/2009 | Alpert et al. | |
| 2009/0196259 A1 | 8/2009 | Pani et al. | |
| 2009/0201864 A1 | 8/2009 | Ahluwalia | |
| 2009/0232067 A1 | 9/2009 | Pajukoski et al. | |
| 2009/0238124 A1 | 9/2009 | Pragada et al. | |
| 2009/0247163 A1 | 10/2009 | Aoyama et al. | |
| 2009/0253433 A1 | 10/2009 | Voyer et al. | |
| 2009/0310579 A1 | 12/2009 | Furuta | |
| 2009/0316659 A1 | 12/2009 | Lindoff et al. | |
| 2010/0020852 A1 | 1/2010 | Erell et al. | |
| 2010/0027471 A1 | 2/2010 | Palanki et al. | |
| 2010/0034167 A1 | 2/2010 | Umesh et al. | |
| 2010/0039988 A1 | 2/2010 | Narasimha et al. | |
| 2010/0075698 A1 | 3/2010 | Rune et al. | |
| 2010/0087202 A1 | 4/2010 | Ventola et al. | |
| 2010/0098012 A1 | 4/2010 | Bala et al. | |
| 2010/0124291 A1 | 5/2010 | Muharemovic et al. | |
| 2010/0157895 A1 | 6/2010 | Pani et al. | |
| 2010/0157923 A1 | 6/2010 | Jung et al. | |
| 2010/0157943 A1 | 6/2010 | Horn | |
| 2010/0157944 A1 | 6/2010 | Horn | |
| 2010/0159919 A1 | 6/2010 | Wu | |
| 2010/0202392 A1 | 8/2010 | Zhang et al. | |
| 2010/0202394 A1 | 8/2010 | Zhang et al. | |
| 2010/0240359 A1 | 9/2010 | Wu | |
| 2010/0240375 A1 | 9/2010 | Ahluwalia | |
| 2010/0260111 A1 | 10/2010 | Sung et al. | |
| 2010/0260147 A1 | 10/2010 | Xing et al. | |
| 2010/0273520 A1 | 10/2010 | Pelletier et al. | |
| 2010/0296473 A1 | 11/2010 | Kim et al. | |
| 2011/0021154 A1 | 1/2011 | Marinier et al. | |
| 2011/0038271 A1 | 2/2011 | Shin et al. | |
| 2011/0044218 A1 | 2/2011 | Kaur et al. | |
| 2011/0044297 A1 | 2/2011 | Lee et al. | |
| 2011/0105173 A1 | 5/2011 | Haim et al. | |
| 2011/0134774 A1 | 6/2011 | Pelletier et al. | |
| 2011/0134831 A1 * | 6/2011 | Pirskanen | H04L 5/001 |
| | | | 370/328 |
| 2011/0141959 A1 | 6/2011 | Damnjanovic et al. | |
| 2011/0183694 A1 | 7/2011 | Han | |
| 2011/0255577 A1 | 10/2011 | Agee et al. | |
| 2011/0275374 A1 | 11/2011 | Narasimha et al. | |
| 2011/0281615 A1 | 11/2011 | Yamada et al. | |
| 2011/0287804 A1 | 11/2011 | Seo et al. | |

(56) References Cited

U.S. PATENT DOCUMENTS

| | | |
|---|---|---|
| 2011/0300856 A1 | 12/2011 | Aminaka |
| 2011/0310859 A1* | 12/2011 | Vedantham ....... H04W 72/1263 |
| | | 370/336 |
| 2012/0039471 A1 | 2/2012 | Kim et al. |
| 2012/0064936 A1 | 3/2012 | Vrzic et al. |
| 2012/0082046 A1 | 4/2012 | Ho et al. |
| 2012/0082107 A1 | 4/2012 | Ou et al. |
| 2012/0083308 A1 | 4/2012 | Wang et al. |
| 2012/0099439 A1 | 4/2012 | Baldemair et al. |
| 2012/0113831 A1 | 5/2012 | Pelletier et al. |
| 2012/0140743 A1 | 6/2012 | Pelletier et al. |
| 2012/0178454 A1 | 7/2012 | Kim et al. |
| 2012/0184265 A1 | 7/2012 | Love et al. |
| 2012/0289170 A1 | 11/2012 | Li et al. |
| 2013/0028069 A1 | 1/2013 | Pelletier et al. |
| 2013/0044692 A1 | 2/2013 | Nory et al. |
| 2013/0058315 A1 | 3/2013 | Feuersanger et al. |
| 2013/0083678 A1 | 4/2013 | Yin |
| 2013/0107861 A1 | 5/2013 | Cheng et al. |
| 2013/0165130 A1 | 6/2013 | Wu et al. |
| 2013/0176988 A1 | 7/2013 | Wang et al. |
| 2013/0176995 A1 | 7/2013 | Park et al. |
| 2013/0286997 A1 | 10/2013 | Davydov et al. |
| 2013/0294414 A1 | 11/2013 | Inumaru |
| 2014/0010192 A1 | 1/2014 | Chang et al. |
| 2014/0010207 A1 | 1/2014 | Horn et al. |
| 2014/0038590 A1 | 2/2014 | Wijting et al. |
| 2014/0056278 A1 | 2/2014 | Marinier et al. |
| 2014/0071936 A1 | 3/2014 | Zhang et al. |
| 2014/0080484 A1 | 3/2014 | Centonza et al. |
| 2014/0099939 A1 | 4/2014 | Uemura et al. |
| 2014/0126487 A1 | 5/2014 | Chen et al. |
| 2014/0254468 A1 | 9/2014 | Raaf et al. |
| 2015/0009853 A1 | 1/2015 | Wan et al. |
| 2015/0155922 A1* | 6/2015 | Bi ...................... H04L 43/0888 |
| | | 370/329 |
| 2015/0181593 A1 | 6/2015 | Kim et al. |
| 2015/0215898 A1 | 7/2015 | Nebat et al. |
| 2016/0066364 A1 | 3/2016 | Marinier et al. |
| 2016/0323790 A1 | 11/2016 | Wang et al. |
| 2017/0265176 A1 | 9/2017 | Marinier et al. |

FOREIGN PATENT DOCUMENTS

| | | |
|---|---|---|
| CN | 101232715 | 7/2008 |
| CN | 101375622 | 2/2009 |
| CN | 101379866 | 3/2009 |
| CN | 101394338 | 3/2009 |
| CN | 101529969 | 9/2009 |
| CN | 101568142 | 10/2009 |
| CN | 101843136 | 9/2010 |
| CN | 101867878 | 10/2010 |
| CN | 101909321 | 12/2010 |
| CN | 101933362 | 12/2010 |
| CN | 2018/93939 | 7/2011 |
| CN | 102149179 | 8/2011 |
| CN | 201967138 | 9/2011 |
| CN | 102238716 | 11/2011 |
| CN | 102301801 | 12/2011 |
| CN | 102308544 | 1/2012 |
| CN | 102308640 | 1/2012 |
| CN | 102461045 | 5/2012 |
| CN | 102577541 | 7/2012 |
| EP | 2192744 | 6/2010 |
| EP | 2242300 | 10/2010 |
| EP | 2244514 | 10/2010 |
| EP | 2341679 | 7/2011 |
| EP | 2582076 | 4/2013 |
| EP | 2603038 | 6/2013 |
| JP | 2004-007279 | 1/2004 |
| JP | 2008511223 A | 4/2008 |
| JP | 2009-077287 | 4/2009 |
| JP | 2009-124500 | 6/2009 |
| JP | 2009-290341 | 12/2009 |
| JP | 2009-303030 | 12/2009 |
| JP | 2010-220214 | 6/2010 |
| JP | 2011-517536 | 6/2011 |
| JP | 2011-525327 | 9/2011 |
| JP | 2011-530238 | 12/2011 |
| JP | 2012-503347 | 2/2012 |
| JP | 2012-528538 | 11/2012 |
| JP | 2013-502152 | 1/2013 |
| JP | 2008-508832 | 3/2018 |
| KR | 10-2007-0041096 | 4/2007 |
| KR | 2010-0071775 | 6/2010 |
| KR | 2011-0050546 | 5/2011 |
| KR | 10-2011-0125244 | 11/2011 |
| KR | 2011-0124302 | 11/2011 |
| KR | 2012-0027526 | 3/2012 |
| RU | 2008148124 | 6/2010 |
| RU | 2420903 | 6/2011 |
| TW | 201008315 | 2/2010 |
| WO | 2005/002141 | 1/2005 |
| WO | 2006/019237 | 2/2006 |
| WO | 2008/024057 | 2/2008 |
| WO | 2009008817 A1 | 1/2009 |
| WO | 2009/120125 | 10/2009 |
| WO | 2010/014969 | 2/2010 |
| WO | 2010/032675 | 3/2010 |
| WO | 2010/033438 | 3/2010 |
| WO | 2010/044632 | 4/2010 |
| WO | 2010/103725 | 6/2010 |
| WO | 2010/105125 | 6/2010 |
| WO | 2010/105148 | 6/2010 |
| WO | 2010/073830 | 7/2010 |
| WO | 2010/078961 | 7/2010 |
| WO | 2010/080848 | 7/2010 |
| WO | 2010092457 A1 | 8/2010 |
| WO | 2010105145 A1 | 9/2010 |
| WO | 2010/121708 | 10/2010 |
| WO | 2010/138634 | 12/2010 |
| WO | 2010/144864 | 12/2010 |
| WO | 2011/019501 | 2/2011 |
| WO | 2011/067459 | 6/2011 |
| WO | 2011085270 A1 | 7/2011 |
| WO | 2011/100492 | 8/2011 |
| WO | 2011/100673 | 8/2011 |
| WO | 2011/120716 | 10/2011 |
| WO | 2011/137775 | 11/2011 |
| WO | 2011/159311 | 12/2011 |
| WO | 2011159215 A1 | 12/2011 |
| WO | 2012/07 4878 | 6/2012 |
| WO | 2012/096502 | 7/2012 |
| WO | 2012/101688 | 8/2012 |

OTHER PUBLICATIONS

"3rd Generation Partnership Project; Technical Specification Group Radio Access Network; Evolved Universal Terrestrial Radio Access (E-UTRA) Physical Layer Procedures (Release 10)", 3GPP TS 36.213 V10.0.1, Dec. 2010, 98 pages.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 53 pages.

"3rd Generation Partnership Project; Technical Specification Group Radio Access Network; Evolved Universal Terrestrial Radio Access (E-UTRA); Physical layer procedures (Release 10)", 3GPP TS 36.213 V10.0.0, Dec. 2010, 98 pages.

"3rd Generation Partnership Project; Technical Specification Group Radio Access Network; Radio Resource Control (RRC); Protocol specification (Release 9)", 3GPP TS 36.331 V9.5.0, Dec. 2010, 252 pages.

"3rd Generation Partnership Project; Technical Specification Group Radio Access Network; Multiplexing and channel coding (Release 10)", 3GPP TS 36.212 V10.0.0, Dec. 2010, 72 pages.

"3rd Generation Partnership Project; Technical Specification Group Radio Access Network; Radio Resource Control (RRC); Protocol specification (Release 10)", 3GPP TS 25.331 V10.2.0, Dec. 2010, 1834 pages.

(56)                    References Cited

OTHER PUBLICATIONS

"Chinese Office Action (English Translation)", Chinese Application No. 201180058295.2, Nov. 17, 2015, 11 pages.
"Chinese Office Action", Chinese Application No. 201180058295.2, Nov. 17, 2015, 8 pages.
"International Search Report and Written Opinion", International Patent Application No. PCT/U52011/062091, Jan. 31, 2012, 18 pages.
"Japanese Notice of Allowance (English Translation)", Japanese Application No. 2013-542065, Jun. 21, 2016, 3 pages.
"Japanese Notice of Allowance", Japanese Application No. 2013-542065, Jun. 21, 2016, 3 pages.
"Japanese Notice of Rejection (English Translation)", Japanese Application No. 2013- 542065, Oct. 27, 2015, 5 pages.
"Japanese Notice of Rejection", Japanese Application No. 2013-542065, Oct. 27, 2015, 5 pages.
"Japanese Official Notice of Rejection (English Translation)", Japanese Application No. 2016-143413, Sep. 5, 2017, 6 pages.
"Japanese Official Notice of Rejection", Japanese Application No. 2016-143413, Sep. 5, 2017, 5 pages.
"Korean Office Action (English Translation)", Korean Application No. 10-2013-7017409, Mar. 22, 2017, 6 pages.
"Korean Office Action", Korean Application No. 10-2013-7017409, Mar. 22, 2017, 6 pages.
"Patent Abstract of Japanese Publication No. 2010-220214", Sep. 30, 2010, 2 pages.
"Patent Abstract", Japanese Publication No. 2004-007279, Jan. 8, 2004, 2 pages.
"Taiwanese Examination Notification (English translation)", Taiwanese Application No. 105111404, Dec. 20, 2016, 5 pages.
"Taiwanese Examination Notification", Taiwanese Application No. 105111404, Dec. 20, 2016, 6 pages.
$3r^d$ Generation Partnership Project (3GPP), R1-090066, "Relaying for LTE-Advanced", Alcatel Shanghai Bell, Alcatel-Lucent, 3GPP TSG RAN WG1 Meeting #55bis, Ljubljana, Slovenia, Jan. 12-16, 2009, 9 pages.
3rd Generation Partnership Project (3GPP), R1-090357, "Carrier Aggregation in Heterogeneous Networks", Qualcomm Europe, 3GPP TSG RAN WG1 #55bis, Ljubljana, Slovenia, Jan. 12-16, 2009, pp. 1-12.
3rd Generation Partnership Project (3GPP), R1-122402, "UL Transmissions in Case of Multiple TA", Nokia Siemens Networks, Nokia, 3GPP TSG RAN WG1 Meeting #69 Prague, Czech Republic, May 21-25, 2012, 4 pages.
3rd Generation Partnership Project (3GPP), R2-092394, "LTE-Advanced Discussion for RAN2", Panasonic, 3GPP TSG RAN WG2 #65bis, Seoul, Korea, Mar. 23-27, 2009, 7 pages.
3rd Generation Partnership Project (3GPP), R2-093104, "CarrierAggregation in Active Mode", Huawei, 3GPP TSG-RAN WG2 Meeting #66, San Francisco, USA, May 4-8, 2009, 4 pages.
3rd Generation Partnership Project (3GPP), R2-093599, "LS on RAN2 Status on Carrier Aggregation Design", 3GPP TSG-RAN WG2 Meeting #66, San Francisco, US, May 4-8, 2009, 3 pages.
3rd Generation Partnership Project (3GPP), R2-093933, "Mobility Management Consideration for Carrier Aggregation", Huawei, 3GPP TSG-RAN WG2 Meeting #66bis, Los Angeles, USA, Jun. 29-Jul. 3, 2009, 3 pages.
3rd Generation Partnership Project (3GPP), Tdoc R2-092958, "Control Plane Aspects of Carrier Aggregation", Ericsson, 3GPP TSG-RAN WG2 #66, San Francisco, USA, May 0408, 2009, 4 pages.
3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.
3rd Generation Partnership Project (3GPP), TS 36.212 V10.1.0, "Technical Specification Group Radio Access Network, Evolved Universal Terrestrial Radio Access (E-UTRA), Physical Layer Procedures (Release 10)", Mar. 2011, pp. 1-76.
3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.
3rd Generation Partnership Project (3GPP), TS 36.321 V11.2.0, "Technical Specification Group Radio Access Network, Evolved Universal Terrestrial Radio Access (E-UTRA), Medium Access Control (MAC) Protocol Specification (Release 11)", Mar. 2013, pp. 1-56.
3rd Generation Partnership Project (3GPP), TS 36.322 V8.6.0, "Technical Specification Group Radio Access Network, Evolved Universal Terrestrial Radio Access (E-UTRA) Radio Link Control (RLC) Protocol Specification (Release 8)", Jun. 2009, pp. 1-39.
3rd Generation Partnership Project (3GPP), TS 36.423 V8.6.0, "Technical Specification Group Radio Access Network, Evolved Universal Terrestrial Radio Access Network (E-UTRAN), X2 Application Protocol (X2AP) (Release 8)", Jun. 2009, pp. 1-100.
3rd Generation Partnership Project; Technical Specification Group Radio Access Network; Radio Resource Control (RRC); Protocol specification (Release 10), 3GPP TS 25.331 V10.2.0, F-06921 Dec. 2010, 1834 pages XP050462635.
Alcatel-Lucent et al., Simultaneous transmissions of multiple UL channels with multiple TA groups, 3GPP Tdoc R1-122473, 3GPP TSG RAN WG1 Meeting #69, Prague, Czech Republic, May 21-25, 2012, 4 pages.
Dimou et al., "Generic Link Layer: A Solution for Multi-Radio Transmission Diversity in Communication Networks Beyond 3G", VTC-2005-Fall, IEEE 62nd Vehicular Technology Conference, Dallas, TX, USA, 2005, pp. 1672-1676.
Discussions on multiple PUSCH transmissions in CA, 3GPP Tdoc R1-110948, 3GPP TSG RAN WG1 Meeting #64, Taipei, Taiwan, Feb. 21-25, 2011, 2 pages.
English language abstract, Chinese Publication No. CN 101232715 A.
English language abstract, Chinese Publication No. CN 101909321 A.
English language abstract, Japanese Publication No. JP 2009077287 A.
English language abstract, Korean Publication No. KR 20100071775 A.
Ericsson, "Impact of Carrier Aggregation on the L2 protocol architecture", 3GPP Tdoc R2-092957, 3GPP TSG-RAN WG2 #66, San Francisco; USA, May 4-8, 2009, 8 pages.
Ericsson, et al., "Spectrum migration from HSPA to LTE", 3GPP Tdoc R1-111089, 3GPP TSG-RAN WG1 Meeting #64, Taipei, Taiwan, Feb. 21-25, 2011, 4 pages.
Huawei, HiSilicon, "Migration scenarios and possible aggregation between HSPA and LTE", 3GPP Tdoc R1-111126, 3GPP TSG RAN WG1 #64, Taipei, Taiwan, Feb. 21-25, 2011, 4 pages.
Intel Corporation, "Enhancements on MAC procedures to support CA with multiple TA," 3GPP Tdoc R2-113214 3GPP TSG RAN2#74 meeting, Barcelona, Spain, May 9-13, 2011, 5 pages.
LG Electronics Inc., "Further clarification on L3 relay node for LTE-A", 3GPP Tdoc R1-090662, TSG-RAN WG1 Meeting #56, Athens, Greece, Feb. 9-13, 2009, 3 pages.
LG Electronics, et al., "WID for Operator Policies for IP Interface Selection (OPIIS)", 3GPP Tdoc S2-110668, 3GPP TSG SA WG2 Meeting #83, Salt Lake City, Utah, USA, Feb. 21-25, 2011, 5 pages.
Meijen et al., "Multi-Layer Survivability", Lucent Technologies White Paper, Aug. 2000, 8 pages (and translation).
Nokia Siemens Networks, et al., "Aggregating HSDPA and LTE carriers", 3GPP Tdoc R1-111060, 3GPP TSG-RAN WG1 Meeting #64, Taipei, Taiwan, Feb. 21-25, 2011, 3 pages.
Nokia, et al., "Stage 2 Description of Carrier Aggregation", 3GPP Tdoc R2-101985 Change Request 36.300 CR No. V9.2.0, 3GPP TSG-RAN WG2 Meeting #69, Beijing, China, Apr. 12-16, 2010, 16 pages.
Nokia; "Generic test procedure for Enhanced UL in CELL_FACH", 3GPP Tdoc R5-101017, 3GPP TSG RAN Meeting 746, San Francisco, USA, Feb. 22-26, 2010, 5 pages.
Pantech, "Considerations on Multiple TA capability", 3GPP Tdoc R2-122908; 3GPP TSG RAN WG2 Meeting #78, Prague, Czech, May 21-25, 2012, 3 pages.

(56)                    References Cited

OTHER PUBLICATIONS

Qualcomm Incorporated, "Definition of Pcmax,c", 3GPP R4-110207; 3GPP TSG RAN4 Meeting #57AH; Austin, Texas, USA, Jan. 17-21, 2010, 2 pages.

Shen et al., "Overview of 3GPP LTE-Advanced Carrier Aggregation for 4G Wireless Communications", LTE Advanced and 4G Wireless Communications, Communications Magazine, IEEE, vol. 50, Issue: 2, Feb. 2012, 122-130.

Texas Instruments, Physical layer aspects of multiple timing advance commands, 3GPP Tdoc R1-120462, 3GPP TSG RAN WG1 #68, Dresden, Germany, Feb. 6-10, 2012, 5 pages.

ZTE, "Consideration on the aggregation of LTE and HSPA", 3GPP Tdoc R1-111173 , 3GPP TSG-RAN WG1 Meeting #64, Taipei, Taiwan, Feb. 21-25, 2011, 4 pages.

Alcatel-Lucent, "Radio link failure handling by RN," 3GPP TSG-RAN WG2 Meeting #70bis, R2-103682, Stockholm, Sweden (Jun. 28-Jul. 2, 2010).

RAN3 (Nokia Siemens Networks et al.), "Functionality of SON MRO defined for Rel. 10," 3GPP TSG-RAN2 Meeting #72, R2-106969, Jacksonville, USA (Nov. 15-19, 2010).

Third Generation Partnership Project, "Technical Specification Group Radio Access Network; Evolved Universal Terrestrial Radio Access Network (E-UTRAN); Self-configuring and self-optimizing network (SON) use cases and solutions (Release 10)," 3GPP TR 3.023 V0.1.0 (Oct. 2010).

Change Request; "Sending of GERAN SI/PSI information at Inter-RAT Handover", 3GPP Tdoc R2-092097, 3GPP TSG-RAN2 Meeting #65bis Seoul, Republic of Korea, Mar. 23-27, 2009, 5 pages.

* cited by examiner

OPERATING WITH MULTIPLE SCHEDULERS IN A WIRELESS SYSTEM

CROSS-REFERENCE TO RELATED APPLICATIONS

This application is a continuation of U.S. Non-Provisional patent application Ser. No. 17/530,717, filed Nov. 19, 2021, which issued as U.S. Pat. No. 11,716,781 on Aug. 1, 2023, which is a continuation of U.S. Non-Provisional patent application Ser. No. 16/418,832, filed May 21, 2019, which issued as U.S. Pat. No. 11,184,942 on Nov. 23, 2021, which is a continuation of U.S. Non-Provisional patent application Ser. No. 15/695,850, filed Sep. 5, 2019, which is a continuation of U.S. Non-Provisional patent application Ser. No. 14/794,493, filed on Jul. 8, 2015, which issued as U.S. Pat. No. 9,788,358 on Oct. 10, 2017, which is a continuation of U.S. Non-Provisional patent application Ser. No. 13/974, 946, filed on Aug. 23, 2013, which issued as U.S. Pat. No. 9,113,450 on Aug. 18, 2015, which claims the benefit of U.S. Provisional Patent Application No. 61/692,548, filed Aug. 23, 2012; U.S. Provisional Patent Application No. 61/726, 448, filed Nov. 14, 2012; U.S. Provisional Patent Application No. 61/753,323, filed Jan. 16, 2013; U.S. Provisional Patent Application No. 61/753,334, filed Jan. 16, 2013; U.S. Provisional Patent Application No. 61/821,071, filed May 8, 2013; U.S. Provisional Patent Application No. 61/821,186, filed May 8, 2013; and U.S. Provisional Patent Application No. 61/863,311, filed Aug. 7, 2013, the contents of which are hereby incorporated by reference in their entirety.

BACKGROUND

Wireless communication systems are widely deployed to provide various types of communication content such as voice, data, etc. These system may be multiple-access systems capable of supporting communication with multiple user by sharing the available system resources (e.g., bandwidth, transmit power, etc.). Examples of such multiple-access systems may include code division multiple access (CDMA) systems, wideband code division multiple access (WCDMA) systems, time division multiple access (TDMA) systems, frequency division multiple access (FDMA) systems, the Third Generation Partnership Project (3GPP) Long Term Evolution (LTE) systems, and orthogonal frequency division multiple access (OFDMA) systems, etc.

These multiple access technologies have been adopted to provide a common protocol that enables different wireless devices to communicate on municipal, national, regional, and even the global level. An example of an emerging telecommunication standard is LTE. LTE is a set of enhancements to the Universal Mobile Telecommunications System (UNITS) mobile standard promulgated by 3GPP. LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

SUMMARY

Systems and methods are disclosed for a wireless transmit/receive unit (WTRU) to operate in a wireless communication systems that utilizes multiple schedulers. For example, in some multiple scheduler systems, the schedulers may lack a low latency communication interface for coordinating scheduling operation associated with the same WTRU. The WTRU may exchange data with the network over more than one data path, such that each data path may use a radio interface connected to a different network node and each node may be associated with an independent scheduler. For example, a WTRU may establish a radio resource control (RRC) connection between the WTRU and a network. The RRC connection may establish a first radio interface between the WTRU and a first serving site of the network and a second radio interface between the WTRU and a second serving site of the network. The first serving site may be a Macro eNodeB (MeNB) and the second serving site may be a Small Cell eNodeB (SCeNB). The RRC connection may be established between the WTRU and the MeNB and a control function may be established between the WTRU and the SCeNB. The WTRU may receive data from the network over the first radio interface or the second radio interface.

As an example, methods and systems are described WTRU to operate using multiple layers that are independently scheduled. For example, the WTRU may establish a radio resource control (RRC) connection with a first serving site. The WTRU may receive a reconfiguration message from the first serving site. The reconfiguration message may include a configuration for the WTRU to connect to one or more cells associated with a second serving site. The reconfiguration message may indicate at least one radio bearer (RB) to be used by the WTRU at the second serving site. The WTRU may determine to activate a connection to the second serving site. The WTRU may monitor a control channel of at least one of the one or more cells associated with the second serving site based on determining activate the connection to the second serving site. For example, the reconfiguration message may be an RRC connection reconfiguration message, and the at least one RB may be a new RB established for use at the second serving site. In an example, the reconfiguration message may be an RRC connection reconfiguration message that includes a mobility control information element, the at least one RB may be an RB that was previously mapped to the first serving site, and the RRC connection reconfiguration message may trigger the WTRU to begin associating the RB that was previously mapped to the first serving site with the second serving site.

In an example, the reconfiguration message may include a plurality of radio resource management (RRM) configurations for a given cell associated with the second serving site. Upon activating the connection to the second serving site, the WTRU may apply a default RRM configuration of the plurality of RRM configurations. The WTRU may receive one or more of physical layer signaling or layer 2 signaling. The one or more of physical layer signaling or layer 2 signaling may be indicative of another RRM configuration of the plurality of RRM configurations that the WTRU should apply at the given cell of the second serving site. The WTRU may then apply the another RRM configuration when connected to the given cell of the second serving site. For example, the one or more of physical layer signaling or layer 2 signaling may include one or more of a physical downlink control channel (PDCCH) transmission or a medium access control (MAC) control element (CE). The WTRU may determine which of the plurality of RRM configurations to apply based on an index received in the one or more of physical layer signaling or layer 2 signaling. At least one RRM configuration of the plurality of RRM configurations may include one or more of a physical layer configuration, a channel quality indication (CQI) reporting configuration, or a MAC configuration.

In an example, the control plane may be distribute across the serving sites, coordinated between the serving sites, and/or centralized at one or the serving sites. For example, a network RRC entity associated with both the first serving site and the second serving site may be located at the second serving site. One or more signaling radio bearers terminated at the RRC entity at the first serving site may be transmitted to the WTRU via the second serving site. For example, the one or more signaling radio bearers terminated at the RRC entity at the first serving site that are transmitted to the WTRU via the second serving site may be associated with control information for managing the radio resources between the WTRU and the second serving site. The WTRU may perform one or more measurements of at least one or the one or more cells associated with the second serving site. The WTRU may report the one or more measurements to the first serving site.

The WTRU may handle security for transmissions associated with the first serving site and/or the second serving site in a semi-coordinated and/or independent fashion. For example, each of the first serving site and the second serving site may be associated with independent packet data convergence protocol (PDCP) instances for the WTRU. The WTRU may be configured to utilize the same security key for ciphering PDCP packets to be sent to either a first PDCP instance associated with the first serving site or a second PDCP instance associated with the second serving site. For example, the WTRU may be configured to use a different BEARER parameter for each of the first PDCP instance associated with the first serving site and the second PDCP instance associated with the second serving site. For example, a respective BEARER parameter used for ciphering transmissions to the second PDCP entity at the second serving site may be determined based on a layer identity associated with the second serving site.

The WTRU may implement two or more sets of protocol stacks for the control plane and/or the data plane. For example, the WTRU may include a first medium access control (MAC) instance configured to access cells associated with the first serving site, and a second MAC instance configured to access cells associated with the second serving site. The WTRU may be configured to data associated with at least one logical channel using either of the first MAC instance or the second MAC instance. The WTRU may be configured to deactivate at least one bearer associated with the first serving site based on activating the connection to the second serving site. The WTRU may be configured to measure at least one cell associated with the second serving site, and determine to autonomously activate the at least one cell based on the measurements. A RRC reconfiguration message may include a preconfiguration for the at least one cell, and the WTRU may be configured to autonomously activate the at least one cell using a random access channel (RACH) procedure.

The RRC connection for the WTRU may establish one or more SRBs between the WTRU and the network, such that each of the established SRBs may be assigned to at least one of the first radio interface and the second radio interface. A received/transmitted RRC PDU may be associated with one of the one or more SRBs. The RRC PDU may be received over either the first radio interface or the second radio interface regardless of its associated SRB. The RRC connection may be controlled by the network. The WTRU may transmit an indication to the network indicating that the WTRU supports multi-scheduling operation.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
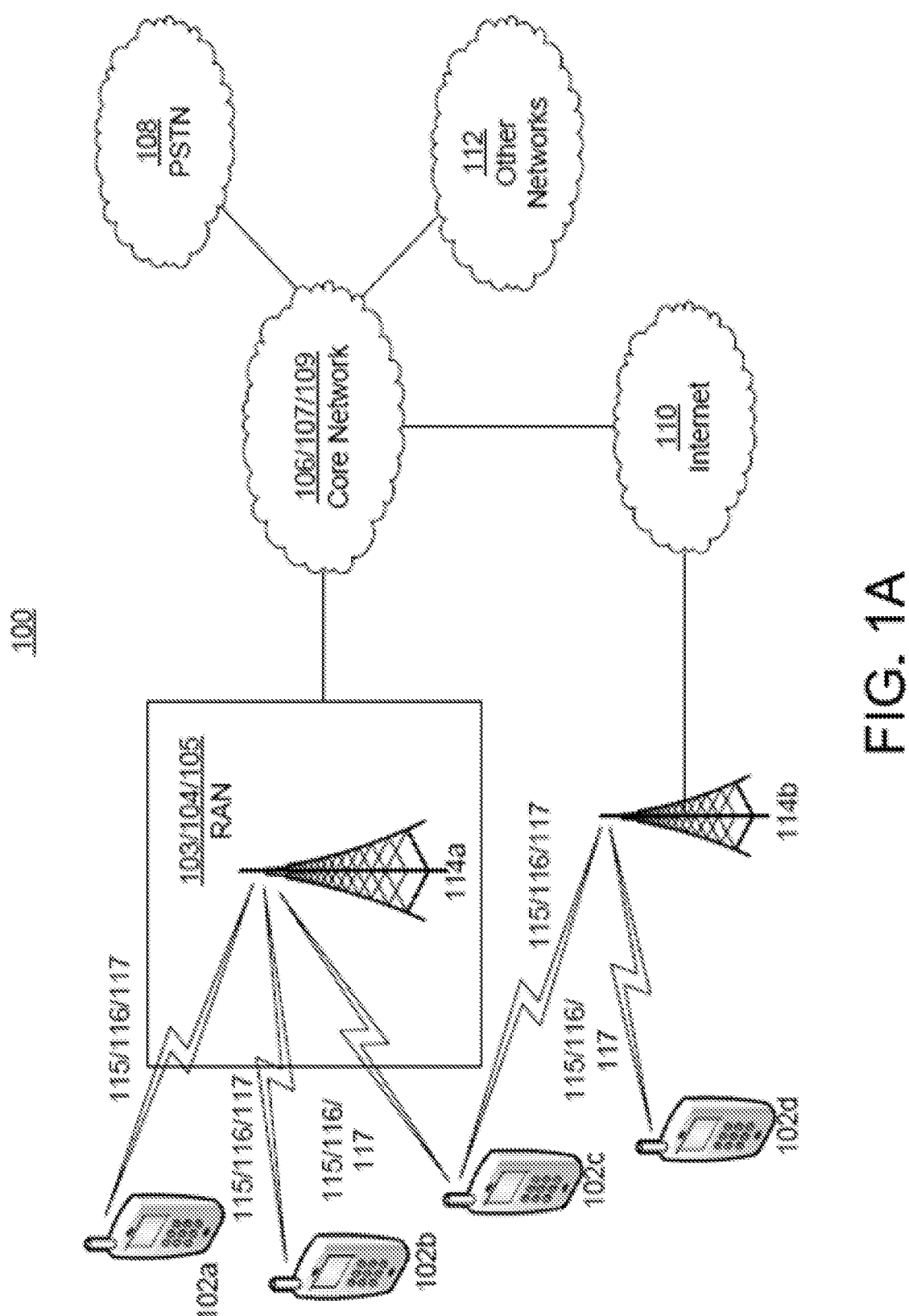
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSDPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 (e.g., 802.11ac, 802.11af, and the like) to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
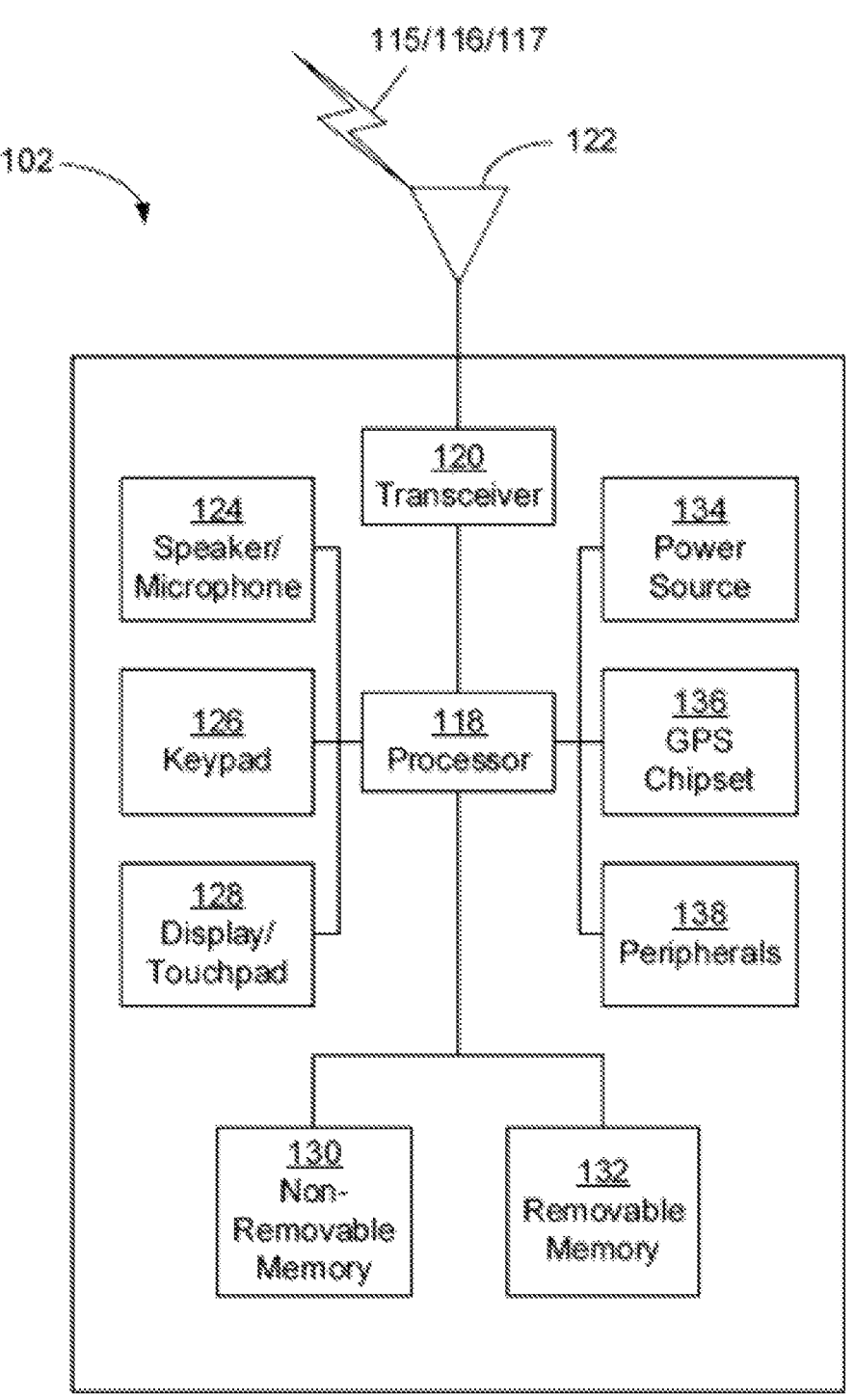
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
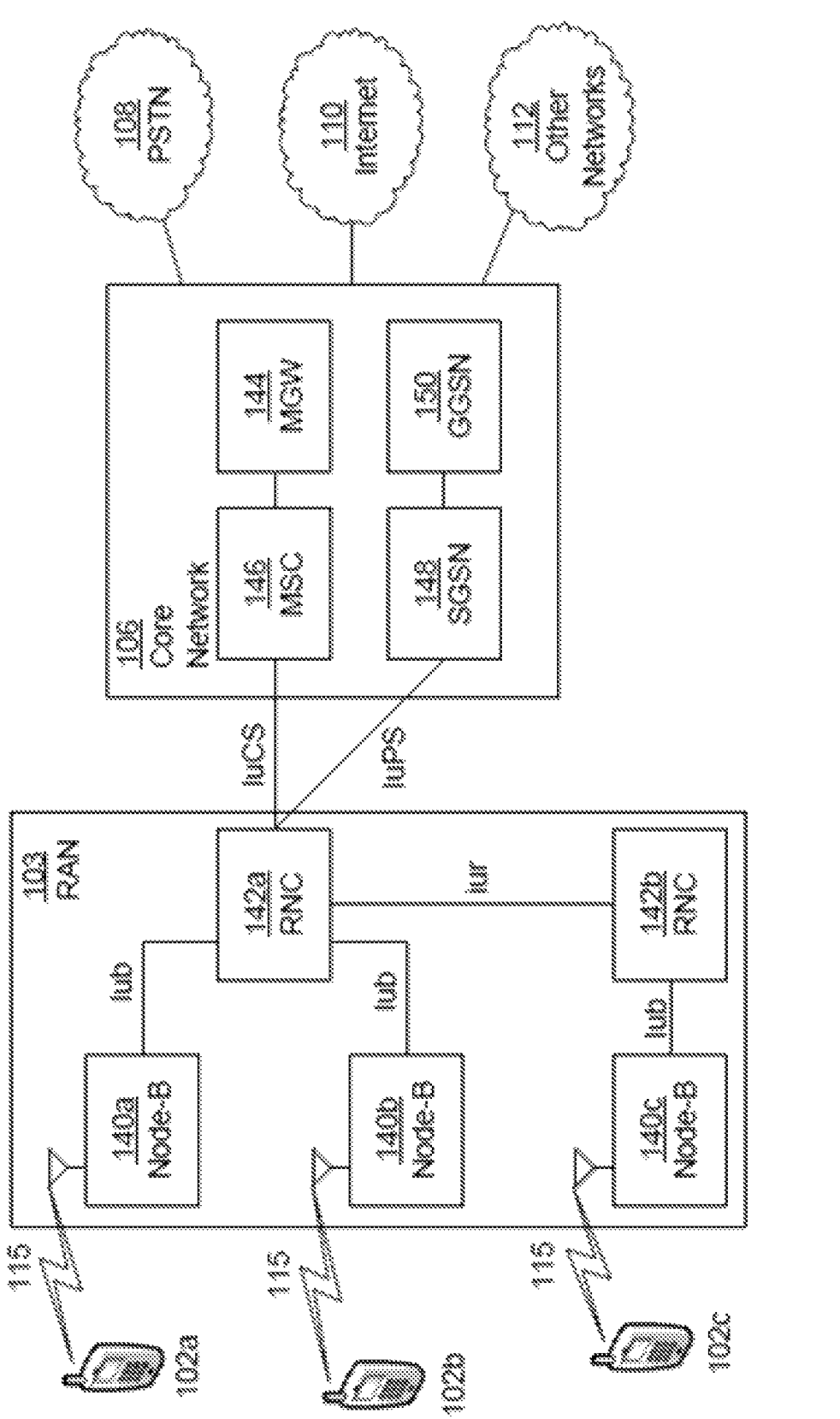
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
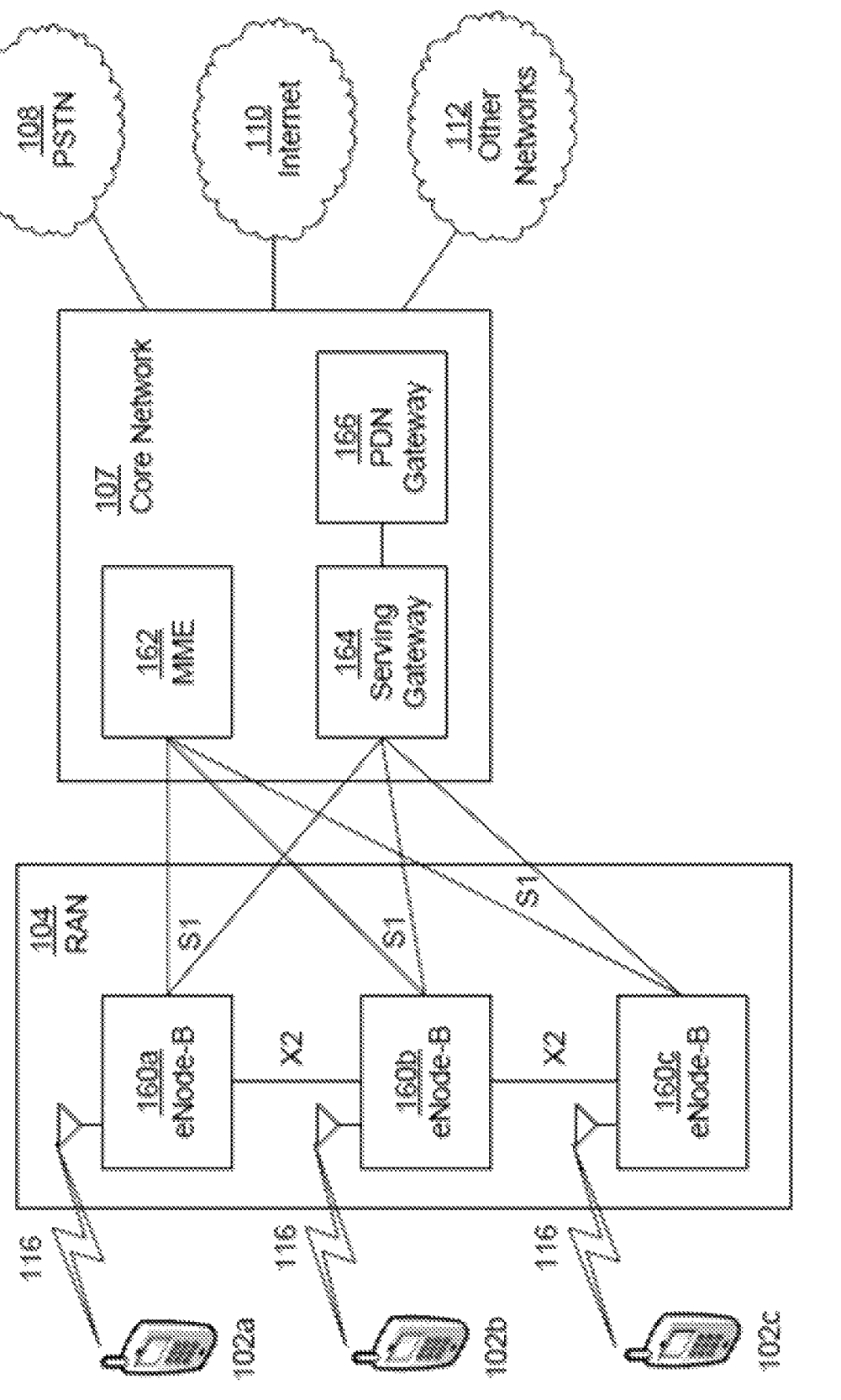
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
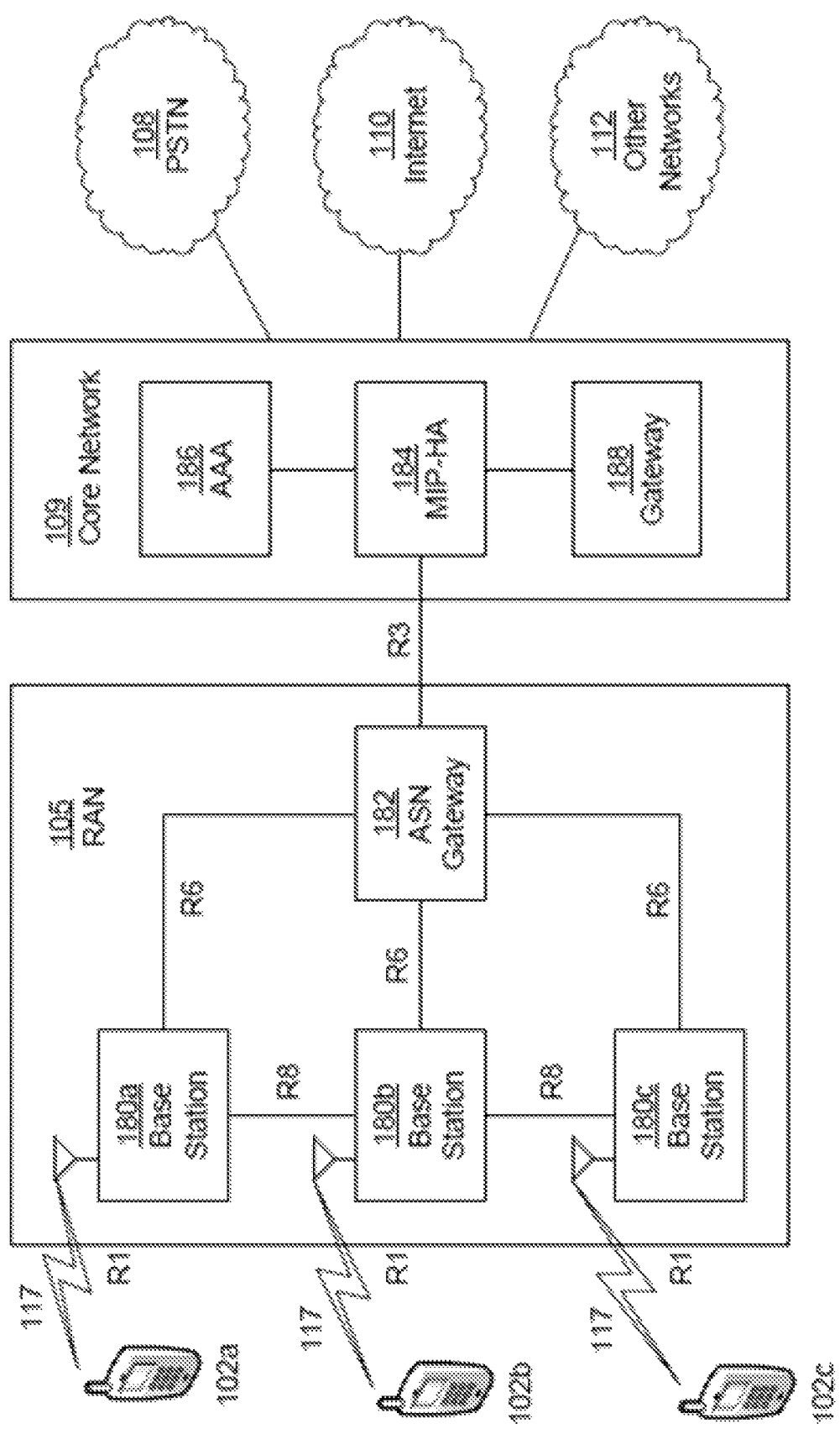
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a,

180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems and methods are disclosed for utilizing multi-node scheduling whereby a WTRU may exchange data over a wireless communication network using more than one data path. For example, different air interface transmission/reception points may be associated with each of the data paths (e.g., each data path may use a radio interface that is associated with a different network node). The different transmission/reception points associated with the different data paths may independently schedule WTRU transmissions over their respective data path. In other words, a first scheduler may schedule transmissions to/from a WTRU over a first data path, and a second scheduler may schedule transmissions to/from the WTRU over a second data path. The different transmission/reception points within the network may be in communication with each other; however, the data links between the different transmission/reception points may be associated with a relative high latency. Therefore, it may be difficult or impractical for the different transmission/reception points to schedule transmissions over the data paths in a coordinated manner. Thus, each transmission/reception point may independently schedule the WTRU to transmit and/or receive over a respective transmission path. Such transmission/reception points may be referred to as serving sites.

The examples described herein may be described in terms of examples implemented within an evolved universal terrestrial radio access network (E-UTRAN). However, the methods and systems disclosed herein may be applicable to other network architectures and/or used by other network nodes. Data that transmitted to (or received from) a serving site for a WTRU may be provided to (passed from) a core network (e.g., a serving gateway (S-GW)). A serving site may support one or more Layer 2 protocols (e.g., MAC, RLC and/or PDCP) for a given radio bearer.

For example, a WTRU may establish a radio resource control (RRC) connection between the WTRU and a wireless communication network. The RRC connection may establish or configure a first radio interface between the WTRU and a first node of the network and a second radio interface between the WTRU and a second node of the network. The first node may be a Macro eNodeB (MeNB) and the second node may be a Small Cell eNodeB (SCeNB). In an example, the RRC connection may be established between the WTRU and the MeNB and a control function may be established between the WTRU and the SCeNB. The WTRU may receive data from the network over the first radio interface and/or the second radio interface. Although the examples described herein may be described with respect to operation utilizing a first data path (e.g., may also be referred to as a first layer, a primary data path, a primary layer, etc.) that is associated with a MeNB and a second data path (e.g., may also be referred to as a second layer, a secondary data path, a secondary layer, etc.), the methods and systems described herein may be equally applicable to other network transmission/reception points that are independently scheduled (e.g., two or more independently scheduled eNBs, two or more independently scheduled NBs, two or more independently scheduled RAN access nodes, etc.).

The systems and methods described herein may be applicable to one or more multi-scheduler frameworks wherein different network nodes serve as transmission/reception points for different data paths. The use of multiple data paths may be facilitated by decoupling the relationship between bearers, radio bearers, and/or the like. For example, when a multi-scheduler framework is utilized, an evolved packet service (EPS) bearer may be associated with multiple radio bearers. When multi-scheduler operation is utilized, the WTRU may be configured to exchange control signaling and/or user plane data over one or more data paths.

A data path may be defined based on the identity of one or more service access points (SAPs) that are used to transmit data associated with the data path, based on the identity of one or more network interfaces or nodes that are used to transmit the data associated with the data path, based on one or more radio interfaces (e.g., X2, X2bis, X2', Uu, etc.) that are used to transmit data associated with the data path, and/or the like. Further, a data path may be defined based on the communication protocol stack (e.g., including one or more of a packet data convergence protocol (PDCP) layer, a radio link control (RLC) layer, a medium access control (MAC) layer, a physical (PHY) layer, etc.) that may be used to define a processing sequence for transferring information associated with the data path. The information or data transmitted over a data path may include one or more of control plane data (e.g., non-access stratum (NAS) signaling, RRC signaling, etc.) and/or user plane data (e.g., IP packets, etc.). Data paths may be independently scheduled from other data paths.

For example, in LTE Release 11, data transfer may be performed over a single data path between the WTRU and the network. For the control plane, there may be a direct mapping between an SRB and a Logical Channel (LCH) over a single Uu interface (e.g., an interface between the WTRU and an eNB). For the user plane, there may be a direct mapping between an EPS bearer, a Data Radio Bearer (DRB), and a Logical Channel (LCH) over that same Uu interface.

However, in the presence of multiple independent schedulers, the WTRU may be configured to utilize more than one data path, for example where each data path may be established between the WTRU and network nodes using different Uu interfaces. A data path may also be referred to as a layer. For example, the WTRU may be configured to transmit and/or receive data over multiple layers, where each layer is associated with a different data path. Each layer may be scheduled independently of other layers. Each layer may be associated with a different air interface for the WTRU. Each layer may be associated with a serving site that serves as a transmission and/or reception point for the data path within the network.

In order to support transmissions over multiple layers, a plurality of MAC instances may be established at the WTRU. For example, the WTRU may be configured with multiple MAC instances that are each associated with a corresponding set of physical layer parameters and/or with layer-specific radio bearers. As an example, the WTRU may be configured with a set of primary layer information (e.g., which may be associated with a macro layer/MeNB/macro serving site) and one or more sets of secondary layer information (e.g., which may be associated with a small cell layer/SCeNB/small cell serving site). A WTRU may be configured with one or more serving cells for each layer. For example, the WTRU may perform carrier aggregation in each of the layers such that transmissions and/or reception may occur from multiple cells within a given layer.

For example, the WTRU may be configured to operate with one or more serving sites (e.g., also referred to as serving eNBs) in the downlink and/or the uplink. Each serving site may be associated with one or more serving cells. For example, a WTRU may operate using a single serving cell (e.g., component carrier) at first serving site (e.g., a MeNB) and may operate using a plurality of serving cells (e.g., a plurality of component carriers) at a second serving site (e.g., a SCeNB). Thus, a serving site may be associated with a plurality of serving cells. Each serving cell of a given serving site may be configured for operation at a corresponding component carrier (CC). A serving site may support one or multiple CCs. Each CC within a serving site may operate using a different frequency range than other CCs of the serving site, so that each of the serving cells associated with a given serving site may be transmitted using a different CC. However, serving cells from different serving sites may be transmitted using the same CC. Therefore, serving cells may be associated with the same CC but with different serving sites. A WTRU may be configured with a maximum number of serving sites over which the WTRU may operate (e.g., 1, 2, 3, 4, etc.). An indication of the maximum number of serving sites that the WTRU may be allowed to utilize may be signaled by the WTRU to the network as part of WTRU capability information and/or may be determined by the network based on the operating class of a WTRU.

A serving site may be associated with one or more Transport Channels. For example, in the uplink the WTRU may be configured to deliver data to the physical layer using a transport channel (e.g., UL-SCH) that is associated with a serving cell associated with a specific serving site. In an example, each transport channel may be specific to a given serving site/layer, although the transport channel may be associated with multiple serving cells and/or component carriers within that serving site. For example, a UL-SCH may be associated with a specific serving site (e.g., a serving site associated with the data path including the MeNB) and one or more component carriers associated with that serving site (e.g., multiple component carriers that are associated with the MeNB). A transport block to be delivered to that serving site may be served with data associated with the transport channel mapped to that serving site. In the downlink the WTRU may be configured to receive data to at the physical layer and deliver the data to a transport channel (e.g., DL-SCH) that is associated with a serving cell associated with a specific serving site. For example, a DL-SCH may be associated with a specific serving site (e.g., a serving site associated with the data path including the SCeNB) and one or more component carriers associated with that serving site (e.g., multiple component carriers that are associated with the SCeNB). A transport block received at the physical layer may be mapped to a transport channel associated with that serving site from which the transport block was received. A given serving site may be associated with zero, one, or more than one UL-SCHs and zero, one, or more than one DL-SCHs.

Each serving site may be associated with a corresponding MAC instance at the WTRU. The WTRU may be configured with multiple MAC instances. Each MAC instance may be associated with a specific serving site. The terms serving site, layer, data path, MAC instance, etc. may be used interchangeably herein. Each MAC instance may be associated with one or more configured serving cells and support one or more CCs. Each UL-SCH and/or DL-SCH may be associated with a given MAC instance (e.g., a one-to-one instance between a transport channel and a MAC instance).

A MAC instance may be configured with a Primary Cell (PCell). For each serving site (and/or MAC instance), one of its associated serving cells may support at least a subset of the functionality supported by a primary serving cell (Pc-Cell) in legacy (e.g., single-site) systems. For example, one or more of the serving cells of a given MAC instance may support PUCCH transmissions that may be utilized for sending scheduling requests, HARQ feedback, CSI feedback, and/or the like related to the UL-SCH and/or the DL-SCH mapped to the corresponding serving site. A serving cell that is configured to receive uplink control information (UCI) associated with the transport channels of the serving site may be referred to as a "site PCell" and/or a "MAC primary cell." Each MAC instance may be configured with one PCell and zero or more SCells. Further, the PCell of a primary MAC instance (e.g., the MAC instance associated with a MeNB) may have additional functionality specific to that MAC instance. A serving site may be associated with a data path. A serving site may correspond to a single data path.

RRC may utilized to configure multiple MAC instances. For example, when RRC configures a MAC instance for operation, the WTRU may determine whether a received configuration or parameter is associated with given MAC instance based on an explicit indication included in a field of the information element (IE) that includes the configuration information. In an example, is multiple configurations are received, the WTRU may implicitly determine that each configuration applies to respective MAC instance. For example, if multiple radioResourceConfigDedicated IEs are received in a RRC connection setup/modification message, then the WTRU may determine that a first radioResourceConfigDedicated IE is associated with a first MAC instance and that a second radioResourceConfigDedicated IE is associated with a second MAC instance. In an example, different types of IEs may be defined for configuring a secondary MAC instance (e.g., a radioResourceConfigDedicatedSecondaryMACInstance IE). The WTRU may determine that a received configuration/IE applies to a secondary MAC instance based on the type of the IE that is received. The WTRU may determine that a received configuration/IE applies to a secondary MAC instance based on the presence of an access-stratum (AS) configuration in the IE (e.g., similar to the mobilityControl IE). For example, if certain AS configuration information is present in received configuration information, the WTRU may determine that the configuration applies to a secondary MAC instance. If the AS configuration information is absent in received configuration information, the WTRU may determine that the configuration applies to a primary MAC instance. The WTRU may determine which MAC instance a given configuration is applicable to based on the identity of the SRB over which the configuration message is received (e.g., SRB3 may indicate configuration information for the secondary MAC instance), for example if such SRB has been previously configured for the WTRU. If individual RRC instances/entities are associated with the different serving sites, then the WTRU may determine which MAC instance the configuration applies to based on the RRC entity from which the configuration was received.

The different layers utilized by the WTRU may be associated with different types of radio access nodes and/or different types of cells. For example, the primary layer may be associated with a macro cell served by MeNB and a secondary layer may be associated small cell served by a SCeNB. The network arrangement may be transparent to the WTRU. Although examples may be described where the schedulers associated with the different layers are implemented in different RAN nodes (e.g., different eNBs), the systems and methods described herein may be applicable to an arrangement where multiple schedulers implemented in a single RAN node.

Figure 2B:
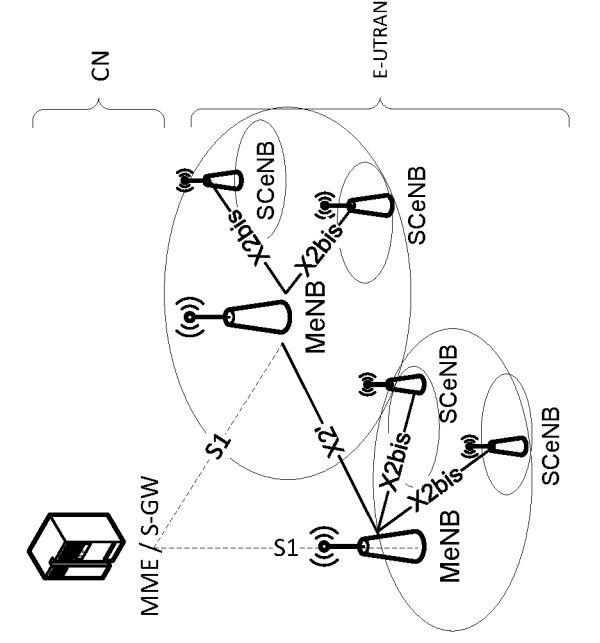
FIG. 2B illustrates another example reference architecture that may implement a multi-scheduler architecture.
Figure 2A:
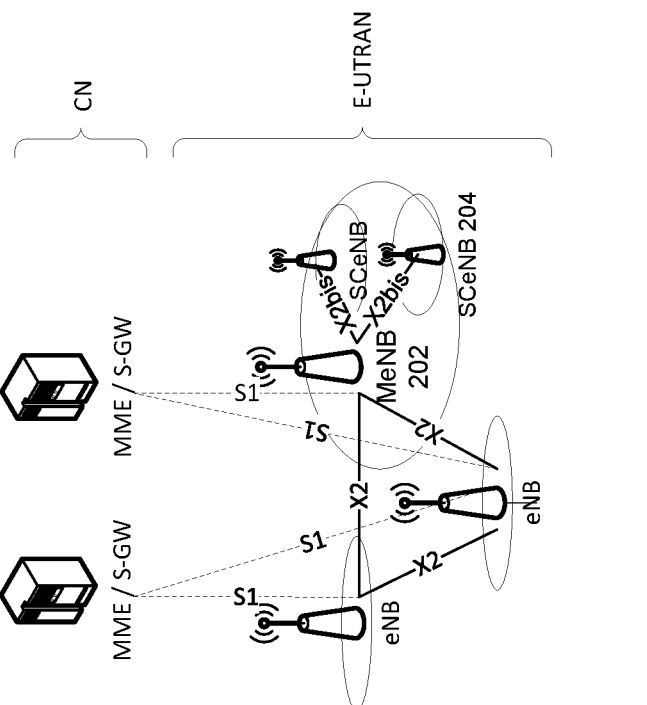
FIG. 2A illustrates an example reference architecture that may implement a multi-scheduler architecture.

FIG. 2A is a system diagram illustrating an example network architecture that may provide a WTRU multiple layers for transmission/reception. For example, MeNB 202 may provide a WTRU with a first layer of wireless coverage (e.g., a macro layer). SCeNB 204 and/or SCeNB 206 may provide the WTRU with additional layers of wireless coverage (e.g., a second layer, a third layer, etc.). SCeNB 204 and/or SCeNB may be provide one or more layers of "small cells" coverage for the WTRU. One or more SCeNBs may be logically grouped to form clusters of SCeNBs. This may be referred to as a cluster. For example, SCeNB 204 and SCeNB 206 may be included in a cluster.

MeNB 202 may communicate with one or more of SCeNB 204 and/or SCeNB 206 via a logical communication interface, which may be referred to as an X2bis interface. MeNB 202 may communicate with a cluster of one or more SCeNBs using an X2bis interface. SCeNBs within a cluster arrangement may communicate with other SCeNBs within the cluster and/or may communicate with a central controller (e.g., a cluster controller, a Small Cell Gateway (SCGW), etc.). For example, a SCGW may terminate S1-U for bearers associated with the corresponding small cell layer. The X2bis interface may be an extension of the X2 interface (e.g., an interface used by an eNB to communicate with other eNBs), may be the same as the X2 interface, and/or the X2bis may be a separate logical interface (e.g., in addition to the X2 interface). The X2bis interface may be a wired interface and/or may be a wireless interface. In an example, the X2bis interface may be implemented over a relatively high latency communication medium (e.g., and/or a communication medium over which relatively low latency cannot be guaranteed), for example making coordinated scheduling between a MeNB and an SCeNB practically difficult to implement.

FIG. 2B is a system diagram illustrating another example network architecture that may provide a WTRU multiple layers for transmission/reception. As illustrated in FIG. 2B, a MeNB may communicate with another MeNB via the X2' interface and with a SCeNB via the X2bis interface. The X2' interface may be an extension of the X2 interface, may be the same as the X2 interface, and/or may be a separate logical interface (e.g., in addition to the X2 interface).

With multi-scheduling, a WTRU may establish a connection such that data may be exchanged using one or more data paths, where each path may use a radio interface (e.g., Uu) associated with different network nodes (e.g., a MeNB or a SCeNodeB). The air interfaces for the different data paths may be independently scheduled by the respective network nodes (e.g., a MeNB or a SCeNodeB).

A first RRC connection may be established between the WTRU and a MeNB. The first RRC connection may establish signaling radio bearers SRB0, SRB1 and SRB2. For example, this connection may be established according to LTE Release 11 principles. During RRC connection establishment of the first RRC connection, the WTRU may indicate a whether or not the WTRU supports operation according to multi-scheduler principles. For example, the WTRU may indicate whether it supports multi-schedule/ multi-layer operation when indicating the WTRU operating class and/or when otherwise indicating WTRU capabilities.

When a WTRU operates according to multi-scheduler principles, the control plane may be extended in order to support multi-layer operation. For example, the control plane associated with a WTRU operating utilizing multiple layers may be implemented using a centralized control plane/entity, a coordinated control plane/entities, and/or a distributed control plane/entity.

For example, from the perspective of the network, a centralized control plane/entity may be characterized by a single terminating RRC instance (e.g., MeNB, another network node/entity, etc.) that is supplemented by a control function between the terminating node within the network and the SCeNB. In an example, when utilizing a centralized control plane, a control function may be established between the terminating node of the RRC instance and the MeNB, for example, if the terminating instance of the RRC connection is logically separate from the MeNB. From the perspective of the WTRU, a centralized control plane/entity may be characterized by a single RRC entity. The WTRU may also implement one or more extensions to control multi-scheduler aspects (e.g., one or more SRBs) specific to a subset of the configured serving cells/layers (e.g., those corresponding to a SCeNB).

From the perspective of the network, a coordinated control plane/entities may be characterized by a plurality of terminating RRC instances (e.g., a first terminating instance in a first network node such as a MeNB, a second terminating instance in a second network node such as an SCeNB) that may be supplemented by a control function implemented between the corresponding terminating nodes. Each of the RRC instances may implement a corresponding set of SRBs and/or a corresponding set of control functions (e.g., connection establishment, mobility control and RRM, connection release, etc.). From the perspective of the WTRU, a coordinated control plane/entities may be characterized by a plurality of RRC entities entity. The WTRU may also implement one or more extensions to the control multi-scheduler aspects (e.g., signaling received via a first RRC instance) that may trigger the establishment of a second RRC instance. Mobility control may be performed on a per layer basis. As an example, mobility may be performed on a per layer basis if a cluster of SCeNBs are utilized. Mobility control on a per layer basis may include each RRC instance being independently configurable from each other.

From the perspective of the network, distributed control plane/entities may be characterized by a plurality of terminating RRC instances (e.g., a first terminating instance in a first network node such as a MeNB, a second terminating instance in a second network node such as an SCeNB) that may be supplemented by a control function between the terminating nodes (e.g., between the MeNB and the SCeNB) Each RRC instance may implement a different set of functions (e.g., the MeNB may support connection establishment, RLM mobility control, NAS transport, etc., while a SCeNB may lack support for one or more of those functions). Some RRC functions (e.g., management of radio resources for the applicable serving cells, for example using the RRC Connection Reconfiguration) may be supported by each of the RRC instances. Mobility control may be performed per layer, for example, in case of a deployment with a cluster of SCeNBs, in which case mobility control may be supported by one or more RRC instances. From the perspective of the WTRU, a distributed control plane/entity may be characterized by a single RRC entity. The WTRU may also implement one or more extensions specific to the control of the multi-scheduler aspects. For example, one or more SRBs may be specific to a subset of the configured serving cells/layers (e.g., SRB0, SRB1 and SRB2 may be specific to the control of the serving cells/layer corresponding to a MeNB, while SRB3 may be specific to serving cells/layer corresponding to a SCeNB). Some functions may be SRB-specific (e.g., reconfiguration of radio resources and/or mobility management), which may be applied per layer.

Figure 3:
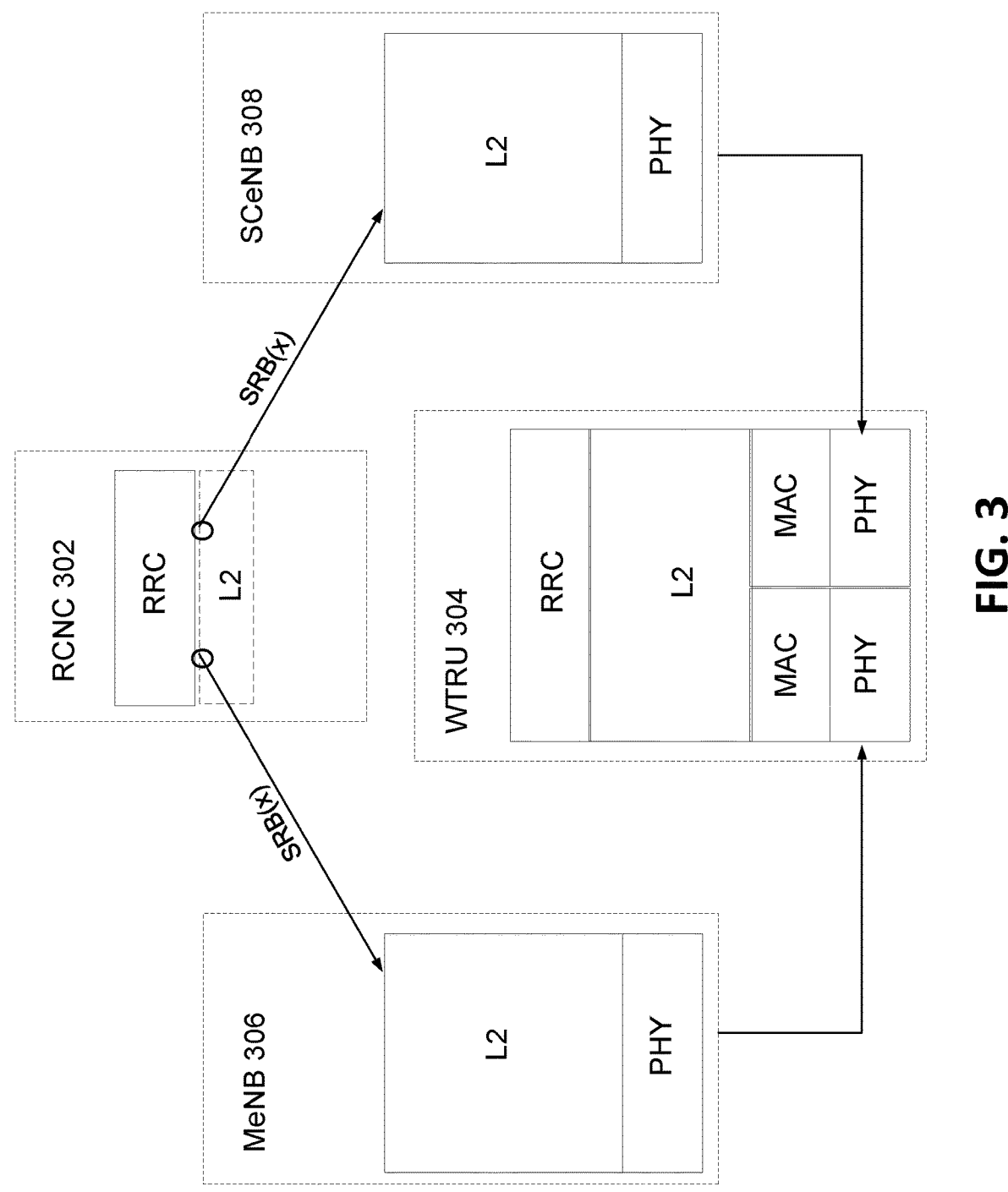
FIG. 3 illustrates an example implementation of a centralized control plane.

FIG. 3 illustrates an example implementation of a centralized control plane. For example, the centralized control plane may include a single terminating RRC instance at the network side (e.g., at Radio Cloud Network Controller (RCNC) 302), a single RRC instance at WTRU 304, and use of X2bis control. For example, WTRU 304 may establish a single RRC connection to the network. The RRC connection may be controlled by a centralized network controller such as RCNC 302.

Within the network, the centralized network controller at which the RRC instance is terminated may be a separate logical network node (e.g., RCNC 302) and/or may be implemented within a RAN node (e.g., an eNB). For example, the centralized network controller may be implemented in MeNB 306 and/or SCeNB 308. RCNC 302 may be communicate via the X2bis interface (e.g., and/or some other interface) in order to configure SCeNB 308. For example, RCNC 302 may configure one or more security parameters, evolved packet core (EPS) bearers, radio resource management (RRM) functions, etc. for SCeNB 308 via the X2bis interface. RCNC 302 may send and/or configuration parameters for SCeNB 308 (e.g., WTRU configuration information for one or more of PHY, MAC, RLC, PDCP, RRC, etc. for one or more serving cells of the SCeNB) via the X2bis interface. At WTRU 304, a single RRC instance and a single RRC connection may be used to implement the centralized control plane.

When utilizing a centralized control plane, information associated with one or more SRBs may be exchanged via multiple layers/data paths. For example, some data associated with an SRB may be exchanged via the layer/data path including MeNB 306 and other data associated with the SRB may be exchanged via the layer/data path including SCeNB 308. As shown in FIG. 3, an RRC PDU corresponding to SRB(x) may be exchanged over a data path that corresponds to a radio bearer (and/or logical channel (LCH)) of the MeNB and/or to a radio bearer (and/or LCH) of a SCeNB. The RRC PDU corresponding to SRB(x) may be included in a transport block associated with a first MAC instance associated with the macro layer and/or a second MAC instance associated with the small cell layer. A centralized control plane may be implemented irrespective of how the layer 2 protocol is split between the RCNC and the MeNB/ SCeNB.

Figure 4:
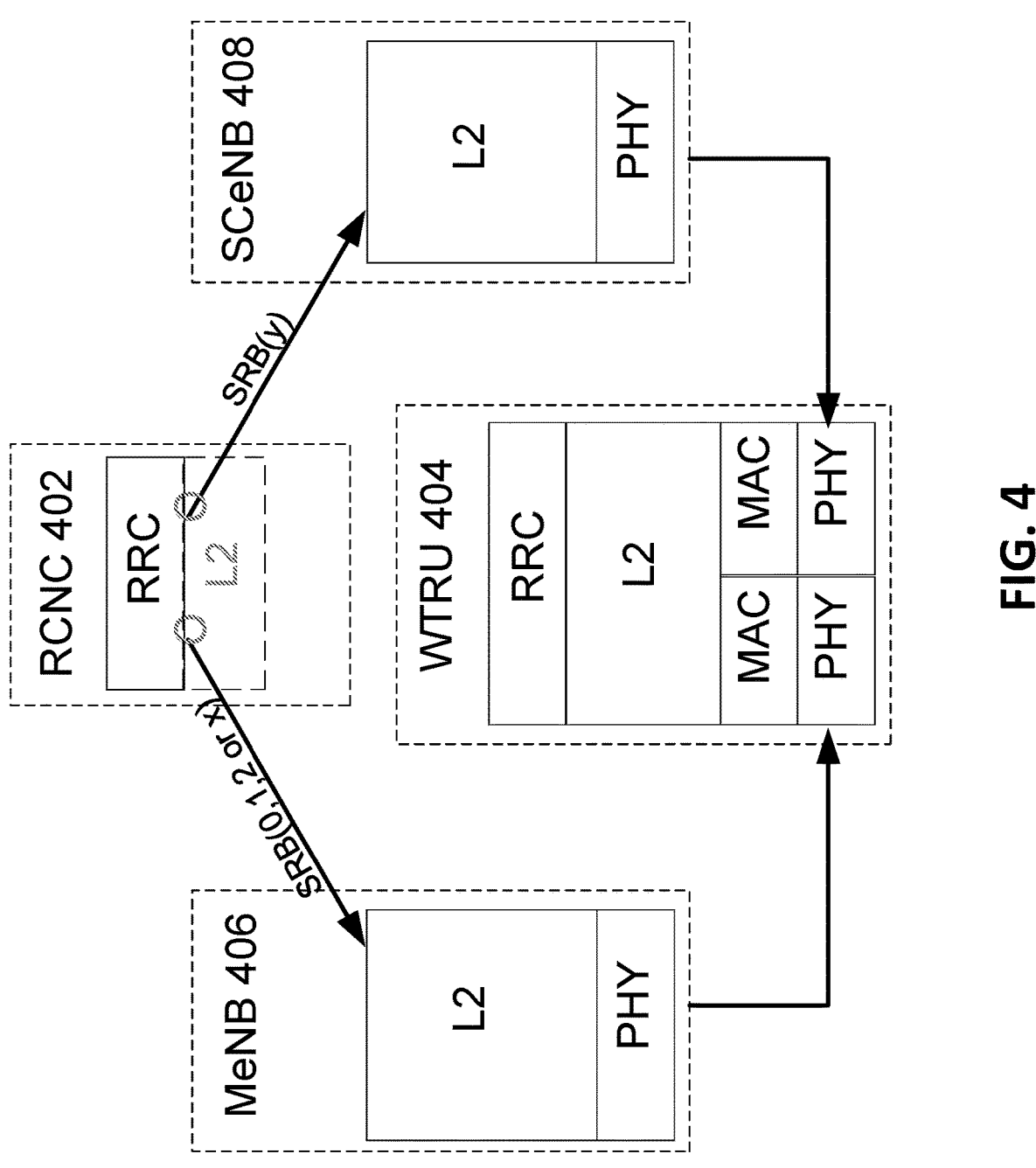
FIG. 4 illustrates another example implementation of a centralized control plane.

In an example, a centralized control plane may be implemented where each SRB is associated with a given data path/layer. For example, FIG. 4 illustrates an example implementation of a centralized control plane where SRBs are associated with a single data path/layer. As shown in FIG. 4, WTRU 404 may be configured to communicate RRC PDUs associated with a first SRB (e.g., SRB(0, 1, 2, or x)) to RCNC 402 via a first data path/layer that is associated with a radio bearer (and/or LCH) of MeNB 406 and RRC PDUs associated with a second SRB (e.g., SRB(y)) to RCNC 402 via a second data path/layer that is associated with a radio bearer (and/or LCH) of SCeNB 408. The RRC PDUs may be mapped to a transport block associated with the appropriate LCH (e.g., a LCH of the MAC instance associated with the SRB). A centralized control plane here each SRB is associated with a given data path/layer may be implemented irrespective of how the layer 2 protocol is split between the RCNC and the MeNB/SCeNB.

As may be appreciated, examples may include a implementations where some SRBs, for example SRB0, SRB1, and SRB2, may be mapped to a single data path (e.g., the data path associated with the MeNB), while other SRB(s) may be mapped to both data paths. In another example, all SRBs may be sent via a single layer. For example, there may no SRBs associated with the data path/layer for the SCeNB.

Figure 5:
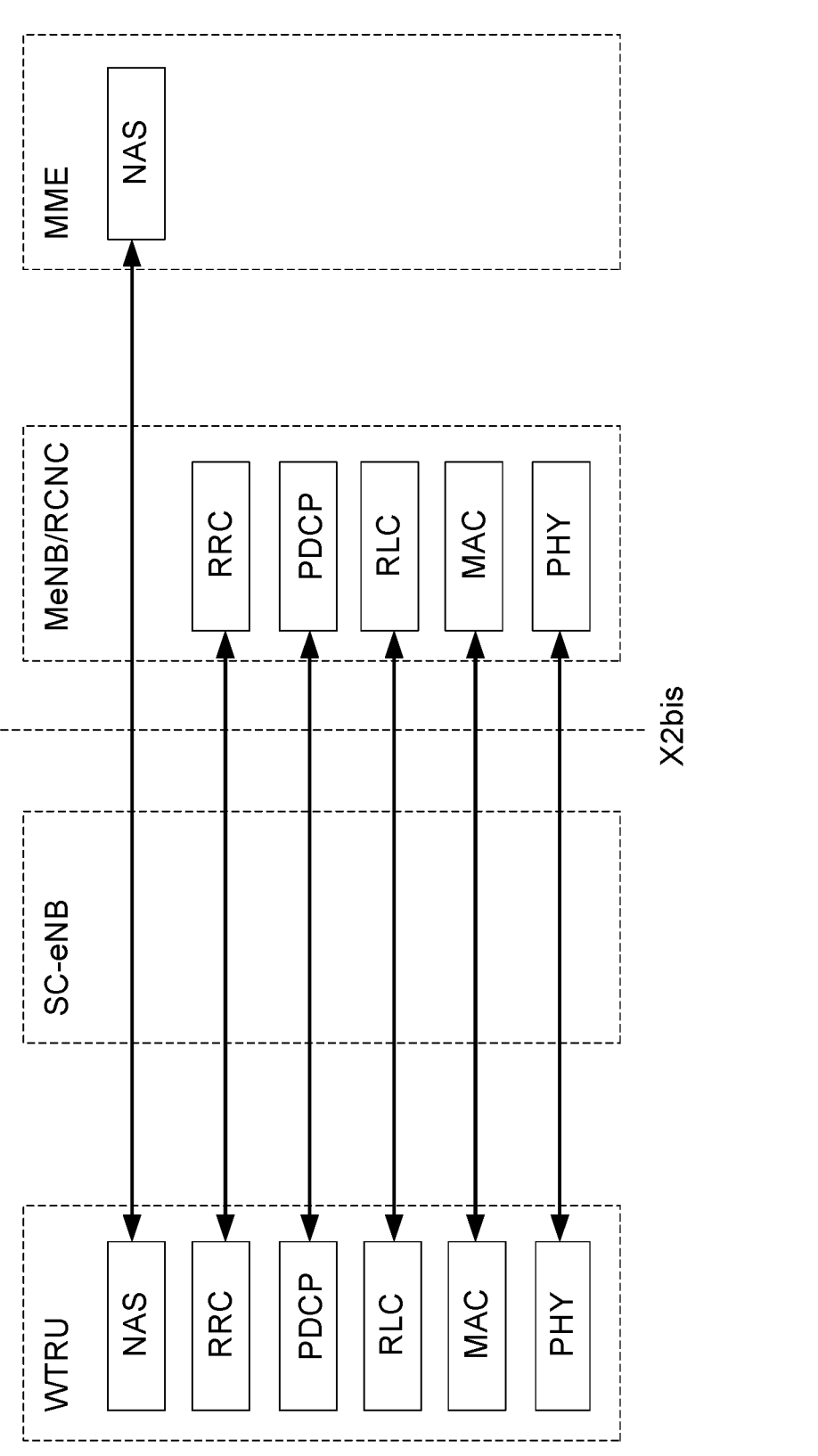
FIG. 5 illustrates an example control plane protocol stack for SRBs exchanged via the data path including a MeNB when an RRC instance is terminated at the MeNB on the network side.

In an example, the RCNC may be co-located with and/or implemented by a MeNB. FIG. 5 illustrates an example control plane protocol stack for SRBs exchanged via the data path including a MeNB when an RRC instance is terminated at the MeNB on the network side. If the RCNC is co-located with and/or implemented by the MeNB, one or more of SRB0, SRB1, SRB2, and/or SRB3 may be exchanged via the data path including the MeNB. For example, a WTRU may establish an RRC connection with a MeNB, for example, according to LTE Release 11 procedures. The MeNB may receive the capability information for the WTRU from the WTRU that indicated that the WTRU supports multi-scheduler/multi-layer operation. The MeNB may configure the WTRU to perform measurements for frequencies that correspond to the Small Cell layer (e.g., intra-band measurements, inter-band measurements, etc.). The MeNB may receive a measurement report from the WTRU, and may determine what serving cell of an SCeNB may be suitable for offloading traffic to/from the WTRU. The MeNB may establish a data path for the WTRU including the SCeNB. The MeNB may establish a connection to the selected SCeNB in order to provide WTRU context information to the SCeNB. For example, the MeNB may configure the SCeNB with parameters for setting up one or more EPS bearers such as QoS/QCI information for the WTRU, security parameters for encryption and/or authentication, and/or the like. The MeNB may receive a response message from the SCeNB that may include the Access Stratum configuration (AS-configuration) information for one or more serving cells of the SCeNB.

The MeNB may transmit a RRC connection reconfiguration message to the WTRU that may include one or more AS-configuration parameters received from the SCeNB to configured the WTRU for access to one or more applicable cell(s) of the SCeNB. The MeNB may receive a response from the WTRU indicating that it has received the configuration and/or successfully connected to the SCeNB. The MeNB may receive a confirmation from the SCeNB that indicates that the WTRU has successfully accessed one or more serving cell of the SCeNB. The WTRU may access the SCeNB using a random access and/or may exchange of one or more RRC message over an SRB that was established for exchanging control data via the data path including the SCeNB (e.g., SRB3). In an example, SRB3 may be an SRB that is established and/or dedicated to controlling the radio link between the WTRU and the SCeNB (e.g., and/or a RAN node associated with a secondary data path).

Figure 6:
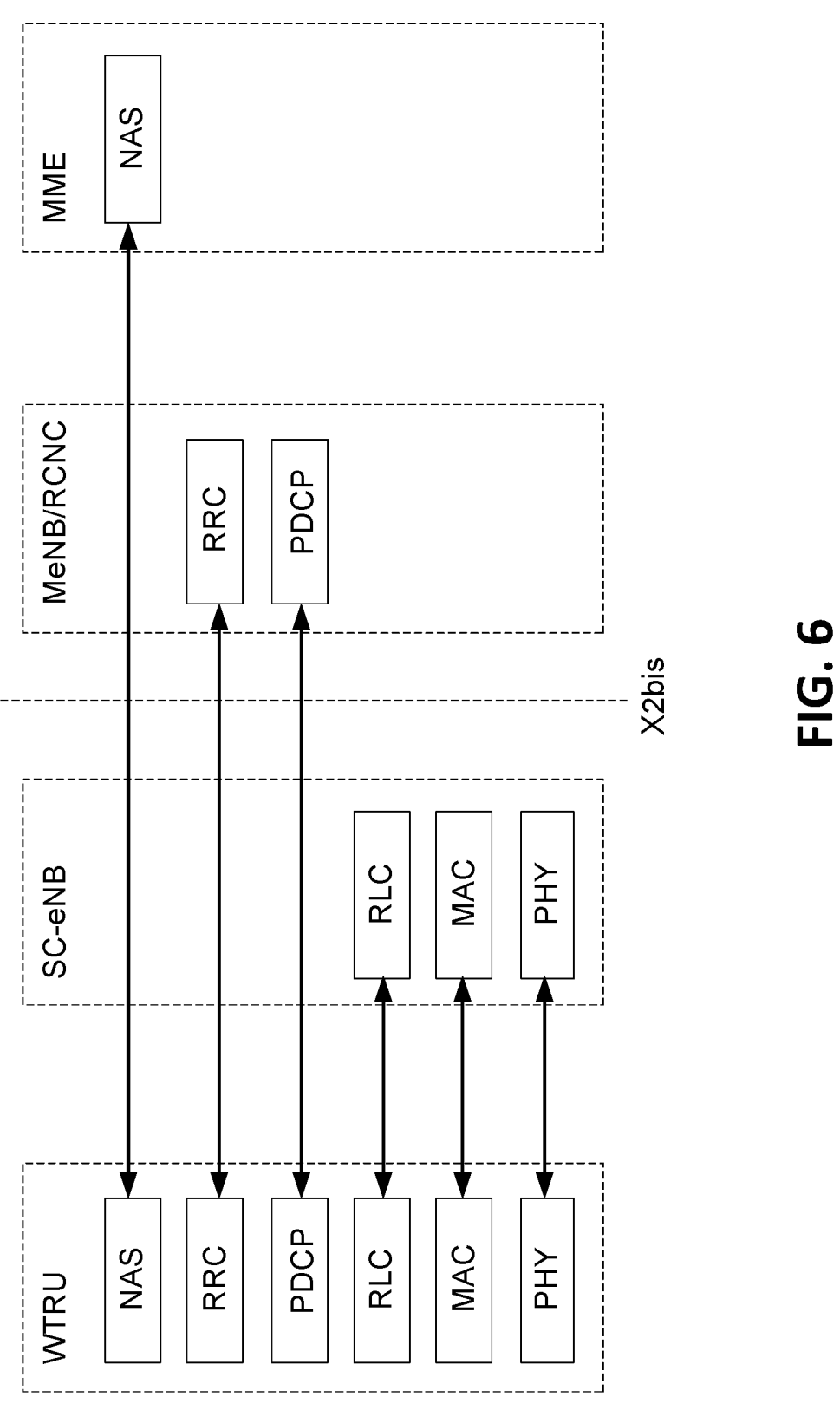
FIG. 6 illustrates an example control plane protocol stack for SRBs exchanged via the data path including an SCeNB when an RRC instance is terminated at the MeNB on the network side.

FIG. 6 illustrates an example control plane protocol stack for SRBs exchanged via the data path including an SCeNB when an RRC instance is terminated at the MeNB on the network side. As shown in FIG. 6, one or more SRBs (e.g., SRB(x) which may be SRB3) may be exchanged over the path that includes the SCeNB. The protocol stack for such a control plane may include the PHY, MAC, and/or RLC layers being terminated in the SCeNB and the PDCP and/or RRC layers being terminated in the MeNB.

In order to establish dual layer connectivity, the WTRU may first establish an RRC connection with the MeNB, for example according to LTE Release 11 procedures. When establishing the RRC connection, the WTRU may indicate that it supports multi-scheduler/multi-layer operation, for example as part of the WTRU capability information. The WTRU may receive measurement configuration information from the MeNB. The measurement configuration information may include measurement information for frequencies that corresponds to the small cell layer (e.g., intra-band measurements, inter-band measurements, etc.). The WTRU may report measurements according to the configured triggering criteria. The WTRU may receive a RRC connection reconfiguration message from the MeNB, and the RRC connection reconfiguration information may include AS-configuration parameters for accessing one or more serving cells of a SCeNB. The WTRU may reconfigure at least a portion of its radio for operation on the indicated carrier frequency for the SCeNB. The WTRU may attempt to perform an initial access procedure to a serving cell of the SCeNB (e.g., receive a system information broadcast from the SCeNB). The WTRU may send an RRC message (e.g., RRC connection reconfiguration request) that indicates a request to establish a SRB3 (e.g., using the same security context as for other SRBs), which may be exchanged via the data path including the SCeNB. The WTRU may receive a response via SRB3 and/or a RRC connection reconfiguration message exchanged via SRB3 (e.g., over the data path including the SCeNB) that configures one or more cells corresponding to the SRB3 connection. The WTRU may perform the reconfiguration and transmit a RRC connection reconfiguration complete response message.

In an example, SRB0, SRB1, and/or SRB2 may terminate in the RCNC/MeNB and in the WTRU and may be exchanged via the data path including the MeNB. For example, SRB0, SRB1, and/or SRB2 may be associated with the control plane protocol stack arrangement illustrated in FIG. 5. In an example, SRB3 (and/or other supplemental SRBs) may terminate in the RCNC/MeNB and in the WTRU and may be exchanged via the data path including the SCeNB. For example, SRB3 may be associated with the control plane protocol stack arrangement illustrated in FIG. 6. SRB3 may be used for reconfiguration (e.g., release) of radio resources and/or for mobility management for the small cell layer.

A coordinated control plane may be characterized by a plurality of terminating RRC instances within the network, one or more SRB sets, and/or X2bis exchange of control data. For example, a WTRU may establish a plurality of RRC connections to the network. The RRC connections may be arranged in a hierarchical manner.

For example, from the perspective of the network both the MeNB and the SCeNB(s) may be associated with a respective RRC entity. The MeNB may use the X2bis interface (and/or some other interface) to configure the SCeNB with various parameters associated with the WTRU (e.g., with security information, EPS bearer information, QoS information, RRM information, etc.). The MeNB may instruct the WTRU to establish a secondary RRC connection to a serving cell of a SCeNB. The SCeNB may establish the secondary RRC connection with the WTRU and may transmit a RRC connection reconfiguration message to the WTRU. The RRC connection reconfiguration message may include AS-configuration for the applicable cell(s) of the SCeNB (e.g., WTRU configuration information for one or more of PHY, MAC, RLC, PDCP, RRC, etc. for one or more serving cells of the SCeNB).

From the perspective of the WTRU, once the WTRU has established an RRC connection with the MeNB, the WTRU may receive control signaling from the network that indicates that the WTRU may establish a secondary RRC connection to a SCeNB. Such control signaling may be received in a dedicated manner using the established RRC connection with the MeNB. In an example, a paging message broadcast within a cell of a SCeNB may indicate to the WTRU that it may establish a secondary RRC connection to a SCeNB. The page may be sent from a cluster (or a group) of SCeNBs. Prior to attempting to receive the page indicating that the WTRU may perform multi-layer operation using a cell of the SCeNB, the WTRU may receive dedicated RRC signaling from the MeNB that configures a secondary RRC instance at the WTRU to perform IDLE mode mobility procedures for one or more cells of a given frequency band (e.g., corresponding to the frequency band utilized by the SCeNB). The RRC connection establishment procedure for a secondary RRC instance may include an indication that the connection being established is for a secondary connection.

Figure 7:
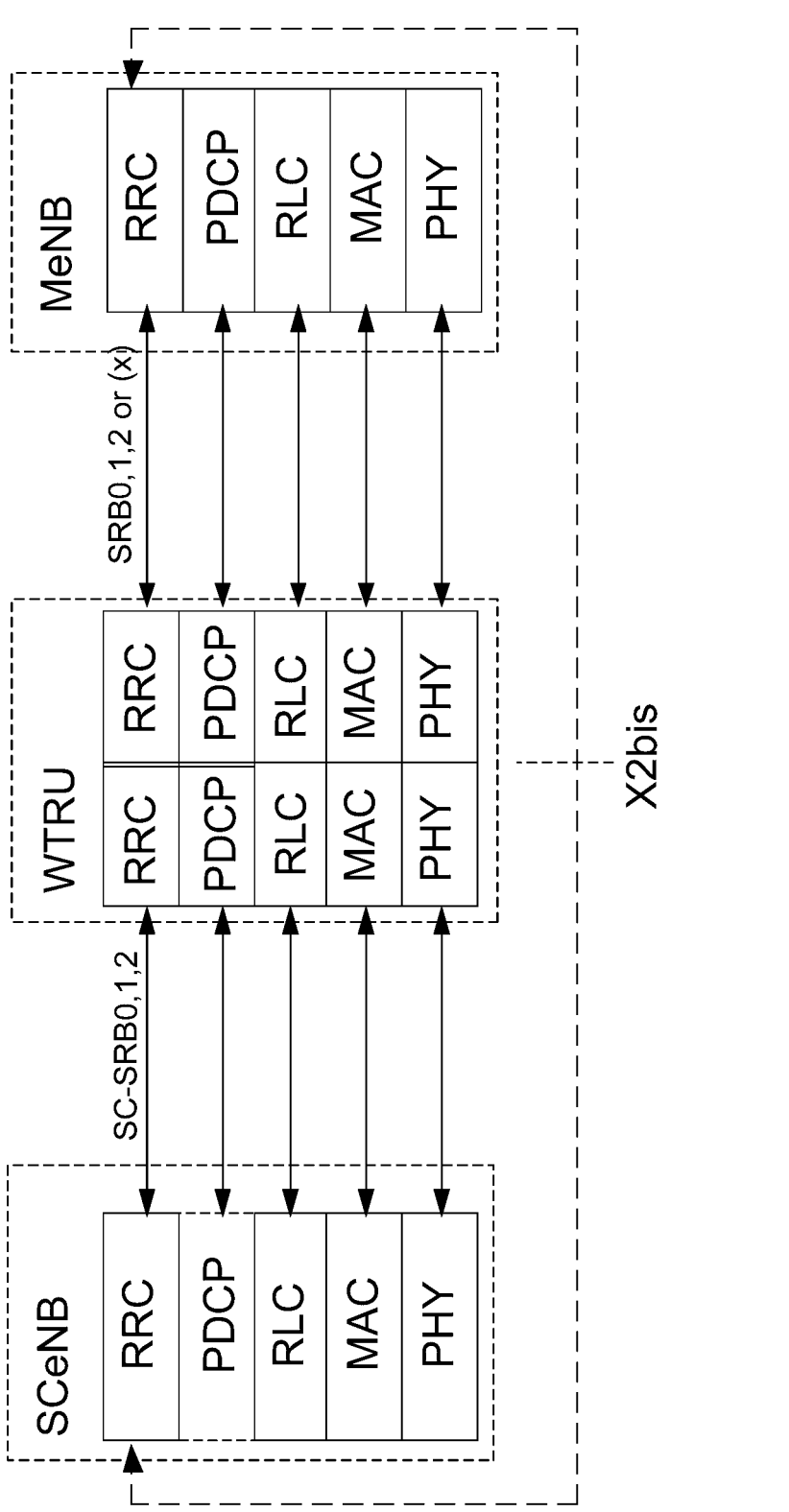
FIG. 7 illustrates an example control plane protocol stack for a coordinated control plane where a first RRC instance is terminated at a first serving site and a second RRC instance is terminated at a second serving site.

FIG. 7 illustrates an example control plane protocol stack for a coordinated control plane where a first RRC instance is terminated at the MeNB and a second RRC instance is terminated at the SCeNB. As shown in FIG. 7, the data path for the first RRC connection (e.g., the connection with the MeNB) may include a radio bearer (and/or LCH) mapped to the MeNB. For example, SRB0, SRB1, and/or SRB2 may be established via the first RRC connection that is associated with the data path including the MeNB. The data path for the second RRC connection (e.g., the connection with the SCeNB) may include a radio bearer (and/or LCH) mapped to the SCeNB. For example, instances SRB0, SRB1, and/or SRB2 associated with the second RRC connection (e.g., indicated as SC-SRB0, 1, 2 in FIG. 7) may be established via the second RRC connection that is associated with the data path including the SCeNB.

A primary connection (e.g., the connection established with the MeNB) may be augmented to include an additional SRB (e.g., illustrated as SRB(x) in FIG. 7), which may be a bearer that is used to control some aspects of the secondary RRC connection (e.g., the connection associated with the SCeNB). For example, the additional SRB may be used to trigger a connection establishment procedure and/or a release procedure over the secondary data path/layer. RRC PDUs corresponding to the supplemental bearer may be exchanged over a data path that corresponds to a radio bearer (and/or LCH) of the MeNB.

A secondary connection (e.g., the connection established with the SCeNB) may be augmented to include an additional SRB (e.g., SRB(y), although not shown in FIG. 7), which may be a bearer that is used transmit data associated with the primary RRC connection (e.g., the connection associated with the MeNB). For example, a supplemental SRB(y) (and/or a similar implementation for multiplexing of RRC PDUs) may terminate at the SCeNB and may be an SRB that is used to re-direct and/or forward RRC PDUs to the primary RRC instance at the MeNB. For example, data for SRB0, SRB1, or SRB2 of the primary RRC instance may be sent via SRB(y) to the SCeNB, which may forward the data to the MeNB, for example via the X2bis interface.

Figure 8:
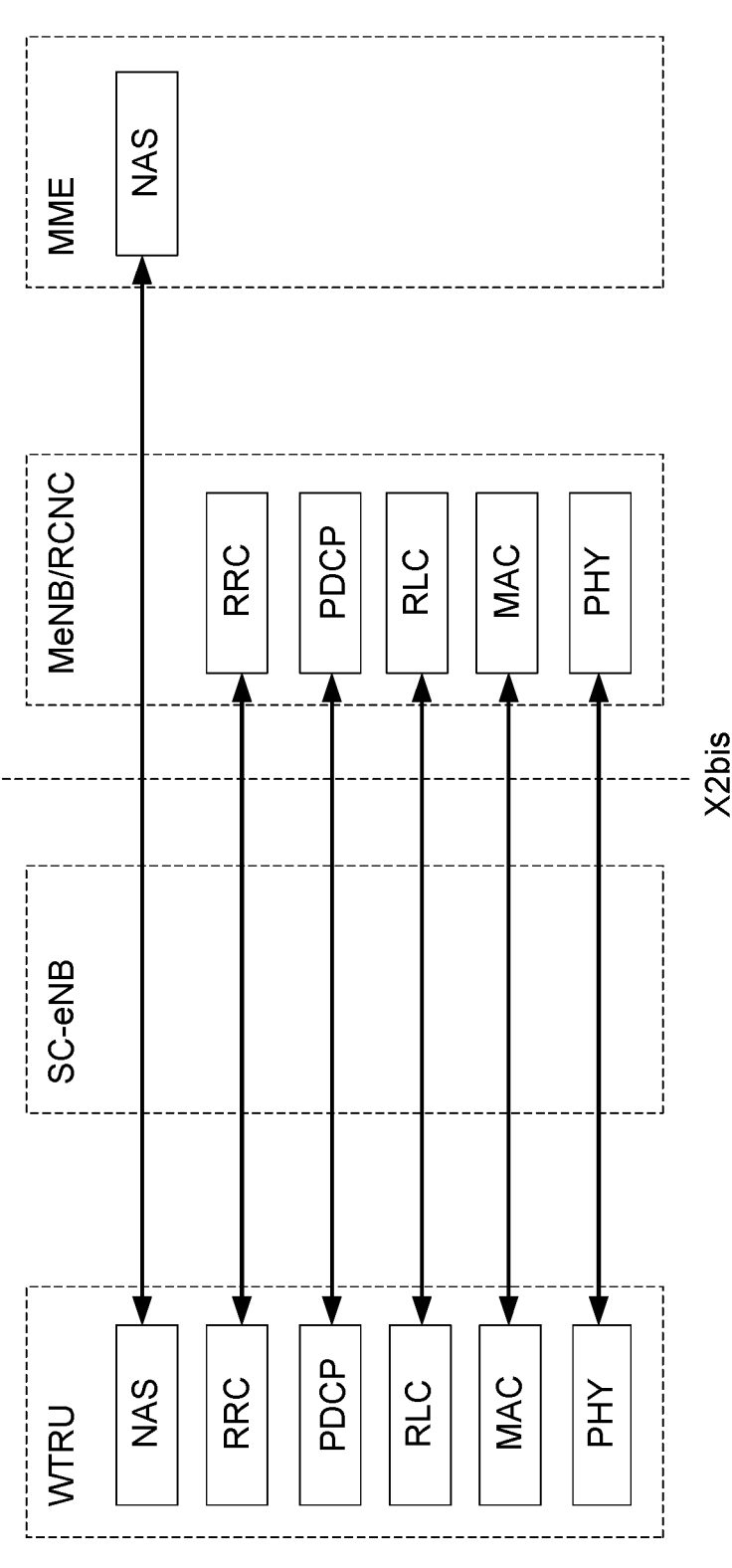
FIG. 8 illustrates an example control plane protocol stack for SRBs exchanged via the data path including a first serving site when an RRC instance is terminated at the first serving site on the network side.

FIG. 8 illustrates an example control plane protocol stack for SRBs exchanged via the data path including a MeNB when an RRC instance is terminated at the MeNB on the network side. In an example of coordinate control plan operation, the MeNB may establish a primary RRC connection with the WTRU, for example according to LTE Release 11 procedures. The MeNB may receive the capability information for the WTRU from the WTRU that indicated that the WTRU supports multi-scheduler/multi-layer operation. The MeNB may configure the WTRU to perform measurements for frequencies that correspond to the Small Cell layer (e.g., intra-band measurements, inter-band measurements, etc.). The MeNB may receive a measurement report from the WTRU, and may determine what serving cell of an SCeNB may be suitable for offloading traffic to/from the WTRU.

Figure 9:
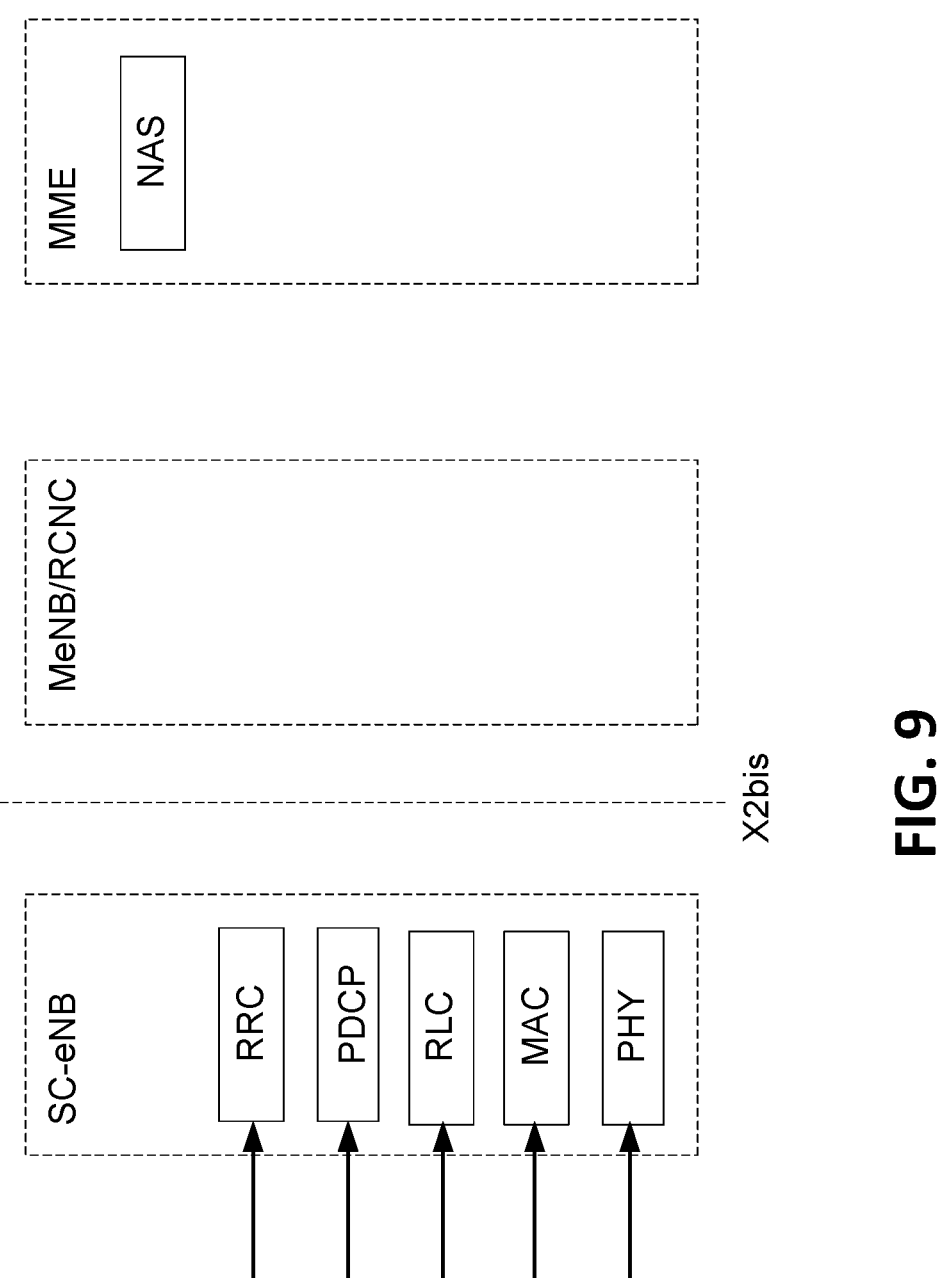
FIG. 9 illustrates an example control plane protocol stack for SRBs exchanged via the data path including a second serving site when an RRC instance is terminated at the second serving on the network side.

FIG. 9 illustrates an example control plane protocol stack for SRBs exchanged via the data path including a SCeNB when an RRC instance is terminated at the SCeNB on the network side. The WTRU and/or the MeNB may trigger the WTRU to establish a secondary RRC connection, for example a secondary connection that is terminated at the SCeNB. As an example, the MeNB may use the primary RRC connection to instruct the WTRU to establish a secondary RRC connection with the SCeNB. In an example, the MeNB may initiate the establishment of a connection with a SCeNB before the WTRU establishes a secondary RRC connection with the concerned SCeNB. For example, the MeNB may establish a data path and a control connection to the selected SCeNB in order to transfer the WTRU context (e.g., via the X2bis). The MeNB may configure the SCeNB with parameters for setting up one or more EPS bearers such as QoS/QCI information for the WTRU, security parameters for encryption and/or authentication, and/or the like. The MeNB may receive a response message from the SCeNB that may include the AS-configuration information for one or more serving cells of the SCeNB (e.g., system information parameters, handover command parameters similar to those of the RRC Connection Reconfiguration with MobilityControl Information Element). The MeNB may transmit a RRC connection reconfiguration message to the WTRU that may include the AS-configuration information received from the SCeNB for the configuration of the applicable cell(s) of the SCeNB (e.g., the MobilityControl Information Element).

In an example, the WTRU may establish a secondary RRC connection to the SCeNB, and then the SCeNB may initiate the establishment of a connection to the MeNB (e.g., after the establishment of the secondary RRC connection). For example, after establishing the secondary RRC connection with the WTRU, the SCeNB may request the establishment of a data path and a control connection to the associated MeNB in order to receive WTRU context information from the MeNB. The request for the WTRU context may be sent by the SCeNB while the secondary connection is being established by the WTRU (e.g., after/based on receiving the RRC connection request sent from the WTRU. For example, the MeNB may configure the SCeNB with parameters for setting up one or more EPS bearers such as QoS/QCI information for the WTRU. The MeNB and the SCeNB may utilize different security configuration for the same WTRU. The MeNB may receive a response message from the SCeNB indicating that the WTRU context information was received and/or that the secondary RRC connection was successfully established. The MeNB may receive a connection complete response from the WTRU and/or a confirmation from the SCeNB that may indicate that the WTRU has established the secondary connection to the SCeNB.

In an example of operation using a coordinated control plan, the WTRU may establish a RRC connection with the MeNB (e.g., according to LTE Release 11 procedures). When establishing the RRC connection, the WTRU may indicate that it supports multi-scheduler/multi-layer operation, for example as part of the WTRU capability information. The WTRU may receive measurement configuration information from the MeNB. The measurement configuration information may include measurement information for frequencies that corresponds to the small cell layer (e.g., intra-band measurements, inter-band measurements, etc.). The WTRU may report measurements according to the configured triggering criteria. The WTRU may receive a RRC connection reconfiguration message from the MeNB, and the RRC connection reconfiguration information may include AS-configuration parameters for accessing one or more serving cells of a SCeNB. The WTRU may reconfigure at least a portion of its radio for operation on the indicated carrier frequency for the SCeNB. The WTRU may attempt to perform an initial access procedure to a serving cell of the SCeNB (e.g., receive a system information broadcast from the SCeNB). The WTRU may establish a RRC connection with the SCeNB, for example according to LTE Release 11 procedures. The WTRU may transmit an RRC reconfiguration complete response to one or more of MeNB and/or the SCeNB upon successfully establishing the secondary RRC connection.

When a coordinated control plan is utilized, one or more independent SRBs may terminate at each of the RAN nodes (e.g., the MeNB and the SCeNB). For the primary RRC connection, a first set of SRBs (e.g., including a first instance of SRB0, a first instance of SRB1, and/or a first instance of SRB2) may terminate in the MeNB. For the secondary RRC connection, a first set of SRBs (e.g., including a first instance of SRB0, a first instance of SRB1, and/or a first instance of SRB2) may terminate in the SCeNB.

A distributed control plane may be characterized by a single terminating RRC instance at the network side, a single set of SRB0, SRB 1, and/or SRB 2, X2bis control between nodes of different layers, and the use of an SRB (e.g., SRB3) for exchanging control data between layers.

For example, when utilizing a distributed control plane the WTRU may establish a single RRC connection to the network via the MeNB. Although the RRC connection is established with the MeNB (e.g., the macro layer), some RRC functionality related to management of the radio resources of serving cells corresponding to the SCeNB may be performed or implemented by the SCeNB. If the SCeNB is a member of a cluster of SCeNBs, then the SCeNB may perform some mobility-related functions. For example, if the SCeNB implements one or more RRC functions and/or RRM functions for the serving cell(s) associated with the SCeNB (e.g., a subset of the RRC functions and/or RRM functions), the RRC connection established between the WTRU and the network may include one or more SRBs utilized to control the data path between the SCeNB and the WTRU (e.g., SRB3).

At the network side, the MeNB may have a RRC entity which may be a termination point of the RRC connection. For example, SRB0, SRB1 and SRB2 may terminate in the WTRU and in the MeNB. The MeNB may use the X2bis interface (or similar) to configure the SCeNB for communications with the WTRU (e.g., security information, EPS bearer setup information, QoS/QCI information, etc.). The MeNB may instruct a WTRU to access a serving cell of a SCeNB. The SCeNB may establish one or more supplemental SRB(s) (e.g., SRB3), for example for performing RRM functions of the serving cells associated with the SCeNB. Such a supplemental SRB may be used to facilitate some mobility-related functions in the SCeNB. The supplemental SRBs (e.g., SRB3) may terminate in the WTRU and in the SCeNB, for example even when the RRC connection is terminated at the MeNB and not the SCeNB. The supplemental SRB may be used for control signaling that reconfigures one or more serving cells corresponding to the SCeNB (e.g., WTRU configuration information for one or more of PHY, MAC, RLC, PDCP, etc. for one or more serving cells of the SCeNB).

From the perspective of the WTRU, once the WTRU has established an RRC connection with the MeNB, the WTRU may receive control signaling from the network that indicates that the WTRU may establish a secondary RRC connection to a SCeNB. Such control signaling may be received in a dedicated manner using the established RRC connection with the MeNB. In an example, a paging message broadcast within a cell of a SCeNB may indicate to the WTRU that it may establish a secondary RRC connection to a SCeNB. The page may be sent from a cluster (or a group) of SCeNBs. Prior to attempting to receive the page indicating that the WTRU may perform multi-layer operation using a cell of the SCeNB, the WTRU may receive dedicated signaling from the MeNB that configures the WTRU to monitor the paging channel of a suitable cell of the SCeNB a given frequency band. The WTRU may accesses a cell of a SCeNB using a random access procedure. The random access may be a dedicated random access, for using RACH parameters (e.g., a dedicated RACH preamble) received in the dedicated control signaling sent from the MeNB. The WTRU may receive RRC signaling that reconfigures the serving cells corresponding to the SCeNB, for example via SRB3.

Figure 10:
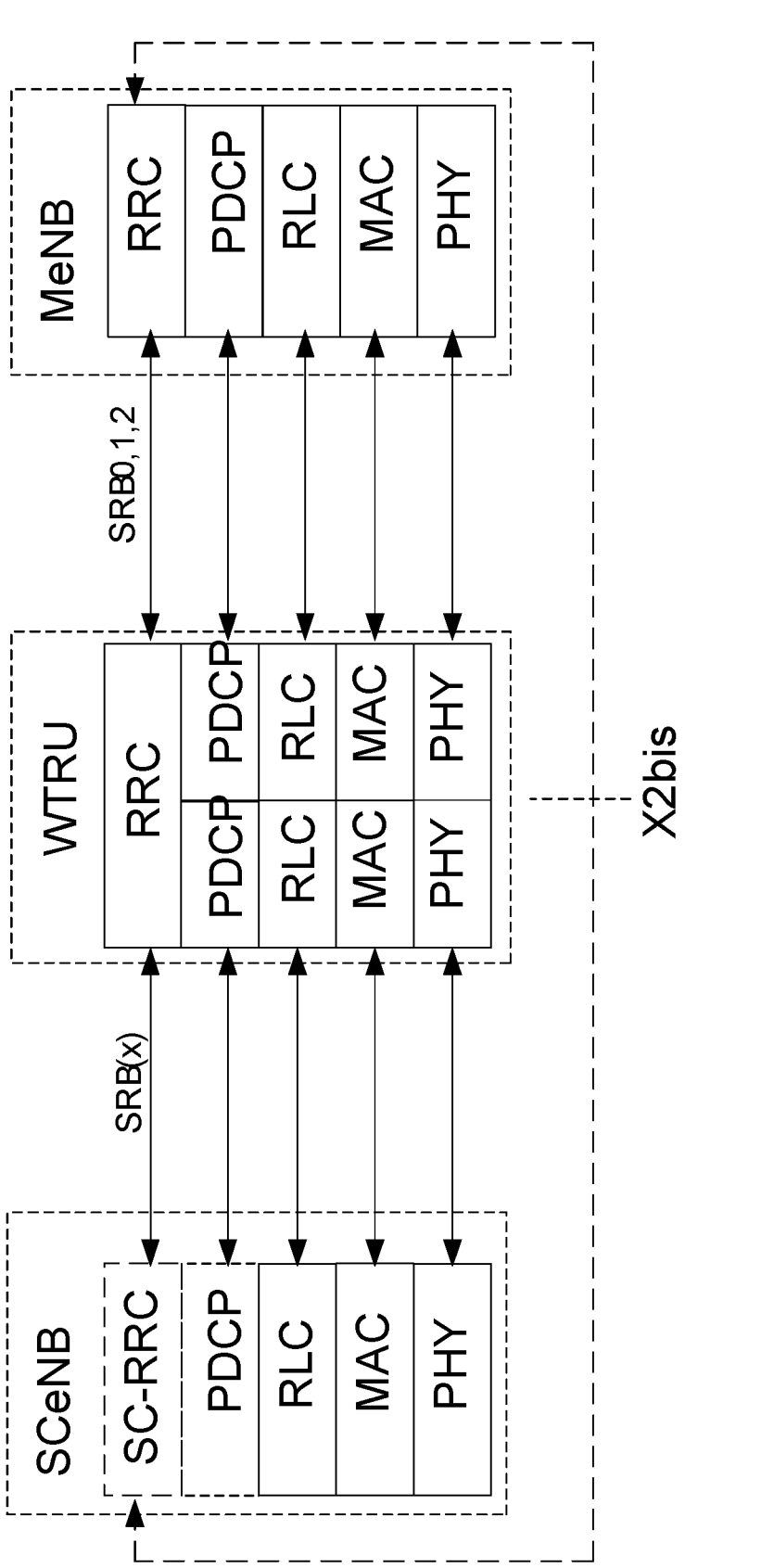
FIG. 10 illustrates an example control plane protocol stack for a distributed control plane where the RRC instance is terminated at first serving site.

FIG. 10 illustrates an example control plane protocol stack for a distributed control plane where the RRC instance is terminated at the MeNB. As shown in FIG. 10, an RRC PDU corresponding to a transmission for a given SRB of the RRC connection may be exchanged over a data path that corresponds to a radio bearer (and/or LCH) of the MeNB and/or to a radio bearer (and/or LCH) of the SCeNB. For example, RRC PDUs corresponding to a transmission for SRBs 0, 1, and 2 may be exchanged over a data path that corresponds to a radio bearer (and/or LCH) of the MeNB. This may be represented as SRB0, 1, 2 in FIG. 10. RRC PDUs corresponding to a transmission for a supplemental SRB (e.g., SRB3) may be exchanged over a data path that corresponds to a radio bearer (and/or LCH) of the SCeNB. This may be represented as SRB(x) FIG. 10. The SCeNB may forward control data associated with SRB3 to the MeNB via the X2bis interface. Thus, in an example for the distributed control plane architecture, some RRC related functionality may be implemented by the SCeNB (e.g., related to SRB3) even though no RRC connection and/or no SRBs are terminated in the small cell layer. Such a subset of RRC functionality is illustrated by the SCeNB including the SC-RRC layer of the protocol stack in FIG. 10 (e.g., representing limited RRC functionality that is implemented at the small cell).

Figure 11:
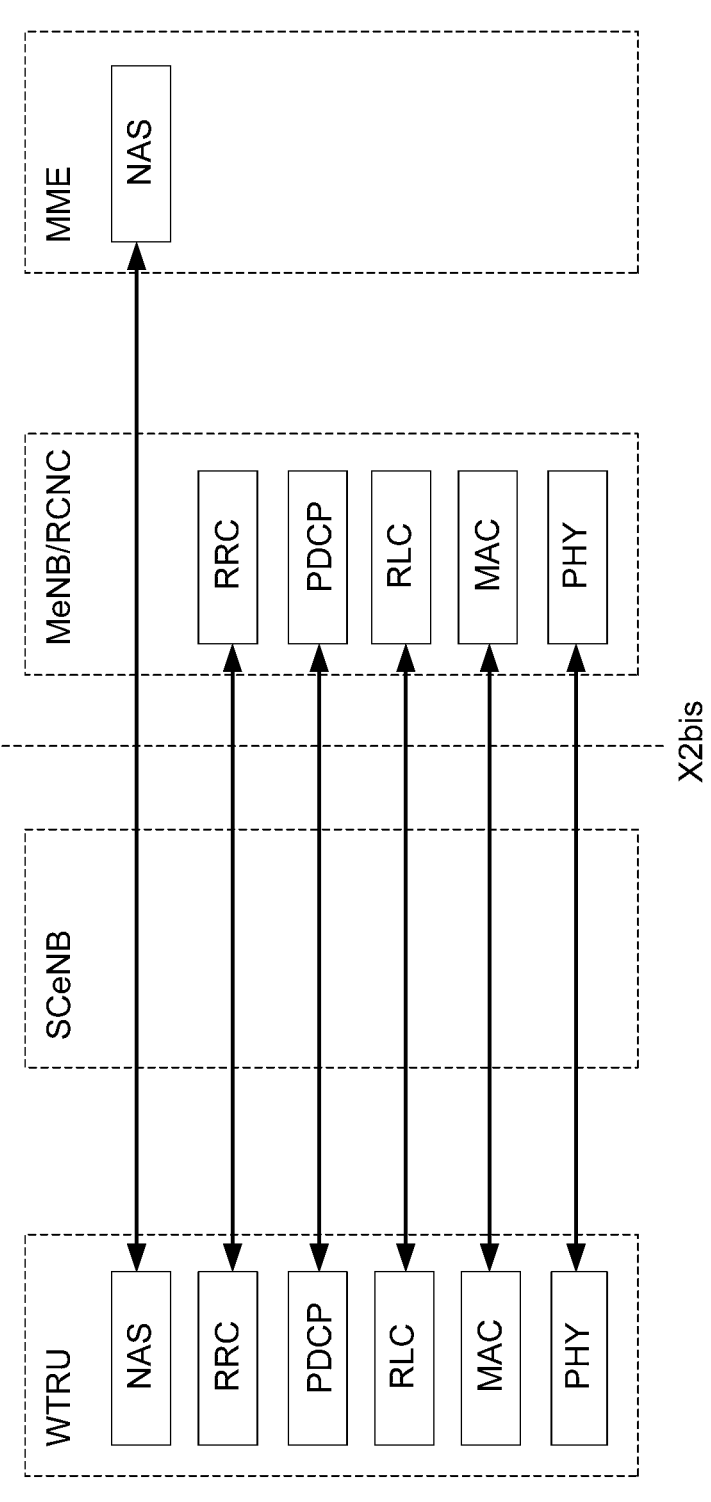
FIG. 11 illustrates an example of a control plan protocol stack comprising a distributed approach for SRB0, SRB1, and SRB2 of terminated an RRC instance at a first serving site.
Figure 12:
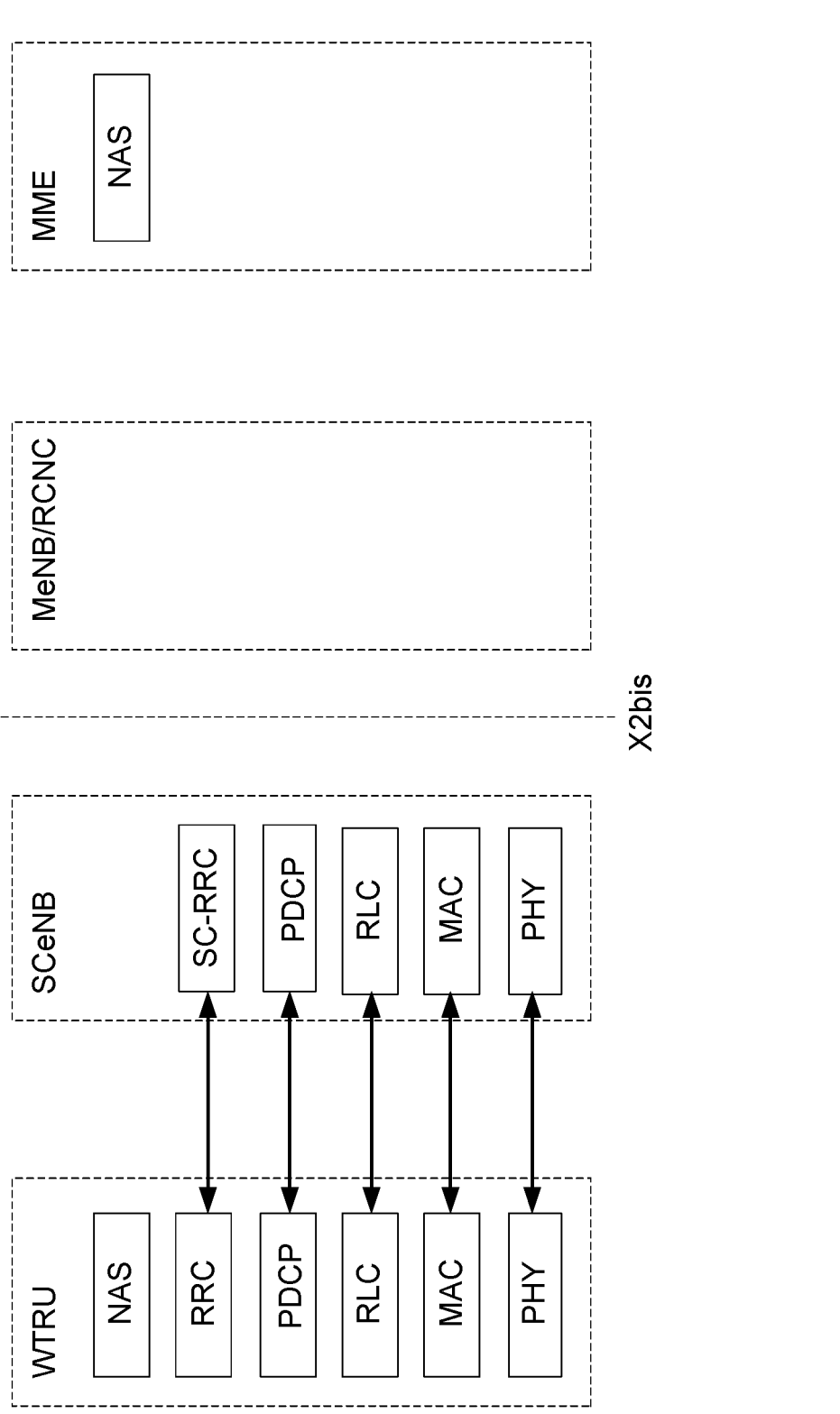
FIG. 12 illustrates an example of a control plane protocol stack comprising a distributed approach for an SRB associated with a second serving site.

In an example of network side functionality in the case of a distributed control plane, the MeNB may establish a RRC connection with the WTRU, for example, according to LTE R11 procedures. An example of such may be shown in FIG. 11. FIG. 11 is a diagram illustrating an example of a control plan protocol stack comprising a distributed approach for SRB0, SRB1, and SRB2 of MeNB RRC. The MeNB may receive the WTRU's capabilities for support for multi-scheduler operation as part of the connection establishment procedure. The MeNB may configure the WTRU with measurements for frequencies that correspond to the Small Cell enhancement layer (e.g., intra-band or inter-band measurements). The MeNB may receive a measurement report from the WTRU, and may determine what serving cell of a SCeNB may be suitable for offloading traffic to/from the WTRU. The MeNB may establish a data path and a control connection to the selected SCeNB for the WTRU's context. The MeNB may configure the SCeNB with, for example, parameters for setting up one or more EPS bearers with QoS/QCI information for the WTRU as well as with security parameters for encryption and authentication. The MeNB may receive from the SCeNB a response message that may include AS-configuration for at least one serving cell of the SCeNB. The MeNB may transmit a RRC connection reconfiguration message to the WTRU that may include the configuration parameters received from the SCeNB for the configuration of the applicable cell(s) of the SCeNB. The MeNB may receive a complete response from the WTRU or a confirmation from the SCeNB, which response may indicate that the WTRU has accessed at least one serving cell of the SCeNB (e.g., a successful random access and/or exchange of at least one RRC message over SRB3). SRB3 may terminate in the SCeNB. For example, this may be shown in FIG. 12. FIG. 12 is a diagram illustrating an example of a control plane protocol stack comprising a distributed approach for SRB 3 of SCeNB.

In an implementation, the WTRU may establish a RRC connection with the MeNB, for example, according to LTE R11 procedures. For example, this may be shown in FIG. 11. The WTRU may include whether or not it supports multi-scheduler operation in its WTRU capabilities. The WTRU may receive from the MeNB a measurement configuration including measurements for frequencies that corresponds to the Small Cell enhancement layer (e.g., intra-band or inter-band measurements). The WTRU may report measurements according to the configured triggering criterion. The WTRU may receive a RRC connection reconfiguration message from the MeNB with the AS-configuration parameters to access one or more serving cell of a SCeNB. The WTRU may reconfigure at least part of its radio for operation on the selected carrier frequency and perform an initial access to the serving cell (e.g., reception of system broadcast). The WTRU may include an initial RRC message such as, but not limited to a request to establish a SRB3 that terminates in the SCeNB. This may be done using the same security context as for other SRBs. For example, this may be shown in FIG. 12. The WTRU may receive a response on SRB3 and/or a RRC connection reconfiguration message on SRB3 that configures one or more cells corresponding to the SRB3 connection. The WTRU may perform the reconfiguration and transmit a complete response over SRB3 as a response to the configuration request from the SCeNB. The WTRU may transmit a complete response to the MeNB over SRB1 or SRB2 in response to the request to access the SCeNB.

SRB3 may terminate in the WTRU and in a SCeNB. A supplemental SRB may be used once security is started. SRB3 may be used for RRM (e.g., configuration, reconfiguration) of the serving cell(s) associated with a SCeNB, and/or for mobility control in the Small Cell enhancement layer.

When multiple schedulers are utilized for transmitting over multiple data paths, the mapping between DRBs/SRBs and the multiple data paths may vary depending on the how the protocol stack for transmitting the data is split between different network nodes. For example, a first data path may be established from the WTRU to the network via a MeNB (e.g., a macro layer) and additional data path(s) may be established from the WTRU to the network via one or more SCeNBs. One or more protocol stacks may be defined for the user plane and/or for the control plane in order to support multi-layer (e.g., multi-scheduler) transmission.

For example, the X2bis interface and/or some other interface between the MeNB and SCeNB may be used to implement various protocol stack arrangements in support of multi scheduler operation. For a given WTRU, the data path for the user plane and the data path for the control plane may be realized, at least in part, based on communications exchanged via the X2bis interface.

For example, multiple data paths for a given WTRU may be established such that the data paths are split within the network above the PDCP layer. Such an architecture may result in each of the MeNB and the SCeNB including functionality corresponding to the PHY layer, the MAC layer, the RLC layer, and the PDCP layer. The control plane may be implemented such that a PDCP entity associated with a given radio bearer (e.g., DRB and/or SRB) may be located in the network entity that transmits and/or receives control data. For example, the PDCP entity used to transmit control data via the SCeNB may be located in the SCeNB and the PDCP entity used to transmit data via the MeNB may be located in the MeNB. In an example, user plane data and/or control plane data may be carried over a radio bearer that may be mapped to a single data path (e.g., to a DRB/SRB with a single SAP). In another example, user plane data and/or control plane data may be carried over a radio bearer that may be mapped to a plurality of data paths (e.g., to a DRB/SRB with multiple SAPs). Each PDCP entity (e.g., the PDCP entity of the SCeNB, the PDCP entity of the MeNB) may include a security state machine for its respective data path.

In an example, multiple data paths that are split above the PDCP layer in the network may be implemented using one or more radio bearers that are associated with a single SAP at the network (e.g., the MeNB or the SCeNB). To support multi-scheduler operation, one or more DRBs and/or SRBs may be transferred between the data paths (e.g., DRB/SRB mobility). For example, an SRB associated with the MeNB may be offloaded to a SCeNB. If a distributed control plane is utilized (e.g., there may be some RRC functionality at both the MeNB and the SCeNB), then SRB3 or some other SRB may be used to exchange mobility related control information.

Figure 13:
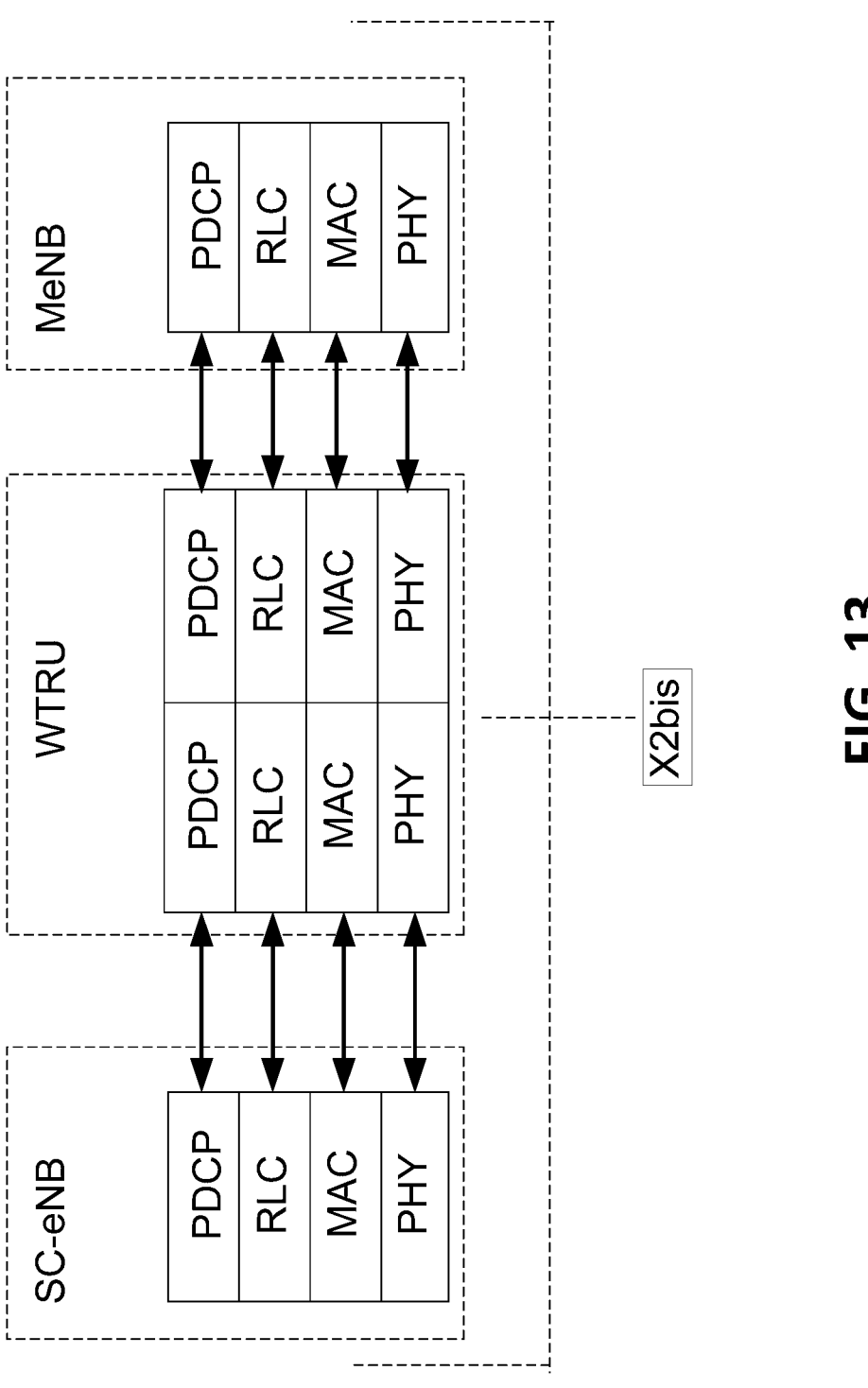
FIG. 13 illustrates an example protocol stack that may be used for user plane data paths when the data paths are split above the PDCP layer in the network.

For example, if a given radio bearer is associated with a single SAP in the network, for the user plane an EPS radio access bearer (RAB) may be implemented using a single DRB SAP. For example, FIG. 13 illustrates an example protocol stack that may be used for user plane data paths (e.g., the WTRU-MeNB data path and the WTRU-SCeNB data path) when the data paths are split above the PDCP layer in the network.

In the control plane, NAS signaling and/or RRC signaling may be transmitted over a single SRB associated with a single SAP. Depending on whether a centralized control plane, coordinated control plane, and/or distributed control plane is utilized, the mapping of SRBs to the data paths, the mobility of SRBs, and/or the protocol stack realization for the control plane within the network may be varied.

For example, a centralized control plane may be implemented such that a single SRB SAP is utilized for NAS and/or RRC signaling. For example, RRC PDUs for SRB0, SRB1, and/or SRB2 may be generated by the RCNC entity, which may be implemented in the MeNB. Additional extensions and/or additional information elements may be exchanged via the MeNB in order to manage the radio connection between the WTRU and the SCeNB (e.g., trigger establishment, mobility, and/or release of a secondary RRC connection). The RRC PDUs for SRB0, SRB1, and/or SRB2 may be may transmitted to the WTRU from a serving cell of the MeNB. In an example, RRC PDUs for SRB0, SRB1, and/or SRB2 may be exchanged via the RAN node to which the WTRU initially established the RRC connection (e.g., prior to initiating multi-scheduler/multi-layer operation). RRC PDUs corresponding to a SRB dedicated to the SCeNB (e.g., SRB3) may be exchanged in a serving cell of the SCeNB.

Figure 14:
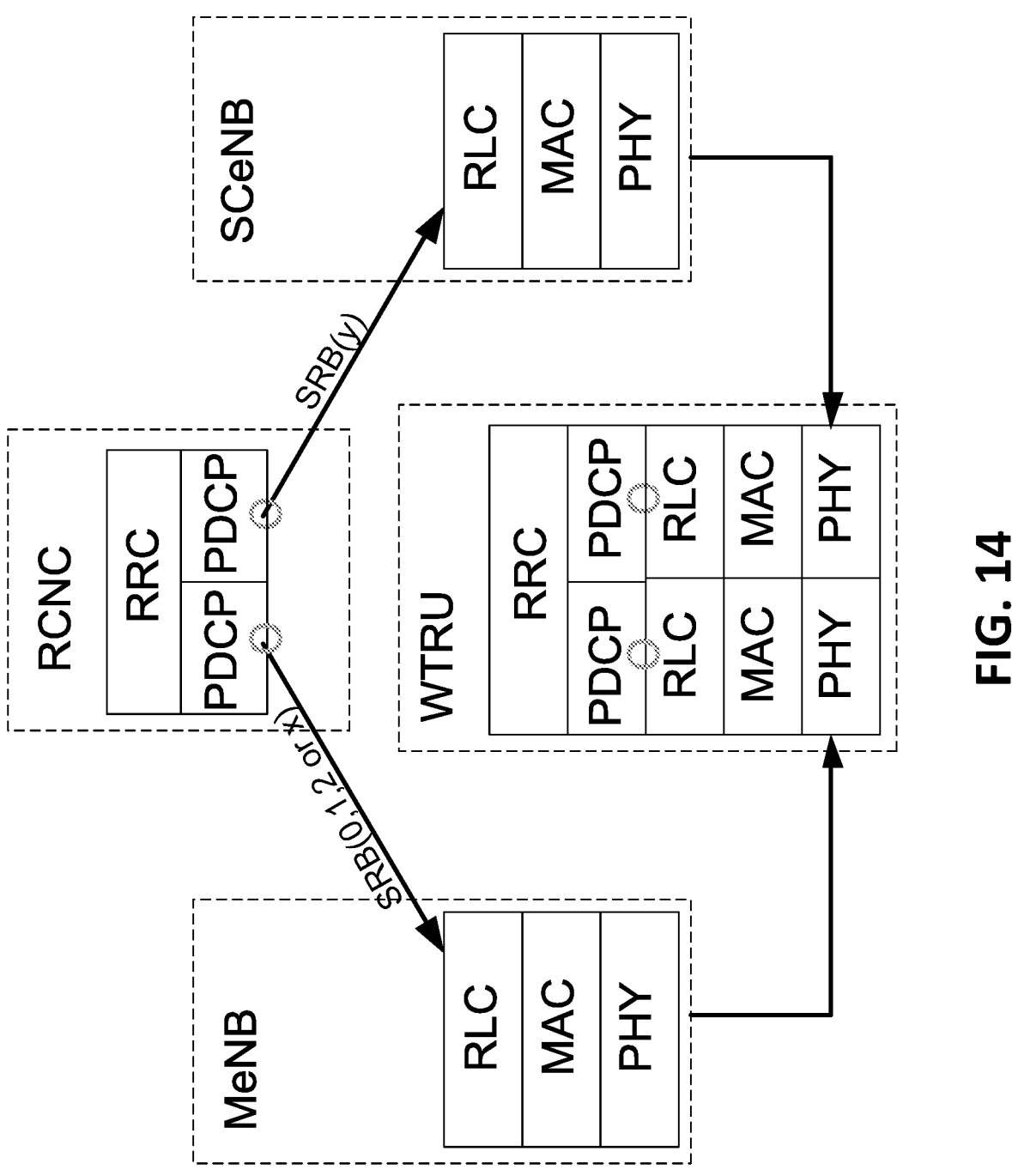
FIG. 14 illustrates an example protocol stack where SRBs may be associated with a single SAP, and the data paths are split above the PDCP layer in the network using a centralized control plane.

FIG. 14 illustrates an example protocol stack where SRBs may be associated with a single SAP and the data paths are split above the PDCP layer in the network using a centralized control plane. For example, RRC PDUs for a given SRB may be transmitted over a single data path (e.g., SRB0, SRB1, and/or SRB2 over the data path associated with the MeNB and SRB3 over the data path associated with the SCeNB). The radio bearers for the different data paths may be associated with different/separate PDCP entities. From the perspective of the network, the PDCP layer associated with the connection to the WTRU may be located in the MeNB and in the SCeNB (e.g., not shown in FIG. 14) or may be located in the RCNC (e.g., as illustrated in FIG. 14). In an example, both the PDCP layer and the RLC layer on the network side may be located at the RCNC.

In an example, a coordinated control plane may be implemented such that a single SRB SAP is utilized for NAS and/or RRC signaling. For example, when the RRC connection uses a coordinated control plane, RRC PDUs for a given SRB (e.g., SRB0, SRB1, and/or SRB2) may be transmitted over a single data path such as the data path associated with the MeNB. Other control data designed to trigger establishment, mobility, and/or release of a secondary RRC connection may also be exchanged via a single data path associated with the MeNB (e.g., via a serving cell of the MeNB). In an example, RRC PDUs for SRB0, SRB1, and/or SRB2 may be exchanged via the RAN node to which the WTRU initially established the RRC connection (e.g., prior to initiating multi-scheduler/multi-layer operation). For a coordinated control plane, RRC PDUs for SRB0, SRB1, and/or SRB2 may be generated by the SCeNB, and the SCeNB may exchange the locally generated RRC PDUs via a serving cell of the SCeNB. For example, for a given radio bearer, FIG. 8 and FIG. 9 may illustrate example where each corresponding radio bearer has a separate PDCP entity for each RRC instance utilizing a coordinated control plane.

In an example, a distributed control plane may be implemented such that a single SRB SAP is utilized for NAS and/or RRC signaling. For example, when the RRC connection uses a distributed control plane, RRC PDUs for SRB0, SRB1, and/or SRB2 may be generated by the MeNB entity. Additional extensions and/or additional information elements may be exchanged via the MeNB in order to manage the radio connection between the WTRU and the SCeNB (e.g., trigger establishment, mobility, and/or release of a secondary RRC connection). The RRC PDUs for SRB0, SRB1, and/or SRB2 may be may transmitted to the WTRU from a serving cell of the MeNB. In an example, RRC PDUs for SRB0, SRB1, and/or SRB2 may be exchanged via the RAN node to which the WTRU initially established the RRC connection (e.g., prior to initiating multi-scheduler/multi-layer operation). RRC PDUs corresponding to a SRB dedicated to the SCeNB (e.g., SRB3) may be exchanged in a serving cell of the SCeNB. For example, RRC PDUs for SRB3 may be generated in the SCeNB and transferred to the WTRU via a serving cell of the SCeNB. FIG. 10 may illustrate example where each corresponding radio bearer has a separate PDCP entity for each RRC instance utilizing a distributed control plane.

Figure 15:
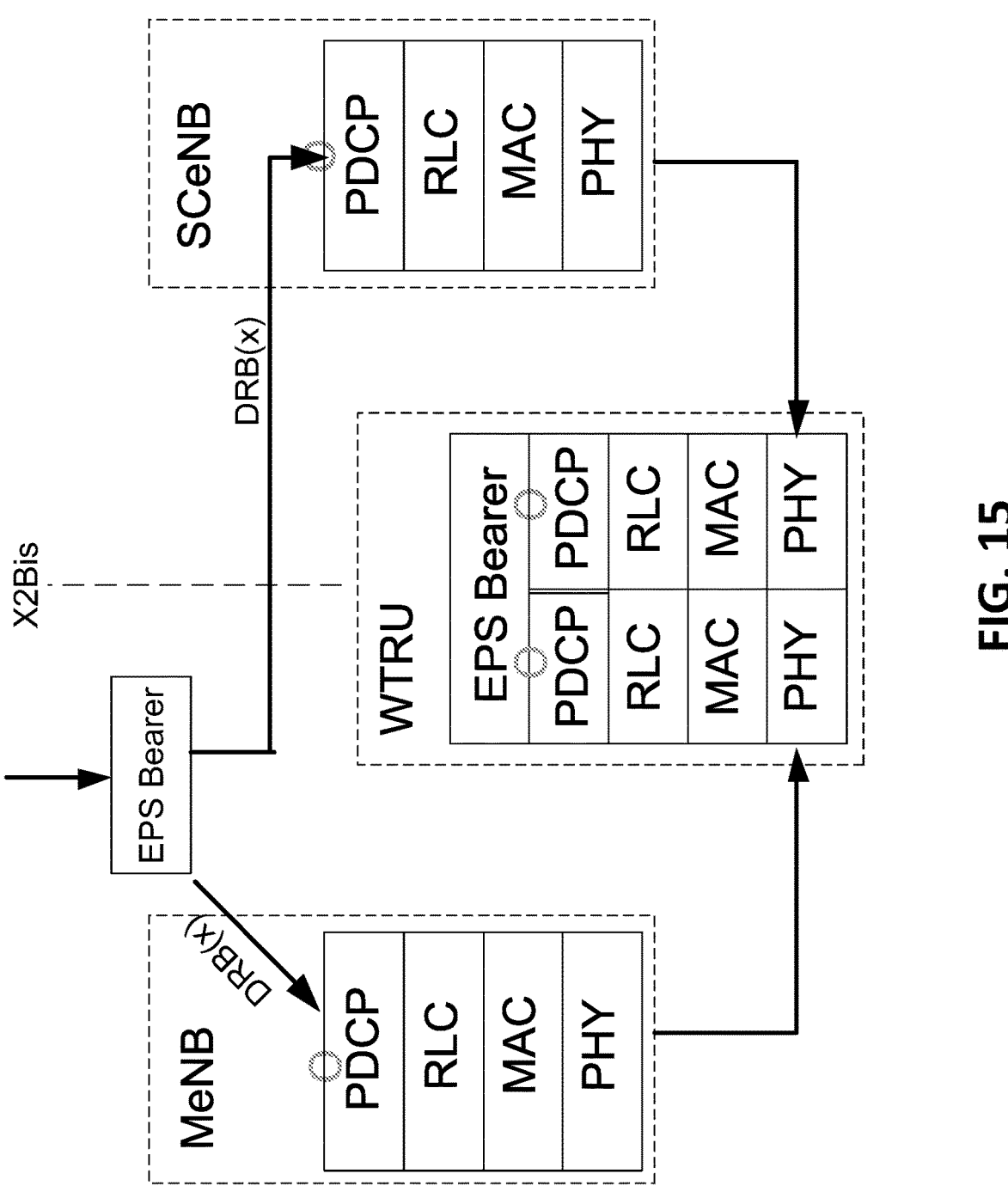
FIG. 15 illustrates an example for a data path split above the PDCP layer for the user plane where multiple DRB SAPs are utilized.

In an example, rather than or in addition to mapping a given radio bearer to a single SAP, a single RB may be mapped to a plurality of SAPs (e.g., over a plurality of logical channels). For example, in the user plane an EPS RAB with multiple DRB SAPs may be used. Mapping of a single EPS RAB over a plurality of E-UTRA DRBs may be implemented using a variety of techniques, for example depending on whether the data is for the data plane or the control plane and/or whether a centralized, coordinated, or distributed control plane is utilized. For example, data for the user plane may be exchanged over one of a plurality of data paths. Data corresponding to a given EPS bearer may be mapped over one or more SAPs, where each SAP may correspond to a DRB and/or to a LCH of a different MAC instance. FIG. 15 illustrates an example for a data path split above the PDCP layer for the user plane where multiple DRB SAPs are utilized. For example, IP packets for a given EPS bearer may be exchanged over either data path (e.g., the path associated with the MeNB or the path associated with the SCeNB).

If multiple radio bearer SAPs are utilized, for the control plane NAS and/or RRC signaling may be transmitted over multiple SRB SAPs. For example, a single SRB may be mapped over a plurality of SAPs (e.g., over a plurality of logical channels). Data corresponding to a given SRB (e.g., one of SRB0, SRB1, SRB2, and/or a supplemental SRB such as SRB3) may be mapped over one or more SAPs, where each SAP may correspond to a different MAC instance and be transmitted via a different RAN node (e.g., the MeNB or the SCeNB).

Figure 16:
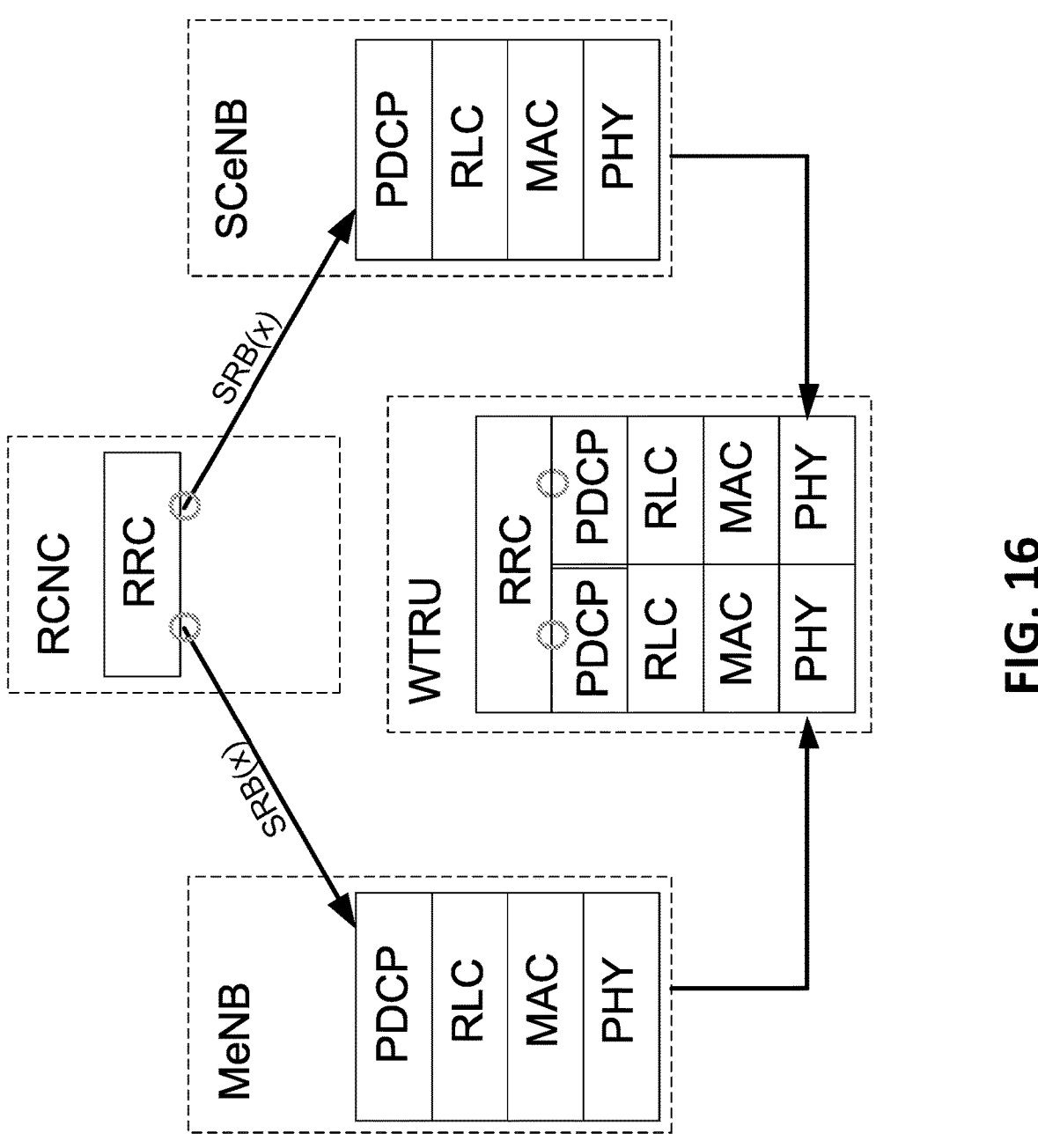
FIG. 16 illustrates an example protocol stack where SRBs may be associated with multiple SAPs and the data paths are split above the PDCP layer in the network using a centralized control plane.

FIG. 16 illustrates an example protocol stack where SRBs may be associated with multiple SAPs and the data paths are split above the PDCP layer in the network using a centralized control plane. For example, RRC PDUs for a given SRB may be transmitted over a multiple data path (e.g., the data path associated with the MeNB and/or the data path associated with the SCeNB). A given radio bearer may utilize the services of multiple PDCP entities (e.g., a PDCP entity at the SCeNB and a PDCP entity at the MeNB). From the perspective of the network, the PDCP layer associated with the connection to the WTRU may be located in the MeNB and in the SCeNB (e.g., as shown in FIG. 16) or may be located in the RCNC (e.g., not shown in FIG. 16). In an example, both the PDCP layer and the RLC layer on the network side may be located at the RCNC. For the perspective of the network, each SAP associated with a given radio bearer may correspond to a logical channel that is managed by a different scheduler. The WTRU may receive control data that corresponds to a given SRB over different logical channels of different MAC instances.

In an example, a coordinated control plane may be implemented such that a radio bearer (e.g., SRB) may use the services of a plurality of PDCP entities. For example, when the RRC connection uses a coordinated control plane, RRC PDUs for a given SRB (e.g., SRB0, SRB1, and/or SRB2) may be transmitted over a multiple data paths. For example, multiplexing and/or demultiplexing of the RRC PDUs associated with a given SRB of a first RRC entity and a RRC PDUs associated with an SRB of a second RRC entity may be performed.

In an example, a distributed control plane may be implemented such that a radio bearer (e.g., SRB) may use the services of a plurality of PDCP entities. For example, a radio bearer associated with the RRC entity in the MeNB may use the services of a PDCP entity located in the SCeNB. FIG. 3 may illustrate an example of a distributed control plane where a given SRB may be mapped to a plurality of radio bearer SAPs.

In an example, rather than splitting the data paths above the PDCP protocol stack within the network, the data paths/layers utilized by the WTRU may be split above the RLC layer. Thus the PDCP layer may be included at a single node within the network, and the PDCP layer PDUs to be transmitted to the WTRU may be mapped to a plurality of RLC SAPs (e.g., over a plurality of logical channels). The PDCP layer may include the functionality of a plurality of PDCP entities. For example, a PDCP entity may be associated with a specific DRB and/or SRB that has been allocated to the WTRU. Thus, if the WTRU has been allocated a plurality of DRBs, there may be a plurality of PDCP entities (e.g., both within the WTRU and within the network) that processes PDCP packets (e.g., SDUs and PDUs) corresponding to the DRB/SRB associated with the specific entity.

If multiple RLC instances are utilized within the network (e.g., a first RLC instance at the MeNB, and a second RLC instance at the SCeNB), then the packets to/from a given PDCP entity may be mapped to one or more of the RLC instances at the different transmission sites in a variety of ways. For example, the data associated with a given PDCP entity (e.g., user plane data associated with a given DRB) may be mapped such that the PDCP entity may transfer associated PDCP PDUs over a single RLC SAP (e.g., using a direct mapping between a PDCP entity and an RLC entity at a given RLC instance). In another example, a PDCP entity (e.g., which may correspond to a given DRB) may be configured to transfer associated PDCP PDUs using one or more of a plurality of RLC SAPs, for example, where data from the PDCP entity may be transferred using a first RLC instance (e.g., at the MeNB) at some times and transferred using a second RLC instance (e.g., at the SCeNB) at other times. The PDCP entity used to transfer data within the network may or may not be co-located in the same node as the RLC entity utilized to transmit the data.

Figure 17:
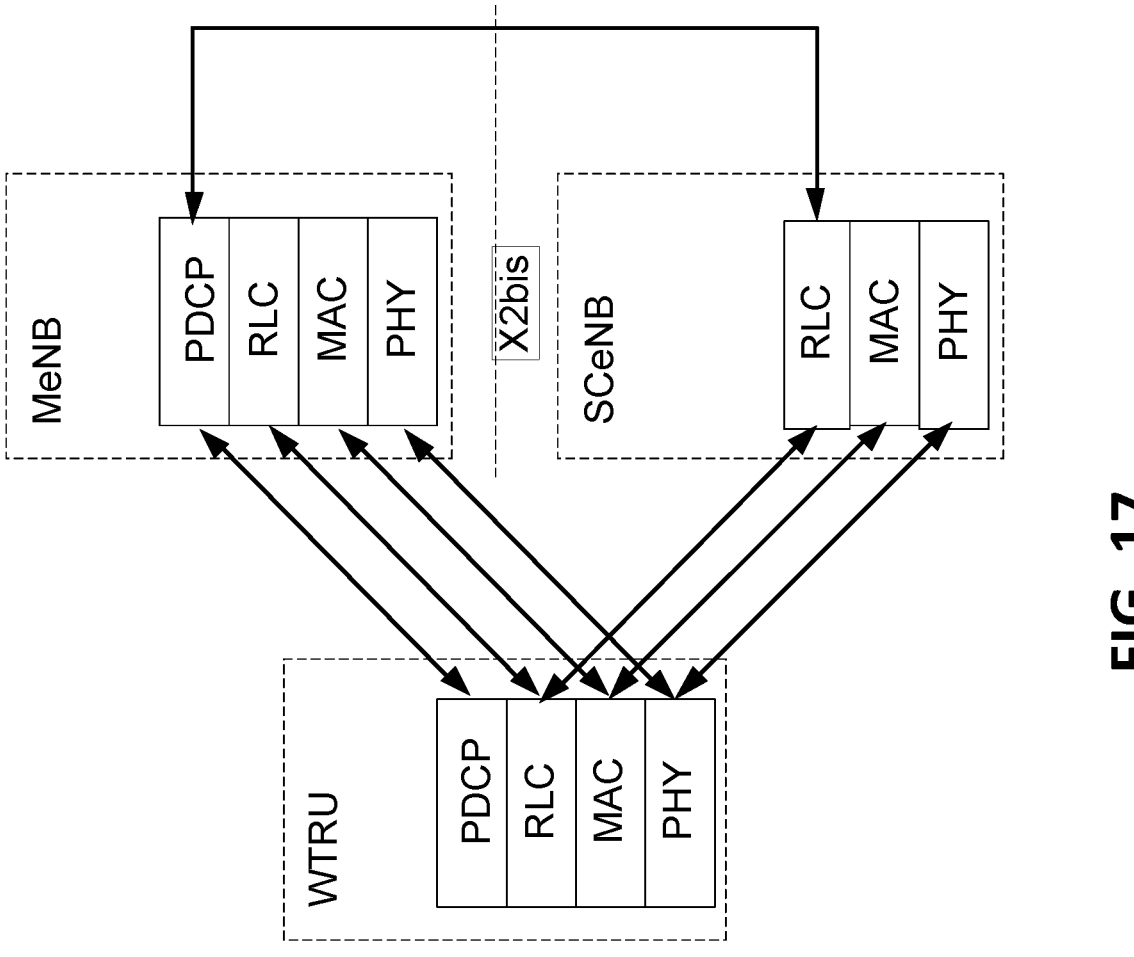
FIGS. 17 and 18 are diagrams illustrating examples of user plane protocol stacks.
Figure 18:
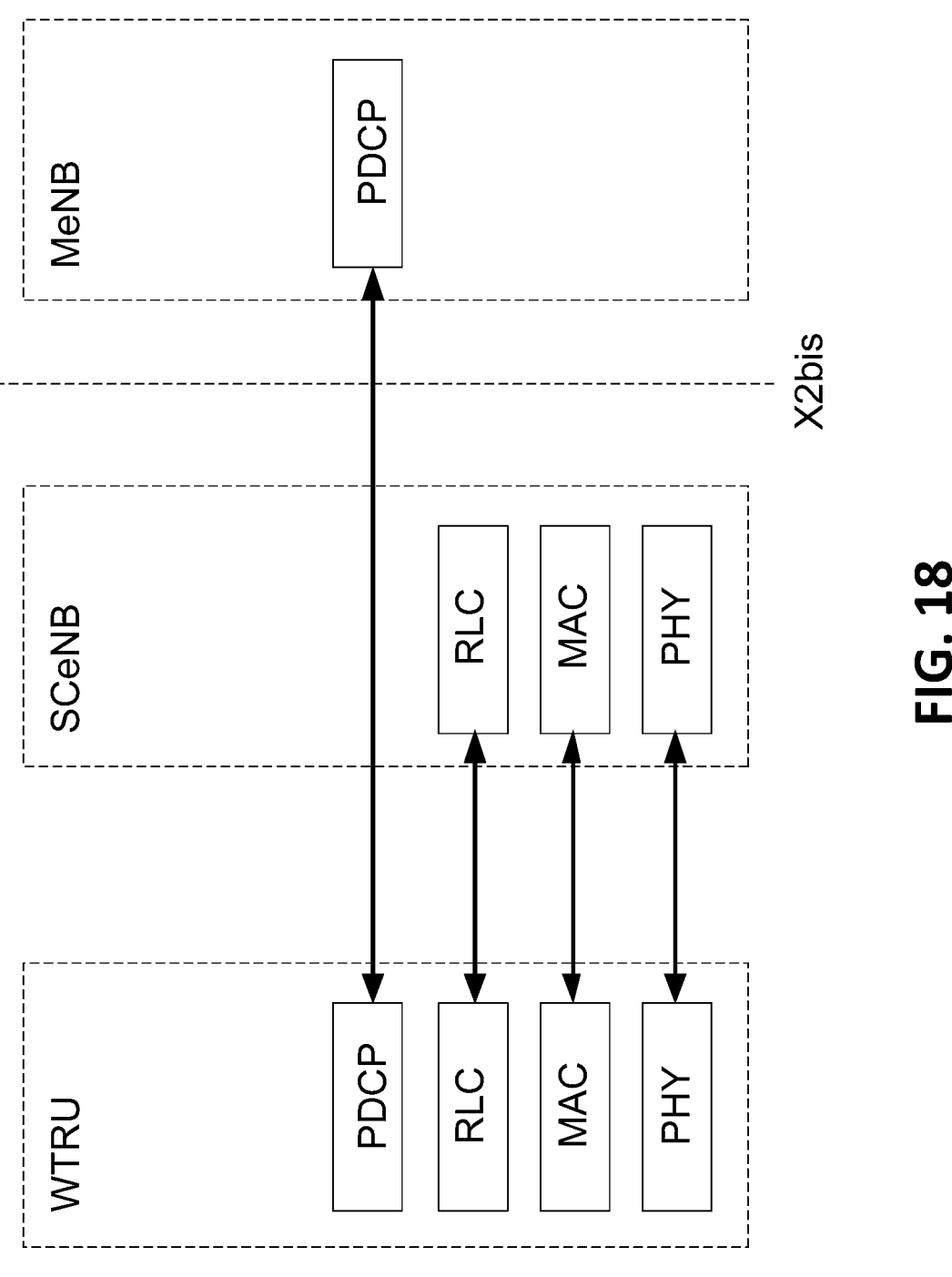

For example, in the user plane PDCP entities (e.g., in the network, in the WTRU, etc.) may be configured to transmit and/or receive data using multiple RLC SAPs. Utilization of multiple RLC SAPs may result in data for a given DRB being exchanged over multiple data paths, where the data paths diverge below the PDCP layer in the network. PDCP PDUs corresponding to a given EPS bearer may be mapped over one or more RLC SAPs, where each SAP may correspond to a LCH of a different MAC instance. For example, FIG. 17 and FIG. 18 illustrate example protocol stacks that may be utilized for transferring user plane data when the data paths are split below the PDCP layer in the network.

A PDCP entity may utilize a plurality of data paths (e.g., associated with different RLC instances located at different network entities) for transferring control data (e.g., data of one or more SRBs). For example, the data associated with a given PDCP entity (e.g., control plane data associated with a given SRB) may be mapped such that the PDCP entity may transfer associated PDCP PDUs over a single RLC SAP (e.g., using a direct mapping between a PDCP entity and an RLC entity at a given RLC instance). In another example, a PDCP entity (e.g., which may correspond to a given SRB) may be configured to transfer associated PDCP PDUs using one or more of a plurality of RLC SAPs, for example, where data from the PDCP entity may be transferred using a first RLC instance (e.g., at the MeNB) at some times and transferred using a second RLC instance (e.g., at the SCeNB) at other times. For example, PDCP PDUs associated with a given SRB (e.g., one of SRB0, SRB1, SRB2 or a supplemental SRB) may be mapped over one or more RLC SAPs.

Figure 19:
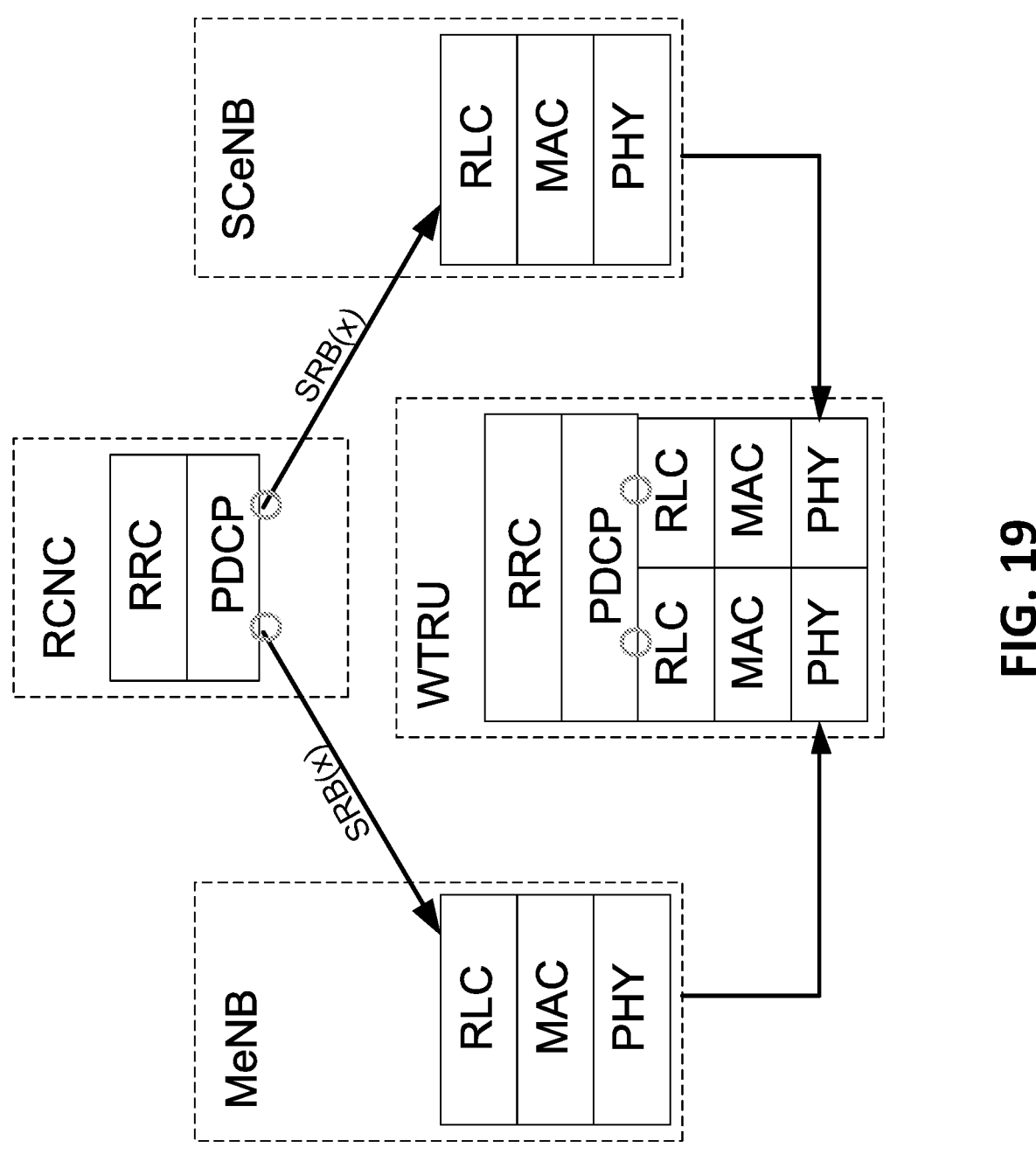
FIG. 19 illustrates an example control plane protocol stack of a data path split above RLC where PDCP PDUs may be transferred over a plurality of data paths.
Figure 20:
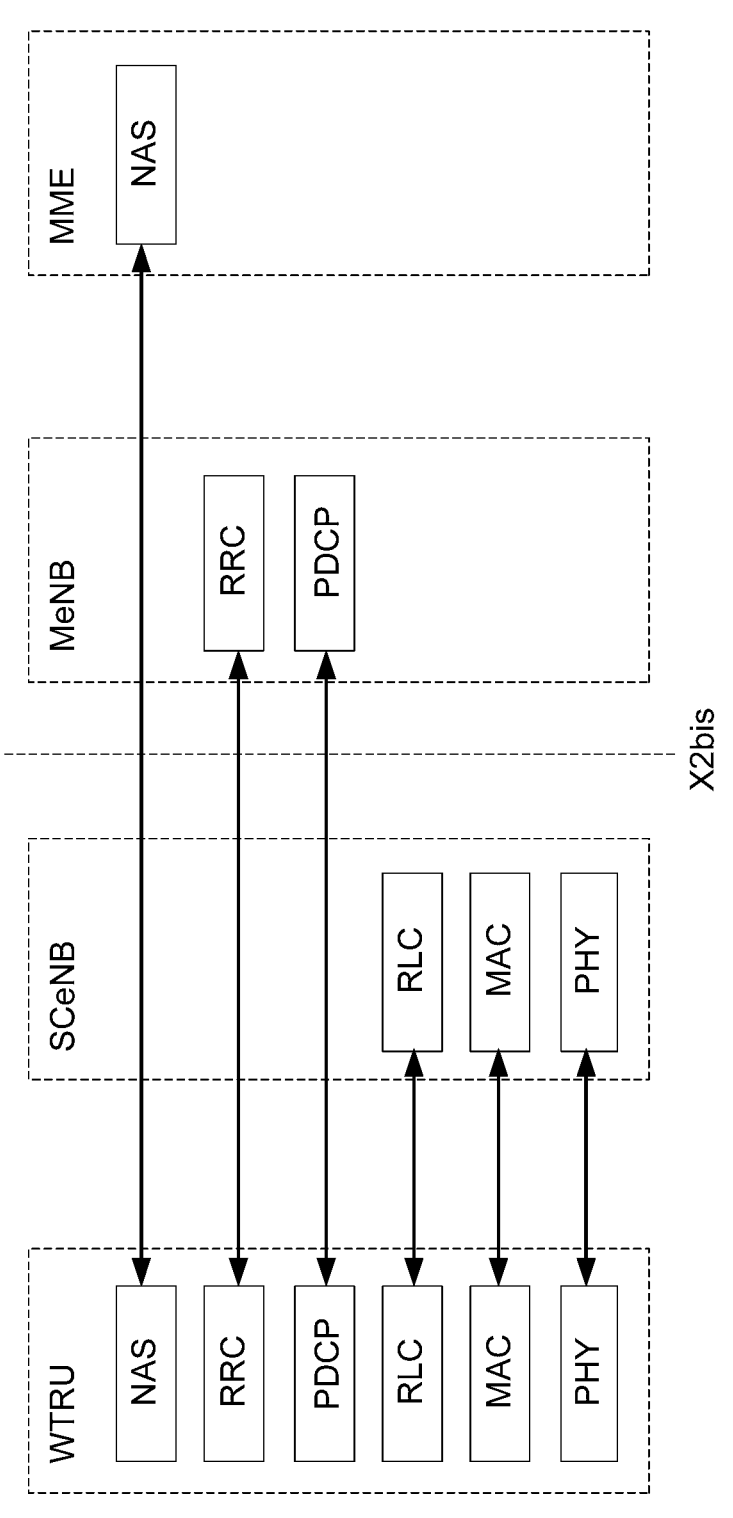
FIG. 20 illustrates an example of a data path associated with a secondary layer when the data split occurs below the PDCP layer (e.g., above the RLC layer).

FIG. 19 illustrates an example control plane protocol stack of a data path split above RLC where PDCP PDUs may be transferred over a plurality of data paths. For example, as shown in FIG. 19, PDCP PDUs associated with SRB(x) may be transferred via the data path associated with the MeNB (e.g., using an RLC entity located at the MeNB) and/or may be transferred via the data path associated with the SCeNB (e.g., using an RLC entity located at the SCeNB). In an example, such an arrangement may be utilized to implement a centralized control plane approach as described herein. The PDCP entity for a given SRB may be located at the MeNB. A first RLC entity utilized to transmit data for the PDCP entity may be co-located with the PDCP entity in the MeNB. A second RLC entity utilized to transmit data for the PDCP entity may be located in the SCeNB. FIG. 20 illustrates an example of the data path associated with the SCeNB when the data split occurs below the PDCP layer (e.g., above the RLC layer).

In an example, a coordinated control plane may be implemented such that a radio bearer (e.g., SRB) may use the services of a plurality of RLC entities. For example, when the RRC connection uses a coordinated control plane, RRC PDUs for a given SRB (e.g., SRB0, SRB1, and/or SRB2) may be transmitted over a multiple data paths. For example, multiplexing and/or demultiplexing of the RRC PDUs associated with a given SRB transferred via a first RLC entity and a RRC PDUs associated with an SRB of a second RRC entity transferred via a second RLC entity may be performed.

For the distributed control plane, RRC PDUs associated with a PDCP entity located in the MeNB may utilize services provide by an RLC entity located in the SCeNB. For example, such an architecture may use methods similar to those described with respect to a distributed control plane when the data split occurs above the PDCP layer (e.g., FIG. 16).

Figure 21:
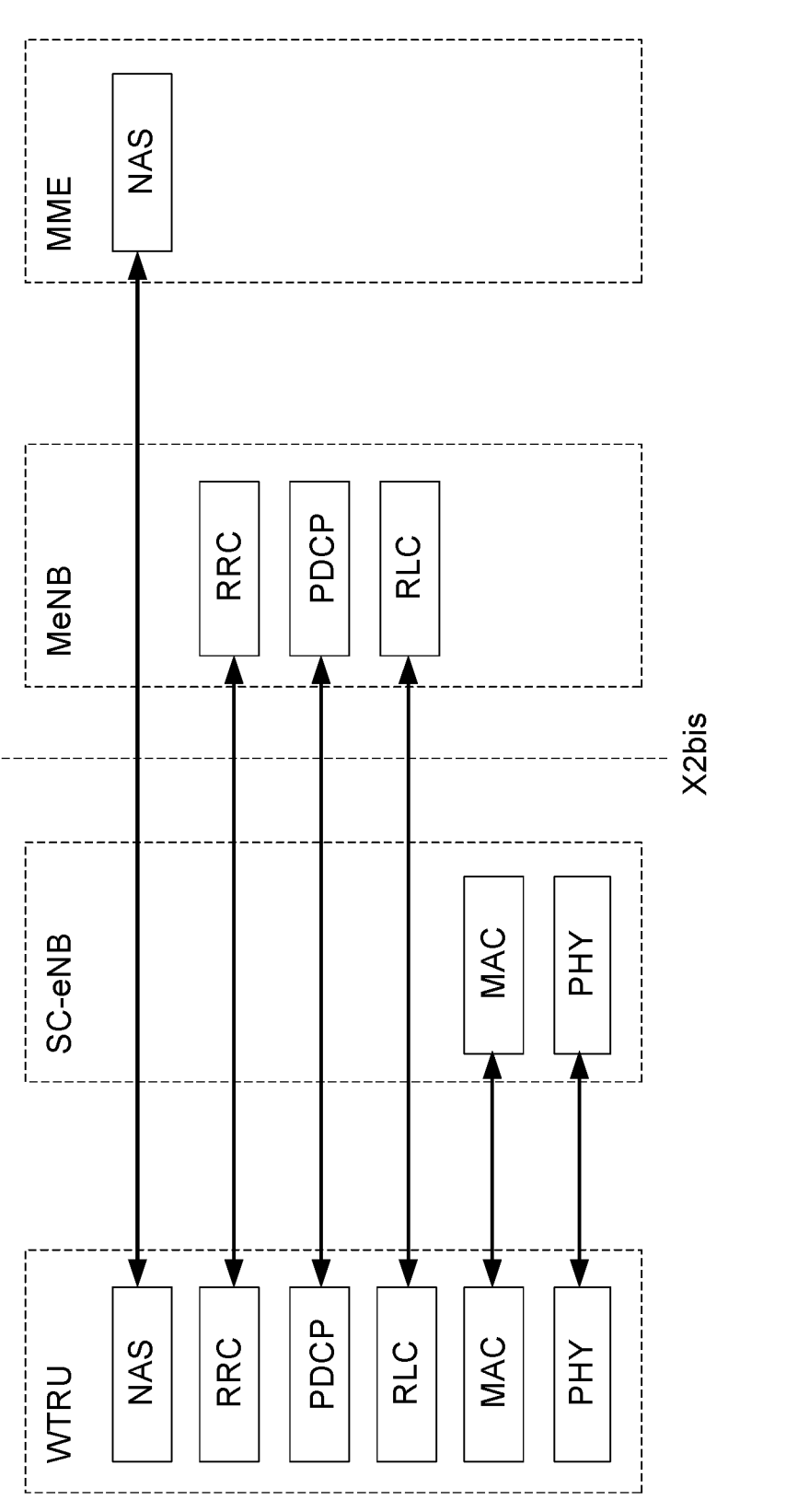
FIG. 21 illustrates an example control plane protocol stack that may be utilized if the data paths are split above the MAC layer.
Figure 22:
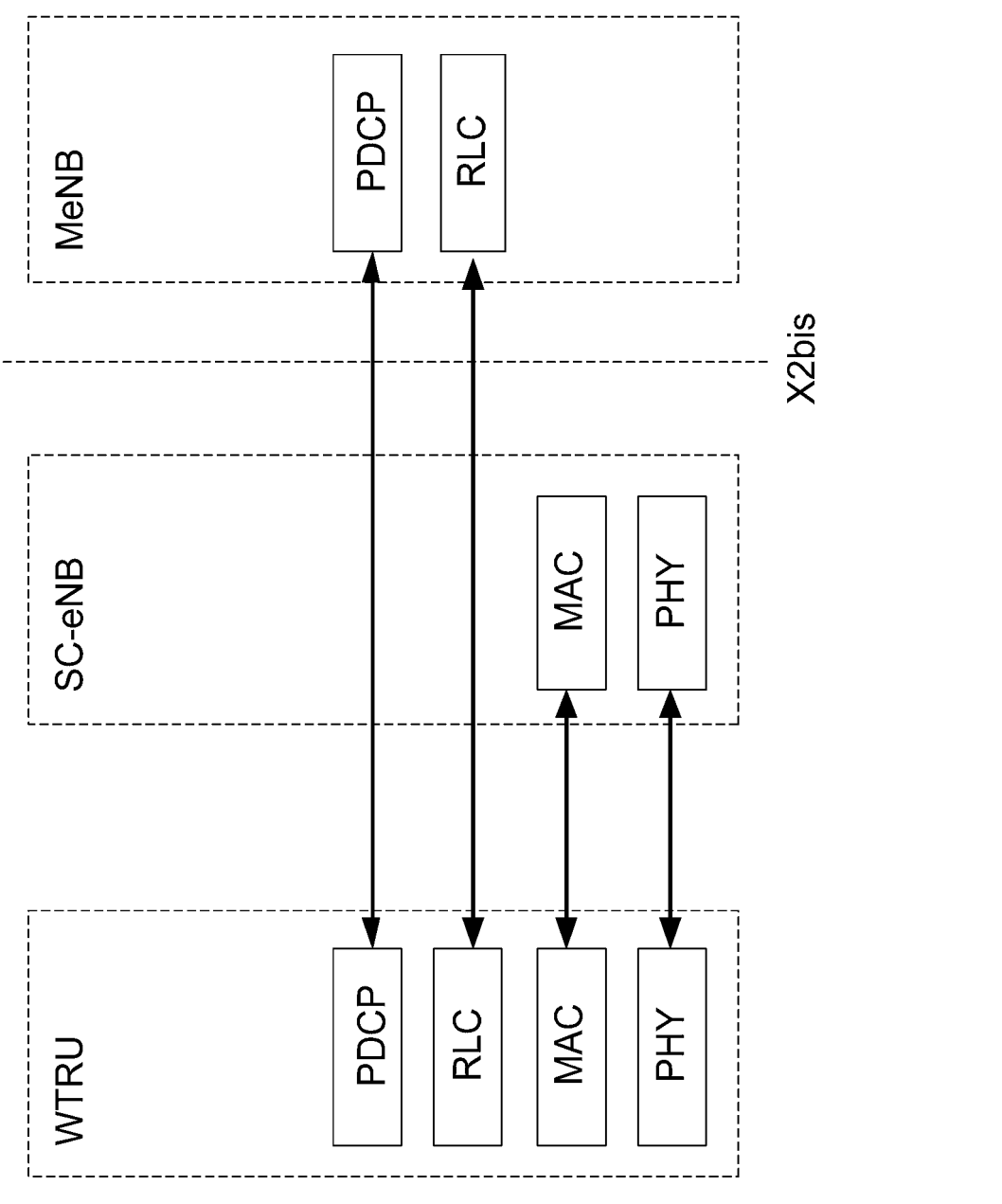
FIG. 22 illustrates an example user plane protocol stack that may be utilized if the data paths are split above the MAC layer.

In an example, the data path split may occur above the MAC layer (e.g., below the RLC layer). In such an architecture, the PDCP layer and the RLC layer within the network may be implemented in the same node within the network (e.g., in the MeNB). However, each data path may be associated with its own MAC instance that is associated with one of the plurality of data paths. FIG. 21 illustrates an example control plane protocol stack that may be utilized if the data paths are split above the MAC layer. FIG. 22 illustrates an example user plane protocol stack that may be utilized if the data paths are split above the MAC layer.

Figure 23:
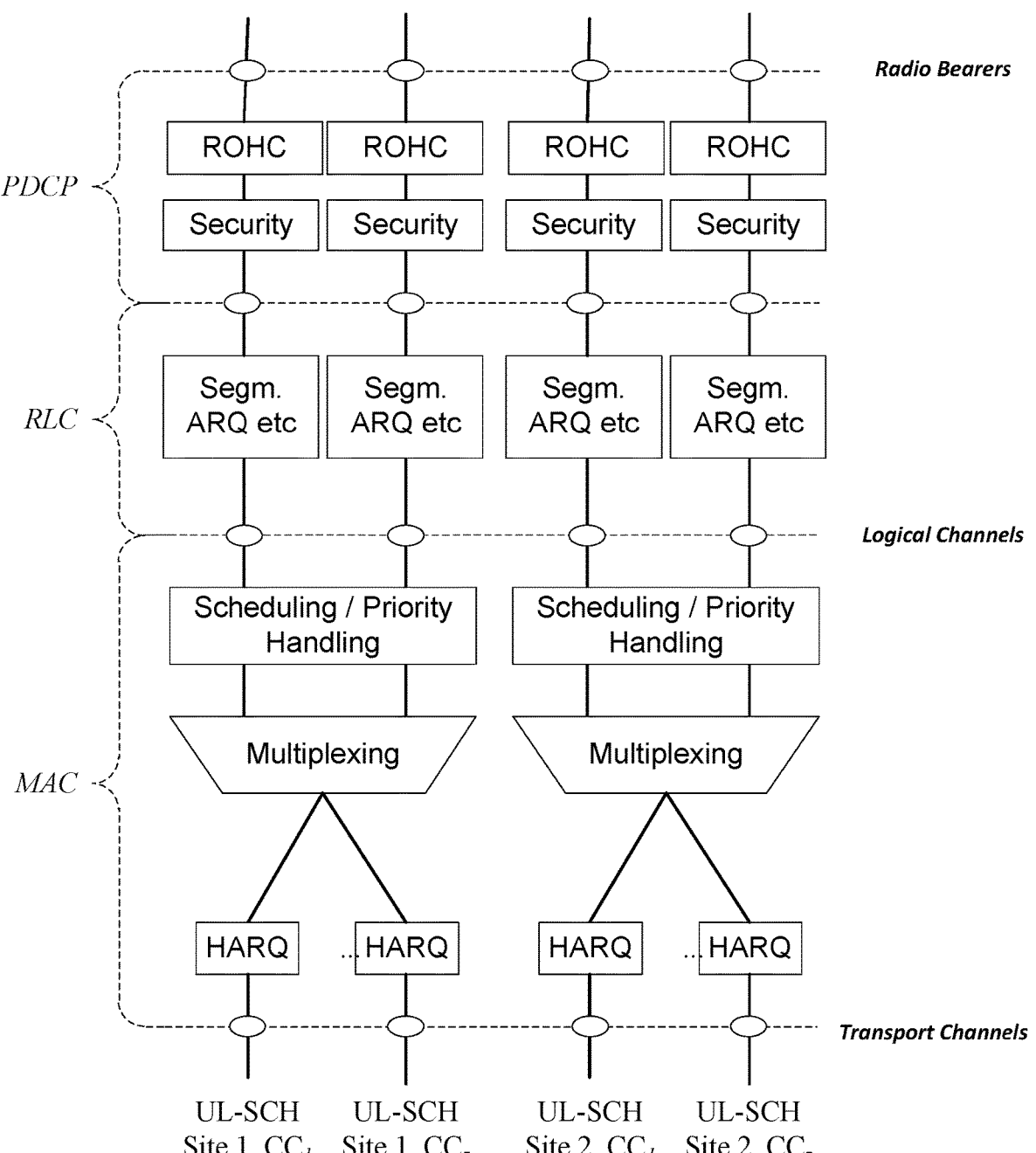
FIG. 23 illustrates an example Layer 2 structure for uplink multi-site operation that may implemented a segregated UL transmission scheme.

In order to support a multi-scheduler architecture (e.g., transmission and/or reception via independently scheduled data paths sent via different serving sites), the Layer 2 structure in the uplink and/or downlink may be modified from the structure utilized for transmission/reception via a single data path. For example, at the WTRU uplink data (e.g., RLC PDU, MAC SDU, etc.) from a logical channel may be multiplexed onto transport blocks delivered to one of a set transport channels (e.g., UL-SCH) associated with a serving site or MAC instance. FIG. 23 illustrates an example Layer 2 structure for uplink multi-site operation (e.g., utilizing a segregated UL). Data associated with a specific radio bearer (e.g., PDCP PDU) may be mapped by an RLC instance to a single logical channel. Mapping data from a radio bearer to a single RLC instance may be referred to as a segregated UL transmission scheme. When a segregated UL transmission scheme is utilized, a given radio bearer may be mapped to a given logical channel that is associated with one of the MAC instances. Although the data may be sent to the network via multiple transport channels (e.g., there may be a UL-SCH transport channel for each component carrier of the MAC instance), data mapped to a given logical channel may be transported to the network via the same MAC instance if a segregated UL transmission scheme is utilized. As an example, a segregated UL transmission scheme may be used for user plane data transfers where a single radio bearer SAP (e.g., a single RLC SAP) is utilized with a protocol stack that is split above the PDCP layer, although the segregated UL transmission scheme may be used with other architectures as well.

Figure 24:
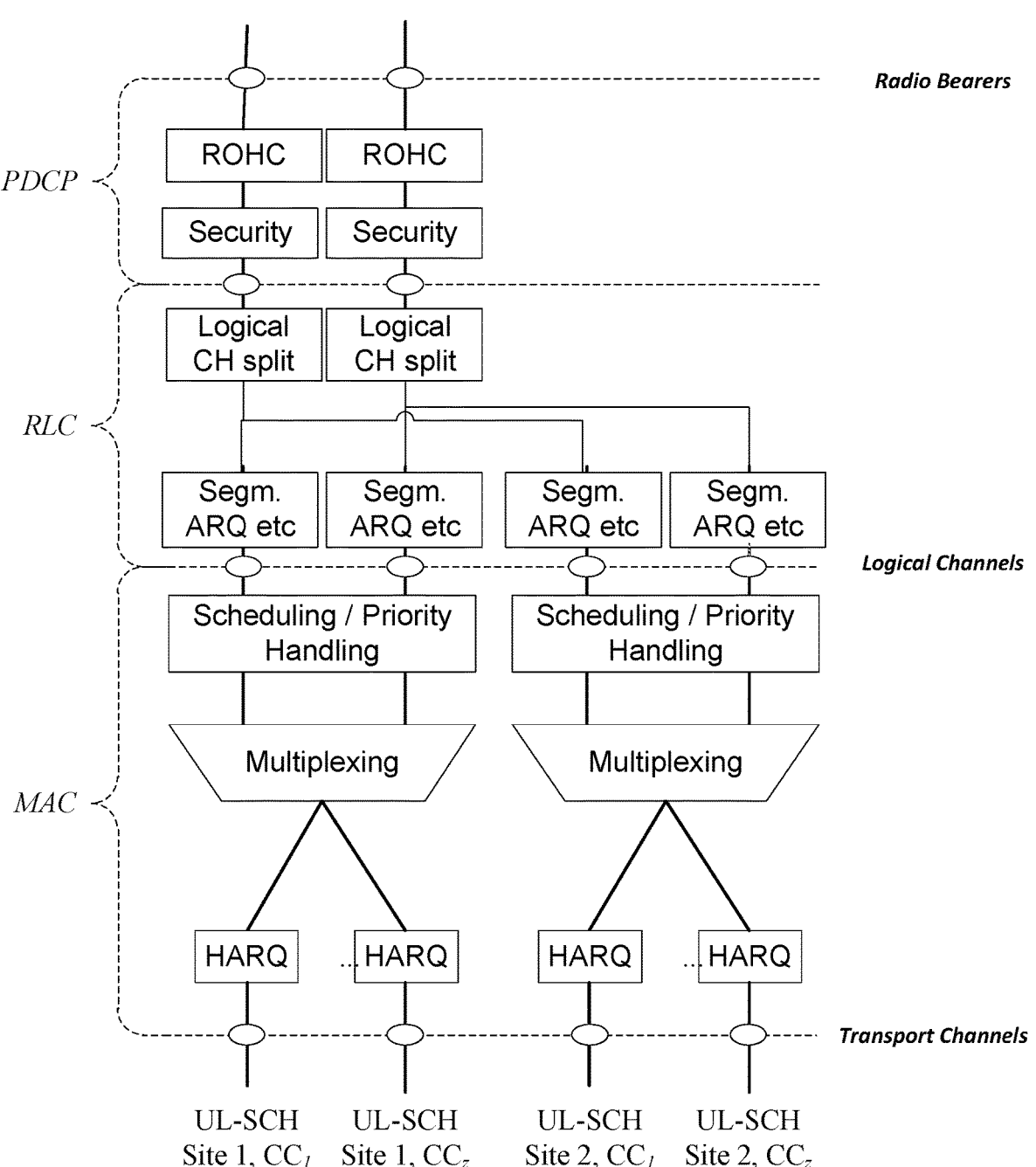
FIG. 24 illustrates an example Layer 2 structure for uplink multi-site operation where a split RLC transmission scheme is utilized.

Data from a specific radio bearer (e.g., PDCP PDU) may mapped to more than one logical channel and/or may be mapped to a plurality of sub-logical channels. Data from a radio bearer that is split between a plurality of logical channels may processed by different RLC instances (e.g., where each RLC instance is associated with and/or located at a different transmission/reception site within the network). For example, a plurality of RLC instances may be configured to segment and/or retransmit data associated with a given radio bearer. Each RLC instance may be associated with a different logical channel or sub-logical channel for the radio bearer. Since separate RLC instances may be utilized for processing data associated with single radio bearer, such a scheme may be referred to as split RLC UL transmission scheme. FIG. 24 illustrates an example Layer 2 structure for uplink multi-site operation where a split RLC transmission scheme is utilized. At the WTRU, data from a logical channel associated a given RLC instance may be associated with a specific MAC instance. Although the data may be sent to the network via multiple transport channels (e.g., there may be a UL-SCH transport channel for each component carrier of the MAC instance), data mapped to a given logical channel may be transported to the network via the same MAC instance. As an example, a split RLC UL transmission scheme may be used for transmitting user plane data where multiple SAPs are utilized with a protocol stack that is split above the RLC layer, although the split RLC UL transmission scheme may be used with other architectures as well.

Figure 25:
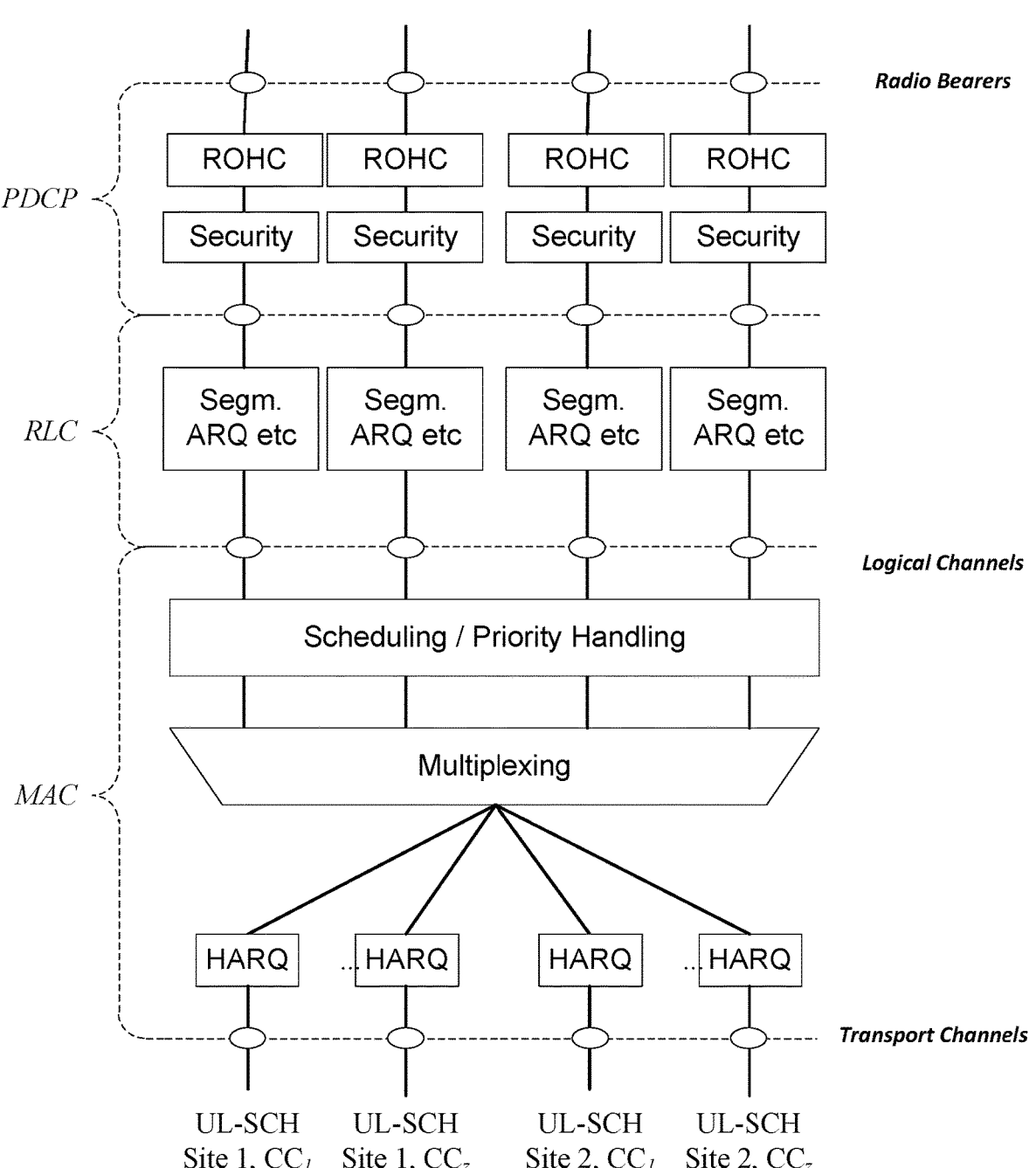
FIG. 25 illustrates an example Layer 2 structure where a data for a given logical channel may be mapped to a plurality of transport channels and the transport channels may be associated with different serving sites.

In an example, at the WTRU uplink data associated with a given logical channel may be multiplexed onto transport blocks associated with transport channels for multiple serving sites. For example, uplink data from a specific logical channel may be allowed to be multiplexed onto transport blocks delivered to a transport channel associated with any of the serving sites (e.g., any transmission/reception point in the network). FIG. 25 illustrates an example Layer 2 structure where a data for a given logical channel may be mapped to a plurality of transport channels and the transport channels may be associated with different serving sites. Mapping data from a logical channel to transport channels associated with different transmission/reception sites in the network may be referred to as a pooled UL transmission scheme. When a pooled UL transmission scheme is used, uplink data (e.g., RLC SDUs) from a given radio bearer may be delivered to one of a plurality of logical channels that are configured for the radio bearer. A plurality of MAC instances and/or a plurality of corresponding logical channels may be configured for use by the bearer (e.g., specified in the bearer configuration). As an example, a pooled UL transmission scheme may be used for user plane data transfers where any MAC PDU may be used for transporting any RLC PDU. For example, a pooled UL transmission scheme may be applied to an architecture where the transmission paths are split above the MAC layer, although the pooled UL transmission scheme may be utilized for other architectures as well.

At the network side, MAC SDUs may be de-multiplexed from a transport block decoded at a serving site that is associated with the UL-SCH used for the transmission. The MAC SDUs may be processed by an RLC entity at the serving site and/or may be relayed to a second site (e.g., a primary serving site) for processing by an RLC entity at the second site. If pooled UL is utilized, one or more serving sites may relay data (e.g., MAC SDUs) to the serving site where the RLC entity configured to process data associated with the concerned logical channel is located.

Figure 26:
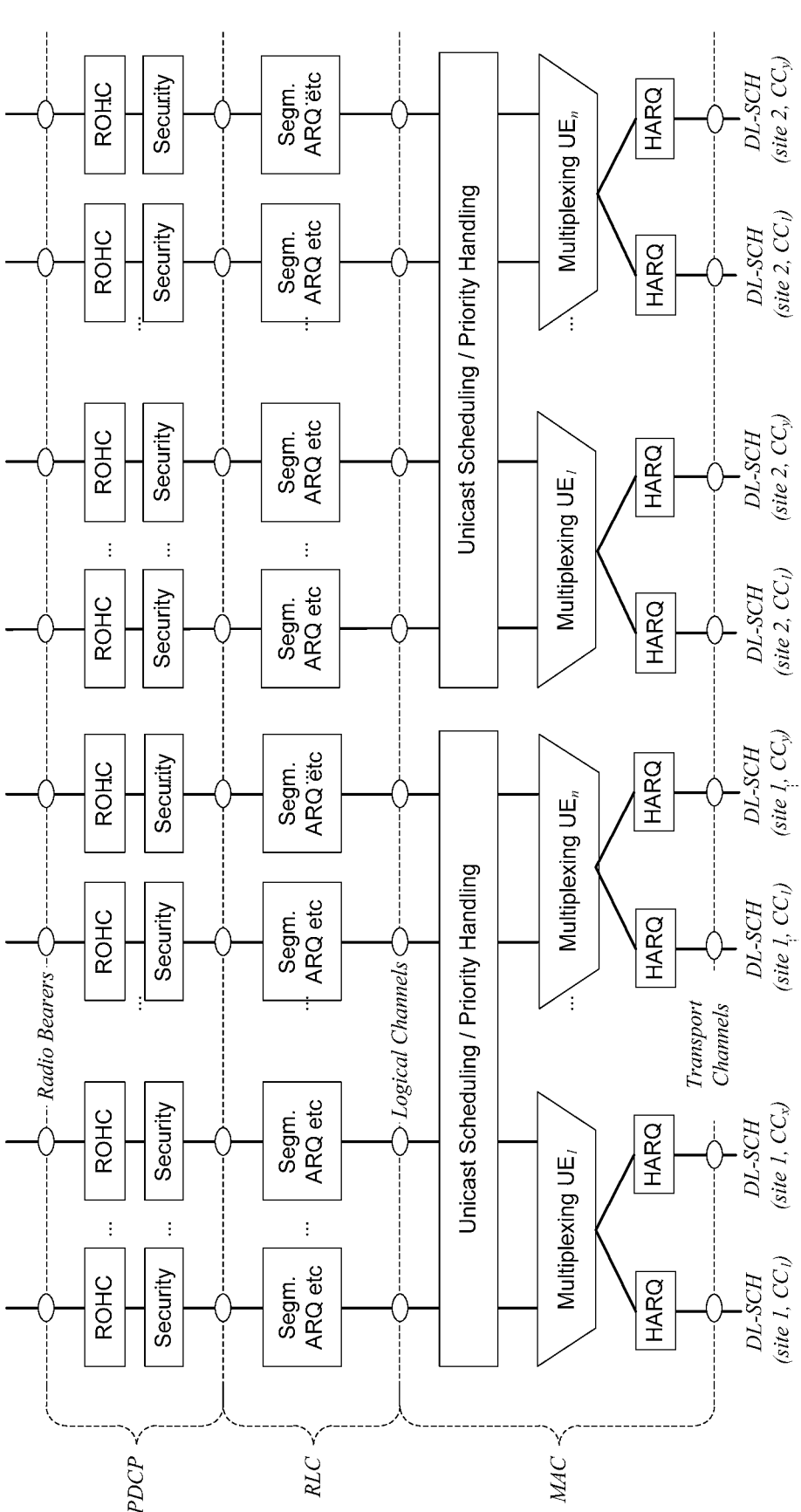
FIG. 26 illustrates an example of Layer 2 structure for downlink multi-site operation that may be used for a segregated DL transmission scheme.

FIG. 26 illustrates an example of Layer 2 structure for downlink multi-site operation that may be used for a seg-regated DL transmission scheme. At the network side, downlink data from a logical channel may be multiplexed onto transport blocks delivered to one of a set transport channels (e.g., DL-SCH) associated with a serving site or MAC instance. At the WTRU side, downlink data associated with a given logical channel may be de-multiplexed from transport blocks received via one of a set of transport channels (e.g., DL-SCH) associated with a specific serving site or MAC instance. Mapping data from a radio bearer to a single RLC instance may be referred to as a segregated DL transmission scheme. When a segregated DL transmission scheme is utilized, a given radio bearer may be mapped to a given logical channel that is associated with one of the MAC instances. Although the data may be sent to the WTRU via multiple transport channels (e.g., there may be a DL-SCH transport channel for each component carrier of the MAC instance), data mapped to a given logical channel may be transported to the WTRU via the same MAC instance if a segregated DL transmission scheme is utilized.

Figure 27:
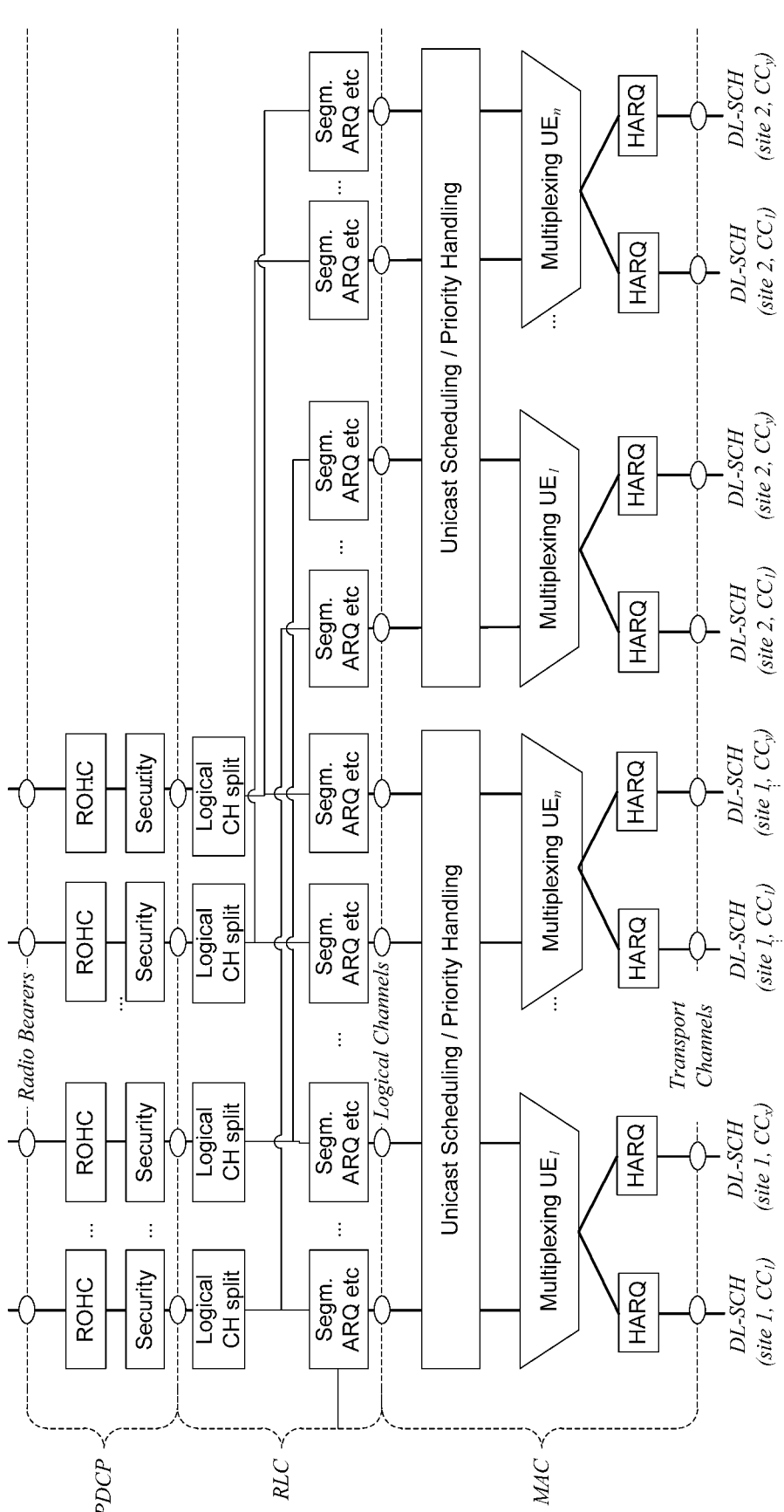
FIG. 27 illustrates an example of Layer 2 structure for downlink multi-site operation that may be used for a split RLC DL transmission scheme.

FIG. 27 illustrates an example of Layer 2 structure for downlink multi-site operation that may be used for a split RLC DL transmission scheme. Data from a specific radio bearer (e.g., PDCP PDU) may mapped to more than one logical channel and/or may be mapped to a plurality of sub-logical channels. Data from a radio bearer that is split between a plurality of logical channels may processed by different RLC instances (e.g., where each RLC instance is associated with and/or located at a different transmission/reception site within the network). For example, a plurality of RLC instances may be configured to segment and/or retransmit data associated with a given radio bearer. Each RLC instance may be associated with a different logical channel or sub-logical channel for the radio bearer. Since separate RLC instances may be utilized for processing data associated with single radio bearer, such a scheme may be referred to as split RLC DL transmission scheme. At the network, data from a logical channel associated with a given RLC instance may be associated with a specific MAC instance. Although the data may be sent to the WTRU via multiple transport channels (e.g., there may be a DL-SCH transport channel for each component carrier of the MAC instance), data mapped to a given logical channel may be transported to the WTRU via the same MAC instance.

Figure 28:
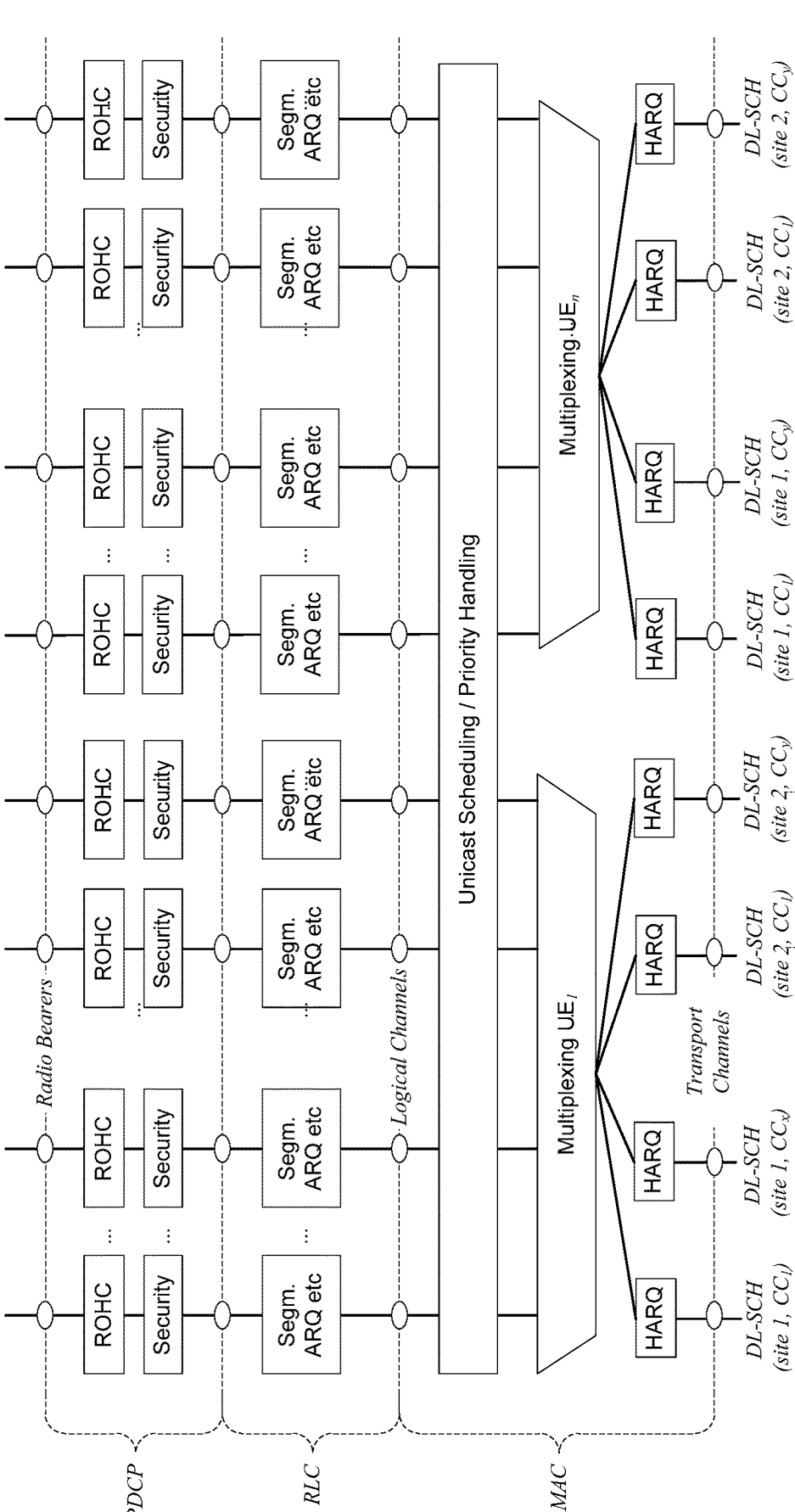
FIG. 28 illustrates an example Layer 2 structure where downlink data for a given logical channel may be mapped to a plurality of transport channels and the transport channels may be associated with different serving sites.

In an example, at the network downlink data associated with a given logical channel may be multiplexed onto transport blocks associated with transport channels for mul-tiple serving sites. For example, downlink data from a specific logical channel may be allowed to be multiplexed onto transport blocks delivered to a transport channel asso-ciated with any of the serving sites (e.g., any transmission/reception point in the network). FIG. 28 illustrates an example Layer 2 structure where downlink data for a given logical channel may be mapped to a plurality of transport channels and the transport channels may be associated with different serving sites. Mapping downlink data from a logi-cal channel to transport channels associated with different transmission/reception sites in the network may be referred to as a pooled DL transmission scheme. When a pooled DL transmission scheme is used, downlink data (e.g., RLC SDUs) from a given radio bearer may be delivered to one of a plurality of logical channels that are configured for the radio bearer. A plurality of MAC instances and/or a plurality of corresponding logical channels may be configured for use by the bearer (e.g., specified in the bearer configuration). As an example, a pooled DL transmission scheme may be used for user plane data transfers where any MAC PDU may be used for transporting any RLC PDU.

If one or more bi-directional logical channels (e.g., a dedicated control channel (DCCH) and/or a bi-directional dedicated traffic channel (DTCH)) are utilized, different combinations of uplink and downlink transmission schemes may be utilized. For example, a segregated DL transmission scheme and pooled UL transmission scheme may be used for a given logical channel. In an example, a serving site associated with a logical channel in the DL may be different from the serving site associated with the logical channel in the UL. For example, a segregated DL transmission scheme and a segregated UL transmission scheme may be used for a given logical channel. The RLC entity at the network side may be operating at a first serving site in the network, and the DL-SCH may be transmitted from the first serving site. However, although there may be no RLC entity at a second serving site, UL MAC SDUs may still be transmitted to and decoded at a second serving site. The UL MAC SDUs transmitted to the second serving site may be relayed to the first site for processing by the RLC entity. Such a scheme where a first serving site includes an RLC entity (e.g., and/or the DL-SCH is transmitted from the first serving site) but UL MAC SDUs may still be transmitted to the second serving site (e.g., where the second serving site lacks an RLC entity and forwards the UL MAC SDUs to the second serving site after decoding) may be referred to as "decoupled UL/DL." In an example, s segregated DL transmission scheme and a segregated UL transmission scheme may be used for one or more bi-directional logical channels. For example, the serv-ing site corresponding to the DL transmission site for the logical channel and the serving site corresponding to the UL reception point for a bi-directional logical channel may be the same serving site, and an RLC entity may operate at this serving site without relaying MAC SDUs to another serving site.

Higher layers (e.g., RRC) may be used to configure the uplink and/or downlink transmissions schemes to be utilized for a given transmission site and/or for a given logical channel. For example, when the WTRU receives RRC signaling configuring a given logical channel, the RRC signaling may indicate whether a pooled transmission scheme (e.g., UL and/or DL) or a segregated transmission scheme (e.g., UL and/or DL) is to be used for the logical channel. For example, if a segregated DL transmission scheme and/or a segregated UL transmission scheme is utilized, RRC signaling may indicate a mapping that is indicative of which of one or more serving site(s) the logical channel should be transmitted to and/or received from. In an example, the mapping of logical channels to serving sites may be predetermined for one or more logical channels, and the WTRU may implicitly know which serving site the logical channel is associated with without receiving an explicit mapping. For example, logical control channels (e.g., DCCH) may be mapped to transport channels associated with a primary serving site. Logical traffic channels (e.g., DTCH) may be mapped to transport channels associated with a secondary serving site.

If a segregated DL transmission scheme and/or a segregated UL transmission scheme is utilized, RRC signaling may be used to configure the mapping between the logical channel and an associated serving site. For example, the RRC signaling used to configure the logical channel for use by the WTRU may include an indication of a logical channel identity and a serving site identity (e.g., and/or a MAC instance identity) so that the WTRU knows which serving site should be used for the logical channel. In an example, rather than or in addition to using a serving site identity (e.g., and/or MAC instance identity), the RRC signaling used to configure the logical channel may identify the mapping by including the logical channel identity and a serving cell identity (e.g., where the serving cell is associated with one of the serving sites). A plurality of logical channels may be configured together to be associated with a certain serving site. For example, a logical channel group may be identified by a logical channel group identity and a serving site identity (e.g., and/or a serving cell identity). In an example, WTRU may be able to implicitly determine which serving site a given logical channel is associated with based on the logical channel identity for that logical channel. For example, certain logical channel identities may be associated with a primary serving site and other logical channel identities may be associated with a secondary serving site.

In an example, the subset of logical channels from which data may be multiplexed into transport blocks of one or more transport channels associated with a specific serving site (e.g., and/or MAC instance) may be referred to as a "logical channel scheduling group" for the serving site or MAC instance. From the above layer 2 structures, the UL (and/or DL) logical channel scheduling groups of different serving sites may be independent of each other (e.g., the processing at higher layers does not overlap), for example, in case of a segregated UL transmission scheme (e.g., and/or a segregated DL transmission scheme) is used. Similarly, if a split RLC UL transmission scheme (e.g., and/or a split RLC DL transmission scheme) is utilized, the processing paths above Layer 2 may be independent of each other.

An example use case for the secondary serving site may be the case of DL data transmission offload. For example, a WTRU may originally connect to a primary serving site (e.g., which may correspond to a MeNB), but may receive a reconfiguration from the primary serving site that reconfigures one or more radio bearers (e.g., and/or logical channels), to be transmitted to and/or received from a secondary serving site. As an example, one or more downlink data channels may be reconfigured to be received via a secondary serving site. Such a scheme may relieve the primary serving site from having to transmit as much data to the WTRU, for example during periods where the WTRU may be well served by one or more small cells. Since the small cells may serve fewer WTRUs than are served in a macro cell, offloading DL data transmissions to the small cells may save network resources while still maintaining a desired level of service for the WTRU. In an example, the downlink data to be delivered to the WTRU may be received by the MeNB and forwarded or relayed to the SCeNB for delivery to the WTRU. Examples for processing the downlink data when the downlink data may be relayed by a primary serving site (e.g., a MeNB) to a secondary serving site (e.g., a SCeNB) for delivery to the WTRU are described herein.

How DL data to be delivered to the WTRU is processed by the network and/or the WTRU may depend on the location of the RLC entity associated with the DL data within the network. For example, the RLC entity processing the downlink data for a radio bearer may be operating in the secondary serving site (e.g., in the SCeNB). If the RLC entity is located in the secondary serving site, the RLC entity within the network may generate RLC PDUs and segments thereof whose size may be adapted to the transport block size applicable to the current radio conditions. The corresponding logical channel associated with the generated RLC PDUs may be mapped to the DL-SCH from the secondary serving site, for example using a segregated DL transmission scheme.

For bi-directional logical channels, if the RLC entity at the network side is located at the secondary serving site, the DL transmissions associated with the bi-directional logical channel may be sent from the secondary serving site and one or more options may be used by the WTRU for transmitting UL data associated with the bi-directional logical channel. For example, the UL data for the bi-directional logical channel may be mapped to a UL-SCH associated with the secondary serving site (e.g., a segregated UL transmission scheme to the secondary serving site). If the UL data is transmitted to the secondary serving site by the WTRU, the same RLC entity at the network side may processes both uplink and downlink data for the bi-directional logical channel. The PDCP entity used to process the uplink and/or downlink data for the bi-directional logical channel may also operate at the secondary serving site.

In an example, the UL data for the bi-directional logical channel may be mapped to a UL-SCH associated with the primary serving site (e.g., a segregated UL transmission scheme to the primary serving site). In another example, the UL data for the bi-directional logical channel may be mapped to a UL-SCH associated with either primary serving site and/or the secondary serving site (e.g., pooled UL transmission scheme).

For example, UL data for the bi-directional logical channel may be mapped to a UL-SCH associated with the primary serving site, for example where UL transmissions to the secondary serving site are not performed by the WTRU. However, the RLC entity at the network side may still be located at the secondary serving site even when UL transmissions to are not performed to the secondary serving site. If the UL data for the bi-directional logical channel is mapped to a UL-SCH associated with the primary serving site, RLC PDUs that are de-multiplexed from uplink transport blocks that are decoded at the primary serving site may be relayed by the primary serving site to the secondary serving site for processing by the RLC entity at the secondary serving site.

In an example, RLC PDUs transmitted by the WTRU that are associated with a bi-directional logical channel whose DL data is transmitted via the secondary serving site may be de-multiplexed from uplink transport blocks that may be received by and decoded at the primary serving site. These RLC PDUS may be processed by an RLC receiving entity operating at the primary serving site. The RLC receiving entity at the primary serving site may provide control information (e.g., through a network interface such as the X2bis) to the RLC entity handling the same logical channel at the secondary serving site. For example, the RLC entity at the primary serving site that receives the RLC PDUS from the WTRU may send information relating to the identity/sequence number of RLCs PDUs that have and/or have not been successfully received to the RLC entity at the secondary serving site in order to allow the RLC entity at the secondary serving site to generate and provide status reports and other control information to the peer RLC entity at the WTRU side (e.g., via downlink transmissions). In an example, RLC PDUs de-multiplexed from uplink transport blocks received at and decoded by the secondary serving site may be relayed to the RLC receiving entity at the primary serving site without processing by the RLC entity at the secondary serving site. The RLC PDUs received in the UL by the secondary serving site may be forwarded to the primary serving site RLC instance for processing when a pooled UL transmission scheme is utilized.

In an example, the WTRU may transmit RLC control PDUs in the uplink to the secondary serving site, while RLC data PDUs may be transmitted to the primary serving site. For example, RLC control PDUs generated by the RLC entity at the WTRU may be multiplexed onto transport blocks delivered on a transport channel associated with the secondary serving site, while RLC data PDUs may be multiplexed onto transport blocks delivered on a transport channel associated with the primary serving site. In an example, a given bi-directional logical channel may be split into two bi-directional sub-logical channels. A first sub-logical channel of the bi-directional logical channel may be associated with RLC data PDUs that are transmitted by the WTRU to a first serving site (e.g., the primary serving site) and with RLC control PDUs that are received from the primary serving site. A second sub-logical channel of the bi-directional logical channel may be associated with RLC data PDUs that are received by the WTRU from a second serving site (e.g., the secondary serving site) and with RLC control PDUs that are transmitted to the secondary serving site.

In an example, the RLC entity may be located at the primary serving site. For example, RLC PDUs to be transmitted in the downlink to the W TRU may be forwarded to the secondary serving site from the RLC entity in the primary serving site using a network interface (e.g., the X2bis). For example, the MAC entity in the secondary serving site may receive the RLC PDUs from the RLC entity in the primary serving site and transmit RLC PDUs to the WTRU over one or more secondary serving site cells. The RLC entity located in the primary serving site may correspond to a single RLC entity that is configured to generate RLC PDUs associated with the primary and/or secondary serving sites. In an example, downlink data transmitted to the WTRU may be sent via the secondary serving site, so the RLC entity located in the primary serving site be configured to provide any RLC PDUs to be delivered to the WTRU to the secondary serving site for transmission.

Since the primary serving site may generate the RLC PDUs to be delivered via the secondary serving site, and the RLC entity located in the primary serving site may not be aware of the near real-time channel conditions experienced at the secondary serving site at the time of RLC PDU generation, some segmentation and/or other scheduling decisions may be performed at the secondary serving site after it receives RLC PDUs to be delivered to the WTRU from the primary serving site. For example, an RLC entity located in a node that is different from the node that that makes the scheduling decisions for delivering the data of that RLC entity (e.g., the RLC entity is located at the primary serving site but the MAC instance performing the scheduling is located at the secondary serving site) may generate one or more RLC PDUs that are not of an appropriate size given the transport block size allocated by a MAC instance performing the scheduling. For example, an RLC PDU generated by the RLC instance at the primary serving site may not fit into the transport block size allocated by the MAC instance at the secondary serving site. To avoid the delayed transmission of such an RLC PDU until the scheduler allocates a transport block that can accommodate the RLC PDU (e.g., which may be difficult given current channel conditions), techniques may be specified for avoiding situations wherein transmission may be delayed and/or some segmentation and/or limited RLC functionality may be performed at the secondary serving site even though the RLC entity is located at the primary serving site.

For example, to avoid the generation of relatively large RLC PDUs that may be delayed upon arriving at the MAC instance of the secondary serving site, the RLC entity in the primary serving site may be restricted from generating RLC PDUs larger than a maximum RLC PDU size. By establishing a maximum RLC PDU size for RLC PDUs generated at an RLC entity that is located at a different serving site than the MAC instance used to transmit the data to the WTRU, the probability that the RLC PDUs do not fit into the transport block size set by the MAC instance of the secondary serving site may be minimized. The maximum RLC PDU size for RLC PDUs transmitted by a serving site that is does not include the RLC entity that generated the RLC PDU may be smaller than the maximum RLC PDU size for RLC PDUs that are transmitted from the serving site that includes the RLC entity. In an example, RLC PDUs transmitted from a serving site that includes the RLC entity that generated the RLC PDUs may be unrestricted in terms of a maximum RLC PDU size.

In an example, although the secondary serving site may not include a full RLC entity, RLC segmentation functionality may be located in the secondary serving site, for example above the MAC instance associated with the secondary serving cell. For example, the RLC entity in the primary serving site may be configured to initially generate RLC PDUs to be transmitted from one or more of the primary and/or secondary serving site. The RLC entity at the primary serving site may be configured to perform segmentation functionality of RLC PDUs transmitted over the cells belonging to the primary serving site. However, the RLC entity in the primary serving site may be configured to refrain from segmenting RLC PDUs it generates that are to be transmitted over the cells belonging to the secondary serving site. The RLC segmentation functionality for RLC PDUs transmitted via the secondary serving site may be located at the secondary serving site, for example even if the remaining RLC functionality for processing those RLC PDUs is located at the primary serving site in the network. The secondary serving site may receive RLC PDUs generated by the primary serving site and may segment the RLC PDUs to be transmitted over the MAC instance associated with the secondary serving site. The segmentation of RLC PDUs at the secondary serving site may be transparent to the RLC entity located at the primary serving site.

RLC Status PDUs (e.g., RLC control PDUs including an RLC Status Report) may be sent to the RLC entity at the primary serving site. In an example, when the RLC entity at the primary serving site receives and RLC Status PDU for an RLC PDU that has been segmented at the secondary serving site, the RLC Status PDU may be forwarded to the secondary serving site and/or processed by the secondary serving site. In an example, when the RLC entity receives an RLC Status PDU that NACKs an RLC PDU that was segmented at secondary serving site, the RLC entity may retransmit the entire original RLC PDUs even if some of the segments have been ACKed, so long as a segment of the original RLC PDU has been NACKed. In this manner, the RLC status report may be processed on the primary serving site without having any knowledge of segmentation at the secondary serving site.

In an example, the MAC instance transmitting an RLC PDU (e.g., the MAC instance at the secondary serving site) may be configured to support segmentation of RLC PDUs. For example, the RLC PDUs may be generated by the RLC entity of the primary serving site and may be forwarded to the MAC instance of a cell at the secondary serving site. Upon reception of the RLC PDU, the MAC instance may determine whether to perform segmentation of the RLC PDU, for example based on whether there is available space in the scheduled transport block. The MAC instance may perform segmentation and concatenation of RLC PDUs. Since the receiving side MAC instance may reassemble the segments of the RLC PDU generated by the MAC instance, additional segmentation information may be added to the MAC header. For example, the segmentation information may provide an indication of whether the MAC PDU that includes the header includes a MAC SDU that corresponds to a full RLC PDU, a MAC SDU that corresponds to a first segment of an RLC PDU, a MAC SDU that corresponds to a middle segment of an RLC PDU, and/or a MAC SDU that corresponds to a last or final segment of an RLC PDU. The MAC header may include a sequence number for each MAC PDU. The WTRU may reorder the MAC PDUs and reassemble the MAC SDUs, for example based on the sequence number and/or the additional segmentation information that indicates whether the MAC SDU corresponds to a first, middle, or final segment of a given RLC PDU. In an example, MAC SDUs may be provided with sequence numbers, and the MAC header may indicate the segment number of a given MAC SDU.

Upon reception of the MAC PDU from a MAC instance of the secondary serving site, the MAC instance at the receiving entity (e.g., the WTRU) may reassemble the segmented MAC SDUs and forward the unsegmented MAC SDUs to the RLC entity. For example, based on the sequence numbers of the received MAC PDUs, the WTRU may re-order the received MAC PDUs and/or de-assemble the MAC PDUs. If the segmentation entity indicates that segmentation of MAC SDUs has been performed by the MAC entity, the WTRU may reassemble the segments included in a plurality of MAC PDUs into a MAC SDU.

Since the RLC entity and MAC entity may not be collocated in a given network node (e.g., the RLC entity may be at the primary serving site and the MAC entity may be located at the secondary serving site) and the network interface between the primary and secondary serving sites may be associated with relatively large delays, buffering and/or flow control may be implemented between the secondary and primary serving sites in order to ensure continuity of transmissions. For example, flow control may be performed in order for the scheduler located at the secondary MAC instance to appropriately schedule resources for transmission of RLC data PDUs forwarded from the primary serving site. For example, the MAC instance at the secondary serving site may request information related to the transmission of one or more RLC PDUs from the RLC entity at the primary serving site. As an example, the MAC instance may request one or more of an indication of the number of bits of data that the MAC instance is scheduling for transmission to the WTRU, an indication of the amount of time a the requested number of bits would take to be transmitted to the WTRU, an indication of the amount of time a certain buffer size would take to be transmitted to the WTRU, an indication of amount of radio resources available for transmitting to the WTRU, an indication of the average data rate supported for transmitting to the WTRU, and/or a poll request of the primary serving site to determine if there may be available data that is to be transmitted to the WTRU.

The RLC entity at the primary serving site may be configured to provide the secondary serving site scheduler (e.g., located in the MAC instance of the secondary serving site) with information related to the amount of data, type of data, and/or characteristics of the data that is to be transmitted to the WTRU. For example, the primary serving site may send information related to data buffered for transmission for the WTRU to the MAC instance at the secondary serving site (e.g., using the network interface). The primary serving site may provide the MAC instance of the secondary site with a total buffer status report for DL data to be transmitted to the WTRU (e.g., data to be transmitted via either the primary or secondary serving site). The primary serving site may provide the MAC instance of the secondary site with a buffer status report for DL data to be transmitted to the WTRU that is transmitted/mapped to the secondary serving site. The primary serving site may send a request to the MAC instance of the secondary site that indicates that data is to be transmitted over the secondary serving site cells. For example, the request may indicate a total number of buffers to be transmitted over the secondary serving site and/or desired bit rate.

The AMC instances at the different serving sites may implement different rules for handling and processing data transmissions. For example, logical channel multiplexing, power control, rules for performing UL PUSCH transmission may be different depending on the site to be used.

As an example, radio link monitoring (RLM) may be performed by the MAC instance associated with the primary serving site (e.g., at the WTRU), but the MAC instance associate with the secondary site (e.g., at the WTRU) may refrain from performing RLM unless specifically configured by the network to do so. In an example, detecting RLF on a primary MAC instance may lead to RRC connection re-establishment, while detecting RLF on a secondary MAC instance may not lead to RRC connection re-establishment. In an example, a MAC reset for a secondary MAC instance may not lead to reset of another MAC instance (e.g., a primary MAC instance and/or another secondary MAC instance). A MAC reset for a secondary MAC instance may suspend DRBs that are associated solely with the MAC instance being resets; however, DRBs for that are associated with the MAC instance being reset and also with another MAC instance may remain active, as the data may be transmitted via the other MAC instance during the reset procedure.

When using a MAC instance-specific DRX (e.g., different MAC instances may be applying different DRX configurations), the DRX state of a primary MAC may have precedence or priority over a DRX state of a secondary MAC. For example, if a WTRU is configured to refrain from performing uplink transmissions in two MAC instances simultaneously, the WTRU being in DRX Active Time in a primary MAC instance may imply that the WTRU should be in a DRX inactive state in a secondary MAC instance. In an example, when an SR is triggered based on data becoming available for a given RB (e.g., DRB, SRB, etc.), the WTRU may perform an SR transmission using the MAC instance that corresponds to the concerned RB. In an example, when an SR is triggered based on data becoming available for a given DRB, the WTRU may perform an SR transmission using the MAC instance that corresponds to the concerned DRB, but if the SR triggered based on data to be transmitted for an SRB, the SR procedure may be performed in the primary MAC instance (e.g., even when the SRB is associated with the secondary MAC instance such as SRB3).

In an example, the MAC instance associated with each of the serving sites may operate relatively independent of each other. For example, multiple MAC instances (or entities) may be defined, where each MAC instance may use transport channels associated with a single serving site. Each of the MAC instances may use an independent MAC configurations, for example independent sets of parameters, state variables, timers, HARQ entities, etc. Independent per-site MAC operation may apply to operation including one or more of random access procedures, maintenance of uplink time alignment (e.g., each MAC instance may maintain its own Active Time, DRX-related timers, DRX-related parameters, TAT timer, etc.), activation/de-activation of Scells (e.g., each MAC instance may have a Pcell and/or one or more Scells), DL-SCH data transfer, UL-SCH data transfer (e.g., scheduling request, buffer status reporting, power headroom reporting, logical channel prioritization, etc.), discontinuous reception (DRX) operation, MAC reconfiguration procedures, MAC reset procedures, semi-persistent scheduling, and/or the like.

As an example, the MAC instance at a given serving site may be configured to perform buffer status reporting (BSR). Different procedures for buffer status reporting may be applied, for example based on the Layer 2 architecture/transmission scheme utilized in the uplink.

As an example, BSR reporting may be performed independently by different MAC instances. For example, multiple BSR procedures may operate independently and/or concurrently, where a given BSR procedure may correspond to a given serving site (e.g., and/or MAC instance). A BSR procedure associated with a given MAC instance may operate on/be associated with a logical channel scheduling group of the serving site/MAC instance. A BSR report generated as part of a BSR procedure associated with a given MAC instance may be included in a MAC control element that is include in a transport block for a transport channel associated with the serving site/MAC instance. The BSR report for a given MAC instance may be generated based on information related to transmission/reception of the concerned MAC instance (e.g., allocated UL resources, UL grant(s), MAC PDU transmission/reception, information considered in the determination applicable to generating a padding BSR, the cancellation of triggered BSRs, the BSR value, etc.) but not information related to the transmission of other MAC instances. BSR parameters such as the BSR retransmission timer (e.g., retxBSR-Timer) and/or the periodic BSR timer (e.g., periodicBSR-Timer) may have different values depending on the serving site or MAC instance the BSR parameters are associated with. Independent BSR reporting may be utilized for one or more UL transmission schemes/Layer 2 structures. For example, Independent BSR reporting may be utilized if a segregated UL transmission scheme/Layer 2 structure is used. In this manner, the different scheduling entities at the network side may be made aware of the buffer status pertaining to the logical channel scheduling group for its corresponding serving site/MAC instance.

In an example, common BSR reporting may be performed across a plurality of MAC instances. For example, a single, combined BSR procedure may operate across a plurality of serving sites and/or logical channels. A combined BSR procedure may provide each scheduler with information related to transmissions at the serving site associated with the scheduler and/or information related to transmissions at other serving sites utilized by the WTRU.

For example, whenever a BSR is triggered, a BSR may be transmitted for each serving site. The BSR for a given serving site may be transmitted over a transport channel associated with the serving site. The BSR for the serving site may include information generated based on uplink data that is to be transmitted to that serving site. A BSR may not be transmitted to one or more serving sites even if a BSR has been triggered if no data is available for transmission from logical channel scheduling group associated with the serving site. A padding BSR may be transmitted for one or more serving sites, for example if the number of padding bits in one of the transport blocks for this serving site is sufficient. The contents of the BSR transmitted for a serving site may be determined based on the data from the corresponding logical channel scheduling group of the serving site. If data from a given logical channel is multiplexed on to transport blocks for more than one serving site, the BSR may reflect the status after MAC PDUs have been generated for the different serving sites (e.g., so that the WTRU does not make it appear that there is more data available than actually is to be transmitted by reporting data in multiple BSRs to multiple sites).

The data considered by the WTRU to be available for transmission for the purpose of generating a BSR may include one or more of RLC SDUs, RLC data PDUs, segments of RLC data PDUs, and/or RLC status PDUs associated with the logical channel scheduling group of the MAC instance for which the BSR is being generated. PDCP SDUs and/or PDCP PDUs may not be considered for BSR generation. By considering RLC SDUs, RLC data PDUs, and/or RLC status PDUs associated with the logical channel scheduling group of the MAC instance for which the BSR is being generated as being available for transmission, the BSR status reporting may be effectively implemented in a split RLC transmission scheme/Layer 2 structure.

In an example, the data considered available for transmission for the purpose of BSR generation may include a portion or all PDCP SDUs and/or PDCP PDUs, for example PDCP SDUs and/or PDCP PDUs that may be considered available as per a Release 11 procedure. If a portion of the PDCP SDUs and/or PDCP PDUs are considered available, the portion may correspond to a ratio provided by higher layers. The portion may correspond to the greater of a "resource utilization ratio" of the serving site (or MAC instance) and a minimum value. The "resource utilization ratio" may correspond to a ratio of the UL resources allocated within a given time period for transport channels associated with the corresponding serving site/MAC instance) and the sum of all UL resources allocated within the same time period for transport channels associated with all serving sites/MAC instances. In an example, PDCP SDUs and/or PDCP PDUs may be considered available for transmission in the BSR generation procedure if the PDCP SDUs and/or PDCP PDUs are associated with the specific serving site/MAC instance for which the transmission is being generated. PDCP SDUs and/or PDCP PDUs associated with other sites (e.g., sites that are not associated with the BSR being generated) may not be counted available for transmission in the BSR calculation of another serving site.

The data considered available for transmission may include a portion of the total amount of data considered available for transmission for a logical channel in given logical channel scheduling group. If a portion of the PDCP SDUs and/or PDCP PDUs are considered available, the portion may correspond to a ratio provided by higher layers.

The portion may correspond to the greater of a "resource utilization ratio" of the serving site (or MAC instance) and a minimum value.

A WTRU may be configured with one or more sets of resource for sending scheduling requests (SRs) to the network. For multi-layer operation, the WTRU may be allocated resources for performing SRs in multiple layers (e.g., a first resource may be available in a primary layer and a second resource may be available in a secondary layer). An example of a resource that may be used for transmitting SRs to the network may be a PRACH configuration for random access-scheduling request (RA-SRs). Another example of a resource that may be used for transmitting SRs may be a received Physical Uplink Control Channel (PUCCH) configuration that is received by the WTRU (e.g., via RRC signaling) that allocates dedicated PUCCH resources to a given WTRU for send scheduling requests (e.g., a dedicated SR (D-SR) resources). The PUCCH configuration may define a periodic allocation of PUCCH physical resources that the WTRU may use for sending SRs on a given layer. In an example, the WTRU may select a resource to use for performing a SR based on one or more characteristics of the data to be transmitted. For example, an example of a data characteristic that may be used to select an appropriate resource for sending a SR may include the identity of the bearer (e.g., a DRB, a SRB, etc.) associated with the data to be transmitted. Another example of a data characteristic that may be used to select an appropriate resource for sending a SR may include the association of a given bearer with a specific layer (e.g., a primary layer, a secondary layer, etc.).

As an example, a WTRU may be configured with a PRACH configuration for a PCell of a primary layer. The WTRU may also be configured with a PRACH configuration for a serving cell of a secondary layer. Further, the WTRU may be configured with a dedicated resource for sending SRs on PUCCH in one or more layers, for example in a serving cell of the secondary layer. The WTRU may be configured with a first DRB and/or a first SRB that may be associated with the primary layer. The WTRU may be configured with a second DRB and/or a second SRB that may be associated with the secondary layer. If new data becomes available for transmission for one or more of the RBs configured for the WTRU and a SR is triggered, the WTRU may select a resource to use to perform the SR procedure based on the layer associated with the RB that triggered the request. For example, if the SR was triggered from data on the first SRB, the WTRU may perform RA-SR on the PCell of the primary layer. If the SR was triggered from data associated with the second DRB, the WTRU may perform a D-SR and/or a RA-SR on the serving cell of the secondary layer.

In an example, the WTRU may be configured to perform a SR procedure in the PCell of a primary layer following the failure of SR procedure in a secondary layer. For example, when sending a SR on the primary layer for an RB associated with a secondary layer, the WTRU may send an indication of the data available for both RBs associated with the secondary layer (e.g., that triggered the SR) and any data available for transmission associated with an RB mapped to the primary layer in the BSR. In an example, the WTRU may re-associate one or more RBs associated with the secondary layer to the primary layer based on an SR failure in the secondary layer.

In an example, how the WTRU handles an SR failure may be based on which layer included the SR resource used for the failed SR procedure (e.g., primary layer, secondary layer, etc.) and/or the type of SR resource used for the failed SR procedure (e.g., RA-SR, D-SR, etc.). For example, when the WTRU determines that a D-SR procedure has failed using PUCCH resources of a cell of a secondary layer, the WTRU may be configured to initiate a RA-SR procedure in a cell of a secondary layer. For example, the cell used for the RA-SR in the secondary layer may be the same cell as was used for the D-SR procedure that failed or may be a different cell of the secondary layer (e.g., the WTRU may try the same cell first, then a different cell of the secondary layer). If the WTRU determines that the RA-SR also fails for the secondary layer, the WTRU may then initiate SR procedure on the PCell of the primary layer. The SR on the PCell of the primary layer may be performed according to the SR configuration for the WTRU in the PCell. For example, if the WTRU has been configured with dedicated PUCCH resources for sending SRs in the PCell, a D-SR procedure may be performed. If the WTRU has not been configured with dedicated PUCCH resources for SR in the PCell, the WTRU may initiate a RA-SR procedure. If the SR procedure(s) in the PCell of the primary layer fail, the WTRU may attempt to re-establish the RRC connection with the PCell of the primary layer. In another example, if any SR procedure (e.g., D-SR or RA-SR) fails on the secondary layer, the WTRU may attempt to perform a SR procedure in the PCell of the primary layer (e.g., rather than attempting to first perform a different type of SR procedure in the secondary layer).

In an example, the WTRU may be configured to perform a SR procedure (e.g., a RA-SR procedure) in the primary layer based on the data that triggered the SR being associated with a RB of the secondary layer. For example, a RA-SR procedure in the primary layer may be used for SRs for data associated with RBs in the secondary layer. The WTRU may indicate in the RA-SR procedure that the data is associated with an RB mapped to the secondary layer. In an example, the WTRU may initiate a mobility procedure based on an SR failure in the secondary layer. For example, if an SR procedure fails in the secondary layer, the WTRU may be configured to perform a re-association procedure (e.g., RRC reconfiguration procedure) for one or more radio bearers that moves the RBs associated with the layer that the SR failed on to a different layer (e.g. the primary layer). In an example, the WTRU may determine that UL RLF has occurred on given layer upon RACH failure using PRACH resources of the concerned layer (e.g., for a SR procedure). For example, for an SR failure corresponding to a secondary layer, the WTRU may initiate a bearer mobility-related procedure in a different layer (e.g., a primary layer).

A WTRU may utilize different procedures for maintaining timing alignment of the different layers. For example, the timing alignment (TA) procedures utilized in a given cell (e.g., a PCell) may be based on which layer the TA procedure is associated with. For example, the WTRU may perform various actions regarding timing alignment in a first cell of a first layer (e.g., a PCell of the primary layer) based on detecting one or more conditions associated with a second cell in a second layer (e.g., a cell in a secondary layer). For example, a SR failure in a secondary layer may trigger one or more actions related to TA in the primary layer.

As an example, the WTRU may consider the timing alignment timer (TAT) (e.g., some or all applicable TATs, for example if multiple TA Groups are configured) associated with a given layer to have expired upon detecting a D-SR failure and/or a RA-SR failure in that layer. For example, the WTRU may consider the TAT of the PCell of a secondary layer to have expired based on determining that a SR procedure has failed using a resource of the PCell of the secondary layer.

In an example, TAT expiration (e.g., or a trigger that causes the WTRU to deem the TAT to have expired) in a first cell of a first layer may trigger an extended SR/BSR to be sent in another cell associated with a different layer. For example, if the WTRU determines that the TAT associated with one or more cells (e.g., the PCell) of a secondary layer has expired and/or has been deemed to have expired (e.g., based on an SR failure), the WTRU may send a BSR to a cell of the primary layer (e.g., the PCell of the primary layer). For example, the BSR sent via the primary layer may include information regarding any data for RBs associated with the secondary layer to be transmitted in addition to any data associated with RBs of the primary layer that is to be transmitted.

In an example, TAT expiration (e.g., or a trigger that causes the WTRU to deem the TAT to have expired) may trigger RB mobility to another layer and/or RB suspension. For example, the WTRU may re-associate one or more RBs associated with a layer that includes a cell for which the TAT expired (e.g., or was deemed to have expired) to a different cell in a different layer (e.g., to the primary layer). In an example, RB association may be performed when all TATs applicable to a secondary layer have expired or have been deemed to have expired. In such a case, if the TAT has expired on a first cell of a secondary layer but that TAT of a second cell has not yet expired, the WTRU may refrain from performing RB mobility to another layer until the TAT of the second cell expires or is deemed to have expired. If an RB is re-associated to a different layer, once one or more TATs are started or running in the secondary layer, the WTRU may reconfigure the RBs that were moved to be re-associated with the secondary layer. In an example, RB suspension may be performed by the WTRU when all TATs applicable to a secondary layer have expired or have been deemed to have expired. In such a case, if the TAT has expired on a first cell of a secondary layer but that TAT of a second cell has not yet expired, the WTRU may refrain from suspending the RB. If the WTRU does suspend an RB based on the expiration of all TATs associated with a given layer, once the WTRU determines that at least one TAT applicable to a secondary layer has been started and/or is now running, the WTRU may consider the concerned RBs as active In an example, TAT expiration (e.g., or a trigger that causes the WTRU to deem the TAT to have expired) may trigger deactivation of MAC instance/layer associated with the expired TAT. For example, if the WTRU determines that a TAT associated with one or more cells (e.g., a PCell) of a secondary layer has expired or has been deemed to have expired, the WTRU may deactivate some or all cells of the concerned MAC instance. In an example, TAT expiration (e.g., or a trigger that causes the WTRU to deem the TAT to have expired) may trigger the WTRU to suspend one or more layer-specific radio bearers. For example, if the WTRU determines that a TAT associated with one or more cells (e.g., a PCell) of a secondary layer has expired or has been deemed to have expired, the WTRU may suspend one or more radio bearers associated with the concerned layer. In an example, TAT expiration (e.g., or a trigger that causes the WTRU to deem the TAT to have expired) may trigger the WTRU to perform a mobility procedure that moves/re-associates one or more layer-specific bearers to a different layer. For example, For example, if the WTRU determines that a TAT associated with one or more cells (e.g., a PCell)

of a secondary layer has expired or has been deemed to have expired, the WTRU may initiate a mobility procedure in order to reconfigure radio bearers to be re-associated with a different layer (e.g., a primary layer).

In an example, TAT expiration (e.g., or a trigger that causes the WTRU to deem the TAT to have expired) may trigger a switch of the active MAC instance/layer. For example, if the WTRU determines that a TAT associated with one or more cells (e.g., a PCell) of a secondary layer has expired or has been deemed to have expired, the WTRU may initiate a procedure to activate one or more cells (e.g., a PCell) of a primary MAC instance, for example if the primary MAC instance had been deactivated.

Layer 1 (e.g., PHY layer) and/or Layer 2 (e.g., MAC, RRC, etc.) based control of dynamic Radio Resource Management (RRM) may be performed in order to coordinate multi-layer RRM. For example, the control and the allocation of physical layer resources for each layer may be a complex and may depend on the type of control plane architecture that is utilized (e.g., distributed control plane, coordinated control plane, centralized control plane, etc.). For example, a WTRU may be configured with dual connectivity such that the SRBs are terminated in a single layer (e.g., the primary layer) and/or one or more layers may have no SRB terminated in the serving site for the layer. In such a case, configuration information and other control data to support RRM may be determined for a layer (e.g., a secondary layer/SCeNB layer) by one or more of a RCNC (e.g., which may be located at the MeNB), another layer serving site (e.g., the MeNB), and/or by serving site of the concerned layer (e.g., the SCeNB). The configuration information may be provided to the appropriate network node where the SRB terminates over one or more interfaces between the layers (e.g., the X2bis). For example, the WTRU may be configured such that SRBs terminate in the MeNB, but control information for the SRB may be provided to other serving sites (e.g., SCeNB).

However, in some scenarios the latency of inter-layer communications/interfaces may be problematic for RRM. For example, RRM and/or reconfiguration in at a secondary layer (e.g., associated with a SCeNB) may be complicated by the fact that an interface between the serving site of the macro layer where an SRB may be terminated (e.g., MeNB) and the serving site of the secondary layer (e.g., SCeNB) may be associated with a relatively high latency and/or may introduce a relatively large delay. Reducing latency for the reconfiguration of a MAC instance and PHY configuration of a layer while still providing for scheduler flexibility (e.g., in terms of allocation of resources) may be relevant to several scheduling functions, such as one or more of transmission time interval (TTI) bundling, PUCCH allocation for D-SR, CQI reporting, hybrid automatic repeat request (HARQ) feedback (e.g., including HARQ format), allocation of sounding reference signal (SRS) resources, configuration reference signals, etc. For example, parameters included in one or more IEs such as sps-Config, macMainConfig (e.g., including ttiBundling, drx-Config, etc.), physicalConfigDedicated (e.g., including pucch-ConfigDedicated, cqi-ReportConfig, soundingRS-UL-ConfigDedicated, schedylingRequestConfig, cqi-ReportConfig-r10, csi-RS-Config-r10, soundingRS-UL-ConfigDedicatedAperiodic-r10, csi-RS-ConfigNZP, etc.) may be time sensitive and delays in signaling and/or configuring such parameters may be problematic.

As an example, the synchronization of a reconfiguration instant (e.g., the time at which a new configuration should start being applied) may be difficult to achieve in a multi-layer setting, for example if intra-network communications between serving sites is associated with a high latency and the control plane (e.g., and/or a specific SRB) is terminated at one of the layers. For example, if the WTRU receives an RRC reconfiguration message that reconfigures one or more aspects related to connectivity at a secondary layer (e.g., associated with an SCeNB), timing and/or synchronization between the scheduler in the secondary layer and the MAC instance associated with the secondary layer in the WTRU may be challenging. For example, the WTRU may be configured to determine a fixed point in time from which the new configuration is assumed to be valid.

Timing and synchronization may be an issue at the network side as well, for example where the network is attempting to reallocate resources from one WTRU to another, as the network may have to determine the first possible occasion from which such resources may be available for allocation to given WTRU. For example, the network may attempt to determine when resources may be available at a given WTRU for the purpose of deactivating TTI Bundling, releasing PUCCH resources for D-SR, allocating CQI reporting instance, receiving HARQ feedback (e.g., including HARQ format), determining when to apply a new DRX configuration, releasing SRS resources, modifying reference signals, and/or the like. For example, the network may attempt to determine when a WTRU can and/or will begin applying one or more parameters included in IEs such as sps-Config, mac-MainConfig (e.g., including ttiBundling, drx-Config, etc.), physicalConfigDedicated (e.g., including pucch-ConfigDedicated, cqi-ReportConfig, soundingRS-UL-ConfigDedicated, schedulingRequestConfig, cqi-ReportConfig-r10, csi-RS-Config-r10, soundingRS-UL-ConfigDedicatedAperiodic-r10, csi-RS-ConfigNZP, etc.). Timing for activation and deactivation of semi-persistent scheduling (SPS) resources may be controlled using PHY layer control signaling (e.g., activated and deactivate via PDCCH orders).

For example, the WTRU and one or more serving sites may be configured to establish a one or more preconfigurations for a set of parameters, may assign an index to each preconfigured set of parameters, and may utilize explicit control signaling and/or implicit rules to switch the active configuration (e.g., activate and/or deactivate a given set of parameters). For example, the WTRU and/or serving sites of different layers may utilize local, flexible, and/or dynamic management of physical layer resources for a given layer and/or scheduler (e.g., for a SCeNB) without having to introduce and/or utilize an RRC component with a SRB termination in the layer for which the configuration is being established (e.g., secondary layer with an SCeNB serving site).

For example, rather than or in addition to relying on RRC signaling for configuring static parameters for RRM (e.g., which may be used for layers where one or more SRBs are terminated in a RRC component at the serving site), whereby a scheduler for a given layer (e.g., in a SCeNB) may preconfigure various RRM configurations (e.g., via RRC signaling or the like), and may signal which preconfigured allocation to use (e.g., via PHY or MAC signaling; based on implicit rules, based on triggering events, etc.).

Various techniques may be used to configure the plurality of sets of RRM parameters. When used herein, the term RRM parameters may refer to one or more of parameters related TTI bundling, PUCCH allocation for D-SR, DRX, SR, CQI reporting, HARQ feedback (e.g., including HARQ format), allocation of SRS resources, configuration reference signals, other PHY layer parameters, and/or the like.

For example, RRM parameters may include one or more items of information that may be include in IEs such as sps-Config, mac-MainConfig (e.g., including ttiBundling, drx-Config, etc.), physicalConfigDedicated (e.g., including pucch-ConfigDedicated, cqi-ReportConfig, soundingRS-UL-ConfigDedicated, schedulingRequestConfig, cqi-ReportConfig-r10, csi-RS-Config-r10, soundingRS-UL-ConfigDedicatedAperiodic-r10, csi-RS-ConfigNZP, etc.). Additionally, various subsets of RRM parameters/configurations may be treated and/or handled independently/separately. For example, sets of SPS parameters may be preconfigured separately from sets of physical layer configuration parameters. Similarly, sets of DRX parameters may be handled separately from sets of CQI reporting parameters. Parameters related to one or more different control functions may be grouped into pre-configuration groups (e.g., DRX parameters grouped with TTI parameters, CQI reporting parameters may be grouped with D-SR configuration parameters, etc.). When used herein, the term RRM parameters may be used to refer to one or more parameters described above (or similar) either alone or in various combinations. The term RRM configuration may refer to a group of one or more RRM parameters that may be grouped for preconfiguration and/or may be activated together.

For example, the WTRU may receive RRC signaling (e.g., a RRC Connection Reconfiguration message) that configures a one or more sets of RRM parameters. The WTRU may receive a configuration with one or more indexed set of parameters. For example, the WTRU may be preconfigured with one or more sets of physical layer configuration parameters (e.g., physicalConfigDedicated) and/or one or more sets of MAC configuration parameters (e.g., mac-MainConfig). For example, each configuration may be grouped as a separate item (e.g., a defaultConfig, and zero of more alternativeConfig). In an example each received configuration may be associated with an index value, which may be assigned when the configuration is received and/or may be implicitly determined. For example, each configuration value may be provided in order if increasing index number (e.g., first configuration in the message has index 0, second configuration has index 1, and so on). One or more of the configurations may be a default configuration. For example, the received reconfiguration message may explicitly indicate which received set of parameters (e.g., configuration) is considered the default configuration and/or the first configuration and/or the configuration assigned index 0 and/or the first configuration that is applied in the cell may be considered the default configuration. Received RRM configurations may be specific to a certain cell or may be common across a plurality of cells. Received RRM configurations may be specific to a certain layer or may be common across a plurality of layers. Upon receiving the plurality sets of parameters (e.g., plurality of sets of RRM configurations), the WTRU may complete the reconfiguration by applying the parameters corresponding to a default set.

As an example, a WTRU may receive a configuration with sets of parameters grouped as one or more virtual cells. For example, the WTRU may receive one or more sets of RRM parameters, for example one or more sets of physical layer configurations. The configuration may be received such that the configuration corresponds to a virtual cell. A virtual cell may be associated with a similar configuration as a traditional cell, although the configuration may be activated and/or deactivated dynamically. For example, the WTRU may receive multiple virtual cell configurations (e.g., a plurality of sets of RRM parameters where each set corresponds to a different virtual cell) for a given sCellIndex, a given physCellId, a given dl-CarrierFreq, and/or the like. The received virtual cell configurations may correspond to multiple potential configurations that may be applied in a given cell. In an example, each virtual cell configuration and/or each set of RRM parameters may be assigned a virtualCellId for purposes of identification. The identifier (e.g., virtualCellId) may be explicitly signaled and/or may be implicitly determined. For example, each virtual cell configuration may be provided in order if increasing identification number (e.g., first configuration in the message has virtualCellId 0, second configuration has virtualCellId 1, and so on). One or more of the virtual cell configurations may be a default configuration. For example, a received reconfiguration message may explicitly indicate which received virtual cell configuration is considered the default configuration and/or the first configuration and/or the configuration assigned virtualCellId 0, and/or the first virtual cell configuration that is applied in the cell may be considered the default configuration. Virtual cell configurations may be specific to a certain cell or may be common across a plurality of cells. Virtual cell configurations may be specific to a certain layer or may be common across a plurality of layers. Upon receiving the virtual cell configurations, the WTRU may complete the reconfiguration by applying the parameters corresponding to a default virtual cell configuration.

Control signaling may be used to activate an RRM configuration and/or virtual cell configuration, deactivate an RRM configuration and/or virtual cell configuration, change an RRM configuration and/or virtual cell configuration, remove an RRM configuration, and/or virtual cell configuration, and/or the like. For example, control signaling may applicable to one or more cells within a layer (e.g., perhaps groups or subsets of cells within a layer), to a specific type of cell within a layer (e.g., PCell, SCell(s), etc.), to a Timing Alignment Group (TAG), etc.

For example, physical layer signaling may be used to activate an RRM configuration and/or virtual cell configuration, deactivate an RRM configuration and/or virtual cell configuration, change an RRM configuration and/or virtual cell configuration, remove an RRM configuration, and/or virtual cell configuration, and/or the like. As an example, physical layer signaling used for layer activation, PCell activation, SCell activation, etc. may also include an indication of an appropriate RRM configuration and/or virtual cell configuration that should be applied. In an example, separate physical layer signaling may be used to indicate which RRM configuration and/or virtual cell configuration should be applied in the cell, in the layer that includes the cell, in another cell in the layer that includes the cell, in another layer, in another cell of another layer, in a TAG, and/or the like.

For example, once configured with a plurality of RRM configurations and/or a plurality of virtual cell configurations for a given cell, a given group of cells, a given layer, etc., the WTRU may receive control signaling, for example on the PDCCH and/or the enhanced PDCCH (ePDCCH), that activates a given RRM configuration and/or virtual cell configuration. For example, the WTRU may receive an index and/or virtualCellId corresponding to a given RRM configuration and/or virtual cell configuration in a downlink control information (DCI) field and/or via other physical layer signaling.

For example, the WTRU may receive a DCI that activates a RRM configuration and/or virtual cell configuration for a one or more cells, and the WTRU may determine which RRM configuration and/or virtual cell configuration to apply based on one or more of an explicit index and/or virtual cell identity indicated in the DCI, the identity of the search space in which the DCI was successfully decoded (e.g., each search space and/or portions of a search space may be implicitly mapped to a given index and/or virtual cell), the radio network temporary identifier (RNTI) used to decode the DCI (e.g., each RRM configuration and/or virtual cell configuration may be assigned an RNTI and/or an implicit mapping may be assumed based on which RNTI is used), the identity of the first (or last or some other CCE in the range used for decoding the DCI) control channel element (CCE) associated with the DCI (e.g., CCEs may be implicitly mapped to RRM configurations and/or virtual cell configurations), and/or the like.

Physical layer signaling may indicate the activation and/or deactivation of a RRM configuration and/or virtual cell configuration, for example by including the corresponding index and or virtual cell identity in the signaling format. If the WTRU is operating using a non-default RRM configuration and/or virtual cell configuration, the non-default RRM configuration and/or virtual cell configuration is deactivated and/or removed, the WTRU may implicitly determine use the default RRM configuration and/or virtual cell configuration for the concerned layer (e.g. a configuration with index/virtualCellId 0) unless a different RRM configuration and/or virtual cell configuration is explicitly indicated.

Feedback may be sent by the WTRU to confirm reconfiguration. For example, the WTRU may transmit feedback to indicate the successful completion of the reconfiguration and/or that physical layer signaling was successfully received. For example, the WTRU may transmit HARQ ACK/NACK for the received physical layer signaling used to activate and/or deactivate a RRM configuration and/or virtual cell configuration. For example, positive feedback (e.g., ACK) may indicate successful reception physical layer signaling that changed the RRM configuration and/or virtual cell configuration. For example, the HARQ ACK/NACK feedback may be transmitted a fixed time after successful reception of the control signaling. The ACK/NACK feedback may be transmitted using the RRM configuration and/or virtual cell configuration that had been previously applicable at the time of reception of the physical layer signaling that changed the RRM configuration and/or virtual cell configuration (e.g., in subframe n) of the control signaling that changed the configuration. For example, if the physical layer control signaling was received in subframe n, the feedback may be transmitted in subframe n+4.

In an example, the feedback for the HARQ ACK/NACK for the received physical layer signaling used to activate and/or deactivate a RRM configuration and/or virtual cell configuration may be transmitted using the RRM configuration and/or virtual cell configuration indicated in the physical layer control signaling. For example, ACK/NACK feedback may be transmitted using the new RRM configuration and/or virtual cell configuration in subframe n+(reconfigurationDelay). The reconfigurationDelay may be a configurable aspect (e.g., that may be indicated in the physical layer activation signaling and/or may be preconfigured with the RRM/virtual cell configuration set) or may be equivalent to some fixed processing delay (e.g., 15 ms). In an example, physical layer signaling used to activate and/or deactivate a RRM configuration and/or virtual cell configuration may indicate a specific resource for the transmission of ACK/NACK feedback. In an example, WTRU may transmit a first feedback indicating whether the physical layer signaling used to activate and/or deactivate a RRM configuration and/or virtual cell configuration was successfully received (e.g., using a method described herein), and a second feedback to indicate the successful completion of the reconfiguration as indicated by the control signaling (e.g., using a method described herein). In an example, the confirmation of the successful reconfiguration to the new RRM configuration and/or virtual cell configuration may be performed by transmission of a random access preamble. For example, one the WTRU successfully applies the new RRM configuration and/or virtual cell configuration, the WTRU may initiate a RACH procedure. A msg3 may include a MAC CE that indicates the activated RRM configuration and/or virtual cell configuration.

Layer 2 signaling such as MAC signaling may be used to activate an RRM configuration and/or virtual cell configuration, deactivate an RRM configuration and/or virtual cell configuration, change an RRM configuration and/or virtual cell configuration, remove an RRM configuration, and/or virtual cell configuration, and/or the like. For example, MAC signaling used for layer activation, PCell activation, SCell activation, etc. may also include an indication of an appropriate RRM configuration and/or virtual cell configuration that should be applied.

For example, the WTRU may receive a MAC control element (CE) that activates a given RIM configuration and/or virtual cell configuration. For example, the WTRU may receive an index and/or virtualCellId corresponding to a given RRM configuration and/or virtual cell configuration in a field of the MAC CE. In an example, the MAC CE used to activate a given RIM configuration and/or virtual cell configuration may include a bitmap, and each bit of the bitmap may correspond to a given RRM configuration and/or virtual cell configuration. For example, the first bit of the bitmap may correspond to index/virtual cell identity 0, the second bit of the bitmap may correspond to index/virtual cell identity 1, and so one. A 1 may indicate that the corresponding RRM configuration and/or virtual cell configuration is being activated, and a 0 may indicate that the corresponding RRM configuration and/or virtual cell configuration is being deactivated (or vice versa).

In an example, the WTRU may receive a MAC activation/deactivation CE that activates and/or deactivates a layer, activates and/or deactivates a cell in a layer, activates and/or deactivates a group of cells in a layer, etc. The MAC activation/deactivation CE may include an explicit an index and/or virtualCellId corresponding to a given RRM configuration and/or virtual cell configuration for an activated cell, group of cells, and/or layer. At bitmap as described herein may also be used.

In an example, the WTRU may receive a MAC RRMConfig CE for a specific cell, group of cells, and/or layer. The MAC RRMConfig CE may include an explicit an index and/or virtualCellId corresponding to a given RRM configuration and/or virtual cell configuration for a configured cell, group of cells, and/or layer. At bitmap as described herein may also be used.

Irrespective of the signaling method used, if the WTRU is operating using a non-default RRM configuration and/or virtual cell configuration, the non-default RRM configuration and/or virtual cell configuration is deactivated and/or removed (e.g., via MAC signaling), the WTRU may implicitly determine use the default RRM configuration and/or virtual cell configuration for the concerned cell/group of cells/layer (e.g. a configuration with index/virtualCellId 0) unless a different RRM configuration and/or virtual cell configuration is explicitly indicated.

Feedback may be sent by the WTRU to confirm reconfiguration received via MAC signaling. For example, the WTRU may transmit feedback to indicate the successful completion of the reconfiguration and/or that MAC CE was successfully received. As an example, the feedback may be included in a MAC CE and/or on the PUCCH (e.g., a fixed time after transmission of the HARQ ACK for the transport block in which the L2/MAC signaling was received).). In an example, the confirmation of the successful reconfiguration to the new RRM configuration and/or virtual cell configuration may be performed by transmission of a random access preamble. For example, one the WTRU successfully applies the new RRM configuration and/or virtual cell configuration, the WTRU may initiate a RACH procedure. A msg3 may include a MAC CE that indicates the activated RRM configuration and/or virtual cell configuration.

Implicit rules may be used to activate an RRM configuration and/or virtual cell configuration, deactivate an RRM configuration and/or virtual cell configuration, change an RRM configuration and/or virtual cell configuration, remove an RRM configuration and/or virtual cell configuration, and/or the like. For example, once preconfigured with a plurality of RRM configurations and/or virtual cell configurations for a given cell, group of cells, layer, etc., the WTRU may determine events or trigger that may activate and/or deactivate an RRM configuration and/or virtual cell configuration.

For example, the WTRU may receive control signaling (e.g., a MAC activation/deactivation CE) that activates a cell, a group of cells, a layer, etc. that was preconfigured for use by the WTRU. The WTRU may implicitly determine that the default RRM configuration and/or virtual cell configuration for the concerned cell, a group of cells, a layer, etc. should be applied absent explicit signaling to the contrary.

The WTRU may be configured to maintain a validity timer for the active RRM configuration and/or virtual cell configuration (e.g., for a non-default RRM configuration and/or virtual cell configuration). For example, the WTRU may start a validity timer for a given RRM configuration and/or virtual cell configuration upon receiving activating the RRM configuration and/or virtual cell configuration and/or upon receiving the explicit control signaling that activates the RRM configuration and/or virtual cell configuration. The WTRU may deactivate an RRM configuration and/or virtual cell configuration for a given cell, a group of cells, a layer, etc. upon the expiration of the validity timer of such RRM configuration and/or virtual cell configuration. In an example, there may be no validity timer for a default configuration. A validity timer may be restarted upon reception of signaling that reactivates the RRM configuration and/or virtual cell configuration.

In an example, expiration of the TAT for a cell, group of cells, layer, etc. may deactivate and/or remove an RRM configuration and/or virtual cell configuration. For example, the WTRU may be configured to deactivate a RRM configuration and/or virtual cell configuration for a given cell, group of cells, layer, etc. upon expiration of the applicable TAT. In an example, expiration of the TAT may cause the WTRU to deactivate a non-default RRM configuration and/or virtual cell configuration, but not the default RRM configuration and/or virtual cell configuration.

The WTRU may deactivate a RRM configuration and/or virtual cell configuration for a given cell, group of cells, layer, etc. upon detection of radio link failure conditions for the concerned cell, group of cells, layer, etc. In an example, detection of radio link failure may cause the WTRU to deactivate a non-default RRM configuration and/or virtual cell configuration, but not the default RRM configuration and/or virtual cell configuration.

The WTRU may deactivate a RRM configuration and/or virtual cell configuration for a given cell, group of cells, layer, etc. upon determining that the concerned cell, group of cells, layer, etc. is in DRX (e.g., long DRX) and that z DRX period(s) have elapsed where x may be a configuration aspect. In an example, determining that the concerned cell, group of cells, layer, etc. is in DRX (e.g., long DRX) and that z DRX period(s) have elapsed may cause the WTRU to deactivate a non-default RRM configuration and/or virtual cell configuration, but not the default RRM configuration and/or virtual cell configuration.

e WTRU may deactivate a RRM configuration and/or virtual cell configuration for a given cell, group of cells, layer, etc. upon deactivating (e.g., implicitly and/or explicitly) the concerned cell, group of cells, layer, etc. (e.g., when it deactivates the cell, or the layer in question). In an example, deactivation of the concerned cell, group of cells, layer, etc. may cause the WTRU to deactivate a non-default RRM configuration and/or virtual cell configuration, but not the default RRM configuration and/or virtual cell configuration.

The WTRU may revert to a default RRM configuration and/or virtual cell configuration upon implicit and/or explicit deactivation of a non-default RRM configuration and/or virtual cell configuration (e.g., unless some other RRM configuration and/or virtual cell configuration is explicitly indicated). The UE may use control signaling (e.g., a RRC message, a MAC CE that indicates the active configuration) that indicates that the WTRU lacks a valid configuration and/or that indicates that a different configuration is now being used (e.g., a default configuration).

Timing of completion of the reconfiguration to a different RRM configuration and/or virtual cell configuration may be specified. For example, the WTRU may attempt to complete the reconfiguration within x subframe(s). The value x may be fixed (e.g., a 15 ms processing time) and/or the value x may be configured as part of the RRM configuration and/or virtual cell configuration. In an example, the delay may be determined beginning from the subframe n at which the applicable control signaling that activates the RRM configuration and/or virtual cell configuration is received (e.g., L1/L2 signaling). In an example, the delay may be determined beginning from the time at which feedback for the applicable control signaling is transmitted (e.g., L1/L2 signaling). In an example, the delay may be determined beginning from the time at which a confirmation of successful reconfiguration is transmitted.

Possibly, during the period [n, n+x], the WTRU may not receive the PDCCH and/or ePDCCH. In an example, the WTRU may begin using a new RRM configuration and/or virtual cell configuration as soon as it is able to reconfigure its transceiver, and may begin receiving the PDCCH and/or ePDCCH and/or may perform uplink transmission using the configuration applicable at the moment of reception of the concerned control signaling. In an example, the WTRU may be allowed to begin using the new RRM configuration and/or virtual cell configuration after the transmission of the acknowledgement of the reception of the control signaling (e.g., subframe n+4).

In an example, one or more of the methods described herein may be combined in order to provide flexible RRM control by a scheduler in a node without SRB termination. For example, a WTRU may receive an RRC Connection Reconfiguration message. The RRC Connection reconfiguration message may be associated with/transmitted via an SRB that is terminated at an RRC entity in the MeNB. The RRC Connection Reconfiguration message may add, modify, remove, etc. one or more cells associated with a secondary layer (e.g., the serving site for the secondary layer may be an SCeNB). The reconfiguration message may include a plurality of RRM configurations and/or virtual cell configurations for the one or more cells being added and/or modified (e.g., and possibly for the deleted cells) in the secondary layer. The various RRM configurations and/or virtual cell configurations may be indexed and/or one or more RRM parameters within the RRM configurations and/or virtual cell configurations may be indexed. One of the RRM configurations and/or virtual cell configurations may be considered a default configuration and/or one or more RRM parameters within the RRM configurations and/or virtual cell configurations may be considered a default parameter value. The initially configured RRM configuration and/or virtual cell configuration may be considered the default configuration and/or the initially configured RRM parameters may be considered the default parameters. The default RRM configuration and/or virtual cell configuration and/or the default RRM parameters may be explicitly indicated, for example by associating them with index 0 and/or listing them first. Grouping of configuration aspects using a virtual cell. For example, multiple serving cell configurations may be given for a given carrier frequency.

The WTRU may receive Layer 1 (e.g., PHY) and/or Layer 2 (e.g., MAC) signaling (e.g., DCI on PDCCH, MAC CE, etc.) that may indicate an index for one or more RRM configurations and/or virtual cell configurations to apply and/or one or more RRM parameters to apply. The WTRU may acknowledge reception at subframe n of such control signaling (e.g., perhaps including an indication of the configuration index in the feedback) by transmitting HARQ ACK on PUCCH according to the current RRM configuration and/or virtual cell configuration (e.g., in subframe n+4). Reception of such control signaling by the WTRU (e.g., with a configuration index) may activate the corresponding RRM configuration and/or virtual cell configuration (e.g., and/or RRM parameters thereof). The WTRU may resume decoding of the PDCCH and/or ePDCCH after a given time (e.g., fixed and/or signaled) from the reception of the concerned signaling (e.g., at subframe n+4, subframe n+15, etc.). In an example, activation/deactivation of a virtual cell may be used as a grouping method.

From the perspective of the network, the SCeNB may provide a number of configuration values for one or more RRM configurations and/or virtual cell configurations to the MeNB. The SCeNB may indicate the indexing method to be used. For example, such configuration may be forwarded on the interface between the SCeNB and the MeNB (e.g., a modified X2 such as the X2bis). The SCeNB may prepare the RRC Connection Reconfiguration Message with the RRM configuration(s) and/or virtual cell configuration(s) and send the RRC Connection Reconfiguration Message to the MeNB to be forwarded to the WTRU. The scheduler in the MAC instance associated with the for the secondary layer may then use L1 signaling and/or L2 signaling to dynamically switch between configuration values for one or more RRM aspects.

When a WTRU is configured to operate utilizing multiple layers or serving sites that are associated with different schedulers, a radio bearer may be associated exclusively with a single MAC instance and/or a plurality of MAC instances. One or more serving cells associated with a given layer/MAC instance may fail, for example due to poor radio link conditions, reconfiguration failure, mobility failure, radio link failure, and/or for other reason(s). Additionally, a WTRU configured with one or more serving cells associated with a given layer/MAC instance may be handed over to a different set of serving cell(s) that may be associated with a different network entity (e.g., logical entity such as a cell or physical entity such as an eNB). Methods are described to address the loss of radio link across one or more serving sites/MAC instances and/or to address mobility on a serving site specific basis (e.g., applied to a set of serving cells associated with a specific layer/MAC instance). Methods and systems are disclosed for efficient management of MAC instances to ensure service continuity during mobility events. For example, methods and systems are described for performing mobility events when one or more radio bearers (e.g., SRBs and/or DRBs) are associated with a layer/MAC for which a mobility event is being performed.

As an example, a WTRU may establish a connection to a first eNB. For example, the first eNB may be a MeNB. The connection to the first eNB may be considered a primary layer and/or the first eNB may be considered a first serving site and/or primary serving site. As part of the WTRU capability exchange during the initial RRC connection procedure with the first serving site, the WTRU may provide a first set of WTRU capabilities, for example in order to establish a connection to the first serving site according to Release 11 connectivity procedures. Additionally, as part of the initial connection procedure to the first site, the WTRU may provide a second set of WTRU capabilities, and the second set of WTRU capabilities may be associated with connectivity information supported by the WTRU for establishing connectivity to a second layer or serving site. The MeNB and another eNB (e.g., a SCeNB) may subsequently coordinate to configure of the WTRU to access multiple serving sites according to the respective capabilities, for example using multiple MAC instances.

In an example, when establishing a connection to a first eNB (e.g., a MeNB associated with a primary layer/first serving site) the WTRU may include an indication of whether or not the WTRU supports dual connectivity, for example as part of the WTRU capability information. If the WTRU indicates dual connectivity is supported, the WTRU may include associated WTRU capabilities for accessing a secondary serving site when establishing the connection with the first serving site. Upon successfully connecting to the first serving site, the WTRU may, for example when initially establishing connectivity to a SCeNB, provide a second set of WTRU capabilities to the SCeNB. The MeNB and the SCeNB may subsequently configure the connection of for the WTRU for each of the serving sites using their respective parameters according to the capability information provided by the WTRU.

After establishing a connection to a primary serving site (e.g., an RRC connection) for example using Release 11 procedures, the initial configuration of a secondary layer may be in a variety of manners. For example, a WTRU that is connected to a first eNB (e.g., a MeNB, a primary layer, a first serving site, a connection via a first MAC instance, etc.) may be configured to operate with one or more cells from a second eNB (e.g., an SCeNB, a secondary layer, a second serving site, a connection via a second MAC instance, etc.). For example, the WTRU may receive control plane signaling (e.g., RRC signaling) such that a second set of cells may be configured to form a secondary layer for the WTRU configuration. The configuration of the secondary layer may be performed using RRC signaling received using dedicated resources and/or dedicated RRC messages.

As an example, the initial configuration of the secondary serving site connection may be performed using a reconfiguration procedure. The WTRU may perform a reconfiguration procedure with the primary layer, and the reconfiguration procedure may be used to establish connectivity to the secondary serving site. Thus, signaling form the primary serving site may be used to configure the WTRU to operate using the secondary layer. The signaling configuring the secondary layer may be received via resources of a primary layer, for example if an RRC connection associated with the primary layer is used to configure a secondary layer. An RRC Connection Reconfiguration procedure may be used. For example, the WTRU may perform an RRC connection reconfiguration procedure with the primary serving site that configures the WTRU to operate using the secondary serving site.

The initial configuration of the secondary serving cell may be a type of a mobility event. For example, after establishing an RRC connection with a primary serving site, resources associated with the primary serving site may be used to perform a mobility procedure. During the mobility procedure the WTRU may maintains its configuration, connectivity, and/or operational status with the primary serving site, but may add one or more serving cells of a secondary layer to its configuration. For example, an RRC Connection Reconfiguration procedure may be performed, for where the mobility control information element is transmitted to the WTRU (e.g., a handover command may be sent to the WTRU). Rather than the WTRU interpreting the handover command to mean that the WTRU should perform a handover from a cell of the primary serving site to some other cell, the handover command may configure one or more cells of a secondary serving site to be used in addition to cells of the primary serving site. The handover command may include an indication that the handover command is to establish dual connectivity rather than to trigger handover of the WTRU from a cell of the primary serving site. The mobility related signaling received on resources of the primary layer may configure a Primary Cell (PCell) in the secondary layer at a target eNB (e.g., the SCeNB). After establishing the connection with the PCell of the secondary layer, the WTRU may receive a RRC Connection Reconfiguration message from the target eNB (e.g., the SCeNB) that adds additional serving cells such as SCells associated with of the secondary serving site.

The initial configuration of the secondary layer/serving site (e.g., as a reconfiguration of the primary serving site and/or a mobility event at the primary serving site) may include a radio bearer reassignment. For example, when performing a connection reconfiguration procedure and/or mobility procedure with the primary serving site in order to establish connectivity to the secondary serving site, one or more existing radio bearers (e.g., radio bearers previously associated with primary serving site transmission) may be moved to the secondary layer/serving site. The radio bearers may be move exclusively to the secondary serving site and/or may be moved such that they are associated with both the primary serving site and the secondary serving site.

Addition of a secondary layer may be performed once security is activated for the primary layer. For example, in order to add a PCell of a secondary serving site, the WTRU may wait until the security context associated with the WTRU connection to the primary serving site has been activated. For example, configuration of a secondary serving site may be performed once Access Stratum (AS) security has been activated and/or once SRB2 with at least one DRB have been established/setup (e.g., and are not suspended) for the connection associated with the first eNB (e.g., the primary layer).

In an example, a common security context may be utilized across a plurality of serving sites, and bearer identities may be WTRU-specific. If the secondary layer implements a security context that is common with that of the primary layer or some other active serving site (e.g., for one or more of the control plane and/or for the user plane), the configuration of the secondary layer may be performed using a common identity space for the bearer identification (e.g., srb-Identity and/or drb-Identity). For example, if one or more serving sites utilize the same bearer identification(s), the transmission scheme may be established such that none of the bearer identities that are utilized are used in multiple layers/serving sites with different PDCP entities. By doing so the WTRU can avoid the scenario where different PDCP PDUs are transmitted using the same security keys and the same sequence number (e.g., such a scenario may lead to processing/identification difficulties at the PDCP layer in the WTRU).

In an example, separate security contexts may be utilized for different serving sites, and bearer identities may be layer-specific. For example, if separate security contexts are utilized accords the layers, a reconfiguration procedure (e.g., used to initially configure the secondary layer) may be performed while security is not active at secondary layer. If the secondary layer implements a separate security context (e.g., for one or more of the control plane and/or the user plane), configuration of the secondary layer may be performed when security has either not yet been started/activated (e.g., for an initial configuration of the secondary layer) and/or has failed (e.g., for a reconfiguration that moves one or more RBs to another layer). A layer-specific security mode command may be used to activate security at a secondary layer. For example, the security activation procedure may be performed and/or the security mode command may be sent for a given layer whenever the layer-specific Kenb is changed and/or when the NAS COUNT is changed.

Depending on the current load in the network and/or the amount of data to be transmitted to and/or from a WTRU, the WTRU may be configured with a primary layer and zero or more secondary layer(s). The WTRU may be configured with measurement information on a layer-specific basis and/or with cell-specific offsets in order to define a region of a cell. A WTRU may be configured with a measurement object (e.g., measObj). This measurement object may be cell-specific and/or layer-specific. The measurement object may be associated with one or more other event configurations (e.g., eventConfiguration), for example depending on the WTRU configuration. An event configuration may include one or more criterion that trigger one or more WTRU behaviors. For example, with respect to the measurement object, the WTRU may be configured with one or more event configurations (e.g., criteria) that establish conditions under which the WTRU is triggered to perform an action based on the WTRU measurements related to the measurement object. As an example, the measurement object may establish a measurement for a serving cell of the primary and/or secondary serving site, and the event configurations may indicate one or more thresholds and/or an offset amounts associated with the measurement object. If the concerned measurement is above a configured threshold, below a configured threshold, exceeds a given offset value, etc., the WTRU may be triggered to perform an event associated with the event configuration. The initial configuration of a secondary cell may include one or more associations between measurement objects for a cell of the secondary serving site and one or more event configurations that establish actions that the W TRU is to perform in the primary and/or secondary layer if the measurement meets specified criteria. The measurement object may be associated with one or more event configurations using a measurement identity (measId) that is used by the network to refer to a given measurement object or configuration.

For example, a measurement object for a given layer may be configured for a given serving cell of the layer. The even configurations may establish actions to be performed by the WTRU based on the quality of the serving cell becoming better than a first threshold (e.g., a condition that may trigger a first behavior), based on the quality of the serving cell becoming worse than a second threshold (e.g., a condition that may end the first behavior and/or that may trigger a second behavior), etc. One or more measurement objects and one or more event configurations may be used to define a cell range expansion (CRE) region. A CRE region may be established with respect to a macro cell (e.g., associated with a MeNB) and one or more small cells (e.g., associated with one or more SCeNBs). The CRE region of the MeNB may be associated with regions where the WTRU is with the coverage area of the MeNB and is also within the coverage of one or more small cells of the SCeNBs. While the WTRU is within the CRE, traffic from the macro cell may by offloaded to one or more of the small cells. The CRE may be defined based on measurements of cells in one or more layers. The WTRU may be configured to determine whether it is within a CRE based on the measurements of one or more small cells (e.g., whether serving cell quality is above a threshold, below a threshold, etc.) while it is still connected to the macro cell. WTRU behavior may be defined based on one or more of whether the WTRU is within coverage of the CRE region, whether the WTRU detects entering the CRE region (e.g., either from or towards the cell center), whether the WTRU detects leaving the CRE region (e.g., either from or towards the cell center), and/or the like.

Conditions detected at a first cell associated with a first serving site or layer may trigger certain WTRU behavior in a secondary serving site or layer. For example, if a neighbor cell in a different layer becomes better than a serving cell of a current layer (e.g., by a specified offset), the WTRU may be triggered to perform a first function and/or stop performing a second function. Similarly, if a neighbor cell in a different layer becomes worse than a serving cell of a current layer (e.g., by a specified offset), the WTRU may be triggered to perform a second function and/or to stop performing the first function.

The WTRU may be configured with one or more offset values (e.g., values by which a neighbor cell may be above or below a value of the current serving cell in order to trigger a behavior) and/or one or more absolute threshold values (e.g., specific levels at which a measurement triggers a given behavior). In terms of multi-layer operation, if certain criteria related to measurements performed on a cell associated with the primary layer and/or a cell associated with a secondary layer are met, the WTRU may perform one or more actions related to a specific layer (e.g., initiate decoding of control signaling in another cell/layer, activate a cell/layer, etc.). Thus, instead of (and/or in addition to) legacy measurement reporting triggers, a given measurement may trigger other behavior in other layers. For example, a WTRU configured with dual connectivity may be configured with a measurement in a first layer and may be triggered to perform actions related to the serving cell of a secondary layer (e.g., a measurement of a cell in the secondary layer) based on certain criteria regarding the measurement in the primary layer being met. For example, measurement criteria may be established to indicate that the WTRU is within the CRE region but that the quality of a secondary cell is decreasing (e.g., indicating that the WTRU is moving towards the edge of the small cell). Such measurement criteria may be used to trigger the WTRU to send a request for re-establishment of at least one bearer configured for use in the secondary layer.

In an example, the WTRU may be configured to attempt to determine whether it is within a CRE region but that the quality of the cell associated with the secondary layer is decreasing. For example, measurements may be configured such that if the WTRU detects that the quality of the secondary serving cell is falling below a threshold but is still within the CRE region (e.g., indicating that the WTRU moving towards the edge of the cell), the WTRU may be triggered to begin reception of control signaling in a different cell. For example, the different cell may be associated with a different SCeNB for which the WTRU has been preconfigured, but that had not been activated in the WTRU. The WTRU may begin attempting to receive the control signaling (e.g., RRC signaling) in the other cell in order to attempt to maintain session continuity during the activation/deactivation of different layer. For example, measurements may indicate that the WTRU is moving towards the edge of a small cell, and the WTRU may be triggered to initiate reception of control signaling in a macro cell. Since the macro cell may have a larger coverage area than the small cells, the WTRU may be more likely to receive the control signaling via the macro cell when moving to a cell edge of the small cell. The initiation of reception of control signaling in the macro cell may be performed in addition to and/or or after transmission of a measurement report to the network (e.g., through the current serving cell of the small cell layer).

Reconfiguration procedures may be utilized in order to configure one or more secondary cells for use. For example, an RRC connection reconfiguration procedure may be utilized by the WTRU to configure a secondary layer using control signaling exchanged with the primary layer. The configuration of the second set of cells that are associated with a secondary serving sit and/or secondary MAC instance (e.g., referred to as a secondary layer) may be performed as part of the RRC connection reconfiguration procedure. For example, the control signaling used to establish a configuration for one or more cells in a secondary layer may include an RRC Connection Reconfiguration message without the mobilityControlInfo information element (e.g., received via a cell of the primary layer). For example, the WTRU may receive an RRCConnectionReconfiguration message, for example via a transmission from a cell associated with the primary layer and/or over an SRB associated with the primary layer (e.g., in case of initial configuration for the small cell layer). In an example, if the secondary layer has already been established, the RRCConnectionReconfiguration message may be received on a transmission from a cell associated with a secondary layer and/or over an SRB associated with a secondary layer (e.g., reconfiguration of PHY/MAC parameters for the secondary layer; for addition, removal, re-association and/or moving of one or more RBs from one layer to the other, etc.).

In an example, rather than reusing the RRCConnection-Reconfiguration message for configuring a secondary layer, a new RRC message may be established for configuring a MAC instance associated with a secondary layer. For example, an RRCConnectionReconfigurationSecondary- Layer message may be defined for initially configuring and/or reconfiguring a secondary layer. If an RRCConnectionReconfiguration message is utilized, an indication may be included in the message that indicates that the reconfiguration is being performed in order to configure/reconfigure a secondary layer rather than or in addition to a primary layer. The configuration information for the secondary layer may be applicable to a second group of cells served by a serving site associated with the secondary layer (e.g., a SCeNB). The cells secondary layer may be scheduled independently of cells of other layers. The configuration for the secondary layer may include configuration information for a PCell and zero or more SCell(s). In an example, the cells of a given layer may be associated with the same Timing Advance Group.

Whether the reconfiguration message is used to initially configure the secondary layer and/or reconfigure the secondary layer, the reconfiguration message may include a one or more parameters that the WTRU may apply for operation in the secondary layer (e.g., the parameters may be in addition to existing parameters of such RRC message). For example, an RRCConnectionReconfiguration message used for configuring/reconfiguring a secondary layer may include a dedicated radio resource configuration for one or more serving cell(s) of the secondary layer (e.g., a radioResourceConfigDedicated IE for a cell of the secondary serving site). For example, the dedicated radio resource configuration may be for a PCell of the secondary layer. In an example, an RRCConnectionReconfiguration message used for configuring/reconfiguring a secondary layer may include an indication and/or a list of one or more secondary layers to be added (an/or to be modified (e.g., a sLayerCellToAddModList IE which may identify layers being added). In an example, an RRCConnectionReconfiguration message used for configuring/reconfiguring a secondary layer may include a list of one or more serving cell(s) to add (and/or to modify) corresponding to cell(s) of a secondary layer (e.g., a pCellToAddModList that indicates information for PCell(s) to add/modify and/or sCellToAddModList that indicates information for SCell(s) to add/modify). For example, for each layer indicated (e.g., via the sLayerCellToAddModList IE), a list of cells to add may be provided (e.g., via a pCellToAddModList and/or sCellToAddModList).

In an example, an RRCConnectionReconfiguration message used for configuring/reconfiguring a secondary layer may include one or more parameters for security key derivation. For example, the reconfiguration message may indicate whether new security keys are to be derived for use with a secondary layer and/or an indication of the method to be used to derive the security key. In an example, an RRCConnectionReconfiguration message used for configuring/reconfiguring a secondary layer may include an indication of a layer identity (e.g., a layer-identity IE, mac-instanceIdentity IE, etc.). The layer identity maybe used for deriving identities for one or more SRBs of the secondary layer (e.g., for purpose of security input such as a BEARER parameter). For example, for a given SRB, the value provided by RRC to lower layers to derive the 5-bit BEARER parameter used as input for ciphering and for integrity protection may be the value of the corresponding srb-Identity+2*layer-identity, for example with the MSBs padded with zeroes. As an example, the primary layer may be allocated the identity 0. The identity of secondary layer may be implicitly derived based on the configuration sequence. In an example, an RRCConnectionReconfiguration message used for configuring/reconfiguring a secondary layer may include an indication of one or more associated RBs (e.g., one or more DRB(s)

and/or SRB(s)) that are being associated with the secondary layer. If bearers may be split across different layers, the RRCConnectionReconfiguration message used for configuring/reconfiguring a secondary layer may include a service access point identity associated with a secondary layer (e.g., such an indication may also be provided even if the bearers are specific to a given layer).

Upon reception of the RRCConnectionReconfiguration message, the WTRU may perform various functions, for example based on the contents of the reconfiguration message. For example, the WTRU may add a first cell for a secondary layer, add an additional cell to a secondary layer, remove a cell from a secondary layer, etc. As an example, if the reconfiguration message indicates the addition of one or more secondary layers and/or one or more cells of a secondary layer, the WTRU may perform an initial configuration of a cell for a secondary layer. As an example if the cell to be added is the first cell being configured and added for a given secondary layer, the WTRU may create a secondary MAC instance, for example using a mac-MainConfig IE provided in the radioResourceConfigDedicated IE that may be included in the reconfiguration message. The WTRU may associate the newly created secondary MAC instance with an identity. For example, an explicit indication of the identity may be provided in the reconfiguration message and/or may be implicitly created based on incrementing a counter of the instantiated (e.g., configured) MAC instances. The WTRU may configure a physical layer (e.g. possibly using a separate transceiver chain) associated with the secondary MAC instance. For example, parameters for the physical layer may be include in the radioResourceConfigDedicated IE included in the configuration applicable to the MAC instance (e.g., physicalConfigDedicated). The WTRU may implicitly consider the first cell configured for use in the newly created layer to be a PCell for the secondary layer. The WTRU may synchronize to the downlink of the configured cell for the newly added layer (e.g., if the cell is configured as a PCell of the concerned layer). If the cell being added is not the first cell being configured for the secondary layer, the WTRU may apply any configurations received for the cell to the existing MAC instance, and may refrain from creating a new MAC instance.

The reconfiguration message may be used to remove or delete a cell from a secondary layer. For example, if the reconfiguration indicates that a cell should be removed, the WTRU may remove the indicated cell(s) and update the MAC instance configuration. If a secondary MAC instance is configured with zero cells following the completion of the processing of the reconfiguration message (e.g., each of the cells for the layer have been removed), the WTRU may remove the corresponding secondary MAC instance from its configuration.

In an example, the use of the RRC connection reconfiguration message without the mobilityControlInfo IE may be associated with modifying an existing connection for a secondary layer, but not for adding a new layer (e.g., the use of the reconfiguration message without the mobilityControlInfo IE occurs when the WTRU is already configured for dual connectivity and one or more secondary layers are being modified). For example, if the WTRU has not previously received an initial configuration for a secondary layer in a RRC connection reconfiguration message that includes the mobilityControlInfo IE, the WTRU may determine to discard the RRC configuration included in a reconfiguration message without the mobilityControlInfo IE that is applicable to a layer that was not previously configured.

For example, the configuration of a secondary layer may be established based on an RRC Connection reconfiguration procedure that includes the mobilityControlInfo IE. The configuration of the second set of cells and/or secondary MAC instance (e.g., the secondary layer) may be performed as part of the RRC connection reconfiguration procedure. The RRC connection reconfiguration message including the mobilityControlInfo information element may be referred to as a handover command. If a handover command is the type of signaling used to add a secondary layer (e.g., and a an RRC connection reconfiguration message without the mobilityControlInfo IE is used to modify existing layer configurations), then the WTRU may perform one or more of the actions described herein for adding a new layer upon receipt of the handover command (e.g., addition of PCell to the new layer, creation of secondary MAC instance, associate the secondary MAC instance with an identity, configure the physical layer, synchronize to a PCell of the new layer, etc.). Additionally, if a handover command is the type of signaling used to add a secondary layer (e.g., and a an RRC connection reconfiguration message without the mobilityControlInfo IE is used to modify existing layer configurations), then the handover command may include one or more of the configuration parameters described herein for adding a new layer (e.g., a dedicated radio resource configuration for a cell of the new layer, a list of one or more layers to add, a list of one or more serving cells for the layer, a parameter for security key derivation, a layer identity, an indication of associated RBs, etc.).

The WTRU may receive an indication that the reconfiguration procedure including the handover command is for addition of a layer. The WTRU may maintain its configuration information for the currently configured serving cells if the handover command is adding a new layer. The indication that the handover command is being used to add a layer may explicitly indicate which other layers the WTRU should maintain its current configuration for.

If the WTRU fails to reconfigure a primary layer during a reconfiguration procedure, the WTRU may release and clear any configuration corresponding to both the primary layer and one or more secondary layers. The WTRU may perform reconfiguration failure handling as per legacy procedures, for example, by reselecting to a different cell, initiating a reestablishment procedure, moving to IDLE mode, and/or the like.

Upon successfully completing the RRC procedure that is used to initially configure the secondary layer and/or upon successfully completing the RRC procedure that reconfigures one or more secondary layers, the WTRU may autonomously trigger RACH reconfiguration, may monitor for a RACH order after the reconfiguration and after an activation time, and/or activate one or more cells via RACH.

For example, the WTRU may be configured to autonomously trigger RACH reconfiguration upon successfully adding and/or reconfiguring a secondary layer. The WTRU may initiate a RACH procedure for the secondary layer. In an example, the UE may receive an indication in the reconfiguration message for the layer that a RACH procedure should be performed. In an example, the RACH procedure may be performed if the WTRU receives the reconfiguration message configuring the new layer using resources of the primary layer (e.g., from MeNB), but not if the reconfiguration is performed via the secondary layer. The RACH procedure may be performed using a dedicated PRACH configuration provided in the reconfiguration procedure (e.g., in the handover command or other reconfiguration message). In an example, the presence of a PRACH configuration in the reconfiguration message may be an indication that the WTRU is to initiate the RACH procedure upon completion of the reconfiguration procedure. The RACH procedure may be performed using uplink resources of a serving cell of the newly added or reconfigured secondary layer. The RACH procedure may be performed via a PCell of the secondary layer. The RACH procedure may be performed on an SCell of the secondary layer. Which cell of the newly added/reconfigured layer should be used for the RACH procedure may be indicated in the reconfiguration message. The TAT associated with the serving cell on which the RACH procedure is to be performed may be considered to be stopped or not running following the reconfiguration procedure.

In an example, the WTRU may monitor for a RACH order after the reconfiguration procedure and/or after an activation time for the secondary layer. For example, the WTRU may begin monitoring for a RACH order on a PDCCH for a serving cell of the secondary layer upon the completion of the reconfiguration procedure adding and/or modifying a secondary layer. The WTRU may begin monitoring the PDCCH after a configured and/or predefined activation time. The serving cell to be monitored for the RACH order may be a PCell of the newly created/reconfigured secondary layer and/or may be a SCell of the newly created/reconfigured secondary layer. Which cell of the newly added/reconfigured layer should be monitored for the RACH order may be indicated in the reconfiguration message. The TAT associated with the serving cell on which the RACH procedure is to be performed (e.g., over which the RACH order is received) may be considered to be stopped or not running following the reconfiguration procedure.

In an example, the cells of a newly created/reconfigured layer may be considered to be initially deactivated. Upon activation of the layer, the WTRU may be configured to perform a RACH procedure on a cell of the layer being activated. For example, the WTRU may determine to associate a deactivated state to each of the cells of a newly added/reconfigured layer. In an example, the Scells of the layer may be initially deactivated, but the PCell of the layer may be consider activated upon receiving the configuration for the layer. Reception of control signaling that activates a cell of a newly added/reconfigured layer may trigger the WTRU to perform a RACH procedure and/or begin PDCCH monitoring of a cell of the newly added/reconfigured layer. For example, the reception of control signaling (e.g., from the MeNB) that activates one or more cell(s) of a secondary layer (e.g. that is received while all cell(s) of the secondary layer are in deactivated state) may trigger the WTRU to perform a RACH procedure and/or begin monitoring the PDCCH for a cell of the layer being activated.

The WTRU may be configured to transmit and/or receive RRC signaling from independent eNBs and/or independent RRC entities within the network. For example, according to LTE Release 11 procedures, when an RRC procedure is initiated, the WTRU may be allowed as maximum time allowed to complete the RRC procedure. For example, typical values for the maximum amount of time the WTRU may take to complete the RRC procedure may be in the range of 15 ms to 20 ms, depending on the RRC procedure. RRC also supports back-to-back reception of RRC messages, for example when an RRC message that initiates a second procedure is received while a first RRC procedure is ongoing and not yet completed. In such a case, the WTRU may process the RRC messages sequentially. When the WTRU has connectivity to a single eNB, the network may ensure proper coordination of the RRC signaling such that WTRU processing and timing requirements are minimized.

When the same eNB sends both messages, the eNB may be able to determine the total delay for the combination of RRC procedures. The delay may be determined independently of how many RRC messages the eNB sends to the WTRU. In this scenario there may be no timing uncertainty at the eNB and synchronization may be entirely controlled by the eNB.

When dual connectivity is configured (e.g., the WTRU is connected to and/or attempting to connect to multiple layers), there may conflicts in cases where eNBs are not entirely coordinated. For example, the WTRU may receive control signaling from multiple eNBs that each initiate a respective RRC procedure. The received control signaling may be sent over different transmission paths (e.g., the Uu of the MeNB and the Uu of the SCeNB). For example, the path utilized for sending the RRC messages may depend on whether the signaling is applicable to the WTRU configuration for the MeNB or for the SCeNB. In such a case, there is a higher probability that the WTRU may receive a RRC message that triggers a second RRC procedure (e.g., with the SCeNB) while the WTRU already has an ongoing RRC procedure (e.g., with the MeNB) (or vice-versa).

When the WTRU receives RRC messages from different eNBs (e.g., a SCeNB and a MeNB) it may be challenging for a second eNB to ensure synchronization and the completion of the procedure with the WTRU. For example, it may be difficulty to determine the delay before the completion of the procedure, as the WTRU may already be performing another RRC procedure initiated by a first eNB. The second eNB may be unaware of the other RRC procedure that the WTRU is performing. In addition, it may be difficult for a WTRU to perform RRC procedures in parallel (e.g., instead of sequentially), for example if there is a dependency (or interaction) between the two RRC procedures. For example, issues may arise in one or more of the conflicting procedures, regarding synchronization, timing uncertainty, additional delay, etc.

For example, there may be colliding RRC PDU reception by the WTRU for the different RRC procedures. In an example, the WTRU may be configured to prioritize one or the RRC procedures that may be associated with a first layer over another RRC procedure that may be associated with a second layer. For example, the WTRU may handle the reception of a plurality of RRC PDUs in the same subframe (or within processing windows that may overlap) by associating a priority to each message. The priority may be assigned according to predefined rules, for example such that the WTRU may sequentially perform the associated procedures in order of increasing priority. For example, the priority assigned to a given RRC procedure and/or a given RRC message may be based on the identity of the layer that the RRC PDU is associated with (e.g., the primary layer/MeNB may have higher priority than a secondary layer/SCeNB), the identity of the SRB that the WTRU receives the RRC PDU over (e.g., SRB0, SRB1, SRB2 may have higher priority than SRB3), the type of procedure the RRC PDU is associated with (e.g., a mobility event such as a handover command may have a higher priority than a reconfiguration procedure), and/or the like.

In an example, in the case of colliding RRC PDU reception, the WTRU may be configured to prioritize an RRC PDU that synchronizes based on a delay requirement. For example, the WTRU may assign a lower priority to a RRC PDU associated with a procedure whose completion may trigger a RACH procedure. The timing of the procedure with higher priority may be maintained, while the second procedure may still be performed without introducing timing uncertainty given that the RACH procedure that is performed after completion of the lower priority RRC procedure may synchronize the WTRU and the network.

In an example, upon reception of an RRC PDU while another RRC procedure is ongoing, the WTRU may be configured to prioritize one of the procedures and suspend/abort the other RRC procedure. For example, the WTRU may suspend or abort an ongoing procedure based on receiving an RRC message that is determined to be of a higher priority. For example, the WTRU may determine that two received RRC PDUs and/or an ongoing procedure and a received RRC PDU conflict, in which case the WTRU may initiate RRC procedure failure logic for the RRC PDU and/or procedure with lowest priority. In an example, the WTRU may suspend a procedure whose completion may result in a RACH procedure in the case of such a conflict.

For example, two or more RRC PDUs may be received concurrently or nearly concurrently. As an example, the WTRU may receive multiple RRC PDU(s) in the same subframe and/or within a certain amount of time. A first RRC PDU may be associated with a procedure applicable to a first eNB/layer and a second RRC PDU may be associated with a procedure applicable to a second eNB/layer. In the case of such a conflict, the WTRU may perform parallel processing of the RRC procedures, sequential processing of the RRC procedures, and/or may drop or perform a failure procedure for one or more of the RRC procedures.

For example, the WTRU may process both messages such that RRC procedures may be performed in parallel. For example, the WTRU may determine to perform the RRC procedures in parallel if the RRC procedures are independent from each other. For example, the WTRU may determine that both procedures reconfigure different RRC aspects (e.g., different parameters, different RBs, different MAC instances, different transceiver components, and/or independent combinations thereof) and that the reconfigurations are not conflicting with each other. The WTRU may perform the RRC procedures in parallel based on determining that both procedures are independent in nature (e.g. a measurement configuration and a reconfiguration of dedicated resources). For example, the WTRU may determine that the processing requirement (e.g., in terms of maximum delay) to complete the procedure(s) are the same as for the case where each procedure would have been performed separately. Otherwise, the WTRU may be configured to perform synchronization with the network (e.g., by performing a RACH procedure). For example, if timing uncertainty is introduced for both the MeNB and SCeNB for an RRC procedure due to the configuration of dual connectivity, the WTRU may be configured to perform a RACH procedure for one or more RRC procedures that modify the corresponding physical layer parameters of the WTRU and/or for each of the reconfigured physical layers.

In an example, the WTRU may be configured to perform sequential processing of two or more RRC procedures. The WTRU may process the received messages in sequence, such that RRC procedures are performed sequentially. For example, the WTRU may determine to perform the RRC procedures sequentially based on determining that both RRC procedures are independent from each other. The WTRU may determine which procedure to prioritize (e.g., to perform first) based on one or more of the identity of the eNB associated with the RRC procedure, an identity of the SRB associated with the RRC procedure, the type of RRC PDU that is received, the type of RRC procedure, and/or the like.

For example, the WTRU may determine which RRC procedure to prioritize/perform first as a function of the identity of eNB (and/or layer/Uu interface) associated with the RRC procedure. For example, the WTRU may prioritize the processing of a RRC PDU associated with a MeNB over that of an SCeNB.

For example, the WTRU may determine which RRC procedure to prioritize/perform first as a function of the identity of the SRB associated with the procedure. For example, the WTRU may determine that the SRB over which the RRC PDU is received is the same or different as that of the RRC PDU that initiated an ongoing procedure. In an example, if the set of SRB(s) used for a first eNB and for a second eNB are different, than certain SRBs may be prioritized over other SRBs. For example, if the SRBs for a given WTRU shared the same identity space across the different layers/MAC instances, then the WTRU may determine which procedure to prioritize directly based on the identity of the SRBs for the procedures. Otherwise, if the SRBs for a first layer are different than that of a second layer, then the WTRU may determine which RRC procedure to prioritize based on association(s) between an SRB identity and an eNB (e.g., the WTRU may have SRB0, 1, and/or 2 for each eNB and the priority may be based first on the SRB identity and in case of the same SRB identity based on the layer identity). For example, the WTRU may prioritize the processing of a RRC PDU associated with SRB0, SRB1, and/or SRB2 over a RRC PDU associated with SRB3.

The WTRU may determine which RRC procedure to prioritize/perform first as a function of the multiplexing method used for reception of RRC PDUs associated with the WTRU configuration for different eNBs. For example, the WTRU may determine the priority associated with a given RRC procedure based on the function that enables multiplexing of RRC PDUs (or information elements in the PDU) pertaining to the configuration for different eNBs. For example, the identity of the Uu interface that was used for the transport of the RRC PDU may be used to establish a priority. The RRC PDU format (e.g., such as an indication received in the RRC PDU and/or the type of information element(s) included in the RRC PDU) may be used to establish an RRC priority. The identity of the subframe in which the WTRU received an RRC PDU may be used to determine a priority for handling RRC procedures (e.g., in case the downlink of the WTRU is time-multiplexed between the eNBs).

The WTRU may determine which RRC procedure to prioritize/perform first as a function of the type of RRC PDU received. For example, the WTRU may determine the priority associated with a given RRC PDU as a function of whether the RRC PDU initiates a new RRC procedure or is a PDU for an ongoing procedure. The WTRU may be configured to prioritize an RRC PDU for an ongoing procedure over an RRC PDU that initiates a new RRC procedure. In an example, if RRC PDUs applicable to WTRU configurations for either eNB/layer may be received on either of the transport paths (e.g., RRC PDUs for RC procedures associated with different layers may be received on the same transport path), then ongoing procedures may be prioritized over newly initiated procedures. For example, the WTRU may prioritize a RRC PDU associated with an ongoing procedure over a RRC PDU that initiates a new procedure.

The WTRU may determine which RRC procedure to prioritize/perform first as a function of the type of procedure associated with the received RRC PDU(s). For example, the WTRU may determine the priority associated with a RRC PDU based on the type of RRC procedure that the RRC PDU is associated with. For example, a WTRU may prioritize a RRC PDU associated with a mobility event or to a security event over an RRC PDU associated with a reconfiguration of a secondary layer.

The WTRU may be configured to drop and/or initiate a failure procedure for an RRC procedure that conflicts with another RRC procedure of higher priority. For example, the WTRU may determine that a second RRC PDU should be ignored and/or that the WTRU should proceed to failure logic for an RRC procedure associated with the second RRC PDU based on determining that another RRC procedure invalidates and/or conflicts with the RRC procedure associated with the second RRC PDU and that the other RRC procedure has a higher priority than the RRC procedure associated with the second RRC PDU. For example, the WTRU may drop an RRC PDU or initiate failure logical for an RRC procedure associated with the RRC PDU based on determining that the procedures are dependent on each other. For example, the WTRU may receive an RRC reconfiguration message with the mobilityControlInfo IE (e.g., a handover command) that instructs the WTRU to remove the configuration associated with an SCeNB and to perform a handover to another cell for the RRC Connection. The WTRU may also receive an RRC reconfiguration message that is meant to reconfigure the SCeNB (e.g., such as the physical layer configuration of the SCeNB). In such a case, the WTRU may process and perform the mobility procedure (e.g., associated with the handover command) and determine that the reconfiguration procedure for the SCeNB is invalid. In an example, the WTRU may transmit a message indicating the failure to perform the second procedure, and the message may include an indication of the cause of the failure (e.g., "override by MeNB").

A similar priority based rules may be applicable in the WTRU for WTRU-initiated RRC procedures. For example, when the WTRU determines that more than one RRC procedures should be triggered within a certain predetermined period of time, the WTRU may utilize the priority rules for determining how to handle conflicts for the two or more WTRU initiated RRC procedures.

In an example, a WTRU may be configured to receive one or more RRC PDU(s) for an RRC procedure while another RRC procedure is ongoing. For example, the ongoing RRC procedure may be applicable to a first eNB/layer and the received RRC PDU(s) may be associated with a procedure applicable to a second eNB/layer. In such a case, similar rules may be defined performing parallel processing of the RRC procedures, sequential processing of the RRC procedures, and/or dropping or performing a failure procedure for one or more of the RRC procedures as was the case when two or more RRC PDUs are received concurrently or near concurrently.

For example, the WTRU may process the received RRC PDU applicable to a configuration for the second eNB/layer such that the second RRC procedure is performed in parallel to the ongoing RRC procedure. For example, the WTRU may determine to perform the RRC procedures in parallel if the RRC procedures are independent from each other. For example, the WTRU may determine that both procedures reconfigure different RRC aspects (e.g., different parameters, different RBs, different MAC instances, different transceiver components, and/or independent combinations thereof) and that the reconfigurations are not conflicting with each other. The WTRU may perform the RRC procedures in parallel based on determining that both procedures are independent in nature (e.g. a measurement configuration and a reconfiguration of dedicated resources). For example, the WTRU may determine that the processing requirement (e.g., in terms of maximum delay) to complete the procedure(s) are the same as for the case where each procedure would have been performed separately. Otherwise, the WTRU may be configured to perform synchronization with the network (e.g., by performing a RACH procedure). For example, if timing uncertainty is introduced for both the MeNB and SCeNB for an RRC procedure due to the configuration of dual connectivity, the WTRU may be configured to perform a RACH procedure for one or more RRC procedures that modify the corresponding physical layer parameters of the WTRU and/or for each of the reconfigured physical layers.

In an example, the WTRU may be configured to process the second message once the ongoing procedure has completed, such that RRC procedures are performed sequentially. For example, the WTRU may determine to perform the RRC procedures sequentially based on determining that both RRC procedures are independent from each other. In an example, the WTRU may determine that the ongoing procedure should be suspended such that the other RRC PDU should be prioritized based on one or more of the identity of the eNB(s) associated with the RRC procedures, an identity of the SRB associated with the RRC procedure, the type of RRC PDU that is received, the type of RRC procedure, and/or the like.

For example, the WTRU may determine which RRC procedure to prioritize/perform first as a function of the identity of eNB (and/or layer/Uu interface) associated with the RRC procedure. For example, the WTRU may prioritize a procedure associated with a MeNB over that of an SCeNB. For example, the WTRU may suspend (or stop, or complete with a failure) the ongoing procedure in favor of initiating a new procedure if the new procedure is for the MeNB/primary layer and the ongoing procedure is for the SCeNB/secondary layer.

For example, the WTRU may determine which RRC procedure to prioritize/perform first as a function of the identity of the SRB associated with the procedure. The WTRU may determine that the SRB for which the RRC PDU is received is of higher priority that that associated with the RRC PDU that initiated the ongoing procedure. For example, the WTRU may prioritize the processing of a RRC PDU associated with SRB0, SRB1, or SRB2 over an RRC procedure initiated from a RRC PDU associated with SRB3.

The WTRU may determine which RRC procedure to prioritize/perform first as a function of the type of procedure associated with the received RRC PDU(s) and the ongoing RRC procedure. For example, the WTRU may prioritize an RRC PDU associated with a mobility event or to a security event over the completion of an ongoing procedure associated with a reconfiguration of a secondary layer.

The WTRU may be configured to drop and/or initiate a failure procedure for an ongoing RRC procedure that conflicts with a RRC PDU that received and determined to have a higher priority. The WTRU may be configured to ignore an RRC PDU associated with a lower priority if a higher priority RRC procedure is ongoing. For example, the WTRU may determine that a second RRC PDU should be ignored and/or that the WTRU should proceed to failure logic for an RRC procedure associated with the second RRC PDU based on determining that another RRC procedure invalidates and/or conflicts with the RRC procedure associated with the second RRC PDU and that the other RRC procedure has a higher priority than the RRC procedure associated with the second RRC PDU. For example, the WTRU may drop an RRC PDU or initiate failure logical for an RRC procedure associated with the RRC PDU based on determining that the procedures are dependent on each other. For example, the WTRU may have an ongoing mobility procedure based on receiving an RRC reconfiguration message with the mobilityControlInfo IE (e.g., a handover command) that instructs the WTRU to remove the configuration associated with an SCeNB and to perform a handover to another cell for the RRC Connection. In such a case, the WTRU may process and perform the mobility procedure (e.g., associated with the handover command) and determine that the reconfiguration procedure for the SCeNB is invalid. In an example, the WTRU may transmit a message indicating the failure to perform the second procedure, and the message may include an indication of the cause of the failure (e.g., "override by MeNB").

In an example, the WTRU may suspend an ongoing RRC procedure if the ongoing procedure conflicts with an RRC PDU received for another layer and completion of the ongoing RRC procedure would result in a synchronization event with the concerned eNB (e.g., completion of the RRC procedure would result in a RACH procedure).

The WTRU may be configured to perform one or more actions upon reconfiguration failure for a secondary layer and/or upon determining to initiate a reconfiguration failure procedure (e.g., due to conflicts between multiple RRC procedures). The WTRU may determine that a reconfiguration of a given layer has failed based on one or more of failure to interpret and/or decode a reconfiguration message, failure to successfully apply a configuration provided during a reconfiguration procedure, failure to successfully perform random access using new configuration, determining a received configuration exceeds the capabilities of the WTRU (e.g., a received configuration cannot be applied based on WTRU capabilities), detection of conflicting control plane signaling, detecting RLF, and/or the like. If the WTRU determines that it was unsuccessful in configuring one or more (or all) serving cell(s) for a secondary layer and/or MAC instance, the WTRU may perform various actions. For example, if the WTRU determines that an RRC connection reconfiguration procedure has failed, the WTRU may revert to a previous configuration for the secondary layer (e.g., if the case the reconfiguration had failed for the secondary layer and/or a single layer). In an example, the WTRU may return to the primary layer and stop utilizing configurations for secondary layers (e.g., in the case of mobility failure for all secondary layers). The WTRU may initiate a RRC Connection Re-establishment procedure in the primary layer, for example to re-establish radio bearers (e.g., DRBs, perhaps DRBs and not SRBs) associated with the secondary layer for which the reconfiguration had failed. For example, the WTRU may perform a re-establishment procedure for all DRBs associated with a secondary layer for which a reconfiguration failure occurred and/or for the specific DRBs of the secondary layer that were the subject of the failed reconfiguration procedure. As an example, the WTRU may send an indication of why the reconfiguration failure occurred to the network. For example, if the reconfiguration failure occurred because it conflicted with another RRC procedure being implemented by the WTRU (e.g., for another layer), the WTRU may indicate that a conflict has occurred, for example by indicating the cause as "WTRU capabilities exceeded" or some similar/other cause. The WTRU may initiate the transmission of a measurement report to the macro layer upon determining a reconfiguration procedure for a secondary layer has failed. For example, the report may include one or more measurement results for the layer that failed reconfiguration. As an example, the WTRU may determine that the WTRU failed to configure a secondary layer if the WTRU fails to successfully apply a configuration for the PCell of the secondary layer. For example, the WTRU may determine that it has failed to successfully synchronize with the PCell and/or if it has failed to successfully perform random access on the PCell. Such failures may cause the WTRU to consider the reconfiguration to be a failure.

The WTRU may be configured to perform an RRC connection re-establishment procedure, for example based on the failure to successfully reconfigure one or more layers. The following examples may be used for an RRC Connection (or secondary layer) Re-establishment Procedure. For example, the WTRU may determine that some or all serving cells of a secondary layer (e.g., the PCell of a secondary layer) are experiencing radio link problems. The WTRU may detect a failure conditions that may indicate that transmissions for the DRBs of a secondary layer will be unsuccessful or no longer possible. For example, if DRBs are exclusively associated with a secondary layer, and one or more cells of the secondary layer are experiencing radio link problems (e.g., RLF has been declared), the WTRU may determine that is will be unable to communicate using the bearers. As an example, a re-establishment procedure may be performed for DRBs for which the QoS may no longer be met, but not for DRBs for which the QoS can still be met. RRC re-establishment may be performed for SRBs (e.g., SRB3). For example, a re-establishment procedure may be performed for an SRB associated with a secondary layer if the re-establishment procedure indicates that a secondary layer is still used for the concerned RBs after the completion of the procedure. The re-establishment procedure may be when a primary layer (e.g., the PCell of a primary layer) is experiencing radio link failure and/or when a secondary layer (e.g., the PCell of a secondary layer) is experiencing radio link failure.

For example, the WTRU may determine that a re-establishment procedure should be performed for a given layer based on detecting one or more failure conditions. Examples of failure conditions may include one or more of DL RLF, UL RLF, handover failure for a secondary layer, security failure (e.g., integrity verification failure), an indication from lower layer (e.g., MAC) that a configuration and/or reconfiguration procedure has failed, a reconfiguration failure that associated with a reconfiguration of a secondary layer, and/or other failure situations. In case of failure conditions being detected for a given layer, the WTRU may attempt to initiate a re-establishment request in a cell of a layer that is not in a failure condition. For example, the re-establishment may be to a cell of a layer has been configured for use by the WTRU, but that may be in a deactivated/idle state. In an example, the WTRU may attempt to perform re-establishment in a configured and active layer that is different than the layer in which the failure was detected. For example, if the cell used for the re-establishment procedure was previously inactive, the WTRU may first resume normal operation and/or activate the concerned cell. For example, the inactive layer may be a cell (e.g., the PCell) of the primary layer. In an example, a re-establishment request may be initiated to a secondary layer cell.

For example, upon detecting a failure in a cell of a given layer (e.g., a secondary layer), the WTRU may initiate a re-establishment procedure, for example in a cell of the primary layer and/or the cell of a different secondary layer. The WTRU may suspend one or more DRBs associated with the layer for which the re-establishment is being performed (e.g., DRBs associated with a failed secondary layer). In an example, the WTRU may release all cells of the layer for which the re-establishment is being performed. The WTRU may reset (e.g., and/or tear down) the MAC instance that corresponds to the layer for which the re-establishment is being performed. For example, the WTRU may initiate the transmission of an RRC message (e.g., an RRC connection re-establishment (or similar) message that indicates a "layer failure"), which may include the identity of the layer for which the re-establishment is being performed (e.g., in reestablishmentCause). If the re-establishment procedure was triggered based on an event configuration, the WTRU may include a measID and/or an indication of "decreasing quality" and/or "insufficient quality." If the WTRU performs the re-establishment via a layer that is in a deactivated/idle state, the WTRU may include an identity, for example such as a WTRU identity and/or a context identity. For example, the identity may be a value assigned to the WTRU in the configuration of the layer for which the re-establishment is being performed and/or the layer over which the re-estab-lishment procedure is being performed. As an example, the identity may be a C-RNTI assigned to the WTRU in the configuration of the layer for which the re-establishment is being performed and/or the layer over which the re-estab-lishment procedure is being performed.

The WTRU may receive an RRC Connection Reconfigu-ration message. The reconfiguration messages may re-asso-ciate one or more DRBs to a layer where a failure condition was not detected (e.g., to the primary layer). The WTRU may tear down and/or remove the configuration for a MAC instance that corresponds to the layer that failed. In an example, the reconfiguration message may re-associate the DRBs of the failed layer (e.g., and/or SRBs) to a new secondary layer and/or to the primary layer. The WTRU may reuse the MAC instance that corresponds to the layer that failed for a new secondary layer and/or may instantiate a new MAC instance for the newly configured secondary layer. Whether a primary layer or a secondary layer is to be used for the re-association of the RBs may be indicated using a layer identity that is included in the reconfiguration message.

If the WTRU is configured to perform a reconfiguration (e.g., based on performing layer reestablishment, based on occurrence of a mobility event, based on activation/deacti-vation of a layer, etc.), the WTRU may re-establish PDCP for the DRBs associated with the layer being reconfigured (and/or for the SRBs of the layer being reconfigured). For example, if the PDCP instance is WTRU-specific (e.g., such as in an architecture in which the receiving/transmitting PDCP entities are changed upon mobility event in the primary layer, but not upon mobility event associated with the secondary layer(s)), the WTRU may re-establish PDCP by performing a subset of the PDCP re-establishment pro-cedure that would be performed if the primary layer was to be re-established. For example, the WTRU may skip PDCP re-establishment, meaning that the WTRU may continue the header compression protocol without resetting it, may main-tain the security context and/or may continue the sequencing information unaffected. In an example, the WTRU may transmit a PDCP status report in the uplink, if configured. The WTRU may re-establish RLC for the concerned DRBs (and/or SRBs, if applicable).

Upon successful completion of a reconfiguration proce-dure based on the failure of a secondary layer, the WTRU may determine that the re-establishment of the DRBs for the layer that failed was successful. The WTRU may resume using any suspended RBs for the layer that failed, for example on a different layer as set by the reconfiguration procedure. The WTRU may include a status report indicat-ing user plane data that has yet to be successfully transmit-ted/received once it resumes the DRBs that were reconfig-ured. The WTRU may perform a re-establishment request for DRBs of a secondary layer if it determines uplink radio link failure. In an example, re-establishment for DRBs of a secondary layer may be performed for the PCell of a secondary layer, but not for SCells of a secondary layer.

As the different serving sites are able to provide access and services to a WTRU relatively independently of each other, WTRU behavior within such an architecture may be different that WTRU behavior in a single data path archi-tecture. For example, a WTRU may be connect to a first, primary serving site (MeNB). The WTRU may establish an RRC connection with the primary serving site in a manner similar to Release 11. During the connection process, the WTRU may send an indication to the network that indicates that the WTRU supports multi-serving site connectivity. Based on receiving the indication, the network may precon-figure the WTRU to access one or more secondary serving sites. For example, the primary serving site may send an RRC Connection Reconfiguration message to the WTRU. The RRC Connection Reconfiguration message may include an indication that the reconfiguration is to add additional MAC instances and/or to add additional transmission layers.

The WTRU may store the configuration information for one or more layers. However, although the received con-figuration(s) may be valid, the actual connections between the WTRU and the preconfigured serving sites may be deactivated. The configuration information stored by the WTRU may be stored and/or remain valid until the WTRU receives a message that removes, changes, and/or releases the configuration. In an example, stored configuration infor-mation may be valid for a set period of time, and an indication of the period of time may be part of the configu-ration. The WTRU may be considered valid until a specified event occurs (e.g., until cell re-selection occurs in a primary layer). For example, the stored configuration information may be considered valid until a mobility event occurs (e.g., the WTRU moves to a different PLMN, a different tracking area, etc.).

The configuration of a primary layer may be valid for different periods of time than a configuration of a secondary layer. For example, an event may trigger the WTRU to disregard the configuration of the secondary layer, but not the primary layer (or vice versa). A network may "pre-configured" or "prepare" a WTRU with configuration infor-mation for one or more layers (e.g., a primary layer, a secondary layer, etc.) without activating the one or more layers. The network may then send signaling to the WTRU to indicate that the WTRU should activate one or more preconfigured layers. The WTRU may prioritize a configu-ration of a first layer over a configuration of a second layer. For example, the WTRU may prioritize the configuration of the primary layer (e.g., which may correspond to a macro layer and/or be served by a MeNB) for functions such as connection re-establishment and/or mobility if another layer fails (e.g., a secondary layer).

The configuration information for multiple layers may configure the WTRU to utilize a plurality of MAC instances. Depending on the circumstances under which the WTRU is attempting to access the different serving sites, the WTRU may be configured to maintain a different number of activate serving sites at any given instance in time. For example, the WTRU may have a single MAC instance (or layer) active at any given time. A configuration where a single MAC instance (or layer) is active at any given time may be referred to as single MAC connectivity. The WTRU may maintain a single active layer, for example which ever layer provides the best connectivity at a given time instance. For example, small cell layers may be used to achieve through-put gains and/or may be used to offload traffic from a macro layer. If the small cell layers are being used for macro layer offload, then the WTRU may deactivate the primary layer after activating and accessing a secondary layer.

For example, as noted above the WTRU may first connect the macro layer. After receiving preconfiguration informa-tion for one or more potential secondary layers, the WTRU may activate a secondary layer and begin accessing the secondary serving site. The WTRU may then deactivate the connection to the primary serving site while maintaining the connection to the secondary serving site. In this manner, the WTRU may effectively be offloaded from the macro layer while maintaining continuous service in the small cell layer.

In an example, if the primary layer is inactive and/or is not used for transmission and/or reception of data, the configu-ration/context for the primary layer may be stored in the WTRU, but the WTRU may refrain from utilizing the configuration/context for the primary layer for transmis-sions. The primary layer configuration and/or configurations associated with serving cells for the primary layer may be considered as idle or as deactivated but may be kept in memory for subsequent reactivation and use. The WTRU may receive control signaling that deactivates one or more layers and/or activates one or more layers. In an example, the deactivation of a certain layer may trigger the WTRU to activate a different layer.

During the period when the macro layer is deactivated, the WTRU may continue to monitor the macro layer serving site. For example, mobility related procedures and/or the WTRU RRC connection may be associated with the WTRU connection to the primary serving site. Offloaded data trans-fer may be performed via the one or more active secondary serving sites. To ensure the WTRU is still able to access the macro serving site in case the macro layer is reactivated (e.g., to perform a mobility or other control procedure, to send and/or receive data, etc.), the WTRU may continue to measure the macro serving site (e.g., MeNB). The WTRU may perform the monitoring based on one or more triggers. For example, the determination to perform measurements on the macro serving site (e.g., and/or on one or more other deactivated layers) may be based on one or more triggers. The triggers for performing such measurements are described in more detail below. Similarly, the trigger(s) to send a measurement report including information related to the quality measurements performed on the WTRU may be defined. The trigger(s) for sending a measurement report may be the same or different than the trigger(s) for perform-ing the measurements. For purposes of explanation and conciseness, the examples of trigger(s) for performing mea-surements and the trigger(s) for sending measurement report may be described together herein. However, it is contem-plated that various combinations of triggers may be used to trigger measurement performance and measurement report-ing. For example, a first trigger such as the quality of the serving cell of an active layer falling below a threshold may trigger the WTRU to perform measurements on a deacti-vated serving cell of another layer. A second trigger such as the quality of the serving cell of the another layer being above a threshold and/or better than the current serving cell of the active layer by a predetermined threshold may cause the WTRU to report the measurements of the serving site of the deactivated layer to the network (e.g., the active serving site). The active serving site may use the measurement information to instruct the WTRU to activate one or more deactivated layers. For example, the primary serving site may send MAC signaling (e.g., a MAC CE) to WTRU that indicates a preconfigured, deactivated secondary layer is to be activated. The MAC signaling may indicate that one or more layers (e.g. the currently activated primary layer) should be deactivated upon activation of the other layer and/or the WTRU may implicitly determine to deactivate an active layer based on activating the other layer.

Further, rather than or in addition to activation and deactivation of layers being triggered by explicit signaling from the network, one or more preconfigured layers may be autonomously activated and/or deactivated by the WTRU. For example, rather than or in addition to sending measure-ment reports of deactivated serving sites to the network, the WTRU may locally evaluate the measurements to determine whether a deactivated layer should be activated and/or a activated layer should be deactivated. Since the WTRU may be use similar criteria as the network for evaluating whether a layer should be activated or deactivated, the triggers for WTRU autonomous activation and/or deactivation may be similar to the triggers that are described for causing the WTRU to perform measurements or a deactivated layer and/or send measurement reports to the network (e.g., an active serving site). Therefore, for purposes of explanation and conciseness the triggers for causing the WTRU to autonomously activate and/or deactivate a layer may be described in combination with the triggers for the WTRU to perform measurements and/or send measurement reports. However, as may be appreciated, various combinations of such triggers may be implemented such that a first set of triggers may cause the WTRU to perform measurements, a second set of triggers may cause the WTRU to report the measurements, and a third set of triggers may cause the WTRU to autonomously activate and/or deactivate a layer. The first, second, and/or third sets of triggers may each be different, may be partially overlapping, and/or may be completely overlapping (e.g., the triggers to perform mea-surements may be the same as the trigger to report mea-surements). Various combinations of the triggers—although described together herein—are within the contemplated scope of this disclosure.

In an example, the WTRU may be configured to activate or use more than one MAC instance (or layer) at a given time. For example, a first MAC instance may be active and configured for transmission/reception over a primary layer and a second MAC instance may be active and configured for transmission/reception over a secondary layer. The dif-ferent MAC instances may be active simultaneously at some points in time, while a single MAC instance may be active at other points in time.

The WTRU may perform layer deactivation. For example, the WTRU may receive control signaling that deactivates a given cell of a given layer (e.g., a Primary Cell (PCell) in the layer, a secondary cell (SCell) in the layer, etc.) multiple cells of a given layer, and/or all cells of a given layer. The WTRU may be configured to perform carrier aggregation in the different layers, for example such that the WTRU may transmit and/or receive data from multiple cells associated with a layer. However, unlike layered transmission using multiple data paths, carrier aggregation may be character-ized in that each of the transmissions sent from a cell/carrier being aggregated by be scheduled by the same entity or may be scheduled by independent entities in a coordinated fash-ion (e.g., there may be a low latency communication inter-face between the scheduling entities). For transmission over different layers or data paths, the independent scheduling entities lack tight coordination and/or may communicate via a communication link whose latency makes it difficult and/or impractical to coordinate the scheduling of the WTRU across the layers. A PCell may refer to a primary cell of a layer, which may be the cell through which carrier aggregation for the layer is configured or established. Each layer may additionally utilize one or more SCells, which may be carrier aggregation cells/carriers associated with the layer. The PCell may be used to schedule transmissions on the SCell and/or the transmissions may be scheduled directly via the Scell. The WTRU may be configured to deactivate PCells and/or SCells autonomously, for example, upon expiration of a timer after a period of scheduling inactivity for the concerned cell.

Forming an RRC connection may establish one or more signaling radio bearers (SRBs) between the WTRU and the network, for example such that each of the established SRBs may be assigned to one or more of the first radio interface or the second radio interface. The control data received by the WTRU over the may be include in one or more RRC protocol data units (PDUs). An RRC PDU may be associated with one of the one or more SRBs. In an example, the RRC PDU may be received over either the first radio interface or the second radio interface irrespective of its associated SRB. In another example, the RRC PDU may be received over the assigned radio interface associated with the corresponding SRB. The RRC connection may be controlled by the network. The network may comprise a Radio Cloud Network Controller (RCNC) that controls the RRC connection. The WTRU may transmit an indication to the network indicating that the WTRU supports multi-scheduling operation.

In an example, a WTRU may be configured to operate using one or more SRBs associated a MeNB or cells served by the MeNB (e.g., may be referred to a macro(SRB)), one or more SRBs associated a SCeNB or cells served by the SCeNB (e.g., may be referred to a sc(SRB)), one or more data radio bearers (DRBs) associated a MeNB or cells served by the MeNB (e.g., may be referred to a macro (DRB)), and or one or more DRBs associated a SCeNB or cells served by the SCeNB (e.g., may be referred to a sc(DRB)). In an example, the WTRU may establish a macro(SRB) with a MeNB and establish a sc(SRB) and a sc(DRB) with a SCeNB.

For example, a MAC instance at the WTRU may be configured and active for the secondary layer, and may be used for both user plane (e.g., sc(DRB)) and control plane (e.g., sc(SRB)) data. In some scenarios, transmission and/or reception may be more frequently performed using the SCeNB, so the secondary layer may be considered the main layer to perform data and control plane data transmission/reception and/or physical layer procedures. Even when the majority of data transmissions are sent via the SCeNB, the WTRU may still have configured a MAC instance for the primary layer, for example that may be used for control plane data (e.g., for traffic that may be sent via either layer, for traffic that may be sent through the primary layer only, etc.). In some scenarios, the primary layer MAC instance may be active at the same time as the secondary layer MAC instance, which may be referred to as dual MAC connectivity. The macro(SRB) may be utilized for transmission of relatively high importance control information, so in some examples the WTRU may be configured to refrain from deactivating the PCell of the primary layer (and/or the entire primary layer) in order to ensure that macro(SRB) data is timely delivered. However, in other examples, such control information may be deliverable via a secondary layer, so during periods of inactivity the primary layer may be deactivated and/or may operate according to IDLE mode principles in order conserve power and network resources. In, the WTRU may be configured to periodically or intermittently monitor a control channel (e.g., PDCCH for Random Access Channel (RACH) orders, a paging channel, etc.) even if a secondary layer is active and/or if the primary layer has been deactivated.

In an example, the WTRU may be configured to exchange control plane data using the primary layer (e.g., via a macro(SRB)) and user plane data via a secondary layer (e.g., via a sc(DRB)). Such a scenario may be the case when, for example, a WTRU was offloaded from a MeNB to a SCeNB for data transfer. The MAC instance that is configured and active for the primary layer may be used remain active and be used for transmission of control information. A MAC instance may be configured and active for a secondary layer and may be used to transfer user plane data. The macro (SRB) may be utilized for transmission of relatively high importance control information, so in some examples the WTRU may be configured to refrain from deactivating the PCell of the primary layer (and/or the entire primary layer) in order to ensure that macro(SRB) data is timely delivered. However, in other examples, such control information may be deliverable via a secondary layer, so during periods of inactivity the primary layer may be deactivated and/or may operate according to IDLE mode principles in order conserve power and network resources. In, the WTRU may be configured to periodically or intermittently monitor a control channel (e.g., PDCCH for Random Access Channel (RACH) orders, a paging channel, etc.) even if a secondary layer is active and/or if the primary layer has been deactivated.

Regardless of how the data and control information is transferred to the WTRU (e.g., via one or more of the primary and/or secondary layers), the WTRU may be configured to maintain or store configuration information for each of the layers/MAC instances even after deactivating a MAC instance. For example, the WTRU may be configured to store configuration for the primary layer even after deactivation of the primary layer. In this manner, the WTRU may be able to quickly return to the macro layer even if it has been deactivated. Quickly returning to the macro layer may allow for fast recovery from radio link failure (RLF) at the secondary layer and may facilitate the avoidance of radio link failures in handover scenarios between small cells.

RRC signaling may be utilized to configure primary layer and/or secondary layer operation. The layer configuration may include one or more of PHY configuration information, MAC configuration information, RLC configuration information, PDCP configuration information, radio bearer (RB) configuration information, Cell Radio Network Temporary identifier (C-RNTI) information, etc. The configuration information provided for the primary layer may include of full set of configuration information (e.g., PHY configuration information, MAC configuration information, RLC configuration information, PDCP configuration information, RB configuration information, C-RNTI information, etc.) that allows the WTRU to perform transmission and reception procedures in the primary layer. In an example, the WTRU may also be configured with a subset of configuration information for transmitting and reception in the secondary layer. For example, the WTRU may be configured with MAC configuration information, RLC configuration information, PDCP configuration information, and a subset of PHY layer resources/configuration information to be used in the secondary layer. Other configuration information such as the remaining PHY layer resources/configuration information (e.g., such as PUCCH configuration information, etc.) may be included in a reconfiguration message that is sent in order to activate the secondary layer. In this manner the WTRU may be preconfigured with the majority of the configuration information for using the secondary layer and certain configuration information may be provided upon activation (e.g., to ensure the configuration does not conflict with the current configuration being utilized at the primary layer).

The primary layer configuration may include full configuration information associated with the operation of both SRBs and DRBs on that layer or may include a subset of the configuration (e.g., only the SRBs). The subset of the configuration may allow the WTRU to perform one or more of receiving data associated with an SRB, receiving an RRC reconfiguration message, perform a handover, and/or perform a reconfiguration procedure.

The WTRU may be configured to, upon receiving a configuration for a second layer (and/or the remaining configuration information such as PHY information that was not provided as part of an initial pre-configuration), implicitly determine to activate the second layer and may begin using the secondary layer as the active layer. The WTRU may store the configuration for the primary layer upon activation of the secondary layer so that the primary layer can be reactivated at a later time. In another example, the WTRU may implicitly assume that the primary layer is the active layer (and store the context of the inactive layers in memory for later use) until the network explicitly indicates that another layer is the active layer. The context stored in the WTRU for the inactive layer may be considered valid until explicitly deleted by the network. The configuration information may be considered valid for a defined period of time. The configuration information for a secondary layer may be deleted upon a change to a different secondary layer and/or upon a change to a primary layer.

When operating using a secondary layer, the WTRU may store the context/configuration information of the primary layer and consider the primary layer to be deactivated and/or in idle mode. In an example, rather than completely deactivating the primary layer, the WTRU may have an independent discontinuous reception (DRX) configuration to keep the context of the primary layer alive. During the DRX period, the WTRU may periodically check cells associated with the primary layer for transmissions (e.g., read the PDCCH). The WTRU may monitor a deactivated layer during the active periods of the DRX cycle even if it is actively monitoring/utilizing a different layer. The WTRU may also be provided with an explicit indication as to which layer is initially active at the time of the receiving the RRC configuration information. Thus, the RRC connection reconfiguration information may include configuration information for a plurality of layers, and may further indicate which of the layers is initially active. The WTRU may then store configuration information for the inactive layers for later use while using the configuration of the active layer to perform reception and transmission procedures.

One or more triggers may cause the WTRU to activate the primary layer, activate an inactive layer, and/or report quality information for one or more layers. For example, while the WTRU is operating with a secondary layer as an active layer, the WTRU may be triggered to use (or return to) the primary layer (e.g., for user plane and/or control plane transmission and/or reception) in order to receive an RRC reconfiguration message. For example, the RRC reconfiguration message may indicate that the WTRU is to perform a handover, may be designed to help the WTRU avoid radio link failure, may facilitate the performance of a fast reestablishment to the primary layer, and/or the like. The switch to the primary layer may be temporary (e.g., the WTRU may switch back after receiving the control plane data), and the WTRU may be configured to utilize a Pcell of the primary layer in order to receive the control plane data.

In an example, the WTRU may receive explicit, dynamic signaling from the network that triggers the WTRU to switch layers, activate a given layer, and/or deactivate a given layer. For example, a PDCCH order and/or MAC control PDUs (e.g., MAC control elements (CEs)) may be used to indicate to the WTRU to switch layers, activate a layer, and/or deactivate a layer. As an example, the WTRU may receive a PDCCH order or a MAC control PDU that indicates that the WTRU should deactivate a currently active MAC instance (e.g., layer) and/or activate a different MAC instance/layer. The explicit activation indication may explicitly indicate which layer should be activated or the WTRU may implicitly determine which layer is to be activated.

Various implicit criteria may be used by the WTRU to determine to activate an inactive/idle layer (e.g., the primary layer), switch to an inactive/idle layer (e.g., the primary layer), and/or to deactivate a given layer. For example, the WTRU may begin monitoring a previously inactive (e.g., begin reading or monitoring the inactive layer PDCCH using a stored C-RNTI for the inactive layer) based on detecting various criteria. In an example, although the WTRU may begin some processing/monitoring of an inactive layer based on detecting implicit triggers, the WTRU may be configured to refrain from switching to the layer or fully activating the layer until an explicit indication to do so is received from the network (e.g., via a PDCCH order or MAC Control PDU).

For example, the downlink quality as observed by the WTRU may be used as an implicit criteria to determine to begin monitoring (e.g., partially monitoring) an inactive layer and/or to report an indication of the downlink quality of an inactive layer to the network. The following criteria may be described for triggering the WTRU to send a measurement report for an inactive layer; however, such triggers may also be used to trigger the WTRU to begin monitoring an inactive layer (e.g., monitoring a PDCCH of cell in the inactive layer). Additionally, such criteria may also be applicable to trigger the WTRU to activate and/or deactivate a layer.

For example, the WTRU may monitor the downlink quality of one or more layers for which it has received configuration information but that are currently not active. There may be one or more triggers that cause the WTRU to perform measurements on a cell associated with the inactive layer (e.g., such triggers may also cause the WTRU to begin monitoring the cell for transmissions, activate and/or deactivate various cells, and/or the like). For example, the WTRU may be configured to perform measurements on a cell associated with the inactive layer any time a measurement report is triggered (e.g., for another layer/cell or for the inactive layer/cell). In an example, the WTRU may be configured to perform measurements on a cell associated with the inactive layer based on a specified event occurring (e.g., a handover, an event indicated in the configuration, etc.).

The WTRU may be configured to perform measurements on a cell associated with the inactive layer (e.g., primary layer) when a measurement report is triggered in the active layer (e.g., secondary layer) and the quality of the active layer is below a predetermined threshold (e.g., indicating that the WTRU is losing coverage in the active layer). For example, the WTRU may determine that the quality of the active layer is deteriorating and/or that measurements should be performed on the inactive layer based on one or more of Reference Signal Receive Power (RSRP) measurements for the active layer falling below a threshold, the Reference Signal Received Quality (RSRQ) measurements for the active layer falling below a threshold, the determined channel quality indicator (CQI) for a cell associated with the active layer being below a threshold, the determined CQI for a serving cell of the active layer (e.g., of the serving cell for the SCeNB) being below a threshold and the determined CQI for a non-serving cell of the active layer (e.g., some other cell associated with the SCeNB) being above a threshold, and/or the WTRU starting the T301 timer (e.g., upon detecting the deteriorations of radio link conditions).

In an example, the WTRU may be configured to perform measurements on a cell associated with the inactive layer (e.g., primary layer) based on a measurement report indicating that the best cell (e.g., highest quality cell) in the currently active layer (e.g., the secondary layer) has changed. The WTRU may be configured to perform measurements on a cell associated with the inactive layer based on a measurement report indicating that the best cell (e.g., highest quality cell) in the primary layer has changed. In an example, the WTRU may be configured to perform measurements on a cell associated with the inactive layer (e.g., primary layer) based on a measurement report being triggered or sent and the active MAC instance being out-of-synch (e.g., upon start of T310 and/or upon start of T311, etc.). The WTRU may be configured to perform measurements on a cell associated with the inactive layer (e.g., primary layer) based on failing to receive a handover command within predetermined period of time while the quality of active layer is below a threshold.

In an example, the WTRU may be configured to perform measurements on a cell associated with the inactive layer (e.g., primary layer) based on detecting an out-of-synch condition in the active layer and/or based on detecting a predetermined number of out-of-synch conditions in the active layer. The WTRU may be configured to perform measurements on a cell associated with the inactive layer (e.g., primary layer) based on an out-of-synch condition being detected in the active layer for a network configured period of time and/or based on an out-of-synch condition being detected a given number of timers within a predetermined window. In an example, the WTRU may be configured to perform measurements on a cell associated with the inactive layer (e.g., primary layer) based on detecting one or more of DL RLF and/or an UL RLF in the active layer. In an example, the WTRU may be configured to perform measurements on a cell associated with the inactive layer (e.g., primary layer) based on the WTRU losing timing alignment with currently active layer (e.g., timing alignment timer (TAT) expiry, for example wherein the TAT of the PCell of the active layer expires if multiple Timing Advance Group are configured for the concerned layer). In an example, the WTRU may be configured to perform measurements on a cell associated with the inactive layer (e.g., primary layer) based on detecting a scheduling request (SR) failure. For example, the WTRU may attempt to re-establish connectivity on an inactive layer (e.g., the primary layer) before attempting to perform an RRC connection re-establishment procedure on the currently active layer. In an example, the WTRU may be configured to perform measurements on a cell associated with the inactive layer (e.g., primary layer) based on the quality of an inactive layer being above a threshold for a configured period of time. In an example, the WTRU may be configured to perform measurements on a cell associated with the inactive layer based on the quality of the serving cell of primary layer or the quality of the serving cell of an active layer being below a threshold and no other cells the layer being above a threshold (e.g., active layer is losing coverage).

In an example, the WTRU may be configured to perform measurements on a cell associated with the inactive layer (e.g., primary layer) based on receiving a deactivation command for the active layer (e.g., which may be an implicit activation of the primary layer). In an example, the WTRU may be configured to perform measurements on a cell associated with the inactive layer (e.g., primary layer) based on the WTRU receiving an RRC reconfiguration message (e.g., the message may de-configure or deactivate the active layer. In an example, the WTRU may be configured to perform measurements on a cell associated with the inactive layer (e.g., primary layer) based on the estimated rate of change in quality of the channel on the active (e.g., secondary layer) being (and/or becoming) higher than a threshold for a configured period of time. For example, the rate of change of the channel may be estimated by measuring a reference signal transmitted from the active (e.g., secondary) layer. Other measure of the rate of change of the channel may be based on a Doppler spread of the channel and/or an absolute value of the Doppler shift of the channel. An estimated rate of change of the channel may be proportional to (and based on) the multiplicative inverse of the coherence time of the channel. In an example, the WTRU may be configured to perform measurements on a cell associated with the inactive layer (e.g., primary layer) based on the estimated rate of change of the fading-averaged path loss on the currently active (e.g., secondary) layer being (or becoming) higher than a threshold for a configured period of time. For example, the rate of change of the fading-averaged path loss may be estimated by subtracting the time-averaged received power level of a reference signal of a first time window from that of a previous time window. In an example, the WTRU may be configured to perform measurements on a cell associated with the inactive layer (e.g., primary layer) based on receiving an indication from RLC that a maximum number of retransmissions has been reached. In an example, the WTRU may be configured to perform measurements on a cell associated with the inactive layer (e.g., primary layer) based on receiving a random access problem indication from the MAC.

The WTRU may start monitoring a PDCCH associated with the primary layer or an inactive layer using a stored C-RNTI based on detecting one or more of the conditions used to trigger measurements of the inactive layer. However, in an example the WTRU may refrain from switching to the inactive layer and/or from performing full activation of the inactive layer unless an explicit indication is received (e.g., via a PDCCH order and/or MAC Control PDU) indicating that a switch or activation should be performed.

The WTRU may be configured with a measurement configuration that is used to determine parameters to use when performing measurements. For example, a measurement configuration may be common for all cells in a layer, common for all cells in a cluster (e.g., if clusters are utilized), configured separately for serving and non-serving cells per layer, and/or configured separately for each cell in a given layer. For example, the WTRU may be configured with corresponding zero power channel state information reference signals (CSI-RSs) for different cells/layers for CQI measurements. The WTRU may be configured with an averaging time period, such that the measurements are performed and filtered over the averaging period. The WTRU may be configured with the identity of the node to which the report should be sent (e.g., MeNB, SCeNB, etc.). The WTRU may be configured with a periodicity to use for reporting measurement and/or may be configured with one or more triggers for sending aperiodic reports (e.g., threshold values of channel quality to trigger a report).

Layer-specific measurement configurations may be provided to the WTRU by the network. For example, a received configuration or configuration parameter may explicitly indicate which layer the configuration is applicable to. In an example, the measurement configuration may indicate a cluster ID that the measurement configuration is applicable to. The measurement configuration may include a list of cells that the WTRU may perform measurement reporting for on a given layer and/or that the WTRU may monitor. The measurement configuration may indicate a measurement cycle to be used for measuring cells within a layer based on the activation and/or deactivation of another layer. For example, activation of a cell in a first layer may trigger more frequent measurements (e.g., a fast measurement cycle) for neighboring cells. The measurement configuration may include a list of white listed cells that are neighbor cells for a configured small-cell. In an example, if the small-cell is activated (e.g., small cell layer is activated), WTRU may stop using the measurement cycle measCycleSCell (e.g., the measurement cycle typically used for Scells in a deactivated stated), and may use a different (e.g., a faster) measurement cycle. In an example, the activation of a first cell may trigger a scaling down of the measCycleSCell to a smaller value.

The WTRU may be configured to report the measurement information for each cell it is currently monitoring, for a subset of cells, and/or for one or more clusters of cells. For example, which cells to measure may be determine based on the cluster identity of the cell that triggered the report and/or the cell for which the measurement is being report. For example, the WTRU may be configured with a blacklist/whitelist in order to determine which events trigger measurement reporting for cells in a given cluster. For example, a measurement report may be triggered for a cell in a first cluster if the triggering is based on criteria associated with a cell of a different cluster (e.g., when measuring for inter-cluster mobility). In an example, the WTRU may be configured with a cluster identity such that the WTRU measures each of the cells in the cluster if measurements are triggered for any cell in the cluster.

The WTRU may send a report of quality measurements based on detecting a trigger to measure an inactive cell, periodically, and/or aperiodically (e.g., at the request of the network). The report may be sent to the network node in the primary and/or secondary layer. For example, if the WTRU detects a trigger that may be used to trigger measurement of an inactive layer/cell, the WTRU may send a measurement report to the network, and the measurement report may indicate what triggered the report. Measurement reports may be sent periodically by the WTRU, for example by configuring and setting a timer to be used to trigger the transmission of a periodic report. The network may send a request for a measurement report. The aperiodic measurement request may be sent to the WTRU, for example using one or more of a PDCCH order, a MAC control PDU, and/or an RRC measurement request. Aperiodic requests may be received from a primary layer (e.g., associated with a MeNB) and/or a secondary layer (e.g. associated with a SCeNB). For example, the MeNB may request a measurement report for cells belonging to any layer (e.g., primary layer and/or a secondary layer). As an example, the SCeNB may send a measurement request that indicate s that the WTRU should send a measurement report to the MeNB (e.g., via RRC). The SCeNB may send the request based on detecting radio link quality degradation (e.g., based on UL RL quality, CQI reports received for the secondary layer being below a threshold, etc.). A request for a measurement report may be sent by using PHY, MAC and/or RRC signaling. In an example, the request may be sent by the SCeNB, for example, by use of a MAC CE.

The WTRU may provide the measurements and/or an indication of the quality of a cell/layer using on or more of an RRC message, a MAC control message, and/or a Layer 1 (PHY) message. For example, selected measurements may be sent over an RRC measurement report and/or as part of an RRC establishment/re-establishment request. A MAC control message (e.g., MAC control element) may be used to send measurements. For example, a MAC CE may be used to send measurement information for each reported cell along with the cell ID associated with the measurement (e.g., the measurements may be associated with the cell using the SCellIndex). If Layer 1 (PHY) reporting is utilized the report may be transmitted via the PUCCH.

For each reported layer/cell, the WTRU may send one or more of the RSRP of all cells being reported, the RSRP of cells on a reporting whitelist, and/or the RSRP of cells within a specified cluster for which the report is performed. In an example, for each reported layer/cell the WTRU may send one or more of the RSRQ of all cells being reported, the RSRQ of cells on a reporting whitelist, and/or the RSRQ of cells within a specified cluster for which the report is performed. The report may include one or more of a CQI value measured for the cell, an identity of the cell that triggered the report; a list of DRBs that are served by the layer that is experiencing failure, and/or an in-synch/out-of-synch indication.

The WTRU may be configured to and/or be requested by the network to send a measurement report in a variety of manners. For example, if the WTRU is configured to send the report via the primary layer and there is a failure on the primary layer, the report may be sent on another active layer. For example, the report may be sent to an active small cell, and the small cell node may forward it to the MeNB using the backhaul link. In an example, the WTRU may be configured to report measurements to the primary layer, which may be associated with the macro eNB. In an example, the report may be sent to both a primary layer and an active secondary layer and/or all active layers. In an example, the report may be via an RRC message to the primary layer (e.g., the macro layer), and the MeNB may forward the information to other layers that may make use of the report. A measurement report may be sent to the same node where the request was received from. The node to which a measurement report should be sent may be configured and/or indicated by the received measurement reporting configuration. If measurement reporting is performed over RRC, then if a secondary RRC is utilized by the secondary layer (e.g., connected via the SCeNB), an appropriate SRB may be selected for sending the measurement information.

In an example, if the WTRU detects that radio link conditions have fallen below a configured threshold in the small-cell layer, the WTRU may send a measurement report to the MeNB on another layer. For example, if the CQI of the active small cell layer are less than configured threshold, the WTRU may be triggered to send an indication regarding the radio conditions to the network.

In another example, the trigger to send measurement information to a primary layer may be receipt of explicit signaling sent by the small cell eNB, for example, by use of a MAC CE. For example, if the SCeNB detects the WTRU CQI measurement has fallen below a threshold, it may send a trigger to the WTRU RRC to send an aperiodic RRC measurement report to the MeNB on another layer (e.g., the Macro layer). In an example, the SCeNB may directly send an indication over the backhaul to the MeNB or forward the measurement report from the WTRU to the Macro.

In an example, the measurement configuration may include a list of white-listed cells. For example, the white-listed cells may be a list of cells that are neighbor cells for the configured small-cell. If the small-cell/the small-cell layer is activated, the neighbor cells may stop using the measurement frequency specified by the configuration parameter measCycleSCell (e.g., measurement cycle for Scells in deactivated state), and may begin using a different (e.g., faster) measurement cycle. In an example, the activation of one cell may trigger a scaling down of the measurement cycle frequency (e.g., a scaling down of measCycleS-Cell) to a smaller value. In an example, the SCeNB may send a command to the WTRU to request an aperiodic CQI measurement report be sent to the MeNB (e.g., over RRC). For example the aperiodic CQI measurement may be triggered if the SCeNB detects degradation of uplink channel conditions.

When one or more of the triggers for performing and/or reporting measurements is detected by the WTRU, the WTRU may determine to activate and/or deactivate a layer based on detecting the trigger. For example, upon determining to activate the primary layer MAC instance based on detecting a trigger to perform or report measurements, the WTRU may maintain the secondary MAC instance as active. In another example, upon activating the primary layer, the WTRU may deactivate the secondary layer. In an example, one or more of the triggers for performing and/or reporting measurements may trigger the WTRU to activate a secondary layer. In an example, one or more of the triggers for performing and/or reporting measurements may trigger the WTRU to deactivate a secondary layer for which the radio link quality has degraded. In an example, rather than directly activating or deactivating a given layer based on detecting one or more of the triggers for performing and/or reporting measurements, the WTRU may sending an indication to the network that indicates that the trigger has been detected. The WTRU may then wait for an explicit indication to activate an inactive layer (e.g., the primary layer) and/or deactivate an active layer (e.g., the secondary layer). For the example, the indication to switch or activate the primary layer may be transmitted to the WTRU over the primary layer PDCCH/MAC. The WTRU may monitor the primary layer PDCCH using the stored configuration for a certain configured period of time after detecting one or more of the measurement performance/reporting triggers. If the timer expires and no indication is received, the WTRU may continue to operate with the secondary layer as the active layer. The indication may also be transmitted over the secondary layer PDCCH/MAC or via an RRC message.

When one or more of the triggers for performing and/or reporting measurements is detected by the WTRU, the WTRU may initiate an RRC procedure, for example an RRC connect re-establishment procedure. The RRC procedure may be utilized to indicate to the network that one or more layers are to be deactivated and/or activated. For example, upon one or more of the triggers for performing and/or reporting measurements, the WTRU may activate the primary MAC instance, for example using a stored configuration. The WTRU may initiate a Scheduling Request in the primary layer, for example using RACH (e.g., a RA-SR).

Upon being schedule, the WTRU may transmit an RRC message (e.g., an RRC Connection Re-establishment Request) that may include one or more of a context identity, a WTRU identity, and/or other information that may be utilized by the network to determine the identity of the WTRU and the corresponding configuration for accessing the cell. The identity information may have been part of the configuration of the primary layer as previously received by the WTRU.

The WTRU may receive a configuration/conformation message in response to the RRC message. For example, the configuration/conformation message may indicate that the WTRU should reuse one or more of the security context, the C-RNTI, PHY parameters, MAC parameters, RLC parameters, PDCP parameters, etc. that were preconfigured for use in the primary layer. In an example, if the configuration/conformation message does not explicitly provide different parameters or indicate that preconfigured parameters should be discarded, the WTRU may assume the parameters previous provided and stored to be valid. The configuration/conformation message may include additional configuration parameters that may supplement or overwrite at least part of the stored configuration for the primary layer. The WTRU may then perform mobility procedure(s) related to configured (e.g., active and/or suspended) DRBs such that the DRBs may be re-associated with the primary layer. If the RRC procedure is unsuccessful, the WTRU may release the stored configuration for the primary layer and initiate a RRC Re-establishment procedure, perform an initial access, and/or move to idle mode.

The WTRU may be configured to perform various actions upon activation of a primary layer. For example, if the WTRU detects a trigger (e.g., such as the triggers described for initiating measurements, measurement reporting, activation/deactivation of a layer, etc.), the WTRU may determine to initiate monitoring of the PDCCH of the primary layer using the preconfigured configuration information while continuing normal operation in the secondary layer. In example, the WTRU may stop monitoring the secondary layer upon determining to begin monitoring the PDCCH of the primary layer. In an example, the WTRU may wait to fully activate the primary layer (e.g., instead continuing with monitoring the PDCCH) until the WTRU receives an explicit PDCCH order that indicates that the WTRU should activate the primary layer. For example, the PDCCH order may indicate to the WTRU that it should activate the primary layer using the pre-configured set of resources for the primary layer. The PDCCH order may configure the WTRU with a dedicated RACH resource/preamble to use for initial UL access in the primary layer. In an example, the PDCCH order may correspond to a PDCCH order for a RACH procedure. The WTRU may determine that the PDCCH order for the RACH procedure corresponds to a trigger for the WTRU to activate the primary layer. The PDCCH order may also be received over the secondary layer and be used as a trigger for the WTRU to activate the primary layer.

Based on determining to activate the primary layer, the WTRU may activate and instantiate the MAC instance associated with the primary layer using the preconfigured configuration information. As part of the activation procedure, the WTRU may attempt to initiate UL access to the primary layer. For example, the WTRU may initiate a random access procedure at the primary cell. One or more of the preconfigured configuration information and/or a dynamic layer activation message (e.g., PDCCH order) may include one or more of a dedicated RACH preamble/resource to use of the initial access procedure and/or a dedicated C-RNTI to be used in the primary layer.

The WTRU may send an UL message to the network over the primary layer, for example as part of the initial random access procedure. The UL message may include one or more of a buffer status report (BSR) for bearers utilized in the previously active layer, an identification or indication of the previous layer, a PDCP status report for the bearers utilized on the previous layer, a WTRU identity (e.g., a C-RNTI of the primary layer, some other unique WTRU ID), an RRC re-establishment message (e.g., indicating reason of failure at the previous layer, and or other information), and/or some other RRC message that indicates the WTRU is requesting to switch layers and transfer bearers between layers (e.g., which may indicate the radio bearers, a buffer status report for each bearer located in the other layer, a WTRU ID, a PDCP context and status report, and/or an ID of the previous layer, etc.). If the WTRU was utilizing DRX on the primary layer, the WTRU may move to active time or to a shorter DRX cycle and/or the WTRU may send an indication that it has moved to active time reception. The WTRU may send an SR, and the transmission of an SR may be an implicit indication that the WTRU is in active time and that it is attempting to switch layers.

Upon activation of the primary layer the WTRU may maintain the secondary layer as active or may deactivate the secondary layer. The deactivation of the secondary layer may the WTRU temporarily suspending the operation of the secondary MAC layer. While the secondary layer is deactivated, the WTRU may not perform physical layer transmission and/or reception. The WTRU may delete the secondary layer configuration upon explicit indication from the network and/or upon a handover of the secondary layer. If the WTRU deactivates the secondary layer, it may delete the MAC instance and release the PHY resources associated with the secondary layer. In another example, upon activation of the primary layer the WTRU may maintain the secondary layer as active and may continue normal reception/transmission procedures on the secondary layer.

Upon activation of the primary layer, the WTRU may be configured to perform one or more bearer mobility procedures to transfer one or more bearers or data flows to a different data path (e.g., the primary layer). For example, a set of one or more SRBs may be configured upon activation of the primary layer and mapped to the primary MAC instance. The SRB configuration to use upon activation of the primary layer may be included in the pre-configured configuration information stored in the WTRU. In an example, both control plane and user plane bearers utilized by the WTRU upon primary layer activation may be pre-configured and stored as configuration information for the primary layer at the WTRU. In an example, a subset of the RBs from the secondary layer may be switched and re-mapped to the primary layer.

The radio bearers that were previous active in the secondary layer may be transfer to the primary layer, may remain at the secondary layer, and/or may be released. For example, the network may be configured to preform reconfiguration and mobility operations of radio bearers from one layer to the other. As an example, if the primary layer is activated the WTRU may suspend the radio bearer transmission/reception on the secondary layer, but keep/store the bearer context for that layer for future use. In another example, when the primary layer is activate, the WTRU may keep the secondary layer bearers active and continue reception/transmission procedures of those bearers while also transmitting/receiving data on the macro layer. For example, the WTRU may be configured to receive control plane data via the macro layer (e.g., but not user plane data) upon activation of the macro layer, or may receive both control plane data and data plane data on the newly activated macro layer (e.g., as configured by the network in the preconfiguration information). The WTRU may move a radio bearer from the secondary layer to the primary layer upon receiving an RRC reconfiguration message over either the macro layer or over the secondary layer. For example, the RRC reconfiguration message may be received as part of message 4 when the primary layer is activated and a RACH procedure is initiated.

The WTRU may perform a partial reconfiguration/radio bearer mobility when initially activating the primary layer, (e.g., transfer SRBs but not DRBs). The WTRU may perform a partial reconfiguration/radio bearer mobility (e.g., transfer SRBs but not DRBs) upon an receiving explicit indication from the network (e.g., PDCCH order, MAC control, or successful random access response) indicating that one or more bearers should be transferred. The WTRU may perform a full radio bearer mobility to the primary layer if configured to do so in the preconfiguration information for the primary layer.

In an example, the WTRU may autonomously initiate radio bearer mobility from the secondary layer to the primary layer and delete the secondary layer context. The autonomous mobility may be based on pre-configured information and/or the WTRU may assume that the secondary layer should be deactivated if the primary layer is activated unless the network explicitly indicates that the secondary layer is to remain active. Once the switching of the DRBs and/or SRBs is performed, either via network-controlled or WTRU autonomous procedures, the WTRU may before an RRC procedure (e.g., RRC connection re-establishment procedure) to apply and/or confirm the RB reconfigurations.

As noted above, the WTRU may utilize a multi-data path connection for a variety of reasons. For example, multiple serving sites may be utilized in order to achieve data throughput gains (e.g., enable inter-layer aggregation of resources available to the WTRU), allow for WTRU autonomous mobility (e.g., allowing a WTRU to determine and access cells of various layers that may provide the highest quality connection at any given time instance), allow the WTRU to recover for connectivity impairments (e.g., if the WTRU detects RLF and/or a decrease in the quality of a given layer, the WTRU may switch to another layer, for example without having to perform a reestablishment procedure), and/or for network controlled mobility (e.g., offloading traffic from one layer to another and/or other network management reasons). Since connectivity to different serving sites may be established for varying reasons, the triggers and/or procedures for accessing a secondary serving site and/or deactivated layer may be different depending on the purpose of the multi-serving site connection. For example, if access to a secondary serving site is for the purpose of achieving data throughput gains, the WTRU may maintain a primary serving site in an activated state upon activation of a secondary serving site. However, if the WTRU is activating a secondary serving site for the purposes of macro layer offload, the WTRU may deactivate the primary layer upon activating the secondary layer. Similarly, the triggers for performing measurements, sending measurement reports, and/or activating and/or deactivating a layer may be different depending on the purpose of performing multi-serving site operation.

As an example, consider a case where dual-site connectivity is used to achieve throughput gains for a WTRU. In this example, multiple serving sites may be used substantially simultaneously by the WTRU in order to increase the amount of data transmitted and/or received by the WTRU. For example, the WTRU may be initially in an RRC_CONNECTED state with a single layer. The WTRU may receive a reconfiguration message that configures the WTRU to access one or more cells of a second layer. The reconfiguration may activate the second layer or the reconfiguration may preconfigure the layer for subsequent activation. For example, if the reconfiguration configures the WTRU for "dual connectivity" while leaving one or more cells of the added layer in a deactivated state, the WTRU may receive a measurement configuration for performing measurements on cells of the deactivated layer. The preconfiguration may include information indicative of the circumstances that may trigger the WTRU to send measurement reports to the active layer and/or autonomously activate the preconfigured layer. For example, based on detecting a trigger received in the received configuration and/or some implicitly determined trigger, the WTRU may initiate one or more procedures to report quality measurements to the network (e.g., activated layer) so that the active serving site (e.g., RRC entity) may subsequently reconfigure (e.g., by RRC) and/or activate (e.g., by MAC CE) one or more cells of a deactivated layer. In an example, rather than or in addition to being triggered to send the measurement report, the WTRU may be configured to autonomously activate one or more cells of a deactivated layer based on detecting the one or more triggers indicated in the reconfiguration and/or implicitly determined. For example, the WTRU may initiate a RACH procedure in a cell to be activated in order to notify the network of the activation, obtain uplink timing alignment, obtain dedicated resources (e.g., request scheduling), and/or establish a configuration for accessing the cell. The WTRU may maintain both layers as active substantially simultaneously in order to increase overall data throughput.

In an example, the WTRU may be configured to access multiple layers as part of WTRU-autonomous mobility. For example, if the secondary serving sites correspond to SCeNBs, the coverage area of the secondary serving sites may be relatively small (e.g., as compared to a MeNB). However, SCeNBs may be deployed in clusters, such that multiple SCeNBs may be accessible by a WTRU in a relatively small area. In this case, the WTRU may be configured to monitor the various SCeNBs in order to determine which serving site may provide the highest quality access to the WTRU at a given point in time. Since the coverage area of the cells for these serving sites may be relatively limited, the WTRU may move into and/or out of coverage areas more frequently than in macro cell deployments. Therefore, rather than relying solely on network controlled mobility (e.g., network controlled handover, network controlled layer activation, etc.), the WTRU may be configured to perform some autonomous mobility procedures. For example, the WTRU may be configured to autonomously switch from a first (e.g., small cell) layer to a second (e.g., small cell) layer, activate a deactivated (e.g., small cell) layer, deactivated an activated (e.g., small cell) layer, and/or the like.

For example, the WTRU may be initially in an RRC_CONNECTED state while accessing one or more layers. The WTRU may receive and/or may have previously received a reconfiguration message that configured the WTRU to access one or more cells of a layer that are not currently active. For example, the WTRU may be connected to a primary layer associated with a MeNB and a first secondary layer associated with a first SCeNB. The WTRU may have preconfigurations for a plurality of other secondary serving sites associated with other SCeNBs. The WTRU may be configured with a measurement configuration for performing measurements on cells of the one or more deactivated layers. The preconfiguration may include information indicative of the circumstances that may trigger the WTRU to autonomously activate a preconfigured layer and/or deactivate a currently active layer. For example, based on detecting a criteria that indicates a deactivated small cell layer is of higher quality than the current small cell layer (e.g., cell quality of the deactivated layer is greater than that of the activated layer by an offset and/or predetermined threshold), the WTRU may be configured to autonomously activate one or more cells of an deactivated layer based and/or deactivate the currently connected small cell layer. As an example, the small cells may be part of a small cell cluster, and the WTRU may be authorized by the network to perform autonomous mobility between small cells within the cluster. The WTRU may initiate a RACH procedure in a cell to be activated in order to notify the network of the activation, obtain uplink timing alignment, obtain dedicated resources (e.g., request scheduling), and/or establish a configuration for accessing the cell.

In an example, the WTRU may be configured to access multiple layers in order to maintain connectivity during periods in which one or more layers are experience poor radio quality. For example, the WTRU may be configured to perform some form of WTRU-autonomous mobility in order to avoid radio link failure in a given layer from preventing the WTRU from communicating with the network or otherwise maintain its connection with the network. For example, the WTRU may determine that a cell (e.g., PCell) failure in an active layer (e.g., the WTRU detects radio link problems; WTRU determines UL RLF and/or DL RLF; a measured signal quality falls below a threshold, etc.) has deteriorated, the WTRU may take one or more actions in another layer to maintain session continuity. For example, the WTRU may be initially in an RRC_CONNECTED state while accessing one or more layers. The WTRU may receive and/or may have previously received a reconfiguration message that configured the WTRU to access one or more cells of a layer that are not currently active. The WTRU may have preconfigurations for a plurality of other serving sites which it may be configured to activate autonomously. The WTRU may perform RLM on one or more cells (e.g., the PCell) of the active layer(s). The UE may determine that it is experiencing an impairment (e.g., loss of connectivity to the concerned cell) such as one or more of radio link problems, out-of-synch conditions, UL RLF, DL RLF, and/or the like. Based on detecting the adverse channel conditions, the WTRU may initiate a procedure to autonomously activate one (or more cells) of the primary layer (e.g., if previously deactivated) and/or some other deactivated later and initiate a RACH procedure to notify the network of the failure of the other layer, to obtain UL timing alignment of the primary layer, to obtain dedicated resources in the primary layer, to obtain a configuration of such resources; and/or to initiate a reconfiguration procedure for the layer associated with the failure. The WTRU may receive a RRC reconfiguration with or without mobility control information (e.g., a reconfiguration or a HO command) from the primary layer (e.g., layer associated with RRC entity) that reconfigures resources mapped to the failed layer. For example, the resources may be moved to the primary layer and/or a different secondary layer.

In an example, the WTRU may be configured to access multiple layers in order to support network controlled mobility across a plurality of layers. For example, the WTRU may be configured to inform the network when it detect a new layer (e.g., based on measurements) such that a serving site may perform network-controlled connectivity management. For example, the WTRU may be initially in an RRC_CO-NNECTED state with a single layer. The WTRU may receive a reconfiguration message that configures the WTRU to access one or more cells of a second layer. The reconfiguration may activate the second layer or the reconfiguration may preconfigure the layer for subsequent activation. For example, if the reconfiguration configures the WTRU for "dual connectivity" while leaving one or more cells of the added layer in a deactivated state, the WTRU may receive a measurement configuration for performing measurements on cells of the deactivated layer. The received measurement configuration may indicate criteria for determining whether or not a cell should be considered available and/or suitable. If a cell meets the criteria, the WTRU may be configured to report the measurements of the cells of that layer. The network may use the reported measurements to trigger WTRU mobility, for example, by sending an RRC reconfiguration with or without mobility control information (e.g., a reconfiguration and/or a HO command) that indicates that the WTRU should begin accessing a cell.

The WTRU may be configured to perform mobility procedures for one or more serving cells of a serving site. For example, a serving cell of a secondary serving site may be subject to different mobility procedures than that of a serving cell of a primary serving site, for example if the RRC entity at the network side is located at the primary serving site. In an example, mobility procedures for one or more RBs (e.g., DRB, SRB, etc.) may be performed such that the RBs are moved from a first serving site to a second serving site. As an example use case, an RB may be mapped to a first secondary serving site, and the WTRU may move such that it may find better coverage at a different secondary serving site (e.g., a serving site served by a different SCeNB). Methods and systems are disclosed for user-plane and/or control-plane mobility when the WTRU moves one or more bearers mapped to a first secondary serving site to a different secondary serving site (e.g., while maintaining a constant connection to a primary serving site served by a MeNB).

As an example of possible architectures where RB mobility between serving sites may be beneficial, consider the case where the PDCP instance and the RLC instance at the network side may be located in the in primary serving site (e.g., there may be no PDCP instance in the secondary serving site and/or no RLC instance in the secondary serving site). In such a scenario, for a given RB the DL-SCH and/or the UL-SCH may be available in both a primary serving site and a secondary serving site (e.g., which may be referred to as a pooled RB) and/or the DL-SCH and/or UL-SCH may be available for transmission associated with a secondary serving site, but not for a primary serving site (e.g., although other scenarios for RB mappings may also be applicable). In another example, the PDCP instance at the network side may be located in the in primary serving site (e.g., there may be no PDCP instance in the secondary serving site), but there may be RLC instance at each of the primary serving site and the secondary serving site. Similarly, there may be respective PDCP instances and RLC instances at each of the primary serving site and the secondary serving site. In either case, there may be scenarios or configurations where for a given RB the DL-SCH and/or the UL-SCH may be available in a secondary serving site, but not a primary serving site. There may be other architectures where for a given RB, transmission to the primary serving site may be unavailable.

Since it is envisioned that for at least some types of SCeNBs the coverage area may be relatively limited (e.g., a smaller coverage area than a MeNB), a mobile WTRU may move into and/or out of coverage of one or more serving cells for the secondary serving sites. In such a case, handover procedures may be defined in order to move one or more bearers between SCeNBs and/or between an SCeNB and an MeNB. These handovers may not be true WTRU handovers (e.g., where an entire WTRU context may be transferred from a first serving site to a second serving site), as the RRC connection may be unchanged, for example in the case of centralized control entity (e.g., and/or the primary RRC connection may be unchanged in the case of coordinated control entities or distributed control entities). Methods and systems are disclosed for control of mobility changes for RBs mapped to SCeNBs when the RRC connection to the RCNC/MeNB may be unchanged. As an example, SCeNB mobility (e.g., mobility of one or more RBs from a first secondary serving site to a second secondary serving site) may be described as "user plane mobility" and/or "data radio bearer handovers."

For example, in order to support SCeNB mobility, the WTRU may be configured to measure and/or detect one or more target cells. The WTRU may be configured by the network and/or autonomously control the handover between a source cell at a first serving site and a target cell at a second serving site. The WTRU may be configured to manage the flow of UL and DL data in order to support lossless operation and minimize/eliminate duplication of transmitted data.

For example, a primary serving site (e.g., a serving site associated with a MeNB and/or a serving site in which the RRC instance/primary RRC instance is maintained at the network side), may be configured to control bearer and/or connection mobility for secondary serving sites. For example, if a centralized control architecture is utilized, the primary serving site may be configured to control RB mobility at one or more secondary serving sites using the RRC connection for the WTRU. The RCNC and/or MeNB may be configured to coordinate secondary serving site mobility with the WTRU, the source secondary serving site, and/or the target secondary serving site.

For example, the primary serving site (e.g., the RCNC and/or MeNB) may be configured to trigger SCeNB mobility based on measurement events reported to the primary serving site. The WTRU may be configured by the RCNC and/or MeNB to detect and report on measurement events as described herein. For example, a WTRU may be configured to compare the quality of potential SCeNB small cells and/or the MeNB macro cell with SCeNB small cells that it is currently accessing.

In an example, the primary serving site (e.g., the RCNC and/or MeNB) may be configured to trigger SCeNB mobility based on CQI reporting from the WTRU and/or SRS reception quality relayed from SCeNBs to the MeNB. The WTRU may be configured to report CQI to the primary serving site and/or the secondary serving site. The WTRU may transmit SRS for multiple small cells, for example including one or more cells that the WTRU may not be currently actively transmitting to and/or receiving from.

In an example, SCeNB mobility in the WTRU may be initiated by an RRC reconfiguration procedure triggered by the RCNC and/or MeNB. The RRC reconfiguration procedure may include the MeNB sending signaling to the WTRU that includes one or more information elements that indicate that the WTRU is to perform a limited mobility procedure for certain DRBs without modifying the WTRU connection to the primary serving site (e.g., indicate the reconfiguration is for SCeNB mobility). For example, one or more data flows (e.g., DRBs) may be rerouted to from a secondary serving site associated with a first secondary serving site to a different secondary serving cell associated with a second secondary serving site. The amount and type of information included in the reconfiguration message may depend on how the data paths are split within the network (e.g., above RLC, above PDCP, etc.). For example, the reconfiguration message may explicitly indicate one or more of the identity of one or more radio bearers to be moved, a SAP identity of the target serving site, transmission and reception sequence numbers for RBs being moved, etc. The reconfiguration messaging may indicate access information in for accessing the target cell at the new secondary serving site. For example, the access information may include a dedicated random access configuration and/or other system information of the target cell. In an example, the WTRU may already have one or more bearers mapped to the target serving site, and the reconfiguration procedure may be to move additional bearers from another serving site to the target serving site.

The primary serving site (e.g., RCNC and/or MeNB) may preconfigure the WTRU with configuration information for one or more potential target secondary serving sites (e.g., SCeNBs). Since the WTRU may be preconfigured with access information for potential target cells associated with different secondary serving sites (e.g., SCeNBs), the mobility procedure may be performed with using RRC signaling procedures in order to configure and execute the handover. For example, WTRU cell switching may be performed by enabling and/or disabling (e.g., activating and/or deactivating) cells associated with one or more SCeNBs. For example, MAC control signaling (e.g., MAC CE) may be used to initiate cell switching between a plurality of preconfigured secondary serving site cells. Further, although examples may be described for mobility between secondary serving sites, the methods and systems disclosed may be equally applicable to switching data flows between one or more secondary serving sites (e.g., SCeNBs) and a primary serving site (e.g., MeNB).

In an example, a secondary serving site may trigger data flow mobility and/or may assist the primary serving site in performing data flow mobility. For example, if a coordinated control architecture and/or distributed control architecture are utilized, some RRC connection functionality may be control at the secondary serving site. In such scenarios, secondary serving sites (e.g., SCeNBs) may be configured to trigger and/or control secondary serving site (e.g., SCeNB) mobility and/or may assist the primary serving site (e.g., MeNB) with secondary serving sites (e.g., SCeNBs) mobility. For example, in a coordinated control architecture and/or in a distributed control architecture one or more SRBs may be managed by the secondary serving site such that the secondary serving sites (e.g., SCeNBs) may be configured with a direct control signaling path to the WTRU. The secondary serving site may utilize the control path to send control signaling (e.g., MAC control signaling) that may be used for SCeNB mobility purposes (e.g., secondary serving site activation and/or deactivation).

Secondary serving sites (e.g., SCeNBs) may configure measurement events and receive measurement reports from a WTRU. The WTRU may be configured by a secondary serving site to detect and report on measurement events. For example, a WTRU may be configured to compare the quality of potential SCeNB small cells and/or the MeNB macro cell with SCeNB small cells that it is currently accessing.

If the secondary serving site has determined to trigger secondary serving site mobility based on RRC measurement reports and/or other information (e.g., resource utilization, traffic balancing, etc.), then the secondary serving site (e.g., SCeNB) may send an RRC reconfiguration message to WTRU in order to instruct the WTRU to handover one or more data flows (e.g., DRBs and/or SRBs) to a target cell associated with another secondary serving site (e.g., SCeNB). In an example, the secondary serving site (e.g., SCeNB) may inform the primary serving site (e.g., MeNB) of the desired mobility procedure (e.g., over the X2bis interface) and the primary serving site may perform the reconfiguration procedure that triggers the secondary serving site mobility.

Methods and systems may be defined for handling data for data flows that undergo a secondary serving site mobility procedure. For example, if a WTRU performs a "secondary serving site handover" between cells associated with different secondary serving sites (e.g., SCeNBs) or between a primary serving site (e.g., a MeNB) and a secondary serving site (SCeNB), the WTRU may be configured to manage UL and DL data transmission such that data associated with a data flow being moved is properly handled so as to avoid data loss and/or minimize/eliminate duplication of transmitted data. The technique(s) utilized to minimize the adverse effects of secondary serving site mobility on transferred data flow(s) may be dependent on the layer 2 split between the primary serving site (e.g., RCNC and/or MeNB) and secondary serving site (e.g., SCeNB). For example, the different techniques for avoiding data loss and/or minimizing data duplication/retransmission may depend on whether the protocol stack for the data floes is split above the MAC, above the RLC, or above the PDCP. For example, if the split is above PDCP, then X2 and PDCP eNB mobility handover related procedures may be used. If the split is above RLC and/or above MAC, one or more additional techniques may be utilized to transfer data and coordinate UL and/or DL transmission in the target cell.

If the layer 2 split is above RLC and/or above MAC, then SDUs transferred between the primary serving site (e.g., RCNC and/or MeNB) and the SCeNB may be identified by unique sequence numbers. The use of unique sequence numbers for SDUs transferred between the primary and secondary serving sites may avoid data loss and maintain the proper sequence of transmission in the DL and/or UL. For example, if the layer 2 split is above RLC, then PDCP PDU sequence numbers may be used. If the layer 2 split is above MAC, then RLC sequence numbers may be used. Sequence numbers may be assigned to SDUs transmitted over the X2bis interface.

Methods that may be used to handle transmission during SCeNB mobility may be integrated with flow control handling for secondary serving site DL transmission. For example, a DL flow control implementation may be used to minimize data buffered in the secondary serving site (e.g., SCeNB), for example, so that data sent and returned over the X2bis may be minimized. For example, a window based transmission scheme and/or credit based transmission scheme may be used in order to identify transmitted data packets. The window based transmission scheme and/or credit based transmission scheme may be reused upon secondary serving site mobility in order to identify data that has and has not been successfully acknowledged by the WTRU.

If secondary serving site mobility event occurs, then unacknowledged data may be forwarded to the target secondary serving site (e.g., SCeNB). The source secondary serving site (e.g., SCeNB) may forward unacknowledged SDUs to the target secondary serving site (e.g., SCeNB) and/or indicate to primary serving site (e.g., RCNC and/or MeNB) the unacknowledged sequence numbers and/or last in sequence delivered sequence number so that primary serving site (e.g., RCNC and/or MeNB) may forward the proper SDUs to the target secondary serving site (e.g., SCeNB).

If layer 2 is split above RLC and secondary serving site mobility is triggered, then, in the DL sufficient PDCP PDUs may be pre-generated in order to avoid limiting DL scheduling by the secondary serving sites (e.g., SCeNB). The DL PDCP entity in primary serving site (e.g., RCNC and/or MeNB) may be unaware of the transmission status of these PDCP PDUs. The primary serving site may be configured to determine the transmission status of the PDCP PDUs to reduce transmission latency during the secondary serving site mobility event.

For example, the secondary serving site (e.g., SCeNB) may return DL RLC SDUs to primary serving site (e.g., RCNC and/or MeNB) that have not been acknowledged at the RLC layer by the WTRU. Sequence numbers of RLC SDUs not successfully received and/or the sequence number of last in-sequence delivered RLC SDU may be indicated to the primary serving site. The sequence numbers may indicate transmission status when secondary serving site (e.g., SCeNB) mobility occurs.

Indicating RLC SDU sequence numbers may performed when the secondary serving site (e.g., SCeNB) indicates RLC SDUs that have been acknowledged by the peer RLC entity to the primary serving site (e.g., RCNC and/or MeNB), which may maintain DL data buffering in for RLC (e.g., in the RCNC and/or MeNB). Methods such as window based transfer protocol, a credit based implementation, and/or the like may be used to control the flow of RLC SDUs. The primary serving site (e.g., RCNC and/or MeNB) may be aware of the delivery status of RLC SDUs. The delivery status of RLC SDUs may be used upon secondary serving site (e.g., SCeNB) mobility to coordinate DL data delivery to the target secondary serving site (e.g., SCeNB). The sequence numbers indicated may be the PDCP sequence number or other sequence numbers used to control the flow of data between the primary serving site (e.g., RCNC and/or MeNB) and the secondary serving site (e.g., SCeNB).

For UL data handling in the network, the secondary serving site (e.g., SCeNB) may forwards in-sequence received RLC SDUs to the primary serving site (e.g., RCNC and/or MeNB) (e.g., may forward automatically). The secondary serving site (e.g., SCeNB) may forward non-sequential RLC SDUs upon secondary serving site (e.g., SCeNB) mobility.

UL data handling in the WTRU may be similar to DL data handling in the network. RLC SDUs that have not been successfully acknowledged may be indicated to PDCP. This may be combined with providing indications of successful RLC transmission of RLC SDUs to PDCP.

As noted above, although the procedures for secondary serving site mobility may have been described herein for mobility between SCeNBs, the methods may be used for mobility between SCeNBs and the MeNB.

In an example, secondary serving site (e.g., SCeNB) mobility may be performed with a Layer 2 split above MAC. If secondary serving site (e.g., SCeNB) mobility is triggered, then outstanding data already provided to the secondary serving site (e.g., SCeNB) may be handled by the RLC instances within the primary serving site (e.g., RCNC and/or MeNB). In the DL, enough RLC PDUs may be pre-generated to avoid limiting DL scheduling by the secondary serving sites (e.g., SCeNBs). The DL RLC entity in the primary serving site (e.g., RCNC and/or MeNB) may be unaware of the transmission status of the RLC PDUs. Methods may be used to determine the transmission status to reduce transmission latency.

Upon secondary serving site (e.g., SCeNB) mobility, the secondary serving site (e.g., SCeNB) may identify the transmission status of outstanding RLC PDUs buffered in the secondary serving site (e.g., SCeNB) and/or the last transmitted MAC SDU for a supported RLC instance. The transmission status may be which MAC SDUs have been processed and transmitted by MAC and/or which MAC SDUs have been HARQ acknowledged by the WTRU.

Methods may be used to combine indicating the transmission status of MAC SDUs with transferring of MAC SDUs between the primary serving site (e.g., RCNC and/or MeNB) and the secondary serving site (e.g., SCeNB). For example, the secondary serving site (e.g., SCeNB) may maintain enough buffered MAC SDUs to avoid restricting DL scheduling. The primary serving site (e.g., RCNC and/or MeNB) may limit the amount of pre-generated RLC PDUs. The flow of MAC SDUs between the RCNC and the secondary serving site (e.g., SCeNB) may be controlled, for example using a window based transfer protocol and/or a credit based scheme.

MAC SDUs may be identified to the primary serving site (e.g., RCNC and/or MeNB) by their RLC sequence number and/or other sequence numbers used to control the flow of data between the primary serving site (e.g., RCNC and/or MeNB) and the secondary serving site (e.g., SCeNB). The WTRU may generate a status report for each re-routed RLC AM instance that is transfer due to secondary serving site (e.g., SCeNB) mobility, for example, upon MAC initialization in the target cell. For RLC UM, the primary serving site (e.g., RCNC and/or MeNB) may use the sequence number indication described herein to determine where to start DL transmission in the target secondary serving site (e.g., SCeNB).

For RLC AM, a RLC status report in the target cell may be used to determine where transmissions should start in the target cell (e.g., for UL data handling). This status report may be generated (e.g., automatically generated) by the primary serving site (e.g., RCNC and/or MeNB) upon secondary serving site (e.g., SCeNB) mobility completion. For RLC UM, the WTRU may be aware of where transmissions stopped in the source secondary serving site (e.g., SCeNB) cell and may resume transmissions from that point in the secondary serving site (e.g., SCeNB) target cell. The WTRU may utilize HARQ feedback in the source secondary serving site (e.g., SCeNB) cell to better approximate where to initiate UL transmissions.

To support multi-scheduler principles, RLF and re-establishment procedures may be implemented in the primary and/or secondary serving sites during periods of adverse channel conditions. For example, a WTRU may have one or more DRBs/SRBs that are associated with a single MAC instance. If RLM is configured for a secondary MAC instance (e.g., associated with a SCeNB), then the WTRU may determine that RLF has occurred one or more serving cells (e.g., a PCell, all serving cells, etc.) configured for the MAC instance. Upon determining RLF has occurred, the WTRU may transmit uplink control signaling (e.g., RRC) using a MAC instance (e.g., the primary MAC instance associated with the MeNB) for which RLF has not occurred. The RRC signaling may include a RRC Connection Re-establishment request (or similar) and may be sent over SRB1 and/or over a data path corresponding to a primary MAC instance. The re-establishment request may indicate that the re-establishment is not be for the primary MAC instance even though the transmission was sent over the primary MAC instance. For example, the re-establishment request may include an indication of the MAC instance that failed and/or may be sent over SRB3. The WTRU may suspend concerned DRBs/SRBs (e.g., DRB(s) and/or SRB3 that are mapped to the secondary MAC instance that failed). The WTRU may reset the failed MAC instance. The WTRU may release a PCell and/or SCells of the MAC instance that failed. The WTRU may re-establish PDCP and/or RLC for one or more of the suspended DRBs when it receives a RRC Connection Reconfiguration message that re-associates one or more of the concerned RB(s) with a MAC instance (e.g., the previous MAC instance and/or a new MAC instance). The WTRU may resume a one or more suspended DRBs. The WTRU may resume a suspended SRB, for example, if the RBs are re-associated with the secondary MAC instance.

For DRB mobility, a WTRU may have one or more DRBs/SRBs that are associated with a single MAC instance. The WTRU may receive a RRC Connection Reconfiguration that reconfigures the WTRU such that one or more of the serving cells of a given MAC instance may be removed. The WTRU may reset the concerned MAC instance. The WTRU may suspend the concerned DRBs and SRBs (e.g., if any), until it receives control signaling that re-associates one or more of the concerned RB(s) with a MAC instance. The WTRU may re-establish PDCP for the concerned DRBs and SRBs (e.g., if any). The WTRU may re-establish RLC for the concerned DRBs and SRBs (e.g., if any).

Measurement reporting may be performed across the cells of various layers, and measurements of cells in a given layer may be reported over one or more cells of other layers. To assist the WTRU to perform and/or repot measurements, a small cell (e.g., a SCeNB) may be configured such that synchronization signals and reference signals broadcast in the small cells may differ from signals used for the purpose of detection and measurement of macro cells (e.g., Primary Synchronization Signal (PSS)/Secondary Synchronization Signal (SSS), cell-specific reference signals, etc.). For example, synchronization signals and/or reference signals may be defined for broadcasts from small cells. A WTRU may be configured to detect and/or measure cells that support the newly defined synchronization and reference signals. For example, the WTRU may determine that a cell is a small cell based on detecting synchronization signals and/or reference signals that are associated with small cell operation.

For example, when the WTRU receives a measurement configuration the WTRU may be notified that synchronization signals and/or reference signals that are associated with small cell operation may be present in a given frequency and/or are to be measured as a certain measurement object. The measurement configuration may indicate to the WTRU whether legacy types of signals may be present at the indicated frequency. The measurement configuration may include additional information that assists the WTRU in detecting synchronization signals and/or reference signals that are associated with small cell operation. For example, the measurement configuration may indicate one or more periods of time when the synchronization signals and/or reference signals that are associated with small cell operation may be transmitted/received and/or one or more properties of the synchronization signals and/or reference signals that are associated with small cell operation.

For example, the measurement configuration may indicate a period of time during which synchronization signals and/or reference signals that are associated with small cell operation may be transmitted/received. The indication regarding the timing of the synchronization signal and/or reference signal transmission may be as a function of frame number and/or subframe number. For example, the frame number and/or subframe number may correspond to frames/subframes of the primary layer. Transmission of the synchronization signals and/or reference signals that are associated with small cell operation may occur as pattern of subframes that repeat periodically. For example, the configuration information may indicate the frequency at which the pattern is repeated.

In an example, the measurement configuration may indicate one or more properties for one or more synchronization signals and/or reference signals that are associated with small cell operation. For example, the measurement configuration may indicate an index and/or identifier that is used for the generation of a synchronization signal and/or reference signal that is associated with small cell operation (e.g., such as a zadoff-chu base sequence index). In an example, the measurement configuration may include an indication of the type of cell and/or the type of signal the WTRU may expect to find at the configured frequency. For example, the type of cell and/or the type of signal may be used as an indication of one or more of the type of access technology associated with the cell, the sustained data rates achievable in the cell, the current state of the cell (e.g., congested, accessible, etc.), and/or the like. The type of cell and/or the index used to generate a synchronization signal and/or reference signal that is associated with small cell operation may be indicative of one or more conditions that the WTRU should meet in order to operate or use the resources of the cell. For example, the type of cell and/or the index used to generate a synchronization signal and/or reference signal that is associated with small cell operation may indicate one or more of a capability that should be present in order to access the cell, a maximum speed that the WTRU may operate in while in the cell, information related to the rate of change of the channel conditions in the cell, and/or the like.

The WTRU may report measurement the results of measurements performed on one or more detected small cell(s) that transmit synchronization signals and/or reference signals that are associated with small cell operation. For example, the WTRU may report measurements performed on a small cell after detecting a cell that broadcasts synchronization signals and/or reference signals that are associated with small cell operation. The WTRU may be configured to report measurements of a small cell and/or measurement information of synchronization signals and/or reference signals that are associated with small cell operation based on detecting a trigger such as the received power or quality being above a given threshold. In an example, even if the WTRU detects a configured trigger for reporting measurements related to small cell operation, the WTRU may refrain from reporting the measurements if the WTRU does not meet one or more conditions for operating or using the resources of the cell. For example, the synchronization signals and/or reference signals that are associated with small cell operation may indicate one or more capabilities that the WTRU should possess in order to operate in the cell. The WTRU may report measurements for a cell if the WTRU detects a measurement reporting trigger and the WTRU meets the criteria for accessing the cell.

The WTRU may include one or more items of information regarding the small cell in the measurement report. For example, the measurement report may include one or more of an identifier of the signal being measured, an identifier of the cell being measured, an indication of the type of signal measured, an indication of the type of cell measured, an indication of a property of the signal detected, and indication of a property of the cell detected, and/or the like. The measurement report may indicate whether the detected/measured signal is of a legacy type or a synchronization signal and/or reference signal that is associated with small cell operation. The measurement report may include information indicating whether the WTRU may operate in the detected cell. Other information that may be included in the measurement report may comprise one or more of measurement results regarding the rate of change of the channel, a mobility state of the WTRU, a number of recent mobility events experience by the WTRU with a given time period (e.g., such as number of reconfiguration procedures with mobility, number of re-establishment procedures, etc.), and/or the like.

Mobility state estimation (MSE) may be performed by the WTRU. For example, as part of the MSE procedures, the W TRU may determine/count the number of handovers (e.g., and/or cell reselections) performed by the WTRU within a period of time. Based on the number of handovers (e.g., and/or cell reselections) performed within the time period, the WTRU may determine a mobility state for itself. For example, the WTRU may determine that it is operating in a low, medium, or high mobility state. The state determined in the MSE may be used to scale one or more mobility variables, such as the Treselection timer. For example, the value of the Treselection timer may be scaled to a larger value for less mobile WTRUs and may be scaled to a shorter value for more mobile WTRUs.

Independent mobility states may be associated with the primary and secondary layers. For example, the primary layer may be associated with a first mobility state for the WTRU and the secondary layer may be associated with a second mobility state for the WTRU if the WTRU is operating using dual connectivity. For example, the MSE in each layer may be determined by separately counting the number of reconfigurations involving mobility in each layer. The WTRU may maintain independent MSE values and/or perform independent determinations regarding the MSE for each configured layer. The WTRU may be configured to scale one or more parameters associated with a given layer based on the MSE determined independently for that layer. For example, one or more configured handover parameters (e.g., time-to-trigger (TTT)) for a given layer may be scaled based on the MSE determination for that layer. Events associated with one or more measurement objects corresponding to a given layer may be scaled according to the MSE for that layer. In an example, the WTRU may measure events associated with the PCell of a layer when determining MSE information for that layer, but may refrain from considering SCell(s) for that layer when determining the MSE for the layer.

In an example, the WTRU may also count other mobility-related events in order to determine MSE information, for example on a per layer basis. For example, for a given primary and/or for a secondary layer, the WTRU may maintain count(s) of one or more of the number of DL radio link failures, the number of UL radio link failures, the number of MAC reconfigurations for a secondary layer, the number of unique cells discovered for a given layer, whether the WTRU has detected radio conditions that are above a specified threshold for more than a specified period of time for a cell of a secondary layer, and/or the like. The counts may be used by the WTRU to determine MSE information for a layer. The amount of time over which the counts are measured for MSE may be a function of the characteristics of a cell (e.g., cell size, etc.).

A WTRU may be configured to perform one or more autonomous mobility procedures. For example, a WTRU may be configured for operation within a plurality of serving cells associated with a secondary layer. One or more cells configured for use by the WTRU within the secondary layer may be in a deactivated state. The WTRU may be configured to perform measurements of the cells within the secondary layer (e.g., activated and/or deactivated cells). Such measurements of active and/or deactivated cells within a secondary layer ay trigger the WTRU to perform one or more autonomous mobility events. As an example, the WTRU may be triggered to begin performing measurements for the purpose of autonomous mobility based on WTRU transmission buffer information. For example, if one or more buffers include an amount of data that is greater than a predetermined threshold, then the WTRU may begin performing measurements for the purpose of autonomous mobility.

For example, the WTRU may determine that one or more measured qualities associated with a deactivated cell of a secondary layer has become better than one or more measure qualities of an activated cell of the secondary layer, for example by more than a configured offset value. Rather than or in addition to comparing measurements between an activated cell of the secondary layer and a deactivated cell of the secondary layer (e.g., with an offset value), WTRU may compare measurements of a deactivated cell of the secondary layer to a threshold value in order to perform autonomous mobility. For example, the WTRU may determine that measurements associated with a deactivated cell of a secondary layer have become better/greater than a threshold value.

If the measured quality of the deactivated cell exceeds the measured quality of the activated cell (e.g., by more than an offset value) and/or the measured quality of the deactivated cell exceeds a threshold, the WTRU may be configured to initiate a procedure to establish a physical layer connection to the deactivated cell (e.g., the WTRU may attempt to connect to and/or activate the cell in the WTRU secondary layer configuration). Such a procedure may include a procedure to move the deactivated cell from a dormant mode to an active mode. For example, the WTRU may initiate a procedure access and/or create a connection to the previously deactivated cell. Such procedure may be similar to a connection establishment procedure. For example, the UE may perform a RACH procedure on uplink resources of the previously deactive cell. The RACH procedure may be performed using dedicated PRACH signaling. For example, the dedicated RACH parameters may enable the eNB serving the cell the WTRU is attempting to access to uniquely identify the WTRU. Rather than or in addition to attempting to access the cell via RACH, the WTRU may transmit RRC signaling to the concerned eNB. Once the RACH and/or RRC procedures successfully complete(s), the WTRU may move the cell and consider it to be in an activated state. In an example, the WTRU may move its previous cell (e.g., of the secondary layer) to a deactivated state, for example if the previous cell is no longer of sufficient quality. In an example, the WTRU may transmit control signaling to notify the MeNB of the WTRU autonomous activation of the cell in the secondary layer. The WTRU may also indicate deactivation of its previous cell in the secondary layer, if applicable. The MeNB may coordinate with the corresponding SCeNB(s) for proper routing of packets and other information related to the WTRU dual connectivity.

A WTRU may be configured to configure/reconfigure one or more radio bearers based on reception of reconfiguration signaling (e.g., the reconfiguration signaling may be or may not be mobility related). For example, upon reception of an RRCConnectionReconfiguration message, the WTRU may perform various actions related to RBs associated with a primary and/or secondary radio bearer. For example, if the reconfiguration message indicates the addition of at least one SRB for a secondary layer (e.g., SRB0, SRB1, and/or SRB2 in the case of a coordinated control plane, SRB3 in case of a distributed control plane, may not applicable to the centralized control plane, etc.) the WTRU may be configured to perform various actions based on its current connectivity. For example, if the WTRU has a single RRC Connection and the RRC connection is with the primary layer (e.g., as in a distributed control plane), the WTRU may implicitly determine that the identity for the SRB to be added in the secondary layer is SRB3 (e.g., INTEGER(3)) independently of the value of the srb-Identity in the reconfiguration message (e.g., if present).

If the SRB being added is the first SRB for the secondary layer and if the secondary layer implements a separate security context for the control plane, then the WTRU may configure lower layers (e.g., PDCP) according to the integrity protection algorithm and the Krrint key derived for and applicable to the secondary layer and/or may configure lower layers (e.g., PDCP) according to the ciphering algorithm and the Kupenc, Krrcenc keys derived for and applicable to the secondary layer. The WTRU may consider that security to be inactive (e.g., not started) until successful completion of the Security Mode Activation procedure for the secondary layer. If the SRB being added is the first SRB for the secondary layer, and if the secondary layer implements a security context that is common with the macro layer for the control plane (and/or with any other layer for which security already is activated), the WTRU may apply the security context (e.g. keys) of the macro layer (e.g., or other layer with shared security) to the secondary layer and consider security as started for the secondary layer. The WTRU may associate the newly added SRB to the MAC instance for the secondary layer. For example, control plane data for the corresponding bearer may be transmitted using a logical channel associated with the corresponding MAC instance.

If a received reconfiguration message indicates the addition of at least one DRB for a secondary layer and/or if the reconfiguration message indicates that at least one DRB is moved from a first layer (e.g., a primary layer) to a second layer (e.g., a secondary layer) or vice versa, then the WTRU may perform various actions to add or move the bearer configuration to a given layer. For example, if the secondary layer implements a security context that is common with the macro layer for the user plane (and/or with another layer which security is already activated for), the WTRU apply a new value for the drb-identity. If the secondary layer implements a security context that is common with the macro layer for the user plane (and/or with another layer which security is already activated for), the WTRU may configure lower layers (e.g., PDCP) according to the ciphering algorithm and the Kupenc key applicable to the macro layer (e.g., or other layer with shared security). If the secondary layer implements a separate security context for the user plane, the WTRU may configure lower layers (e.g., PDCP) according to the ciphering algorithm and the Kupenc key derived for and applicable to the secondary layer. The WTRU may be configured to associate the added and/or transferred DRB(s) to the MAC instance associated with the secondary layer. For example, any user plane data for the corresponding bearer may be transmitted using a logical channel associated with the MAC instance for the secondary layer. Similar techniques may be applied for moving an SRB between layers as is described for moving DRBs between layers.

If the reconfiguration indicates that at least one DRB is re-associated/moved from a first layer (e.g., a primary layer) to a second layer (e.g., a secondary layer) or vice-versa, the WTRU may be configured to re-establish PDCP for the concerned DRB, re-establish RLC for the concerned DRB, resume use of the concerned DRB if it had been suspended (e.g., in case of re-establishment), and/or the PDCP entity associated with the DRB may be configured to handle retransmissions of unacknowledged PDCP SDUs (e.g., based on a PDCP status report).

Mobility of radio bearers at a given layer may apply current security update mechanism. For example, if layer-specific security is applied at the WTRU, depending on the control/user plane architecture, applying a security update may result in the KEY change operation being a function of a change in the RRC connection and MAC instance. For example, the key may be changed when both the RRC connection and the MAC instance is changed to a different eNB (e.g., at either mobility at the macro layer and/or ay the small cell layer). In an example, the mobility of a radio bearer across layers may result in the bearer maintaining the same security context. For example, if macro layer-specific security is applied, depending on control/user plane architecture, the KEY change operation may be a function of a change in the RRC connection and the type of RRC connection (e.g., whether it is primary/macro or secondary/small cell layer). For example, the key may be changed for a moved bearer when the RRC connection associated with the macro cell is changed to a different eNB, but not otherwise. Mobility of radio bearers may result in applying re-keying at due to a radio bearer mobility event. For example, if WTRU-specific security is applied, depending on control/user plane architecture, a KEY change operation may be a function of a change in the RRC connection, a change in the type of RRC connection (e.g., whether it is primary/macro or secondary/small cell layer), and/or a change in the MAC instance. For example, the key is changed for the moved bearer based on any of a change in the node associated with the RRC connection (e.g., from the macro cell layer to a small cell layer or vice versa), the MAC instance being changed to a different eNB, and/or the like.

Examples may be described for ensuring secure communication between the WTRU and a SCeNB. The examples described herein may be applicable to architectures the PDCP protocol is terminated at the SCeNB for at least one radio bearer, although the examples may be applicable to other architectures as well. For example, the PDCP may be terminated in the SCeNB for one or more data radio bearers (DRBs) and/or one or more signaling radio bearers (e.g., SRB3). For example, an SRB associated with a PDCP instance in the SCeNB may be configured to carry control plane messages managing connectivity between the WTRU and the SCeNB. Control protocols for handling connectivity between the WTRU and the SCeNB may be referred to as secondary RRC. Secondary RRC may or may not be configured to provide mobility for the connection between the WTRU and the SCeNB.

The peer PDCP entities in the WTRU and SCeNB may employ one or more security keys. For example, the peer PDCP entities in the WTRU and SCeNB may utilize $K_{RRCint}^{(s)}$ and $K_{RRCenc}^{(s)}$, for example for integrity protection and ciphering of secondary RRC messages between SCeNB and WTRU, respectively. The peer PDCP entities in the WTRU and SCeNB may utilize $K_{UPenc}^{(s)}$ for ciphering of user data (DRB) transferred between the SCeNB and WTRU.

Examples for deriving the above security keys are described. In an example, the same keys as are used in MeNB may be used at the SCeNB and the BEARER calculation may change. For example, one or more security keys applied between the WTRU and the SCeNB may be identical to one or more security keys applied between the WTRU and the MeNB. For example, the same security keys may be used for the same purposes at each of the MeNB and the SCeNB. The WTRU may apply the same security key for any radio bearer regardless of which MAC instance (or serving site/layer) the radio bearer is mapped to.

To enable the reuse of the security keys without compromising security, the 5-bit BEARER parameter used as input for the ciphering operation may be different for any pair of radio bearers configured for the WTRU regardless of whether the corresponding MAC instances (or serving sites/layers) are the same or not. For example, RBs associated with different layers may be assigned different RB identities, including for signaling radio bearers. In an example, a different 5-bit bearer identity input parameter (e.g., BEARER) may be used for ciphering than the configured RB identity parameter. For example, the 5-bit bearer identity input parameter used for ciphering may be selected based on the RB identity and the identity of the layer that the bearer is associated with. For example, the BEARER parameter may be set to the RB identity if the bearer is associated with the MeNB, and set to the RB identity+16 if the bearer is associated with the SCeNB. In another example, the BEARER parameter could be set to the sum of the RB identity and a layer identity (e.g., which may take different values depending on whether the bearer is associated with the MeNB or SCeNB). In another example, the BEARER parameter could be set to the RB identity if the bearer is associated with the MeNB, and set to the RB identity+31 if the bearer is associated with the SCeNB.

In an example, to enable security key reuse without compromising security, the 32-bit COUNT parameter used as input for ciphering operation may be configured to be different for any pair of radio bearers configured for use for the WTRU. For example, the COUNT parameter may be different for each bearer regardless of whether the corresponding MAC instances (or serving sites/layers) are the same or not. As an example, the WTRU may utilize a 32-bit COUNT input parameter for ciphering that is different than the COUNT of the PDCP entity corresponding to the radio bearer on which data is being ciphered. For example, the COUNT input parameter may be selected as a function of the COUNT of the PDCP entity corresponding to the radio bearer on which data is being ciphered and another parameter that is indicative of which layer the RB is associated with. For example, the COUNT parameter could be set to the PDCP COUNT associated with the PDCP entity of the radio bearer if the bearer is associated with the MeNB, and if the bearer is associated with the SCeNB the COUNT value may be set to the COUNT of the PDCP entity+an offset. For example, the offset may be $2^{31}-1$. In another example, the COUNT parameter could be set to the sum of the COUNT for the corresponding PDCP entity for the bearer and of a layer identity (e.g., which may take different values depending on whether the bearer is associated with the MeNB or SCeNB). In another example, the COUNT parameter may be set to the sum of the COUNT for the corresponding PDCP entity, the RB identity, and a layer identity (e.g., or some other function other than a sum based on those parameters). In another example, the COUNT parameter may be set to the COUNT value of the PDCP entity for the bearer if the bearer is associated with the MeNB and set to the sum of the COUNT value of the PDCP entity for the bearer+RB identity if the bearer is associated with SCeNB.

The SCeNB may obtain the relevant keys directly from the MeNB through backhaul signaling (e.g., over X2bis interface) prior to and/or during configuration of a secondary layer. In an example, the SCeNB may obtain a single KeNB key from the MeNB and derive the different keys for ciphering and integrity protection based on KeNB. In this example, the KeNB key used by the SCeNB may be identical to the KeNB key used by the MeNB.

The SCeNB may use different keys than the MeNB. In an example, a security key applied between the WTRU and the SCeNB may be different than a security key applied between the WTRU and the MeNB for the same purpose (e.g., ciphering of DRBs, ciphering of SRBs, integrity protection of SRBs, etc.). The WTRU may be configured to concurrently apply two sets of security keys. A first set of keys (e.g., $K_{UPenc}$, $K_{RRCint}$, $K_{RRCenc}$, etc.) may be applied to radio bearers mapped to the MAC instance corresponding to the MeNB while one or more keys from a second set of keys (e.g., $K_{UPenc}^{(s)}$, $K_{RRCint}^{(s)}$, $K_{RRCenc}^{(s)}$, etc.) may be applied to radio bearers mapped to the MAC instance corresponding to the SCeNB.

For example, the WTRU may be configured to derive the keys used for radio bearers associated with the MeNB and the keys used for radio bearers associated with the SCeNB using the same KeNB. For example, the WTRU may derive the MeNB set of keys (e.g., $K_{UPenc}$, $K_{RRCint}$, $K_{RRCenc}$, etc.) using a first set of algorithm type distinguisher (e.g., RRC-enc-alg, RRC-int-alg, UP-enc-alg), and the WTRU may derives the SCeNB set of keys (e.g., $K_{UPenc}^{(s)}$, $K_{RRCint}^{(s)}$, $K_{RRCenc}^{(s)}$, etc.) using a second set of algorithm type distinguishers (e.g., RRC-enc-alg$^{(s)}$, RRC-int-alg$^{(s)}$, UP-enc-alg$^{(s)}$).

In an example, the WTRU may be configured to derive a value KeNB$^{(s)}$ (e.g., for deriving keys associated with bearers corresponding to the SCeNB) from KeNB (e.g., which is used for deriving keys associated with bearers corresponding to the MeNB). For example, the WTRU may maintain two currently active keys (KeNB and KeNB$^{(s)}$) for the primary and secondary layers, respectively. Based on the key KeNB$^{(s)}$ the WTRU may derive one or more of the second set of keys associated with bearers corresponding to the SCeNB (e.g., $K_{UPenc}^{(s)}$, $K_{RRCint}^{(s)}$, $K_{RRCenc}^{(s)}$, etc.). Upon initial configuration of a secondary layer, the WTRU may derive the key KeNB(s) from the currently active KeNB key used in the primary (macro) layer.

The derivation of KeNB$^{(s)}$ from KeNB may be performed based on a horizontal key derivation algorithm, for example based on the physical layer identity/physical cell identity (PCI) and the frequency EARFCN-DL of a serving cell of the secondary layer as indicated in the received reconfiguration message that configured the secondary layer. In an example, the derivation may be performed based on a vertical key derivation algorithm. For example, a vertical key derivation may be performed if the reconfiguration message includes a nextHopChainingCount (NCC) parameter and if this parameter is different from a NCC associated with KeNB. The NCC associated with KeNB$^{(s)}$ may thus be different from the one associated with KeNB.

At the network side, the MeNB may derive the value of $KeNB^{(s)}$ from KeNB and provide $KeNB^{(s)}$ to the SCeNB through backhaul signaling in preparation of the configuration of the secondary layer. The MeNB may store $KeNB^{(s)}$ for further key derivation in subsequent reconfigurations.

In an example, $KeNB^{(s)}$ may be derived based on the parameter UL NAS $COUNT^{(s)}$. For example, the WTRU may derive the $KeNB^{(s)}$ key from an additional UL NAS $COUNT^{(s)}$ used for the purpose of key derivation in the secondary layer. For example, the UL NAS $COUNT^{(s)}$ may be derived by applying an offset to the UL NAS COUNT of the primary layer. For example, in order to derive the $KeNB^{(s)}$ key, the UL NAS COUNT may be substituted with (UL NAS COUNT+offset) where offset may be large enough to prevent the reuse of UL NAS COUNT values. In another example, the UL NAS $COUNT^{(s)}$ may be derived from the UL NAS COUNT of the MeNB by padding the 24 bit internal representation of UL NAS COUNT with an 8-bits sequence (e.g., that is not simply 8 zeros in the most significant bits). In another example, the additional UL NAS $COUNT^{(s)}$ may be derived by applying some transformation function to the UL NAS COUNT of the MeNB. For example, UL NAS $COUNT^{(s)}$ may be set to 2×UL NAS COUNT+0 or 2×UL NAS COUNT+1, etc. In another example, the KeNB of the MeNB layer may be derived using (2×NAS count+0) while the $KeNB^{(s)}$ of the SCeNB layer may be derived using (2×UL NAS COUNT+1). In another example, the UL NAS COUNT of the MeNB and the UL NAS $COUNT^{(s)}$ of the SCeNB may be set to the sum of the UL NAS COUNT and of a layer identity (e.g., which may take different values depending on whether the bearer is associated with the MeNB or SCeNB). While these examples of an additional UL NAS $COUNT^{(s)}$ calculation are expressed in terms of UL NAS COUNT, similar examples for deriving UL NAS $COUNT^{(s)}$ may be expressed in terms of DL NAS COUNT.

In an example, $KeNB^{(s)}$ may be derived from an additional parameter $Kasme^{(s)}$. For example, the WTRU may derive the $KeNB^{(s)}$ key from an additional key (e.g., $Kasme^{(s)}$ key) used for the purpose of key derivation in the secondary layer. The $Kasme^{(s)}$ key may be stored at the MME and may be derived at both the UE and MME using a method similar to the method used for deriving Kasme. The WTRU may maintain an additional $NH^{(s)}$ key and $NCC^{(s)}$ parameter for the purpose of vertical key derivation of $KeNB^{(s)}$. At the network side, in addition to the NH and NCC pair used for the purpose of KeNB derivation, the MME may provide a target eNB an additional $NH^{(s)}$ key and $NCC^{(s)}$ parameter. Upon a reconfiguration involving a change of MeNB, the WTRU may be provided with both NCC and $NCC^{(s)}$ parameters and update its NH and $NH^{(s)}$ keys accordingly. The $NH^{(s)}$ key may be updated even if not used for deriving a $KeNB^{(s)}$ key.

$Kasme^{(s)}$ may be derived in several ways. For example, the WTRU may derive $Kasme^{(s)}$ from an additional authentication vector used for the purpose of key derivation in the secondary layer. As an example, the WTRU may receive an additional random number (e.g., $RAND^{(s)}$) and an additional authentication number (e.g., $AUTN^{(s)}$) from the MME during the authentication and key agreement (AKA) procedure. The WTRU then uses the $RAND^{(s)}$ and the $SQN^{(s)}$ included in the additional $AUTN^{(s)}$ to generate an additional ($CK^{(s)}$, $IK^{(s)}$) pair, which the WTRU may then use for the generation of the additional $Kasme^{(s)}$. The MME may also send to the WTRU an additional $KSI^{(s)}$ (Key set identifier) for example as part of the NAS security mode command message.

In an example, the WTRU may use a "fake" or virtual serving network $ID^{(s)}$ (SN $ID^{(s)}$) or a secondary SN $ID^{(s)}$ to derive the additional $Kasme^{(s)}$. For example, the WTRU may receive the additional SN ID (e.g., SN $ID^{(s)}$) from the network (e.g., MME). In an example, the WTRU may generate the additional SN ID (e.g., SN $ID^{(s)}$) and may communicate the additional SN ID (e.g., SN $ID^{(s)}$) to the network. In an example, the WTRU and the network may independently generate the additional SN ID (e.g., SN $ID^{(s)}$), for example based on pre-establish rules or algorithm).

In an example, the WTRU may execute an additional AKA procedure (e.g., $AKA^{(s)}$) with the MME. The additional AKA procedure may be a simplified version of the existing AKA procedure where the WTRU may compute the additional $CK^{(s)}$ and $IK^{(s)}$ and may skip the computation of the RES (e.g., response to authentication challenge). The WTRU may then use the additional $CK^{(s)}$, $IK^{(s)}$ for the generation of the additional $Kasme^{(s)}$. The MME may also send to the UE an additional KSI (e.g., $KSI^{(s)}$) for generating the additional $Kasme^{(s)}$.

Upon transition from EMM-IDLE to EMM-CONNECTED, when the WTRU already has been configured with two Kasme keys (e.g., Kasme for MeNB and $Kasme^{(s)}$ for SCeNB), the WTRU and the MME may coordinate the use of layer specific Kasme a variety of methods. For example, the WTRU may include two KSIs in the initial NAS message (e.g., service request message). The WTRU may indicate the mapping of the KSI to eNB layer in the initial NAS message. If the mapping of KSI to layer is not indicated, the WTRU may subsequently determine which KASME is mapped to which eNB layer (e.g., which KASME is used to derive which KeNB at the MME), for example by doing a "blind matching" of the KeNBs. Upon reception of the AS security mode command (e.g., an RRC SecurityModeCommand message) from the eNB that the WTRU has connection to, the WTRU may derive two KeNBs and the associated RRC integrity keys using the two layer specific $K_{ASME}$(s) identified by the two KSI included in the initial NAS message. The WTRU may iteratively verify the integrity of the RRC security mode command message by using the RRC integrity key(s) derived from each of the two KeNB. The WTRU may considers the KeNB used to generate the RRC integrity key used to successfully verify the integrity of the AS security mode command as the KeNB assigned by the MME to the eNB that the WTRU has a current RRC connection to. Similarly, the WTRU may determine the $K_{ASME}$ being used by the MME to generate NAS integrity and ciphering key using a "blind matching" principle for the first NAS message received after the service request procedure. For example, the WTRU may perform "blind matching" to determine the Kasme association to eNB layer even if WTRU indicates a KSI mapping to eNB layer initially in the service request message.

In an example, the WTRU may include one KSI in the initial NAS message, for example a service request message. For example, both the WTRU and the network may assume the KSI is for the MeNB layer. In another example, both the WTRU and the network may assume the KSI is the one that maps to the SCeNB layer. In an example, both the WTRU and the core network may assume the KSI maps to the eNB layer the UE has an RRC connection to. In an example, the network may explicitly signal to the WTRU the mapping for of the KSI t appropriate eNB layer. A new procedure (e.g., a new NAS procedure) may be executed between the core network and the WTRU to establish the mapping of KSI to eNB layer. The MME may trigger the execution of this procedure. In an example, the WTRU may derived the Kasme mapping to eNB layer from the AS security mode command message.

Upon subsequent reconfiguration involving a mobility event (and/or when the mobilityControlInfo IE is included in the message) when the WTRU already maintains two sets of currently active keys derived from KeNB and KeNB(s), the WTRU may derive new keys for the primary layer, the secondary layer, or both, according to one or more methods.

In an example, the WTRU may maintain an indication of the most recently derived key (e.g., which may correspond to either KeNB or KeNB$^{(s)}$). The most recently derived key may be used as a basis for deriving a new key KeNB* or KeNB*$^{(s)}$ upon a reconfiguration. After derivation of a new key during a subsequent reconfiguration procedure, the result of the derivation may become the new most recently derived key. If the reconfiguration involves derivation of two new keys (e.g., one for each layer), a subsequent (e.g., second) new key may be derived from a first new key. The order of key derivation may be indicated in the reconfiguration message or be pre-defined (e.g., primary layer first or secondary layer first, etc.). The WTRU may store the most recently derived key even if the corresponding layer for this key is removed in a subsequent reconfiguration. At the network side, the MeNB may also store two keys KeNB and KeNB(s) and an indication of which is the most recently derived key between the two.

Upon a reconfiguration such as reconfiguration due to mobility in the secondary layer, the MeNB may derive the new key KeNB*$^{(s)}$ from the most recently derived key, and provide the value of KeNB*$^{(s)}$ to the target SCeNB. Upon a reconfiguration involving mobility in the primary layer but not the secondary layer, the MeNB may derive the new key KeNB* from the most recently derived key and provide the value of KeNB* to the target MeNB and/or target SCeNB. Upon a reconfiguration involving mobility in both the primary and secondary layers, the MeNB may derive first a new key KeNB*from the most recently derived key and then derive a new key KeNB*$^{(s)}$ from KeNB*. The MeNB may provide the values of KeNB* and KeNB*$^{(s)}$ to the target MeNB and the target MeNB may provide the values of KeNB*$^{(s)}$ to the target SCeNB. The new most recently derived key in this case may be KeNB*$^{(s)}$.

In an example, upon a reconfiguration involving mobility in the primary layer, the WTRU may derive a new key KeNB* from its currently active KeNB key, and upon a reconfiguration involving mobility in the secondary layer, the WTRU may derive a new key KeNB*$^{(s)}$ from its currently active KeNB$^{(s)}$ key. Thus, either or both of the currently active KeNB key and/or KeNB$^{(s)}$ key may be used as a basis for further key derivation depending on which layer(s) is (are) involved in the next reconfiguration. The same principle may be used at the MeNB for the derivation of new keys KeNB*$^{(s)}$ and/or KeNB*.

In an example, the WTRU may activate the SCeNB layer AS security when SRB1 is established (e.g., toward the MeNB) and prior the establishment of SRB2. In another example, the WTRU may activate the SCeNB layer security after SRB2 is established. As part of the SCeNB AS security activation, the UE may derives KeNB$^{(s)}$ and the corresponding set of security keys (e.g., K$_{UPenc}$$^{(s)}$, K$_{RRCint}$$^{(s)}$, K$_{RRCenc}$$^{(s)}$, etc.) using one or more of the methods described herein.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A method implemented in a wireless transmit receive unit (WTRU), the method comprising:
  establishing a radio resource control (RRC) connection, wherein the RRC connection is common between at least a first data path associated with a first group of one or more cells and a second data path associated with a second group of one or more cells, and wherein a first signaling radio bearer (SRB) is used for communicating RRC connection information via the first data path;
  receiving an RRC reconfiguration message comprising information indicating a configuration associated with a second SRB;
  determining that at least part of the configuration associated with the second SRB cannot be successfully applied, wherein the at least part of the configuration associated with the second SRB cannot be successfully applied due to an integrity verification failure associated with the second SRB; and
  reverting back to a previous RRC connection configuration associated with the second SRB based on determining that at least part of the configuration associated with the second SRB cannot be successfully applied.

2. The method of claim 1, comprising transmitting an RRC message via the first SRB based on determining that at least part of the configuration associated with the second SRB cannot be successfully applied, wherein the RRC message comprises information indicating a cause of failure, and wherein the cause of failure is the integrity verification failure associated with the second SRB.

3. The method of claim 1, comprising transmitting a message indicating the integrity verification failure via the first SRB.

4. The method of claim 1, comprising determining the integrity verification failure using at least an integrity key.

5. The method of claim 1, comprising initiating an RRC re-establishment procedure or an RRC failure notification procedure.

6. The method of claim 1, wherein the first SRB comprises any of a SRB0 and a SRB1, and the second SRB comprises a SRB3.

7. The method of claim 1, wherein a single RRC entity at the WTRU is configured to process each of the first and second SRBs.

8. The method as in claim 1, wherein the first data path is used for communication with a first type of radio access node associated with a first cell type, and wherein the second data path is used for communication with a second type of radio access node associated with a second cell type.

9. The method of claim 1, wherein receiving the RRC reconfiguration message comprising information indicating a configuration associated with a second SRB comprises receiving the RRC reconfiguration message via the first SRB or the second SRB.

10. A wireless transmit receive unit (WTRU) comprising circuitry, including a transmitter, a receiver, a processor and memory, configured to:

establish a radio resource control (RRC) connection, wherein the RRC connection is common between at least a first data path associated with a first group of one or more cells and a second data path associated with a second group of one or more cells, and wherein a first signaling radio bearer (SRB) is used for communicating RRC connection information via the first data path;

receive an RRC reconfiguration message comprising information indicating a configuration associated with a second SRB;

determine that at least part of the configuration associated with the second SRB cannot be successfully applied, wherein the at least part of the configuration associated with the second SRB cannot be successfully applied due to a integrity verification failure associated with the second SRB; and revert back to a previous RRC connection configuration associated with the second SRB based on determining that at least part of the configuration associated with the second SRB cannot be successfully applied.

11. The WTRU of claim 10, where the circuitry is configured to transmit an RRC message via the first SRB based on determining that at least part of the configuration associated with the second SRB cannot be successfully applied, wherein the RRC message comprises information indicating a cause of failure, and wherein the cause of failure is the integrity verification failure associated with the second SRB.

12. The WTRU of claim 10, wherein the circuitry is configured to transmit a message indicating the integrity verification failure via the first SRB.

13. The WTRU of claim 10, wherein the circuitry is configured to determine the integrity verification failure using at least an integrity key.

14. The WTRU of claim 10, wherein the circuitry is configured to initiate an RRC re-establishment procedure or an RRC failure notification procedure.

15. The WTRU of claim 10, wherein the first SRB comprises any of a SRB0 and a SRB1, and the second SRB comprises a SRB3.

16. The WTRU of claim 10, wherein a single RRC entity at the WTRU is configured to process each of the first and second SRBs.

17. The WTRU of claim 10, wherein the first data path is used for communication with a first type of radio access node associated with a first cell type, and wherein the second data path is used for communication with a second type of radio access node associated with a second cell type.

18. The WTRU of claim 10, wherein the circuitry being configured to receive the RRC reconfiguration message comprising information indicating a configuration associated with a second SRB comprises the circuitry being configured to receive the RRC reconfiguration message via the first SRB or the second SRB.

* * * * *